United States Patent
Miyabe et al.

(10) Patent No.: US 12,552,757 B2
(45) Date of Patent: Feb. 17, 2026

(54) NRF2-ACTIVATING COMPOUND

(71) Applicant: SENJU PHARMACEUTICAL CO., LTD., Osaka (JP)

(72) Inventors: Tomoyo Miyabe, Osaka (JP); Shinnosuke Machida, Osaka (JP); Yuka Oba, Osaka (JP)

(73) Assignee: SENJU PHARMACEUTICAL CO., LTD., Osaka (JP)

( * ) Notice: Subject to any disclaimer, the term of this patent is extended or adjusted under 35 U.S.C. 154(b) by 1086 days.

(21) Appl. No.: 17/623,983

(22) PCT Filed: Jul. 3, 2020

(86) PCT No.: PCT/JP2020/026309
§ 371 (c)(1),
(2) Date: Dec. 30, 2021

(87) PCT Pub. No.: WO2021/002473
PCT Pub. Date: Jan. 7, 2021

(65) Prior Publication Data
US 2023/0024995 A1  Jan. 26, 2023

(30) Foreign Application Priority Data
Jul. 3, 2019  (JP) .................. 2019-124336

(51) Int. Cl.
| | | |
|---|---|---|
| C07D 515/04 | (2006.01) | |
| A61K 31/553 | (2006.01) | |
| A61K 31/554 | (2006.01) | |
| A61P 3/10 | (2006.01) | |
| A61P 11/00 | (2006.01) | |
| A61P 13/12 | (2006.01) | |
| A61P 17/00 | (2006.01) | |
| A61P 25/00 | (2006.01) | |
| A61P 27/02 | (2006.01) | |
| A61P 27/04 | (2006.01) | |
| A61P 27/06 | (2006.01) | |
| A61P 27/12 | (2006.01) | |

(Continued)

(52) U.S. Cl.
CPC ......... *C07D 291/08* (2013.01); *C07D 409/04* (2013.01); *C07D 419/10* (2013.01); *C07D 419/14* (2013.01); *C07D 515/04* (2013.01); *C07F 5/027* (2013.01)

(58) Field of Classification Search
CPC .. C07D 515/04; A61K 31/553; A61K 31/554; A61P 27/02; A61P 27/04; A61P 27/06; A61P 27/12; A61P 27/16; A61P 3/10; A61P 11/00; A61P 13/12; A61P 17/00; A61P 25/00; A61P 43/00
See application file for complete search history.

(56) References Cited

U.S. PATENT DOCUMENTS

| | | |
|---|---|---|
| 2017/0217922 A1 | 8/2017 | Duncton et al. |
| 2018/0258063 A1 | 9/2018 | Duncton et al. |

(Continued)

FOREIGN PATENT DOCUMENTS

| | | |
|---|---|---|
| CN | 108699011 | 10/2018 |
| JP | 2017-503786 | 2/2017 |

(Continued)

OTHER PUBLICATIONS

Clevelandclinic, https://my.cleveland-clinic.org/health/diseases/22934-brain-diseases, Available online: Sep. 15, 2022. (Year: 2022).*
Clevelandclinic, https://my.clevelandclinic.org/ health/diseases/21573-skin-diseases, Available online: Jun. 10, 2021. (Year: 2021).*
International Search Report issued Aug. 25, 2020 in International (PCT) Application No. PCT/JP2020/026309.
Weiguo Yu et al., Medicinal Chemistry, Edition 3, Human Science and Technology press (2018), pp. 6-7, with English language translation (pp. 1-4).

(Continued)

*Primary Examiner* — Kamal A Saeed
*Assistant Examiner* — Sagar Patel
(74) *Attorney, Agent, or Firm* — Wenderoth, Lind & Ponack, L.L.P.

(57) ABSTRACT

A compound having Nrf2-activating action is provided. The compound is represented by formula (I), a salt of the compound, or a solvate of the compound or salt:

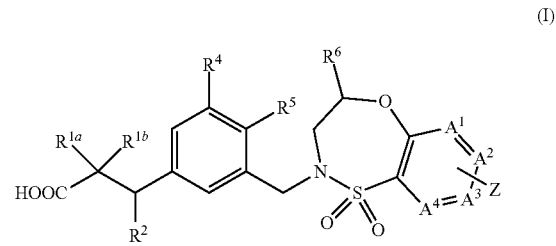

wherein $R^{1a}$ and $R^{1b}$ are identical or different and represent a hydrogen atom, an alkyl group, or a halogen atom; $R^2$ represents an optionally substituted group derived from a heterocycle, and the heterocycle represents thiophene, furan, pyrrole, thiazole, or a fused ring including any of these heterocycles; $R^4$ and $R^5$ are identical or different and represent a hydrogen atom or an optionally substituted alkyl group, or $R^4$ and $R^5$ bind with each other to form —NH—CH—N—; $R^6$ represents an optionally substituted alkyl group; $A^1$, $A^2$, $A^3$, and $A^4$ are identical or different and represent CH or N wherein the number of N is 1 or less; and Z represents a hydrogen atom or a halogen atom.

21 Claims, No Drawings

(51) Int. Cl.
- *A61P 27/16* (2006.01)
- *A61P 43/00* (2006.01)
- *C07D 291/08* (2006.01)
- *C07D 409/04* (2006.01)
- *C07D 419/10* (2006.01)
- *C07D 419/14* (2006.01)
- *C07F 5/02* (2006.01)

(56) References Cited

U.S. PATENT DOCUMENTS

| | | | |
|---|---|---|---|
| 2020/0216412 A1 | 7/2020 | Duncton et al. | |
| 2021/0078969 A1 | 3/2021 | Duncton et al. | |
| 2024/0132519 A1* | 4/2024 | Miyabe | C07D 515/04 |

FOREIGN PATENT DOCUMENTS

| | | |
|---|---|---|
| WO | 2015/092713 | 6/2015 |
| WO | 2018/109643 | 6/2018 |
| WO | 2018/109647 | 6/2018 |
| WO | 2018/109649 | 6/2018 |

OTHER PUBLICATIONS

Thomas G. Davies et al., "Monoacidic Inhibitors of the Kelch-like ECH-Associated Protein 1: Nuclear Factor Erythroid 2-Related Factor 2 (KEAP1:NRF2) Protein-Protein Interaction with High Cell Potency Identified by Fragment-Based Discovery", Journal of Medicinal Chemistry, pages A-P (2016); J. Med. Chem. 2016, 59, 8, 3991-4006.

Thomas G. Davies et al., "Mono-acidic inhibitors of the Ketch-like ECH-associated protein 1:Nuclear factor erythroid 2-related factor 2 (KEAP1:NRF2) protein-protein interaction with high cell potency identified by Fragment-based Discovery", Supporting information, pp. S1-S6 (2016).

Notification of the Frist Office Action issued Apr. 20, 2023 in corresponding Chinese Patent Application No. 202080048742.5, with English language translation, pp. 1-8.

Davies et al., "Monoacidic Inhibitors of the Kelch-like ECH-Associated Protein 1: Nuclear Factor Erythroid 2-Related Factor 2 (KEAP1:NRF2) Protein-Protein Interaction with High Cell Potency Identified by Fragment-Based Discovery", Journal of Medicinal Chemistry, vol. 59, No. 8, Mar. 31, 2016, pp. 3991-4006.

Extended European Search Report issued Jun. 22, 2023 in corresponding European Patent Application No. 20835394.6.

\* cited by examiner

NRF2-ACTIVATING COMPOUND

TECHNICAL FIELD

The present invention relates to an Nrf2-activating compound.

BACKGROUND ART

Nrf2 (NF-E2-related factor 2) is a transcription factor that promotes the expression of oxidative-stress defense genes. Due to its interaction with Keap1 (Kelch-like ECH-associated protein 1), Nrf2 undergoes ubiquitylation and proteasomal degradation. This prevents the interaction between Nrf2 and Keap1 and thus promotes the translocation of Nrf2 into the nucleus, thereby activating the expression of oxidative-stress defense genes. For example, Nrf2 activators are expected to be a therapeutic agent for diseases in the systemic area, such as multiple sclerosis, psoriasis, and diabetic nephropathy, and for diseases in the ophthalmic area, such as dry eyes, diabetic retinopathy, retinitis pigmentosa, and glaucoma.

Patent Literature 1 discloses an Nrf2 activator intended mainly for use in the treatment of chronic obstructive pulmonary disease (COPD).

CITATION LIST

Patent Literature

Patent Literature 1: WO2015/092713A

SUMMARY OF INVENTION

Technical Problem

An object of the present invention is to provide a compound having Nrf2-activating action.

Solution to Problem

The present inventors conducted extensive research to achieve the object, and found that the compound represented by formula (I), described later, a salt of the compound, and a solvate of the compound or salt have Nrf2-activating action. They conducted further research based on this finding and completed the present invention.

Specifically, the present invention includes the following subject matter.

Item 1. A compound represented by formula (I), a salt of the compound, or a solvate of the compound or salt:

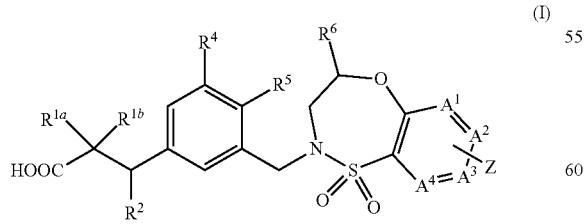

(I)

wherein $R^{1a}$ and $R^{1b}$ are identical or different and represent a hydrogen atom, an alkyl group, or a halogen atom; $R^2$ represents an optionally substituted group derived from a heterocycle, and the heterocycle represents thiophene, furan, pyrrole, thiazole, or a fused ring including any of these heterocycles; $R^4$ and $R^5$ are identical or different and represent a hydrogen atom or an optionally substituted alkyl group, or $R^4$ and $R^5$ bind with each other to form —NH—CH=N—; $R^6$ represents optionally substituted alkyl group; $A^1, A^2, A^3$, and $A^4$ are identical or different and represent CH or N wherein the number of N is 1 or less; and Z represents a hydrogen atom or a halogen atom.

Item 2. The compound according to Item 1, a salt of the compound, or a solvate of the compound or salt, wherein $R^2$ represents a thienyl group optionally having a substituent.

Item 3. The compound according to Item 2, a salt of the compound, or a solvate of the compound or salt, wherein the optional substituent of the thienyl group includes an electron-withdrawing group.

Item 4. The compound according to Item 2 or 3, a salt of the compound, or a solvate of the compound or salt, wherein the optional substituent of the thienyl group includes an acetyl group, an aminosulfonyl group, a cyano group, or a cycloalkyl carbonyl group.

Item 5. The compound according to any one of Items 1 to 4, a salt of the compound, or a solvate of the compound or salt, wherein $R^2$ is a group represented by formula (R2A):

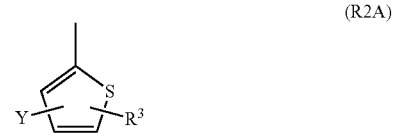

(R2A)

wherein $R^3$ represents an acetyl group, an aminosulfonyl group, a cyano group, or a cycloalkyl carbonyl group; and Y represents a hydrogen atom, an alkyl group, a halogen atom, or an alkoxy group.

Item 6. The compound according to any one of Items 1 to 5, a salt of the compound, or a solvate of the compound or salt, wherein $R^2$ is a group represented by formula (R2Aa) or (R2Ab):

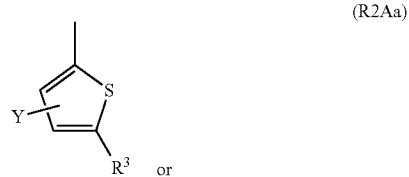

wherein $R^3$ represents an acetyl group, an aminosulfonyl group, a cyano group, or a cycloalkyl carbonyl group; and Y represents a hydrogen atom, an alkyl group, a halogen atom, or an alkoxy group.

Item 7. The compound according to Item 5 or 6, a salt of the compound, or a solvate of the compound or salt, wherein $R^3$ represents an acetyl group.

Item 8. The compound according to any one of Items 5 to 7, a salt of the compound, or a solvate of the compound or salt, wherein $R^4$ and $R^5$ are identical or different and represent a hydrogen atom or an alkyl group.

Item 9. The compound according to any one of Items 5 to 8, a salt of the compound, or a solvate of the compound or salt, wherein $R^{1a}$ and $R^{1b}$ are identical or different and represent a hydrogen atom or an alkyl group.

Item 10. The compound according to any one of Items 5 to 9, a salt of the compound, or a solvate of the compound or salt, wherein $R^{1a}$ and $R^{1b}$ are identical or different and represent a hydrogen atom or an alkyl group; $R^3$ represents an acetyl group; $R^4$ and $R^5$ are identical or different and represent a hydrogen atom or an alkyl group; $R^6$ represents an ethyl group optionally having a substituent; $A^1$, $A^2$, and $A^4$ are all CH, and $A^3$ represents CH or N; Y represents a hydrogen atom, an alkyl group, a halogen atom, or an alkoxy group; and Z represents a hydrogen atom.

Item 11. The compound according to any one of Items 5 to 10, a salt of the compound, or a solvate of the compound or salt, wherein
one of $R^{1a}$ and $R^{1b}$ is an alkyl group, and the other is a hydrogen atom, or $R^{1a}$ and $R^{1b}$ are both an alkyl group, and the alkyl group preferably has 1 to 3 carbon atoms,
$R^2$ is represented by formula (R2Aa):

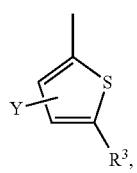

(R2Aa)

wherein $R^3$ represents an acetyl group, Y represents a hydrogen atom, an alkyl group, a halogen atom, or an alkoxy group; preferably, the alkyl group has 1 to 3 carbon atoms, the halogen atom is a fluorine atom, and the alkoxy group has 1 to 3 carbon atoms;
$R^4$ represents a hydrogen atom;
$R^5$ represents an alkyl group, and preferably, the alkyl group has 1 to 3 carbon atoms,
$R^6$ represents an ethyl group optionally having a substituent, the optional substituent of the ethyl group is preferably an aryl alkoxy group, and particularly preferably a benzyloxy group,
$A^1$, $A^2$, and $A^4$ are all CH, and $A^3$ represents CH or N; and
Z represents a hydrogen atom.

Item 12. A compound of any of the following, a salt of the compound, or a solvate of the compound or salt:
3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (compound 1),
3-(5-acetyl-4-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (compound 2),
3-(4-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (compound 3),
3-(5-acetyl-4-methoxythiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoic acid (compound 4)
3-(5-acetylthiophen-2-yl)-3-[3-({4-[2-(benzyloxy)ethyl]-1,1-dioxide-3,4-dihydro-2H-benzo[b][1,4,5]oxathiazepin-2-yl}methyl)-4-methylphenyl]-2-methylpropanoic acid (compound 13),
3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoic acid (compound 16),
3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid (compound 48),
3-(5-acetyl-4-fluorothiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid (compound 49),
3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid (compound 50), and
3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoic acid (compound 51).

Item 13. A medicament comprising at least one member selected from the group consisting of the compound of any one of Items 1 to 12, a salt of the compound, and a solvate of the compound or salt.

Item 14. The medicament according to Item 13, which is an Nrf2 (NF-E2-related factor 2) activator.

Item 15. The medicament according to Item 13 or 14, which is a topically administered formulation.

Item 16. The medicament according to any one of Items 13 to 15, which is an ophthalmic formulation, an dermatological formulation, a respiratory formulation, or a dermatological formulation.

Item 17. The medicament according to Item 13 or 14, which is an orally administered formulation.

Item 18. The medicament according to Item 13 or 14, which is a parenterally administered formulation.

Item 19. The medicament according to Item 13, 14, or 18, which is an intravenously administered formulation, an intranasally administered formulation, or a transdermally administered formulation.

Item 20. The medicament according to any one of Items 11 to 19, which is a medicament for prevention or treatment of a brain disease, a lung disease, a skin disease, an otologic disease, a kidney disease, or an ophthalmic disease.

Item 21. A method for preventing or treating a disease or symptom associated with regulation of activity of Nrf2 (NF-E2-related factor 2) in a subject with a disease associated with regulation of activity of Nrf2,
the method comprising administering at least one member selected from the group consisting of the compound of any of Items 1 to 13, a salt of the compound, and a solvate of the compound or salt to the subject.

Item 22. A method for preventing or treating a brain disease, a lung disease, a skin disease, an otologic disease, a kidney disease, or an ophthalmic disease in a subject with a brain disease, a lung disease, a skin disease, an otologic disease, a kidney disease, or an ophthalmic disease, the method comprising administering at least one member selected from the group consisting of the compound of any one of Items 1 to 13, a salt of the compound, and a solvate of the compound or salt to the subject.

Item 23. At least one member selected from the group consisting of the compound of any one of Items 1 to 13, a salt of the compound, and a solvate of the compound or salt, for use in a medicament.

Item 24. At least one member selected from the group consisting of the compound of any one of Items 1 to 13, a salt of the compound, and a solvate of the compound or salt, for use in the prevention or treatment of a disease or symptom associated with regulation of activity of Nrf2 (NF-E2-related factor 2).

Item 25. At least one member selected from the group consisting of the compound of any one of Items 1 to 13, a salt of the compound, and a solvate of the compound or salt, for use in the prevention or treatment of a brain disease, a lung disease, a skin disease, an otologic disease, a kidney disease, or an ophthalmic disease.

Item 26. Use of at least one member selected from the group consisting of the compound of any one of Items 1 to 13, a salt of the compound, and a solvate of the compound or salt in the production of a medicament.

Advantageous Effects of Invention

The present invention provides a compound having an Nrf2-activating action, a salt of the compound, and a solvate of the compound or salt. The present invention also provides a medicament containing at least one member selected from the compound, the salt, or the solvate; more specifically, the present invention provides a medicament such as an Nrf2 activator, a topically administered formulation, and a medicament for prevention or treatment of a brain disease, a lung disease, a skin disease, an otologic disease, a kidney disease, or an ophthalmic disease.

DESCRIPTION OF EMBODIMENTS

In the present specification, the expressions "comprising," "including," and "containing" include the concepts of "comprising," "containing," "consisting essentially of," and "consisting of."

1. Compound

In an embodiment, the present invention relates to a compound represented by formula (I), a salt of the compound, or a solvate of the compound or salt.

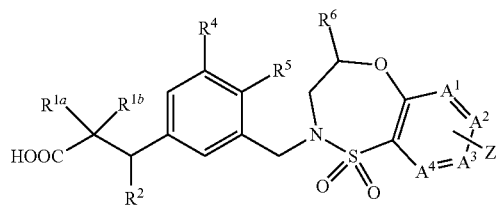

(I)

(in the present specification, this compound may be referred to as "compound (I) of the present invention").

This compound is described below.

1-1. $R^{1a}$ and $R^{1b}$ $R^{1a}$ and $R^{1b}$ are identical or different and represent a hydrogen atom, an alkyl group, or a halogen atom.

The alkyl group represented by $R^{1a}$ or $R^{1b}$ includes both a linear alkyl group and a branched alkyl group (preferably a linear alkyl group). The number of carbon atoms of the alkyl group is not particularly limited, and is, for example, 1 to 4, preferably 1 to 3, more preferably 1 to 2, and still more preferably 1. Specific examples of the alkyl group include a methyl group, an ethyl group, an n-propyl group, an isopropyl group, an n-butyl group, an isobutyl group, a tert-butyl group, and a sec-butyl group.

Examples of the halogen atom represented by $R^{1a}$ or $R^{1b}$ include a fluorine atom, a chlorine atom, a bromine atom, and an iodine atom; the halogen atom represented by $R^{1a}$ or $R^{1b}$ is preferably a fluorine atom or a chlorine atom, and more preferably a fluorine atom.

In a preferable embodiment of the present invention, $R^{1a}$ and $R^{1b}$ are preferably identical or different and represent a hydrogen atom or an alkyl group. In particular, from the standpoint of Nrf2-activating action, it is more preferred that one of $R^{1a}$ and $R^{1b}$ is an alkyl group while the other is a hydrogen atom or an alkyl group, and it is still more preferred that one of $R^{1a}$ and $R^{1b}$ is an alkyl group while the other is a hydrogen atom.

1-2. $R^2$ $R^2$ represents an optionally substituted group derived from a heterocycle, and the heterocycle represents thiophene, furan, pyrrole, thiazole, or a fused ring including any of these heterocycles;

Examples of fused rings include a fused ring formed by thiophene, furan, pyrrole, or thiazole with a 5- to 7-membered ring (bicyclic ring). Examples of the 5- to 7-membered ring for forming a fused ring include a ring having, for example, 0 to 3 heteroatoms (e.g., a sulfur atom, an oxygen atom, and a nitrogen atom) with or without an oxo group. More specific examples of the fused ring include indole, hydroindole, oxohydroindole, thienopyrrole, hydrothienopyrrole, and oxohydrothienopyrrole; the fused ring is preferably, for example, oxohydroindole (more specifically, for example, 4-oxo-1,5,6,7-tetrahydro-1H-indole), or oxohydrothienopyrrole (more specifically, for example, 6-oxo-4,5-dihydro-6H-thieno[2,3-c]pyrrole).

Examples of groups derived from a heterocycle include a thienyl group (e.g., a 2-thienyl group, a 3-thienyl group, preferably a 2-thienyl group), a furyl group (e.g., a 2-furyl group, a 3-furyl group, preferably a 2-furyl group), a pyrrolyl group (e.g., a 1-pyrrolyl group, a 2-pyrrolyl group, a 3-pyrrolyl group), a thiazolyl group (e.g., 2-thiazolyl, 4-thiazolyl, 5-thiazolyl), and groups derived from the fused rings described above.

Examples of substituents of the optionally substituted group derived from a heterocycle represented by $R^2$ include acyl groups, such as an acetyl group, and a cycloalkyl carbonyl group, aminosulfonyl group, a cyano group, $—R^{21}—NR^{22}R^{13}$ ($R^{21}$ represents a single bond, a carbonyl group, or an alkylene group; $R^{22}$ and $R^{23}$ are identical or different and represent a hydrogen atom, an optionally substituted alkyl group, or $R^{22}$ and $R^{23}$ bind with each other to form an alkylene group and form a ring together with an adjacent nitrogen atom), an alkoxy group, a halogen atom, and an alkyl group. The substituent can be at any position, and is, for example, at any ring-constituting atom of a heterocycle (e.g., a carbon atom, a sulfur atom, an oxygen atom, and a nitrogen atom), preferably at a carbon atom of a heterocycle. The number of substituents is not particularly limited, and can be, for example, 0 to 4, preferably 0 to 2, and more preferably 1 to 2.

The acyl group as a substituent of the group derived from a heterocycle can be any acyl group that is formed by removing a hydroxy group from a carboxylic acid, and is preferably a group represented by —CO—$R^{24}$ ($R^{24}$ represents an alkyl group or a cycloalkyl group, preferably an alkyl group). The alkyl group represented by $R^{24}$ includes both linear alkyl groups and branched alkyl groups (preferably a linear alkyl group). The number of carbon atoms of the alkyl group is not particularly limited, and is, for example, 1 to 8, preferably 1 to 6, more preferably 1 to 4, still more preferably 1 to 2, and particularly preferably 1. Specific examples of the alkyl group include a methyl group, an ethyl group, an n-propyl group, an isopropyl group, an n-butyl group, an isobutyl group, a tert-butyl group, a sec-butyl group, an n-pentyl group, a neopentyl group, an n-hexyl group, and a 3-methyl pentyl group. The number of carbon atoms of the cycloalkyl group represented by $R^{24}$ is not particularly limited, and is, for example, 3 to 8, preferably 3 to 6, more preferably 3 to 4, and still more preferably 3. The acyl group as a substituent is preferably, for example, an acetyl group, and a cycloalkyl carbonyl group; from the standpoint of Nrf2-activating action, the acyl group as a substituent is particularly preferably an acetyl group.

$R^{21}$ of —$R^{21}$—$NR^{22}R^{23}$ as a substituent of the optionally substituted group derived from a heterocycle represents a single bond, a carbonyl group, or an alkylene group (preferably a carbonyl group). The alkylene group represented by $R^{21}$ includes both linear alkylene groups and branched alkylene groups (preferably a linear alkylene group). The number of carbon atoms of the alkylene group is not particularly limited, and is, for example, 1 to 8, preferably 1 to 6, more preferably 1 to 4, still more preferably 1 to 2, and particularly preferably 1. Specific examples of the alkylene group include a methylene group, an ethylene group, a propylene group, and a butylene group. $R^{22}$ and $R^{23}$ of —$R^{21}$—$NR^{22}R^{23}$ as a substituent are identical or different and represent a hydrogen atom, an optionally substituted alkyl group, or $R^{22}$ and $R^{23}$ bind with each other to form an alkylene group and form a ring together with an adjacent nitrogen atom (preferably $R^{22}$ and $R^{23}$ are identical or different and represent a hydrogen atom or an alkyl group, more preferably one of $R^{22}$ and $R^{23}$ is a hydrogen atom and the other is an alkyl group, and still more preferably $R^{22}$ and $R^{23}$ both are a hydrogen atom). The alkyl group represented by $R^{22}$ or $R^{23}$ includes both linear alkyl groups and branched alkyl groups (preferably a linear alkyl group). The number of carbon atoms of the alkyl group is not particularly limited, and is, for example, 1 to 8, preferably 1 to 6, more preferably 1 to 4, still more preferably 1 to 2, and particularly preferably 1. Specific examples of the alkyl group include a methyl group, an ethyl group, an n-propyl group, an isopropyl group, an n-butyl group, an isobutyl group, a tert-butyl group, a sec-butyl group, an n-pentyl group, a neopentyl group, an n-hexyl group, and a 3-methyl pentyl group. The substituent of the optionally substituted alkyl group is, for example, an alkoxy group. The alkoxy group includes both linear alkoxy groups and branched alkoxy groups (preferably a linear alkoxy group). The number of carbon atoms of the alkoxy group is not particularly limited, and is, for example, 1 to 8, preferably 1 to 6, more preferably 1 to 4, still more preferably 1 to 2, and particularly preferably 1. Specific examples of the alkoxy group include a methoxy group, an ethoxy group, an n-propoxy group, an isopropoxy group, an n-butoxy group, an isobutoxy group, a sec-butoxy group, and a tert-butoxy group.

The alkoxy group as a substituent of the optionally substituted group derived from a heterocycle includes both linear alkoxy groups and branched alkoxy groups (preferably a linear alkoxy group). The number of carbon atoms of the alkoxy group is not particularly limited, and is, for example, 1 to 8, preferably 1 to 6, more preferably 1 to 4, still more preferably 1 to 2, and particularly preferably 1. Specific examples of the alkoxy group include a methoxy group, an ethoxy group, an n-propoxy group, an isopropoxy group, an n-butoxy group, an isobutoxy group, a sec-butoxy group, and a tert-butoxy group.

The halogen atom as a substituent of the optionally substituted group derived from a heterocycle is, for example, a fluorine atom, a chlorine atom, a bromine atom, or an iodine atom, preferably a fluorine atom, or a chlorine atom, and more preferably a fluorine atom.

The alkyl group as a substituent of the optionally substituted group derived from a heterocycle includes both linear alkyl groups and branched alkyl groups (preferably a linear alkyl group). The number of carbon atoms of the alkyl group is not particularly limited, and is, for example, 1 to 4, preferably 1 to 3, more preferably 1 to 2, and still more preferably 1. Specific examples of the alkyl group include a methyl group, an ethyl group, an n-propyl group, an isopropyl group, an n-butyl group, an isobutyl group, a tert-butyl group, and a sec-butyl group.

In a preferable embodiment of the present invention, $R^2$ is preferably an optionally substituted thienyl group, or an optionally substituted furyl group; particularly from the viewpoint that the compound is more easily metabolized, $R^2$ is more preferably an optionally substituted thienyl group.

In a preferable embodiment of the present invention, particularly when $R^2$ represents an optionally substituted thienyl group or optionally substituted furyl group (preferably an optionally substituted thienyl group), the substituent of the optionally substituted group derived from a heterocycle preferably contains an electron-withdrawing group (i.e., when the number of substituents is one, the substituent is an electron-withdrawing group, and when the number of substituents is two or more, at least one substituent is an electron-withdrawing group) from the viewpoint that the compound is more easily metabolized. More preferably, the substituent of the optionally substituted group derived from a heterocycle is an acyl group, an aminosulfonyl group, or a cyano group (still more preferably an acetyl group, an aminosulfonyl group, a cyano group, or a cycloalkyl carbonyl group; particularly from the standpoint of Nrf2-activating action, particularly preferably an acetyl group) (i.e., when the number of substituents is one, the substituent is any one of these groups, and when the number of substituents is two or more, at least one substituent is any of these groups). In these embodiments, preferably, the number of substituents of the group derived from a heterocycle is 0 to 2 (preferably 1 to 2). When the number of substituents is two or more, at least one substituent is an alkyl group, a halogen atom, or an alkoxy group.

In a preferable embodiment of the present invention, $R^2$ is preferably a group represented by formula (R2X1) or formula (R2X2):

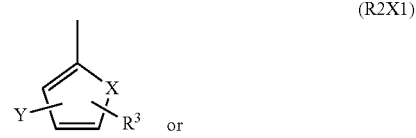

(R2X1)

or

-continued

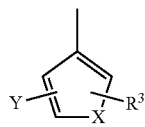
(R2X2)

wherein X represents S, O, or $NR^{31}$, Y represents a hydrogen atom, an alkyl group, a halogen atom, or an alkoxy group, $R^3$ represents an acyl group, a hydrogen atom, an aminosulfonyl group, a cyano group, or $-R^{21}-NR^{22}R^{23}$, and $R^{31}$ represents a hydrogen atom or an alkyl group.

X preferably represents S or O, and particularly preferably S.

The substituents represented by $R^3$ and Y are as defined for the "substituents of the optionally substituted group derived from a heterocycle represented by $R^2$."

$R^3$ is preferably an acyl group (preferably, $-CO-R^{24}$ ($R^{24}$ represents an alkyl group or a cycloalkyl group)), an aminosulfonyl group, or a cyano group, more preferably an acetyl group, an aminosulfonyl group, a cyano group, or a cycloalkyl carbonyl group; particularly from the standpoint of Nrf2-activating action, $R^3$ is particularly preferably an acetyl group.

$R^{31}$ is preferably an alkyl group. The alkyl group represented by $R^{31}$ includes both linear alkyl groups and branched alkyl groups (a preferably linear alkyl group). The number of carbon atoms of the alkyl group is not particularly limited, and is, for example, 1 to 8, preferably 1 to 6, more preferably 1 to 4, still more preferably 1 to 2, and particularly preferably 1. Specific examples of the alkyl group include a methyl group, an ethyl group, an n-propyl group, an isopropyl group, an n-butyl group, an isobutyl group, a tert-butyl group, a sec-butyl group, an n-pentyl group, a neopentyl group, an n-hexyl group, and a 3-methyl pentyl group.

$R^2$ represented by the general formulas is preferably a group represented by formula (R2X1), and more preferably formula (R2A):

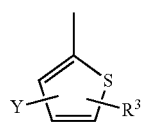
(R2A)

wherein Y and $R^3$ are as defined above.

$R^2$ is still more preferably a group represented by formula (R2Aa) or (R2Ab):

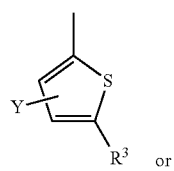
(R2Aa)

or

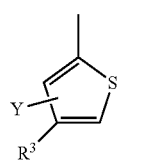
(R2Ab)

wherein Y and $R^3$ are as defined above.

1-3. $R^4$ and $R^5$ $R^4$ and $R^5$ are identical or different and represent a hydrogen atom or an optionally substituted alkyl group, or $R^4$ and $R^5$ bind with each other to form $-NH-CH=N-$.

The alkyl group represented by $R^4$ or $R^5$ includes both linear alkyl groups and branched alkyl groups (preferably a linear alkyl group). The number of carbon atoms of the alkyl group is not particularly limited, and is, for example, 1 to 4, preferably 1 to 3, more preferably 1 to 2, and still more preferably 1. Specific examples of the alkyl group include a methyl group, an ethyl group, an n-propyl group, an isopropyl group, an n-butyl group, an isobutyl group, a tert-butyl group, and a sec-butyl group.

The substituent of the optionally substituted alkyl group represented by $R^4$ or $R^5$ is, for example, a halogen atom. Examples of the halogen atom include a fluorine atom, a chlorine atom, a bromine atom, and an iodine atom. The number of substituents is not particularly limited, and is, for example, 0 to 3, and preferably 0.

The phrase "$R^4$ and $R^5$ bind with each other to form $-NH-CH-N-$" means that the following moiety in formula (I)

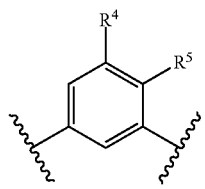

takes the following structure.

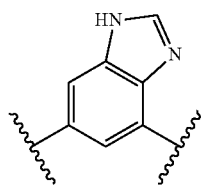 [SMILES: *c1cc(*)c2nc[nH]c2c1]

In a preferable embodiment of the present invention, preferably, $R^4$ and $R^5$ are identical or different and represent a hydrogen atom or an alkyl group; more preferably, one of $R^4$ and $R^5$ is an alkyl group, and the other is a hydrogen atom; still more preferably, $R^4$ is a hydrogen atom, and $R^5$ is an alkyl group.

1-4. $R^6$ $R^6$ represents an optionally substituted alkyl group.

The alkyl group represented by $R^6$ includes both linear alkyl groups and branched alkyl groups (preferably a linear alkyl group). The number of carbon atoms of the alkyl group is not particularly limited, and is, for example, 1 to 8, preferably 1 to 6, more preferably 1 to 4, still more preferably 1 to 2, and particularly preferably 2. Specific examples of the alkyl group include a methyl group, an ethyl group, an n-propyl group, an isopropyl group, an n-butyl group, an isobutyl group, a tert-butyl group, a sec-butyl group, an n-pentyl group, a neopentyl group, an n-hexyl group, and a 3-methyl pentyl group.

The substituent of the optionally substituted alkyl group represented by $R^6$ is, for example, a hydroxyl group, an alkoxy group, an aryl alkoxy group, an aryloxy group, or —NR$^{61}$R$^{62}$ (R$^{61}$ and R$^{62}$ are identical or different and represent a hydrogen atom or an alkyl group). The position of the substituent is not particularly limited; in an embodiment of the present invention, the substituent is preferably at the terminal of the alkyl group. The number of substituents is not particularly limited, and is, for example, 0 to 3, and preferably 0 to 1.

The substituent of the alkoxy group includes both linear alkoxy groups and branched alkoxy groups (preferably a linear alkoxy group). The number of carbon atoms of the alkoxy group is not particularly limited, and is, for example, 1 to 8, preferably 1 to 6, more preferably 1 to 4, still more preferably 1 to 2, and particularly preferably 1. Specific examples of the alkoxy group include a methoxy group, an ethoxy group, an n-propoxy group, an isopropoxy group, an n-butoxy group, an isobutoxy group, a sec-butoxy group, and a tert-butoxy group.

The aryl alkoxy group as a substituent can be any alkoxy group substituted with an aryl group. The number of carbon atoms of the aryl group is not particularly limited, and is, for example, 6 to 14, and preferably 6 to 8. Specifically, such an aryl group is, for example, a phenyl group, a naphthyl group, a biphenyl group, a pentalenyl group, an indenyl group, an anthryl group, a tetracenyl group, a pentacenyl group, a pyrenyl group, a perylenyl group, a fluorenyl group, or a phenanthryl group, and particularly preferably a phenyl group. The position of substitution with the aryl group in the alkoxy group is not particularly limited; in an embodiment of the present invention, the position of substitution is preferably at the terminal of the alkoxy group. The aryl alkoxy group is, for example, a benzyloxy group, or a phenethyloxy group.

The number of carbon atoms of the aryloxy group as a substituent is not particularly limited, and is, for example, 6 to 14, and preferably 6 to 8. Specifically, the aryl group that constitutes the aryloxy group is, for example, a phenyl group, a naphthyl group, a biphenyl group, a pentalenyl group, an indenyl group, an anthranil group, a tetracenyl group, a pentacenyl group, a pyrenyl group, a perylenyl group, a fluorenyl group, or a phenanthryl group, and particularly preferably a phenyl group. The aryloxy group is, for example, a phenyloxy group.

R$^{61}$ and R$^{62}$ that constitute —NR$^{61}$R$^{62}$ as a substituent are identical or different, and represent a hydrogen atom or an alkyl group. The alkyl group represented by R$^{61}$ or R$^{62}$ includes both linear alkyl groups and branched alkyl groups (preferably a linear alkyl group). The number of carbon atoms of the alkyl group is not particularly limited, and is, for example, 1 to 8, preferably 1 to 6, more preferably 1 to 4, still more preferably 1 to 2, and particularly preferably 2. Specific examples of the alkyl group include a methyl group, an ethyl group, an n-propyl group, an isopropyl group, an n-butyl group, an isobutyl group, a tert-butyl group, a sec-butyl group, an n-pentyl group, an neopentyl group, an n-hexyl group, and a 3-methyl pentyl group.

In a preferable embodiment of the present invention, R$^6$ is preferably an alkyl group optionally substituted with a hydroxyl group, an alkoxy group, or an aryl alkoxy group, more preferably an alkyl group optionally substituted with an aryl alkoxy group, and still more preferably an alkyl group.

1-5. A$^1$, A$^2$, A$^3$, and A$^4$

A$^1$, A$^2$, A$^3$, and A$^4$ are identical or different and represent CH or N (however, the number of N is 1 or less).

When one of A$^1$, A$^2$, A$^3$, and A$^4$ is N, preferably A$^1$ or A$^3$ is N, and more preferably A$^3$ is N.

In a preferable embodiment of the present invention, preferably, A$^1$, A$^2$, and A$^4$ are all CH, and A$^3$ is CH or N; more preferably, A$^1$, A$^2$, A$^3$, and A$^4$ are all CH.

1-6. Z

Z represents a hydrogen atom or a halogen atom.

The halogen atom represented by Z is, for example, a fluorine atom, a chlorine atom, a bromine atom, or an iodine atom, preferably a fluorine atom or a chlorine atom, and more preferably a fluorine atom.

When Z is a halogen atom, the binding site may be any of A$^1$, A$^2$, A$^3$, and A$^4$, and is, for example A$^4$.

In a preferable embodiment of the present invention, Z is preferably a hydrogen atom.

1-7. Formula (I)

In an embodiment of the present invention, of the scope of formula (I), formula (IA)

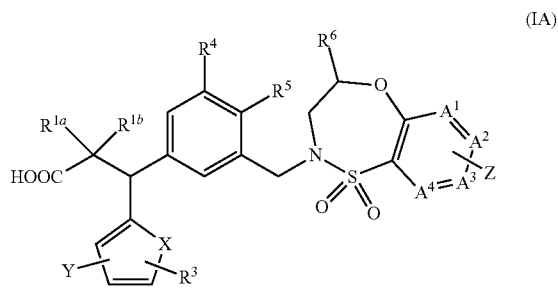

(wherein R$^{1a}$, R$^{1b}$, R$^3$, R$^4$, R$^5$, R$^6$, A$^1$, A$^2$, A$^3$, A$^4$, X, Y, and Z are as defined above) is preferable, formula (IAA)

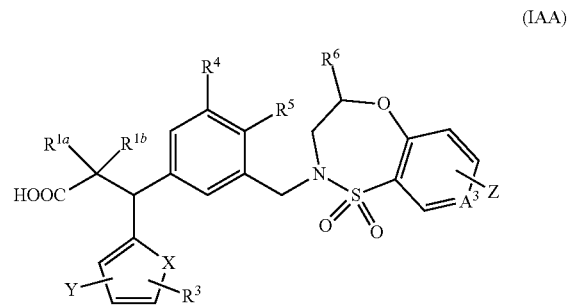

(wherein R$^{1a}$, R$^{1b}$, R$^3$, R$^4$, R$^5$, R$^6$, A$^3$, X, Y, and Z are as defined above) is more preferable, and formula (IAAA)

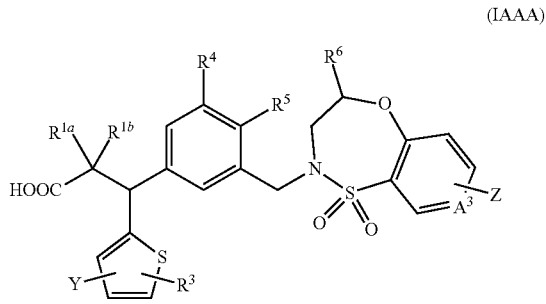

(wherein R$^{1a}$, R$^{1b}$, R$^3$, R$^4$, R$^5$, R$^6$, A$^3$, Y, and Z are as defined above) is still more preferable, and formula (IAAAA1)

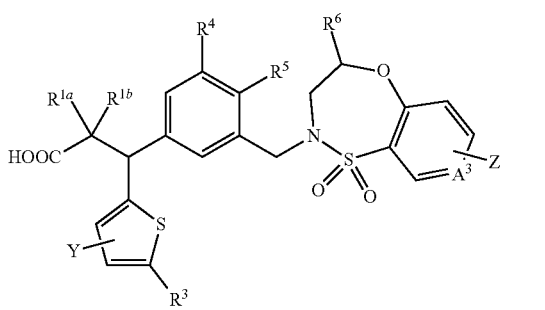

(IAAAA1)

(wherein $R^{1a}$, $R^{1b}$, $R^3$, $R^4$, $R^5$, $R^6$, $A^3$, Y, and Z are as defined above) or formula (IAAAA2)

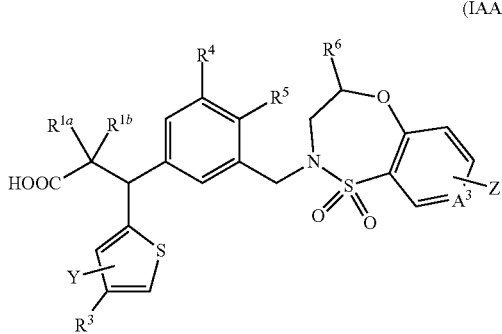

(IAAAA2)

(wherein $R^{1a}$, $R^{1b}$, $R^3$, $R^4$, $R^5$, $R^6$, $A^3$, Y, and Z are as defined above) is yet more preferable.

In a preferable embodiment of the present invention, it is preferred that
$R^{1a}$ and $R^{1b}$ are identical or different and represent a hydrogen atom or an alkyl group,
$R^3$ represents an acetyl group,
$R^4$ and $R^5$ are identical or different and represent a hydrogen atom or an alkyl group,
$R^6$ represents an optionally substituted ethyl group,
$A^1$, $A^2$, and $A^4$ are all CH, $A^3$ represents CH or N,
Y represents a hydrogen atom, an alkyl group, a halogen atom, or an alkoxy group, and
Z represents a hydrogen atom.

In a preferable embodiment of the present invention, it is preferred that
one of $R^{1a}$ and $R^{1b}$ is an alkyl group, and the other is a hydrogen atom, or $R^{1a}$ and $R^{1b}$ are both an alkyl group, and the alkyl group preferably has 1 to 3 carbon atoms;
$R^2$ is represented by formula (R2Aa)

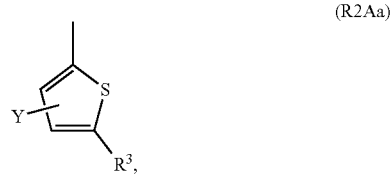

(R2Aa)

wherein $R^3$ represents an acetyl group, Y represents a hydrogen atom, an alkyl group, a halogen atom, or an alkoxy group, the alkyl group preferably has 1 to 3 carbon atoms, the halogen atom is a fluorine atom, and the alkoxy group has 1 to 3 carbon atoms; $R^4$ represents a hydrogen atom;
$R^5$ represents an alkyl group, and the alkyl group preferably has 1 to 3 carbon atoms;
$R^6$ represents an optionally substituted ethyl group, and the substituent of the ethyl group is preferably an aryl alkoxy group, and particularly preferably a benzyloxy group;
$A^1$, $A^2$, and $A^4$ are all CH, and $A^3$ represents CH or N; and
Z represents a hydrogen atom.

In an embodiment of the present invention, the compound represented by formula (I) is preferably the following compounds.

3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (compound 1), 3-(5-acetyl-4-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (compound 2), 3-(4-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (compound 3), 3-(5-acetyl-4-methoxythiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoic acid (compound 4)

3-(5-acetylthiophen-2-yl)-3-[3-({4-[2-(benzyloxy)ethyl]-1,1-dioxide-3,4-dihydro-2H-benzo[b][1,4,5]oxathiazepin-2-yl}methyl)-4-methylphenyl]-2-methylpropanoic acid (compound 13), 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoic acid (compound 16), 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid (compound 48), 3-(5-acetyl-4-fluorothiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid (compound 49), 3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid (compound 50), 3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoic acid (compound 51).

1-8. Others

The salt of the compound represented by formula (I) can be any pharmaceutically acceptable salt. The salt can be either acidic or basic salts. Examples of acidic salts include inorganic acid salts, such as hydrochloride, hydrobromide, sulfate, nitrate, and phosphate; organic acid salts, such as acetate, propionate, tartarate, fumarate, maleate, malate, citrate, methanesulfonate, and paratoluenesulfonate. Examples of basic salts include alkali metal salts, such as sodium salts and potassium salts; alkaline earth metal salts, such as calcium salts and magnesium salts; salts with ammonia; and salts with organic amines, such as morpholine, piperidine, pyrrolidine, monoalkylamine, dialkylamine, trialkylamine, mono(hydroxyalkyl)amine, di(hydroxyalkyl) amine, and tri(hydroxyalkyl)amine.

The solvate of the compound represented by formula (I) is not particularly limited. The solvent that constitutes the solvate is, for example, water, or a pharmaceutically acceptable organic solvent (e.g., ethanol, glycerol, and acetic acid).

The compound (I) of the present invention can also be produced by modifying the compound of the following formula to a compound in which each B independently represents C, CH, or N. In the following formula, the double line formed of a dotted line and a solid line indicates a single bond or a double bond. In an embodiment of the compound represented by the following formula, the number of N in the 6-membered ring containing Bs is 1 to 3. $R^{1a}$, $R^{1b}$, $R^3$, $R^4$, $R^5$, $R^6$, $A^1$, $A^2$, $A^3$, $A^4$, and Z are as defined above.

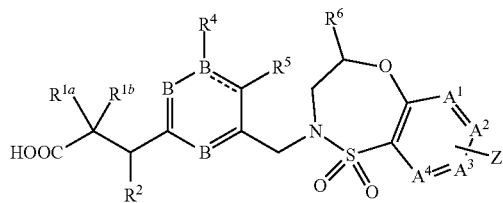

2. Production Method

Compound (I) of the present invention can be produced by various methods.

Compound (I) of the present invention can be produced, for example, by the method described by the following scheme 1 or a method according to this method.

equivalents, of a catalyst can be used per synthetic intermediate 2. For example, 1.5 to 5 equivalents, preferably 1.5 to 3 equivalents, of a base can be used per synthetic intermediate 2. The catalyst is, for example, a rhodium complex, and preferably $[RhCl(cod)]_2$. The base is, for example, N,N-dicyclohexylmethylamine, triethylamine, pyridine, or N,N-diisopropylethylamine; and preferably triethylamine. The reaction is typically performed in a solvent. The solvent can be any solvent that does not adversely affect the reaction, and is, for example, 1,4-dioxane, 1,2-dimethoxyethane, or tetrahydrofuran, and preferably 1,4-dioxane. The reaction time depends on the reagent or solvent for use, but is typically 1 hour to 24 hours, and preferably 1 hour to 18 hours. The reaction temperature depends on the reagent or solvent for use, but is typically 0° C. to 150° C., and preferably 25° C. to 100° C.

In step b, synthetic intermediate 4 is reacted with iodomethane in the presence of a base to produce synthetic intermediate 5. For example, 1 to 2 equivalents, preferably 1 to 1.8 equivalents, of lithium diisopropylamide can be used per synthetic intermediate 4; and, for example, 1 to 20 equivalents, preferably 1 to 15 equivalents, of iodomethane can be used per synthetic intermediate 4. The reaction is typically performed in a solvent. The solvent can be any solvent that does not adversely affect the reaction, and is, for example, tetrahydrofuran. The reaction time depends on the reagent or solvent for use, but is typically 1 hour to 24 hours, and preferably 1 hour to 5 hours. The reaction temperature depends on the reagent or solvent for use, but is typically −78° C. to 40° C., and preferably −78° C. to 25° C.

In step c, deprotection of the acetal of synthetic intermediate 5 is performed. An excess amount of hydrochloric acid Scheme 1

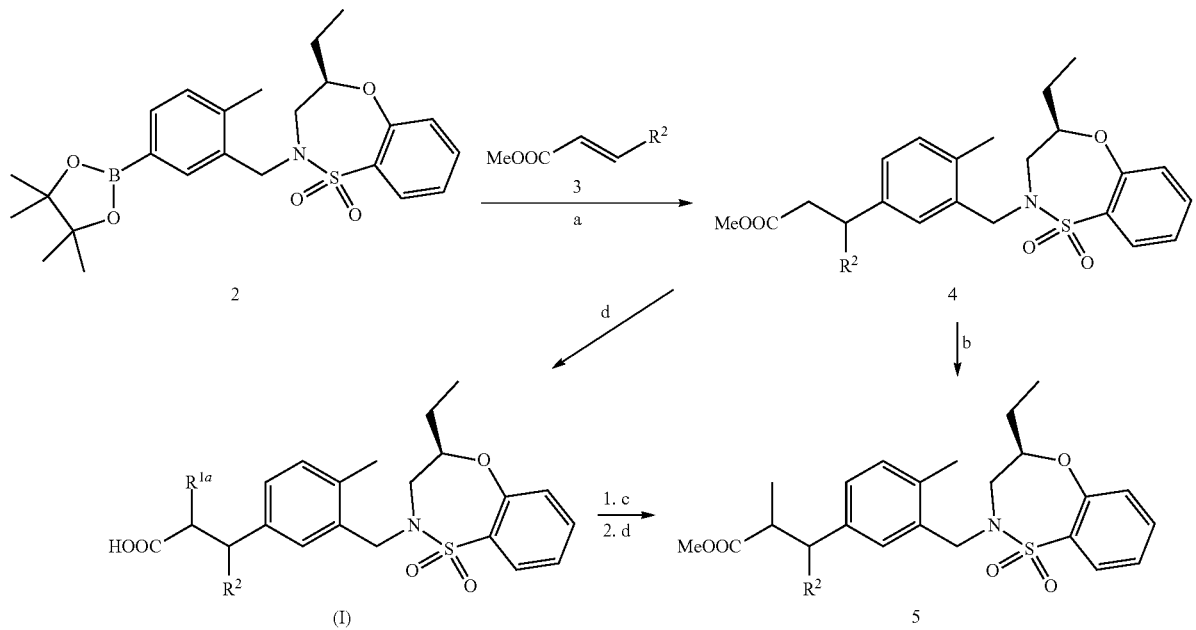

In step a, synthetic intermediate 2 is reacted with synthetic intermediate 3 in the presence of a catalyst and a base to produce synthetic intermediate 4. For example, 1 to 5 equivalents, preferably 1.2 to 3 equivalents, of synthetic intermediate 3 can be used per synthetic intermediate 2. For example, 0.05 to 0.5 equivalents, preferably 0.05 to 0.2 is used for synthetic intermediate 5. The solvent can be any solvent that does not adversely affect the reaction, and is, for example, methanol, dichloromethane, tetrahydrofuran, or 1,4-dioxane, and preferably methanol or tetrahydrofuran. The reaction time depends on the reagent or solvent for use, but is typically 1 hour to 24 hours, and preferably 1 hour to 18 hours. The reaction temperature depends on the reagent or solvent for use, but is typically 25° C. to 150° C., and preferably 25° C. to 100° C.

In step d, hydrolysis of synthetic intermediate 4 or its equivalent ester is performed to produce compound (I) of the present invention. For example, 5 to 20 equivalents, preferably 10 to 20 equivalents, of a base can be used per synthetic intermediate 4. The base is, for example, lithium hydroxide, sodium hydroxide, or potassium hydroxide, and preferably sodium hydroxide or lithium hydroxide. The reaction is typically performed in a solvent. The solvent can be any solvent that does not adversely affect the reaction, and is, for example, methanol, dichloromethane, or tetrahydrofuran, and preferably methanol or tetrahydrofuran. The reaction time depends on the reagent or solvent for use, but is typically 1 hour to 24 hours, and preferably 1 hour to 18 hours. The reaction temperature depends on the reagent or solvent for use, but is typically 25° C. to 150° C., and preferably 25° C. to 140° C.

Compound (I) of the present invention can also be produced, for example, by the method described by the following scheme 2 or a method according to this method.

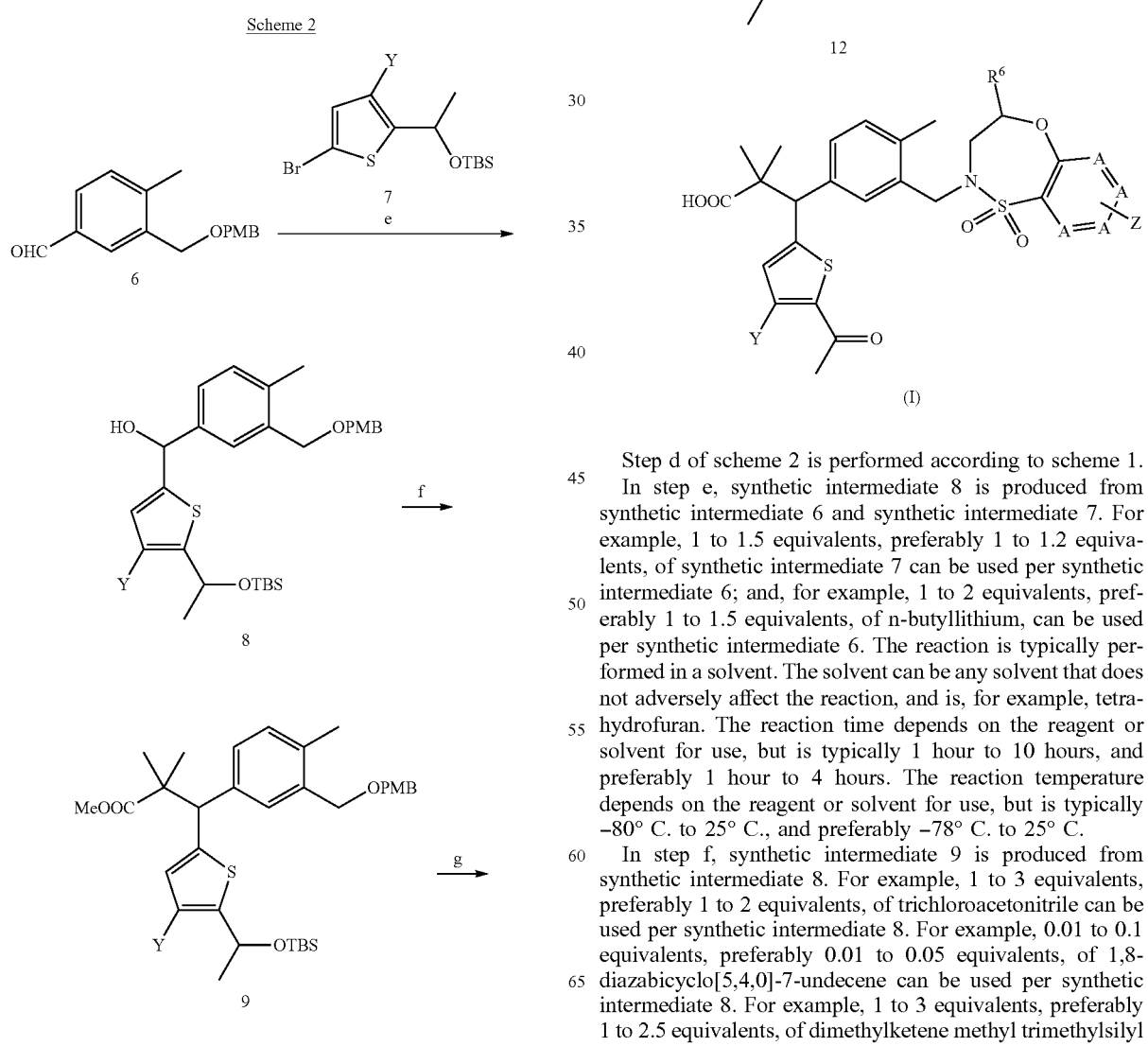

Step d of scheme 2 is performed according to scheme 1.

In step e, synthetic intermediate 8 is produced from synthetic intermediate 6 and synthetic intermediate 7. For example, 1 to 1.5 equivalents, preferably 1 to 1.2 equivalents, of synthetic intermediate 7 can be used per synthetic intermediate 6; and, for example, 1 to 2 equivalents, preferably 1 to 1.5 equivalents, of n-butyllithium, can be used per synthetic intermediate 6. The reaction is typically performed in a solvent. The solvent can be any solvent that does not adversely affect the reaction, and is, for example, tetrahydrofuran. The reaction time depends on the reagent or solvent for use, but is typically 1 hour to 10 hours, and preferably 1 hour to 4 hours. The reaction temperature depends on the reagent or solvent for use, but is typically −80° C. to 25° C., and preferably −78° C. to 25° C.

In step f, synthetic intermediate 9 is produced from synthetic intermediate 8. For example, 1 to 3 equivalents, preferably 1 to 2 equivalents, of trichloroacetonitrile can be used per synthetic intermediate 8. For example, 0.01 to 0.1 equivalents, preferably 0.01 to 0.05 equivalents, of 1,8-diazabicyclo[5,4,0]-7-undecene can be used per synthetic intermediate 8. For example, 1 to 3 equivalents, preferably 1 to 2.5 equivalents, of dimethylketene methyl trimethylsilyl acetal can be used per synthetic intermediate 8. For example, 0.01 to 0.1 equivalents, preferably 0.05 to 0.1 equivalents, of bis(trifluoromethanesulfonyl)imide can be used per synthetic intermediate 8. The reaction is typically performed in a solvent. The solvent can be any solvent that does not adversely affect the reaction, and is, for example, dichloromethane, tetrahydrofuran, or acetonitrile, and preferably acetonitrile. The reaction time depends on the reagent or solvent for use, but is typically 1 hour to 10 hours, and preferably 1 hour to 5 hours. The reaction temperature depends on the reagent or solvent for use, but is typically 0° C. to 25° C., and preferably 10° C. to 25° C.

In step g, synthetic intermediate 10 is produced from synthetic intermediate 9. For example, 1 to 3 equivalents, preferably 1 to 2.5 equivalents, of 2,3-dichloro-5,6-dicyano-p-benzoquinone can be used per synthetic intermediate 9. The reaction is typically performed in a solvent. The solvent can be any solvent that does not adversely affect the reaction, and is, for example, a mixed solvent of dichloromethane and water. The reaction time depends on the reagent or solvent for use, but is typically 1 hour to 5 hours, and preferably 1 hour to 3 hours. The reaction temperature depends on the reagent or solvent for use, but is typically 0° C. to 25° C., and preferably 10° C. to 25° C.

In step h, synthetic intermediate 12 is produced from synthetic intermediate 10 and synthetic intermediate 11. For example, 1 to 2 equivalents, preferably 1 to 1.2 equivalents, of synthetic intermediate 11 can be used per synthetic intermediate 10. For example, 1 to 2 equivalents, preferably 1 to 1.2 equivalents, of triphenylphosphine can be used per synthetic intermediate 10. For example, 1 to 1.5 equivalents, preferably 1 to 1.2 equivalents, of diethyl azodicarboxylate can be used per synthetic intermediate 10. Instead of diethyl azodicarboxylate, for example, bis(2-methoxyethyl)azodicarboxylate, diisopropyl azodicarboxylate, or cyanomethylenetributylphosphorane can be used. The reaction is typically performed in a solvent. The solvent can be any solvent that does not adversely affect the reaction, and is, for example, dichloromethane, 1,4-dioxane, tetrahydrofuran, toluene, or N,N-dimethylformamide, and preferably tetrahydrofuran. The reaction time depends on the reagent or solvent for use, but is typically 1 hour to 24 hours, and preferably 5 hours to 8 hours. The reaction temperature depends on the reagent or solvent for use, but is typically 0° C. to 40° C., and preferably 0° C. to 25° C.

Synthetic intermediate 2, synthetic intermediate 6, and synthetic intermediate 11 in schemes 1 and 2 can be produced by a known method, such as the method disclosed in PTL 1 (WO2015/092713), the method disclosed in WO2016/202253, or a method according the methods. For example, these synthetic intermediates can be produced in accordance with the following scheme 3.

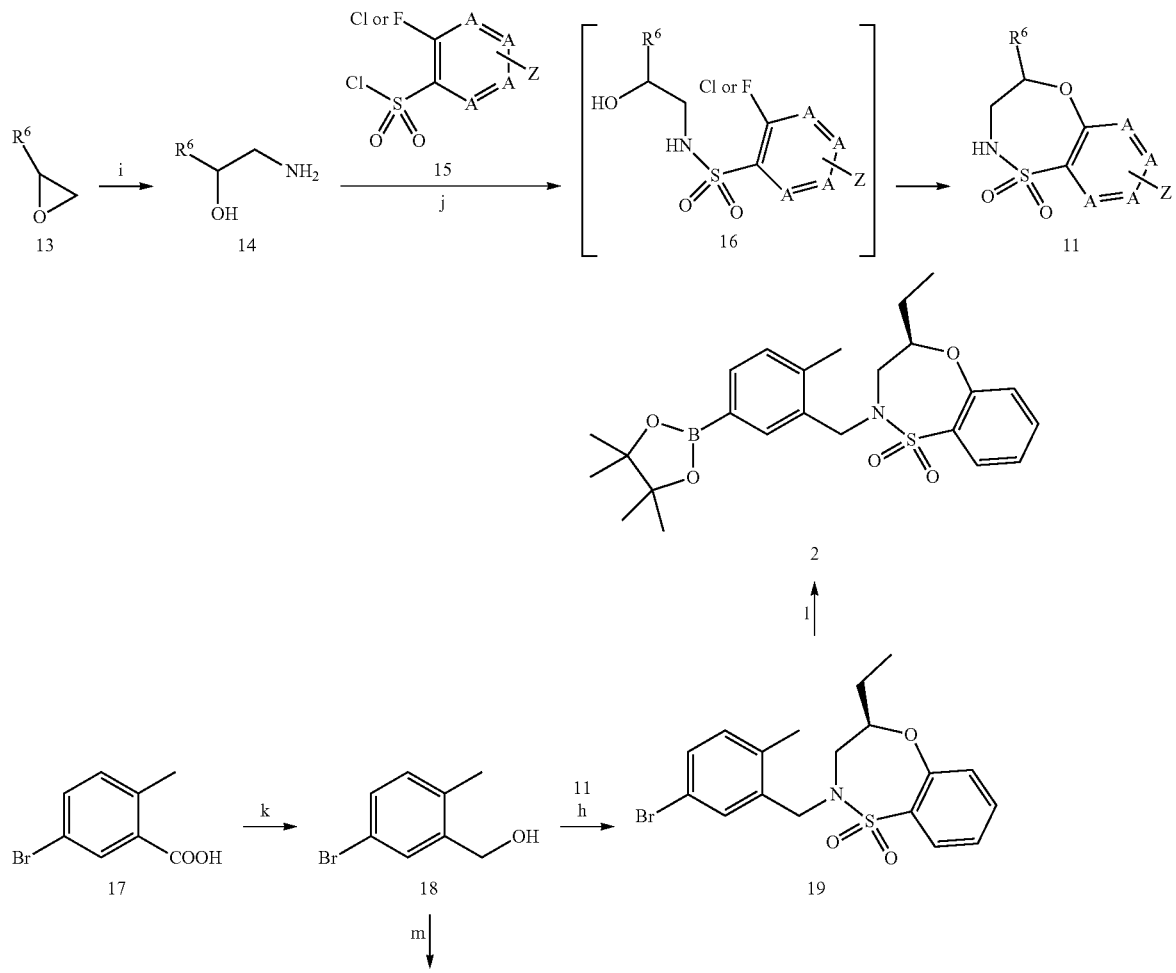

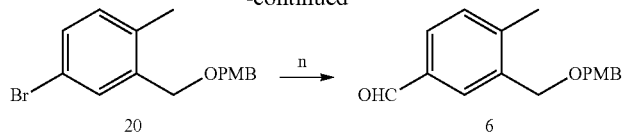

Step h in scheme 3 is performed according to scheme 2.

In step i, amination of synthetic intermediate 13 is performed to produce synthetic intermediate 14. An excess amount of ammonia water is used for synthetic intermediate 13. The reaction time depends on the reagent or solvent for use, but is typically 1 hour to 24 hours, and preferably 1 hour to 18 hours. The reaction temperature depends on the reagent or solvent for use, but is typically 25° C. to 150° C., and preferably 25° C. to 40° C.

In step j, synthetic intermediate 14 is reacted with synthetic intermediate 15 to produce synthetic intermediate 11 via synthetic intermediate 16.

In the first step, synthetic intermediate 14 and synthetic intermediate 15 are reacted in the presence of a base. For example, 1 to 2 equivalents, preferably 1 to 1.5 equivalents of a base can be used per synthetic intermediate 14. For example, 0.8 to 1.5 equivalents, preferably 0.8 to 1.2 equivalents, of synthetic intermediate 15 can be used per synthetic intermediate 14. The base is, for example, potassium carbonate, or sodium carbonate, preferably potassium carbonate. The reaction is typically performed in a solvent. The solvent can be any solvent that does not adversely affect the reaction, and is, for example, a mixed solvent of an organic solvent (e.g., tetrahydrofuran or dimethylformamide) and water, and preferably a mixed solvent of tetrahydrofuran and water. The reaction time depends on the reagent or solvent for use, but is typically 1 hour to 24 hours, and preferably 1 hour to 3 hours. The reaction temperature depends on the reagent or solvent for use, but is typically 25° C. to 150° C., and preferably 25° C. to 40° C.

In the second step, synthetic intermediate 11 is produced from synthetic intermediate 16 in the presence of a base. For example, 1 to 5 equivalents, preferably 2 to 3 equivalents, of a base can be used per synthetic intermediate 16. The base is, for example, potassium tert-butoxide, potassium carbonate, or potassium hydroxide, and preferably potassium tert-butoxide. The reaction is typically performed in a solvent. The solvent can be any solvent that does not adversely affect the reaction, and is, for example, dimethyl sulfoxide, or dimethylformamide, and preferably dimethyl sulfoxide. The reaction time depends on the reagent or solvent for use, but is typically 1 hour to 24 hours, and preferably 1 hour to 3 hours. The reaction temperature depends on the reagent or solvent for use, but is typically 25° C. to 150° C., and preferably 60° C. to 100° C.

In step k, a reduction reaction of synthetic intermediate 17 is performed to produce synthetic intermediate 18. For example, 1 to 2 equivalents, preferably 1 to 1.5 equivalents, of a reducing agent can be used per synthetic intermediate 17. The reducing agent is, for example, a borane-tetrahydrofuran complex or a borane-dimethylsulfide complex. The reaction is typically performed in a solvent. The solvent can be any solvent that does not adversely affect the reaction, and is, for example, tetrahydrofuran. The reaction time depends on the reagent or solvent for use, but is typically 1 hour to 40 hours, and preferably 1 hour to 24 hours. The reaction temperature depends on the reagent or solvent for use, but is typically 25° C. to 150° C., and preferably 25° C. to 40° C.

In step l, synthetic intermediate 19 is reacted with bispinacolato diboron in the presence of a base and a catalyst to produce synthetic intermediate 2. For example, 1 to 3 equivalents, preferably 1 to 2.5 equivalents, of a base can be used per synthetic intermediate 19. For example, 0.05 to 0.1 equivalents, preferably 0.05 to 0.08 equivalents, of a catalyst can be used per synthetic intermediate 19. For example, 1 to 2 equivalents, preferably 1 to 1.5 equivalents, of bispinacolato diboron can be used per synthetic intermediate 19. The base for use is, for example, potassium acetate. The catalyst is, for example, a palladium catalyst such as $PdCl_2(dppf)_2 \cdot CH_2Cl_2$ or $Pd_2(dba)_3$, and preferably $PdCl_2(dppf)_2 \cdot CH_2Cl_2$. The reaction is typically performed in a solvent. The solvent can be any solvent that does not adversely affect the reaction, and is, for example, 1,4-dioxane, tetrahydrofuran, dimethyl sulfoxide, or N,N-dimethylformamide, and preferably 1,4-dioxane. The reaction time depends on the reagent or solvent for use, but is typically 1 hour to 24 hours, and preferably 5 hours to 8 hours. The reaction temperature depends on the reagent or solvent for use, but is typically 60° C. to 120° C., and preferably 60° C. to 100° C.

In step m, synthetic intermediate 20 is produced from synthetic intermediate 18. For example, 1 to 2 equivalents, preferably 1 to 1.5 equivalents, of sodium hydride can be used per synthetic intermediate 20. For example, 1 to 2 equivalents, preferably 1 to 1.2 equivalents, of p-methoxybenzyl chloride can be used per synthetic intermediate 20. The reaction is typically performed in a solvent. The solvent can be any solvent that does not adversely affect the reaction, and is, for example, tetrahydrofuran, or N,N-dimethylformamide, and preferably N,N-dimethylformamide. The reaction time depends on the reagent or solvent for use, but is typically 1 hour to 24 hours, and preferably 5 hours to 15 hours. The reaction temperature depends on the reagent or solvent for use, but is typically 0° C. to 60° C., and preferably 0° C. to 25° C.

In step n, synthetic intermediate 6 is produced from synthetic intermediate 20. For example, 1 to 1.5 equivalents, preferably 1 to 1.2 equivalents, of n-butyllithium can be used per synthetic intermediate 20. For example, 1 to 2 equivalents, preferably 1 to 1.5 equivalents, of N,N-dimethylformamide can be used per synthetic intermediate 20. The reaction is typically performed in a solvent. The solvent can be any solvent that does not adversely affect the reaction, and is, for example, tetrahydrofuran. The reaction time depends on the reagent or solvent for use, but is typically 1 hour to 10 hours, and preferably 1 hour to 3 hours. The reaction temperature depends on the reagent or solvent for use, but is typically −80° C. to 25° C., and preferably −78° C. to 25° C.

Synthetic intermediate 3 can be obtained, for example, by the methods described in the following schemes 4 to 7 or a method according to these methods.

Scheme 4

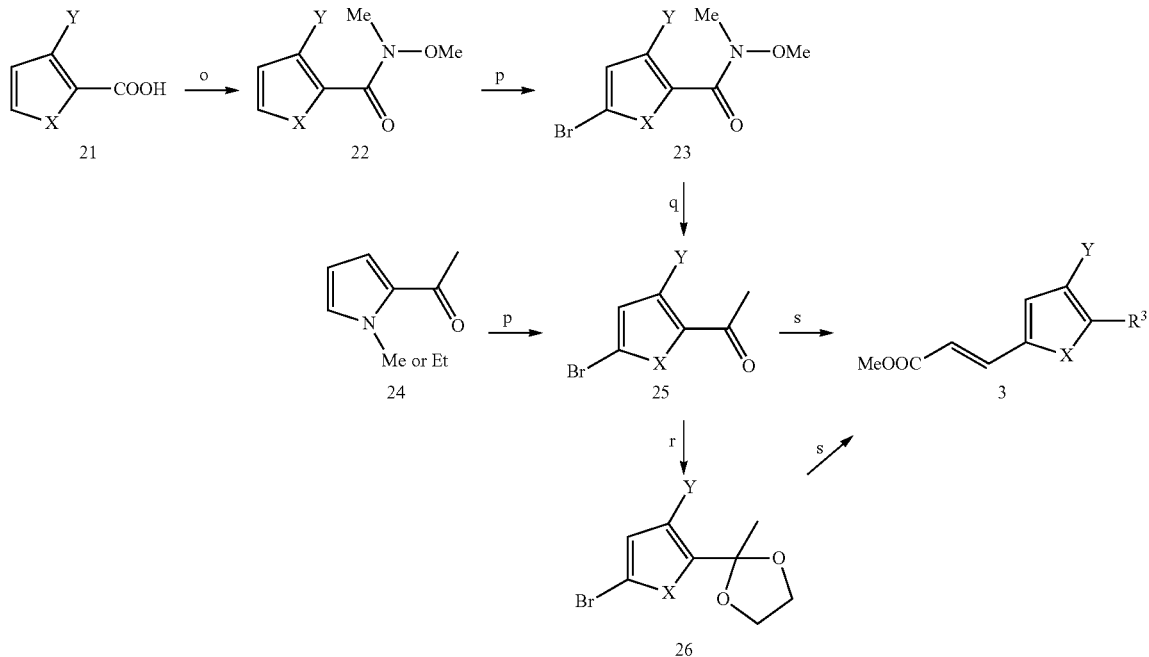

In step o, synthetic intermediate 21 is reacted with N,O-dimethylhydroxylamine hydrochloride in the presence of a base, a condensing agent, and an additive to produce synthetic intermediate 22. Typically, 1 to 3 equivalents, preferably 1.5 to 2 equivalents of N,O-dimethylhydroxylamine hydrochloride can be used per synthetic intermediate 21. Typically, 1 to 3 equivalents, preferably 1 to 2 equivalents, of a condensing agent can be used per synthetic intermediate 21. Typically, 0.1 to 2 equivalents, preferably 1 to 2 equivalents, of an additive can be used per synthetic intermediate 21. Typically, 0.5 to 5 equivalents, preferably 2 to 4 equivalents, of a base can be used per synthetic intermediate 21. The condensing agent is, for example, N,N'-dicyclohexylcarbodiimide, 1,1'-carbonyldiimidazole, 1-ethyl-3-[3-(dimethylamino)propyl]carbodiimide hydrochloride, benzotriazol-1-yl oxytripyrrolidinophosphonium hexafluorophosphate, O-(benzotriazol-1-yl)-N,N,N',N'-tetramethyluroniumhexafluorophosphate, O-(7-azabenzotriazol-1-yl)-N,N,N',N'-tetramethyluroniumhexafluorophosphate, diethyl cyanophosphate, diphenylphosphoryl azide, trifluoroacetic acid pentafluorophenyl ester, or isopropylchloroformate, preferably 1-ethyl-3-[3-(dimethylamino)propyl]carbodiimide hydrochloride, or O-(7-azabenzotriazol-1-yl)-N,N,N',N'-tetramethyluroniumhexafluorophosphate. The additive is, for example, 1-hydroxybenzotriazole, 1-hydroxy-7-azabenzotriazole, or N-hydroxysuccinimide, and preferably 1-hydroxybenzotriazole. The base is, for example, triethylamine, pyridine, N,N-diisopropylethylamine, or 4-dimethylaminopyridine, and preferably triethylamine, N,N-diisopropylethylamine, or 4-dimethylaminopyridine. The reaction is typically performed in a solvent. The solvent can be any solvent that does not adversely affect the reaction, and is, for example, dichloromethane, chloroform, tetrahydrofuran, 1,4-dioxane, 1,2-dimethoxyethane, diethyl ether, acetonitrile, or N,N-dimethylformamide, and is preferably dichloromethane or N,N-dimethylformamide. The reaction time depends on the reagent or solvent for use, but is typically 1 hour to 24 hours, and preferably 3 hours to 24 hours. The reaction temperature depends on the reagent or solvent for use, but is typically 0° C. to 100° C., and preferably 25° C. to 40° C.

In step p, synthetic intermediate 23 or synthetic intermediate 25 is produced from synthetic intermediate 22 or synthetic intermediate 24 by bromination. Typically, 1 to 5 equivalents, preferably 2 to 3 equivalents, of N-bromosuccinimide can be used per synthetic intermediate 22 or synthetic intermediate 24. Typically, 1 to 3 equivalents, preferably 1 to 2 equivalents, of trifluoroacetic acid can be used per synthetic intermediate 22 or synthetic intermediate 24. Instead of trifluoroacetic acid, for example, concentrated sulfuric acid, concentrated hydrochloric acid, or acetic acid can be used. The reaction is typically performed in a solvent. The solvent can be any solvent that does not adversely affect the reaction, and is, for example, dichloromethane, chloroform, carbon tetrachloride, 1,2-dimethoxyethane, or N,N-dimethylformamide, and preferably N,N-dimethylformamide. The reaction time depends on the reagent or solvent for use, but is typically 1 hour to 24 hours, and preferably 3 hours to 24 hours. The reaction temperature depends on the reagent or solvent for use, but is typically 0° C. to 100° C., and preferably 25° C. to 40° C.

In step q, synthetic intermediate 25 is produced from synthetic intermediate 23. For example, 1 to 3 equivalents, preferably 1 to 1.5 equivalents, of methyl magnesium bromide can be used per synthetic intermediate 23. The reaction is typically performed in a solvent. The solvent can be any solvent that does not adversely affect the reaction, and is, for example, dichloromethane, chloroform, tetrahydrofuran, 1,4-dioxane, 1,2-dimethoxyethane, or diethyl ether, and preferably tetrahydrofuran. The reaction time depends on the reagent or solvent for use, but is typically 1 hour to 24 hours, and preferably 3 hours to 24 hours. The reaction temperature depends on the reagent or solvent for use, but is typically 0° C. to 100° C., and preferably 0° C. to 40° C.

In step r, synthetic intermediate 25 is reacted with ethylene glycol in the presence of an acid catalyst to produce synthetic intermediate 26. For example, 0.1 to 5 equivalents, preferably 0.1 to 0.5 equivalents, of an acid catalyst can be used per synthetic intermediate 25. For example, 5 to 20 equivalents, preferably 10 to 15 equivalents, of ethylene glycol can be used per synthetic intermediate 25. The acid catalyst is, for example, p-toluenesulfonic acid monohydrate, hydrochloric acid, or trifluoroacetic acid, and preferably p-toluenesulfonic acid monohydrate. The reaction is typically performed in a solvent. The solvent can be any solvent that does not adversely affect the reaction, and is, for example, toluene, or benzene, and is preferably toluene. The reaction time depends on the reagent or solvent for use, but is typically 1 hour to 24 hours, and preferably 3 hours to 24 hours. The reaction temperature depends on the reagent or solvent for use, but is typically 40° C. to 150° C., and preferably 100° C. to 130° C.

In step s, synthetic intermediate 25 or synthetic intermediate 26 is reacted with methyl acrylate in the presence of a catalyst, a base, and an additive to produce synthetic intermediate 27. For example, 0.05 to 0.2 equivalents, preferably 0.05 to 0.1 equivalents, of a catalyst can be used per synthetic intermediate 25 or synthetic intermediate 26. For example, 1.5 to 5 equivalents, preferably 1.5 to 3 equivalents, of a base can be used per synthetic intermediate 25 or synthetic intermediate 26. For example, 0.05 to 0.2 equivalents, preferably 0.05 to 0.1 equivalents, of an additive can be used per synthetic intermediate 25 or synthetic intermediate 26. For example, 1.5 to 3 equivalents, preferably 1.5 to 2 equivalents, of methyl acrylate can be used per synthetic intermediate 25 or synthetic intermediate 26. The catalyst is, for example, a palladium catalyst such as $PdCl_2(dppf)_2 \cdot CHCl_3$, $Pd(OAc)_2$, or $PdCl_2(PPh_3)_2$, $Pd(PPh_3)_4$, and preferably $PdCl_2(dppf)_2 \cdot CHCl_3$. The base is, for example, N,N-dicyclohexylmethylamine, triethylamine, pyridine, or N,N-diisopropylethylamine, and preferably N,N-dicyclohexylmethylamine. The additive is, for example, tetrabutyl ammonium chloride, or tetrabutyl ammonium iodide, and preferably tetrabutyl ammonium chloride. The reaction is typically performed in a solvent. The solvent can be any solvent that does not adversely affect the reaction, and is, for example, dimethylformamide, or dimethylacetamide, and preferably dimethylacetamide. The reaction time depends on the reagent or solvent for use, but is typically 1 hour to 24 hours, and preferably 1 hour to 8 hours. The reaction temperature depends on the reagent or solvent for use, but is typically 40° C. to 150° C., and preferably 100° C. to 140° C. with a microwave.

Scheme 5

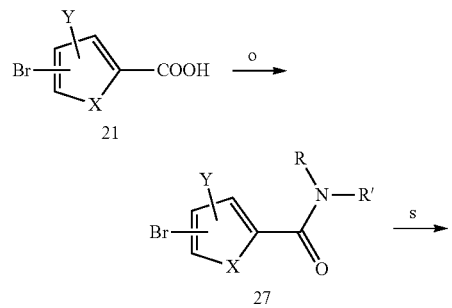

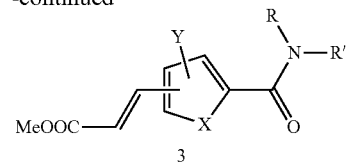

Scheme 5 is performed according to steps o and s of scheme 4. In step o, instead of N,O-dimethylhydroxylamine hydrochloride, a corresponding amine is used.

Scheme 6

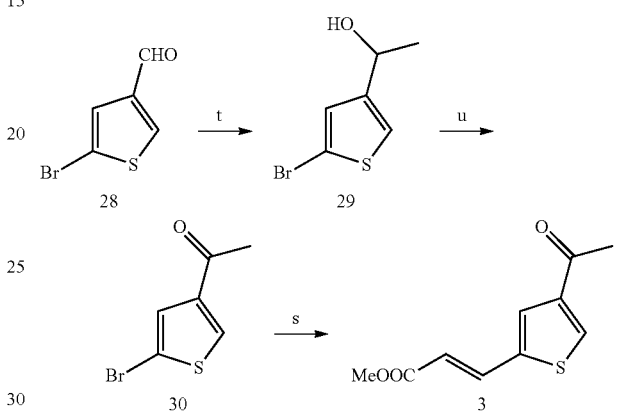

Step s of scheme 6 is performed according to scheme 4.

In step t, synthetic intermediate 29 is produced from synthetic intermediate 28. For example, 1 to 3 equivalents, preferably 1 to 1.5 equivalents, of methyl magnesium bromide can be used per synthetic intermediate 28. The reaction is typically performed in a solvent. The solvent can be any solvent that does not adversely affect the reaction, and is, for example, tetrahydrofuran, 1,4-dioxane, 1,2-dimethoxyethane, or diethyl ether, and preferably tetrahydrofuran. The reaction time depends on the reagent or solvent for use, but is typically 1 hour to 24 hours, and preferably 3 hours to 24 hours. The reaction temperature depends on the reagent or solvent for use, but is typically 0° C. to 100° C., and preferably 0° C. to 40° C.

In step u, oxidation of synthetic intermediate 29 is performed by using a sulfur trioxide-pyridine complex in the presence of a base to produce synthetic intermediate 30. For example, 1 to 5 equivalents, preferably 1 to 3 equivalents, of a base can be used per synthetic intermediate 29. For example, 1 to 3 equivalents, preferably 1 to 2.5 equivalents, of a sulfur trioxide-pyridine complex can be used per synthetic intermediate 29. The base is, for example, triethylamine, pyridine, N,N-diisopropylethylamine, or 4-dimethylaminopyridine, and preferably triethylamine. The reaction is typically performed in a solvent. The solvent can be any solvent that does not adversely affect the reaction, and is preferably dimethyl sulfoxide. The reaction time depends on the reagent or solvent for use, but is typically 1 hour to 24 hours, and preferably 3 hours to 24 hours. The reaction temperature depends on the reagent or solvent for use, but is typically 0° C. to 100° C., and preferably 0° C. to 40° C.

Synthetic intermediate 3 can be produced by a known method, such as the method disclosed in JP2008/273924, or a method according this method. For example, synthetic intermediate 3 can be produced in accordance with the following scheme 7.

Scheme 7

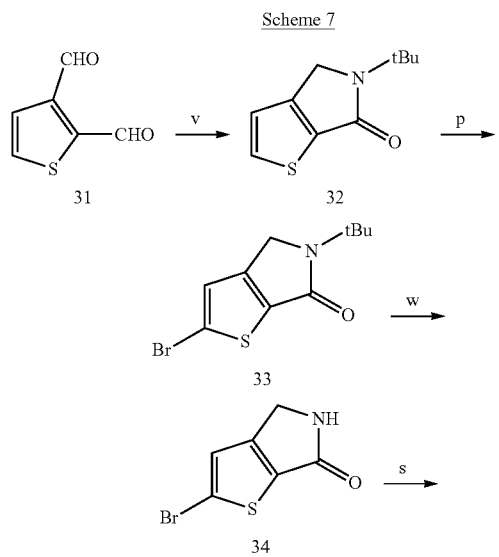

Scheme 8

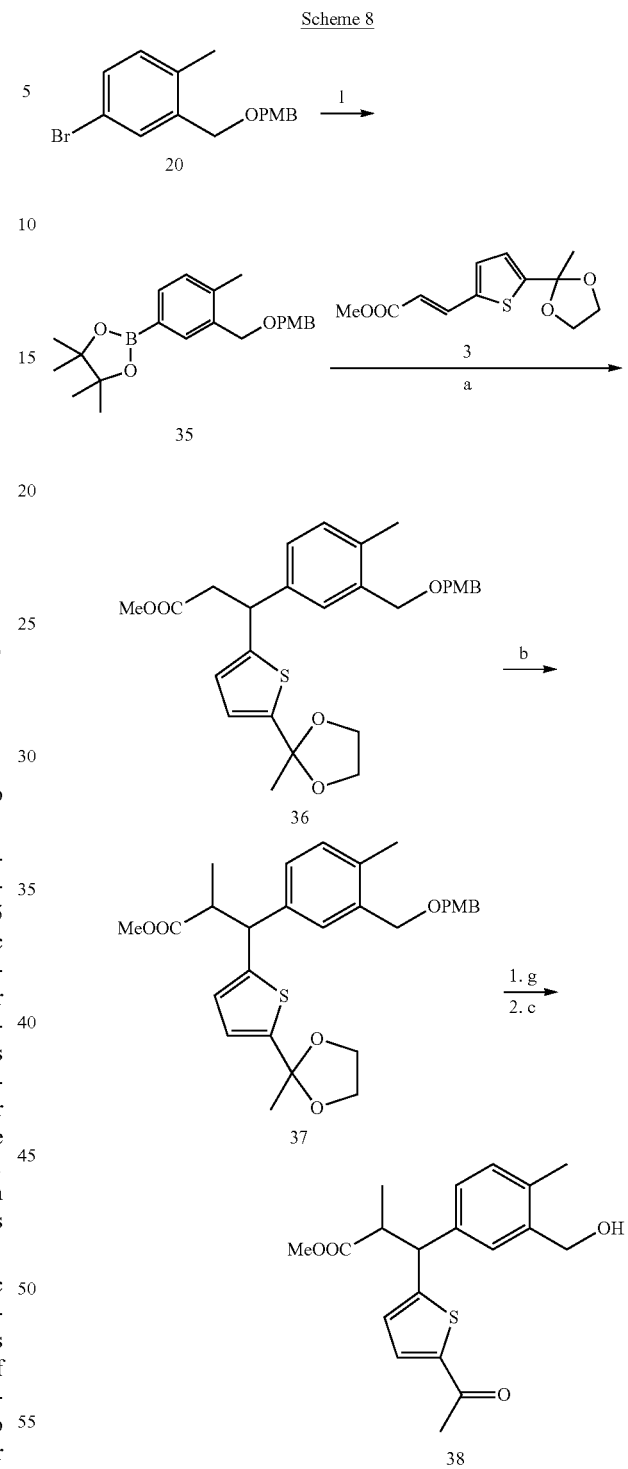

Steps p and s of scheme 7 are performed according to scheme 4.

In step v, synthetic intermediate 31 is reacted with tert-butyl amine and acetic acid to produce synthetic intermediate 32. For example, 1 to 3 equivalents, preferably 1 to 1.5 equivalents, of tert-butyl amine can be used per synthetic intermediate 31. For example, 1 to 20 equivalents, preferably 2.5 to 5 equivalents, of acetic acid can be used per synthetic intermediate 31. The reaction is typically performed in a solvent. The solvent can be any solvent that does not adversely affect the reaction, and is, for example, dichloromethane, chloroform, tetrahydrofuran, 1,4-dioxane, or toluene, and preferably dichloromethane. The reaction time depends on the reagent or solvent for use, but is typically 1 to 5 hours, and preferably 2 to 4 hours. The reaction temperature depends on the reagent or solvent for use, but is typically 0° C. to 40° C., and preferably 10 to 30° C.

In step w, deprotection of tert-butyl amine in synthetic intermediate 33 is performed to produce synthetic intermediate 34. A mixed solvent of trifluoroacetic acid and water is preferably used for synthetic intermediate 33. The ratio of trifluoroacetic acid to water of the mixed solvent (trifluoroacetic acid/water) is 10 to 20/1 to 5, and preferably 10 to 12/1 to 2. The reaction time depends on the reagent or solvent for use, but is typically 1 to 5 hours, and preferably 2 to 4 hours. The reaction temperature depends on the reagent or solvent for use, but is typically 0° C. to 150° C., and preferably 90° C. to 110° C.

Compound (I) of the present invention can also be produced by using synthetic intermediate 38 instead of synthetic intermediate 10 in scheme 2. Synthetic intermediate 38 can be produced, for example, by the method described in the following scheme 8 or a method according to this method.

Each step of scheme 8 is performed according to schemes 1 to 3.

Compound (I) of the present invention can also be produced by using synthetic intermediate 47 instead of synthetic intermediate 2 in scheme 1. Synthetic intermediate 47 can be produced, for example, by the method described in the following scheme 9 or a method according to this method.

Scheme 9

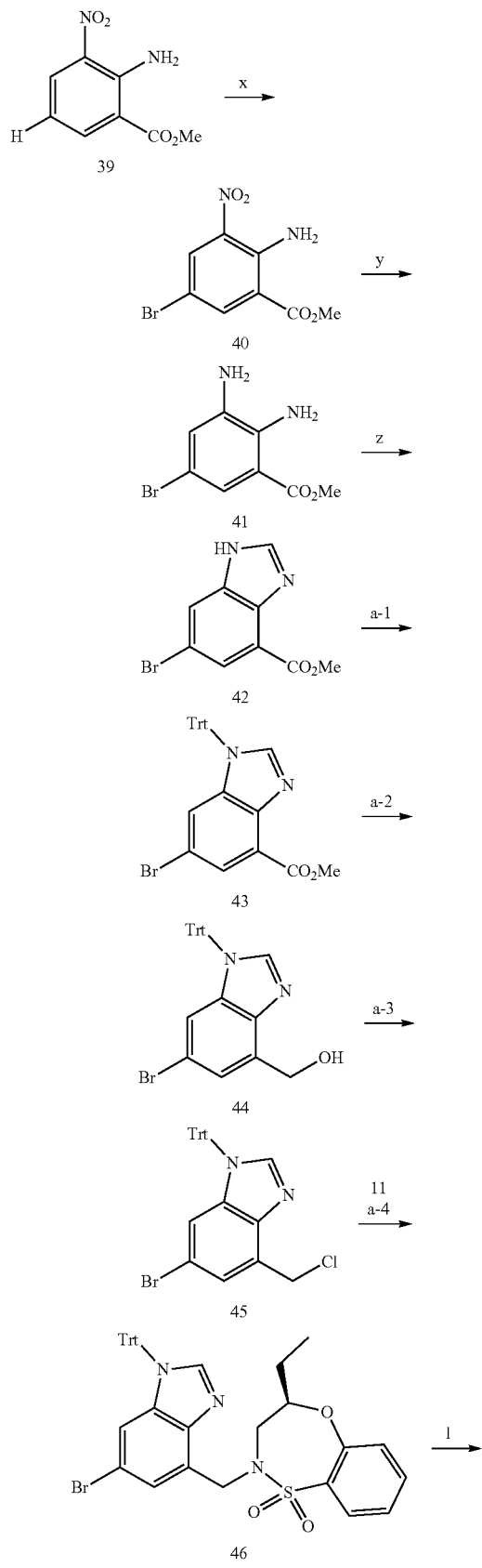
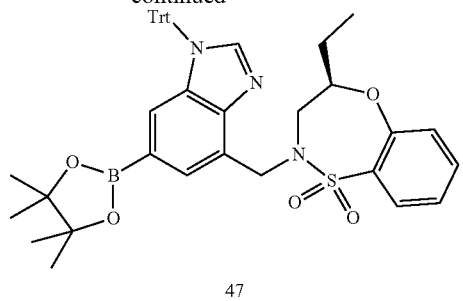

Step 1 in scheme 9 is performed according to scheme 3.

In step x, synthetic intermediate 40 is produced from synthetic intermediate 39. For example, 1 to 2 equivalents, preferably 1 to 1.2 equivalents, of bromine can be used per synthetic intermediate 39. The reaction is typically performed in a solvent. The solvent can be any solvent that does not adversely affect the reaction, and is, for example, acetic acid, or trifluoroacetic acid, and preferably acetic acid. The reaction time depends on the reagent or solvent for use, but is typically 0.5 to 3 hours, and preferably 1 to 2 hours. The reaction temperature depends on the reagent or solvent for use, but is typically 0° C. to 40° C., and preferably 0° C. to 25° C.

In step y, synthetic intermediate 41 is produced from synthetic intermediate 40. For example, 1 to 10 equivalents, preferably 2 to 5 equivalents, of tin (II) chloride can be used per synthetic intermediate 40. The reaction is typically performed in a solvent. The solvent can be any solvent that does not adversely affect the reaction, and is, for example, methanol, ethanol, propanol, or isopropanol, and preferably methanol. The reaction time depends on the reagent or solvent for use, but is typically 1 to 6 hours, and preferably 1.5 to 4 hours. The reaction temperature depends on the reagent or solvent for use, but is typically 0° C. to 100° C., and preferably 60° C. to 80° C.

In step z, synthetic intermediate 42 is produced from synthetic intermediate 41. An excess amount of formic acid is used for synthetic intermediate 41. The reaction time is typically 0.5 to 5 hours, and preferably 1 to 2 hours. The reaction temperature is typically 25° C. to 150° C., and preferably 90° C. to 110° C.

In step a-1, synthetic intermediate 43 is produced from synthetic intermediate 42. For example, 1 to 3 equivalents, preferably 1.1 to 1.3 equivalents, of trityl chloride can be used per synthetic intermediate 42. For example, 1 to 3 equivalents, preferably 1.1 to 1.7 equivalents, of a base can be used per synthetic intermediate 42. The base is, for example, triethylamine, N,N-diisopropylethylamine, pyridine, 4-dimethylaminopyridine, or N-methyl morpholine, and preferably N-methyl morpholine or triethylamine. The reaction is typically performed in a solvent. The solvent can be any solvent that does not adversely affect the reaction, and is, for example, dichloromethane, chloroform, tetrahydrofuran, 1,4-dioxane, 1,2-dimethoxyethane, diethyl ether, acetonitrile, or N,N-dimethylformamide, and preferably dichloromethane. The reaction time depends on the reagent or solvent for use, but is typically 1 hour to 12 hours, and preferably 1 to 2 hours. The reaction temperature depends on the reagent or solvent for use, but is typically 0° C. to 100° C., and preferably 40° C. to 60° C.

In step a-2, synthetic intermediate 44 is produced from synthetic intermediate 43. For example, 1 to 5 equivalents, preferably 1.5 to 3 equivalents, of a reducing agent can be used per synthetic intermediate 43. The reducing agent is, for example, lithium borohydride, lithium aluminum hydride, lithium borohydride, or a borane-tetrahydrofuran complex, and preferably lithium borohydride. The reaction is typically performed in a solvent. The solvent can be any solvent that does not adversely affect the reaction, and is, for example, tetrahydrofuran, diethyl ether, or 1,2-dimethoxyethane, and preferably tetrahydrofuran. The reaction time depends on the reagent or solvent for use, but is typically 0.2 to 3 hours, and preferably 0.5 to 1.5 hours. The reaction temperature depends on the reagent or solvent for use, but is typically 0° C. to 60° C., and preferably 0° C. to 30° C.

In step a-3, synthetic intermediate 45 is produced from synthetic intermediate 44 by reacting methanesulfonyl chloride and lithium chloride in the presence of a base. For example, 1 to 5 equivalents, preferably 1.5 to 2.5 equivalents, of methanesulfonyl chloride can be used per synthetic intermediate 44. For example, 1 to 10 equivalents, preferably 3 to 5 equivalents, of lithium chloride can be used per synthetic intermediate 44. For example, 1 to 10 equivalents, preferably 3 to 8 equivalents, of a base can be used per synthetic intermediate 44. The base is, for example, triethylamine, N,N-diisopropylethylamine, pyridine, 4-dimethylaminopyridine, or N-methyl morpholine, and preferably N,N-diisopropylethylamine. The reaction is typically performed in a solvent. The solvent can be any solvent that does not adversely affect the reaction, and is, for example, dichloromethane, chloroform, tetrahydrofuran, 1,4-dioxane, or N,N-dimethylformamide, preferably dichloromethane. The reaction time depends on the reagent or solvent for use, but is typically 1 to 24 hours, and preferably 1 to 12 hours. The reaction temperature depends on the reagent or solvent for use, but is typically 0° C. to 40° C., and preferably 0° C. to 25° C.

In step a-4, synthetic intermediate 45 is reacted with synthetic intermediate 11 and tetrabutyl ammonium iodide in the presence of a base to produce synthetic intermediate 46. For example, 1 to 3 equivalents, preferably 1 to 1.2 equivalents, of synthetic intermediate 11 can be used per synthetic intermediate 45. For example, 0.1 to 1 equivalents, preferably 0.1 to 0.2 equivalents, of tetrabutyl ammonium iodide can be used per synthetic intermediate 45. For example, 1 to 5 equivalents, preferably 1 to 3 equivalents, of a base can be used per synthetic intermediate 45. The base is, for example, potassium carbonate, sodium carbonate, or sodium hydrogen carbonate, and preferably potassium carbonate. The reaction is typically performed in a solvent. The solvent can be any solvent that does not adversely affect the reaction, and is, for example, dichloromethane, tetrahydrofuran, 1,4-dioxane, N,N-dimethylformamide, or N,N-dimethylacetamide, and preferably N,N-dimethylformamide. The reaction time depends on the reagent or solvent for use, but is typically 1 to 24 hours, and preferably 1 to 18 hours. The reaction temperature depends on the reagent or solvent for use, but is typically 0° C. to 60° C., and preferably 25° C. to 40° C.

Compound (I) of the present invention can also be produced, for example, by the method described in the following scheme 10 or a method according to this method.

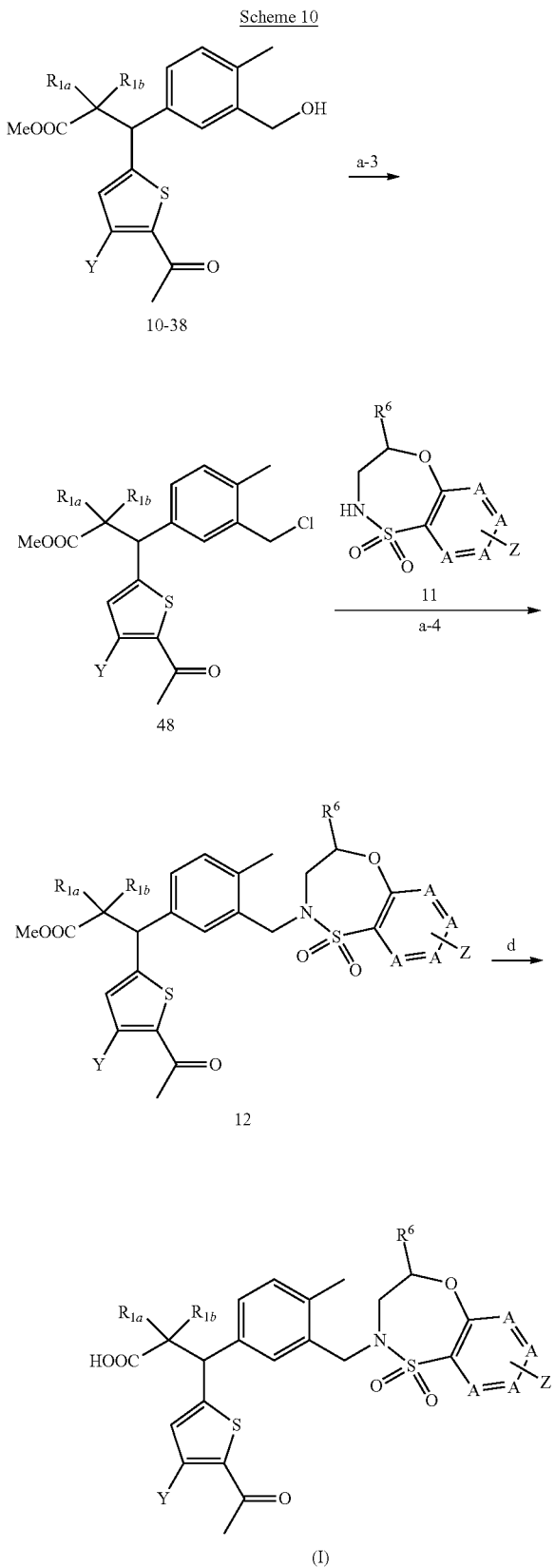

Steps a-3 and a-4 of scheme 10 are performed according to scheme 9, and step d is performed according to scheme 1.

Compound (I) of the present invention can also be produced, for example, by the method described in the following scheme 11 or a method according to this method.
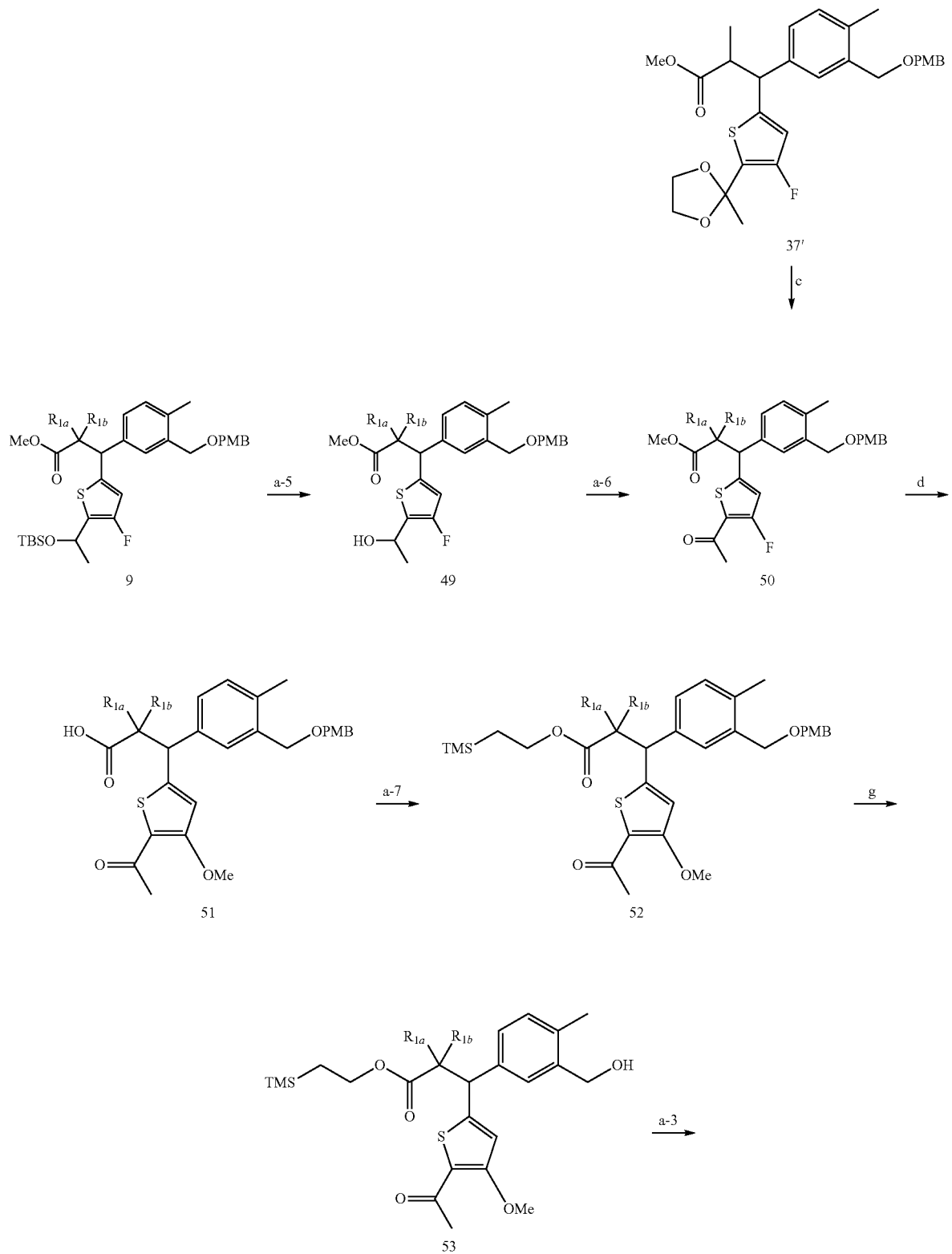
Scheme 11

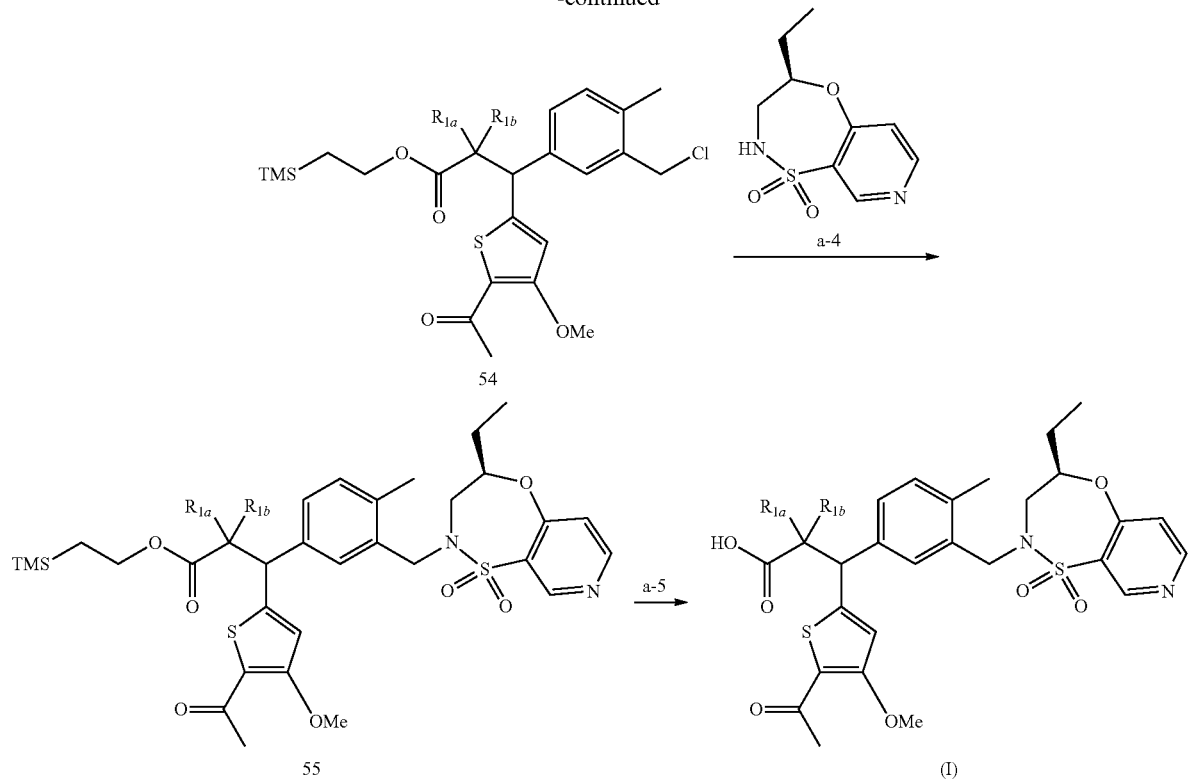

Steps c and d of scheme 11 are performed according to scheme 1. Step g is performed according to scheme 2, and steps a-3 and a-4 are performed according to scheme 9.

Step a-5

In step a-5, compound 49 is produced from compound 9. Per compound 9, 2 to 5 equivalents, preferably 2 to 3 equivalents, of tetrabutyl ammonium fluoride are used. The solvent can be any solvent that does not adversely affect the reaction, and is, for example, tetrahydrofuran, or N,N-dimethylformamide, and preferably tetrahydrofuran. The reaction time depends on the reagent or solvent for use, but is typically 1 to 24 hours, and preferably 1 to 3 hours. The reaction temperature depends on the reagent or solvent for use, but is typically 0° C. to 100° C., and preferably 25° C. to 40° C.

Step a-6

In step a-6, compound 50 is produced from compound 49. Per compound 49, 10 to 50 equivalents, preferably 25 to 50 equivalents, of manganese dioxide are used. The solvent can be any solvent that does not adversely affect the reaction, and is, for example, dichloromethane, acetone, benzene, toluene, tetrahydrofuran, or 1,4-dioxane, and preferably dichloromethane. The reaction time depends on the reagent or solvent for use, but is typically 1 to 24 hours, and preferably 2 to 24 hours. The reaction temperature depends on the reagent or solvent for use, but is typically 0° C. to 100° C., and preferably 25° C. to 40° C.

Step a-7

In step a-7, compound 52 is produced from compound 51. Per compound 51, 1 to 5 equivalents, preferably 3 to 5 equivalents, of TMS ethanol are used. Typically 1 to 3 equivalents, preferably 1.5 to 2 equivalents, of a condensing agent are used. Typically 1 to 5 equivalents, preferably 2 to 5 equivalents, of a base are used. The condensing agent is, for example, N,N'-dicyclohexylcarbodiimide, 1,1'-carbonyl-diimidazole, 1-ethyl-3-[3-(dimethylamino)propyl]carbodiimide hydrochloride, benzotriazol-1-yloxytripyrrolidinophosphonium hexafluorophosphate, O-(benzotriazol-1-yl)-N,N,N',N'-tetramethyluronium hexafluorophosphate, O-(7-azabenzotriazol-1-yl)-N,N,N',N'-tetramethyluronium hexafluorophosphate, diethylcyanophosphate, diphenylphosphoryl azide, trifluoroacetic acid pentafluorophenyl ester, or isopropylchloroformate, and preferably O-(benzotriazol-1-yl)-N,N,N',N'-tetramethyluronium hexafluorophosphate or O-(7-azabenzotriazol-1-yl)-N,N,N',N'-tetramethyluronium hexafluorophosphate. The base is, for example, triethylamine, pyridine, N,N-diisopropylethylamine, or 4-dimethylaminopyridine, and preferably triethylamine, N,N-diisopropylethylamine, or 4-dimethylaminopyridine. The solvent can be any solvent that does not adversely affect the reaction, and is, for example, dichloromethane, chloroform, tetrahydrofuran, 1,4-dioxane, 1,2-dimethoxyethane, diethyl ether, acetonitrile, or N,N-dimethylformamide, and preferably dichloromethane or N,N-dimethylformamide. The reaction time depends on the reagent or solvent for use, but is typically 1 hour to 24 hours, and preferably 3 hours to 24 hours. The reaction temperature depends on the reagent or solvent for use, but is typically 0° C. to 100° C., and preferably 25° C. to 40° C.

Produced compound (I) of the present invention can be isolated or purified as an educt, or as a salt thereof by performing an ordinary salt-forming treatment. The method for isolation or purification is not particularly limited. For example, a commonly used method, such as crystallization, recrystallization, distillation, liquid separation, or chromatography can be suitably selected. Isolation or purification can also be performed by a combination of these methods. When multiple isomers are present, purification can yield a single isomer or a mixture of multiple isomers. When purification yields a single type of isomers or multiple isomer mixtures, these isomers or isomer mixtures can be used as compound (I) of the present invention as they are, or in combination. A solvate of the compound represented by formula (I) can be obtained by a known method. The structure of the product can be identified, for example, by elemental analysis, MS (ESI-MS) analysis, IR analysis, $^1$H-NMR, or $^{13}$C-NMR.

3. Use

Compound (I) of the present invention has Nrf2-activating action. Thus, at least one member selected from the group consisting of the compound represented by formula (I), a salt of the compound, and a solvate of the compound or salt (in the present specification, "the active ingredient of the present invention") can be used as, for example, a medicament or a reagent. From this viewpoint, in its one embodiment, the present invention relates to a medicament containing the active ingredient of the present invention (in the present specification, "the medicament of the present invention").

The medicament of the present invention can be used as, for example, an Nrf2 activator, or an oxidative-stress defense gene expression activator, based on the action of the active ingredient of the present invention.

The medicament of the present invention can be used in the prevention or treatment of various diseases. The target disease can be any disease that can be prevented or treated based on the above-described action of the active ingredient of the present invention. The medicament of the present invention can be used in the prevention or treatment of diseases or symptoms associated with the regulation of Nrf2 activity. The term "treatment" refers to preventing the aggravation of a disability or disease, slowing its progress, and maintaining, reducing, or eliminating its condition when the disability or disease develops. The term "prevention" refers to preventing the onset of a disability or disease before it develops. Examples of target ophthalmic diseases include dry eyes, diabetic retinopathy, retinitis pigmentosa, glaucoma, cataracts, age-related macular degeneration, proliferative vitreoretinopathy, retinal artery occlusion, retinal vein occlusion, uveitis, Leber's hereditary optic neuropathy, retinopathy of prematurity, retinal detachment, retinal pigment epithelial detachment, optic neuropathy caused by these diseases, optic neuropathy caused by glaucoma, ischemic optic neuropathy, inflammation suppression after surgery, and pain suppression. Examples of target skin diseases include UV-induced skin damage, UV-induced epidermal blistering, psoriasis, atopic dermatitis, and scleroderma. Examples of target otologic diseases include noise-induced hearing loss, and sensorineural hearing loss. Examples of target brain diseases include Alzheimer's disease, Parkinson's disease, Huntington's disease, Batten disease, dementia, and epilepsy. Examples of target lung diseases include asthma, pulmonary and bronchial infection, and chronic obstructive lung disease. Examples of target kidney diseases include diabetic nephropathy, Alport syndrome, autosomal dominant polycystic kidney disease, focal segmental glomerulosclerosis, and IgA nephropathy. Examples of other target diseases include arteriosclerosis, hypertension, cancer, cardiac arrest, Friedreich's ataxia, amyotrophic lateral sclerosis, hepatitis, rheumatoid arthritis, pancreatitis, vasculitis, esophagitis, ulcerative colitis, neutropenia, cell-mediated immunity, diabetes, mitochondrial myopathy, sickle cell anemia, and multiple sclerosis. Of these, multiple sclerosis, psoriasis, Alzheimer's disease, and ophthalmic diseases such as retinitis pigmentosa, glaucoma, and cataracts are preferable.

The target of administration of the medicament of the present invention is not particularly limited, and is, for example, a mammal (e.g., humans, mice, rats, hamsters, rabbits, cats, dogs, cows, sheep, and monkeys).

The administration route of the medicament of the present invention is not particularly limited. For example, the following administration route can be used: peroral administration, tube feeding, and enteral administration such as enema administration; parenteral administration such as intravenous administration, transarterial administration, intramuscular administration, intracardiac administration, subcutaneous administration, intradermal administration, and intraperitoneal administration; ocular topical administration (e.g., eye drop administration, intravitreal administration, subconjunctival administration, and Sub-Tenon administration); and local administration such as dermal administration, inhalation administration, enema administration, ear drop, intranasal administration, and intravaginal administration. Of these, local administration and parenteral administration are preferable. In particular, when a readily metabolized compound is used as compound (I) of the present invention, local administration or parenteral administration is suitably used from the viewpoint that the compound is more rapidly metabolized after acting topically. The medicament of the present invention is preferably in a dosage form suitable for these preferable administration routes. From this viewpoint, the medicament of the present invention is preferably a topically administered formulation or a parenterally administered formulation. In an embodiment, the medicament of the present invention may be an orally administered formulation. In an embodiment, the medicament of the present invention may be, for example, an ophthalmic formulation, an otological formulation, a respiratory formulation, or a dermatological formulation. In the present specification, "X formulation" refers to a formulation applied to diseases treated in the diagnosis and treatment department related to X field in medical facilities. In an embodiment, the medicament of the present invention may be an intravenously administered formulation, an intranasally administered formulation, or a transdermally administered formulation.

The medicament of the present invention can be in a dosage form suitable for the administration route. Examples of dosage forms include eye drops, eye ointments, eye washes, injectable drugs, patches, lotions, creams, powders, granules, tablets, capsules, syrups, fluid medicines, ointments, gels, liniments, suppositories, atomizers, inhalants, sprays, and nasal drops. The medicament in these dosage forms can be prepared by a typical technique widely used in the art. In addition to these formulations, the active ingredient of the present invention can also be made into a formulation of drug delivery system (DDS) such as intraocular implant formulations and microspheres.

The medicament of the present invention may be formed only of the active ingredient of the present invention, or may be a composition optionally containing pharmaceutically acceptable additives (in the present specification, simply "additives"). The medicament of the present invention can be produced by a method known in the technical field of pharmaceutical formulations by mixing the active ingredient of the present invention typically with at least one additive. The additive can be suitably selected according to the dosage form of the formulation preferable for administration. The content of the active ingredient of the present invention in the medicament varies according to the dosage form, dose, etc., and can be suitably selected. For example, the content of the active ingredient of the present invention can be typically 0.01 to 99.9 mass %, and preferably 0.1 to 80 mass % of the entire medicament.

Examples of additives include base materials, carriers, solvents, dispersants, emulsifiers, buffers, stabilizers, excipients, binders, disintegrants, lubricants, thickeners, humectants, colorants, flavors, and chelating agents. These can be suitably selected according to the administration route, dosage form etc.

For example, when an otological formulation containing the active ingredient of the present invention is prepared, the following may be added: water (e.g., purified or sterile water, and injectable distilled water), physiological saline, dextrose solutions, water-soluble organic solvents (lower aliphatic alcohols such as ethanol and isopropanol, and polyalkylene glycols such as ethylene glycol, diethylene glycol, and polyethylene glycol), animal and vegetable oils (vegetable oils such as jojoba oil, olive oil, coconut oil, and cottonseed oil, and animal oils such as squalane), mineral oils (e.g., liquid paraffin, and silicone oil), wax (e.g., beeswax, carnauba wax, lanolin, paraffin, and petrolatum), long-chain fatty acid esters (saturated or unsaturated fatty acid alkyl esters, and esters of fatty acids and polyhydric alcohols (e.g., poly $C_{2-4}$ alkylene glycol, glycerin or polyglycerin)), hydrogenated oil, higher alcohols (e.g., saturated aliphatic alcohols such as stearyl alcohol, and unsaturated aliphatic alcohols such as oleyl alcohol), and higher fatty acids (e.g., stearic acid, and oleic acid). Additionally, such a formulation may further contain the following: antiseptics or preservatives (e.g., parabens such as methylparaben, and butylparaben), odor-masking agents or fragrances (e.g., deodorizers such as menthol), fresheners, soothing agents (local anesthetics such as lidocaine), and active ingredients for treating infection or inflammation (e.g., antimicrobial agents, antibiotics, anti-inflammatory agents). The amount of these additives varies according to the type and use of the additives for use, and the additives can be added at a concentration that can achieve the purpose of the additives.

For example, when a dermatological formulation containing the active ingredient of the present invention is prepared, a solvent such as purified water, ethanol, isopropanol, or dipropylene glycol can be used singly or in a combination of two or more. The base material includes animal and vegetable fat and oil such as olive oil, soybean oil, camellia oil, sesame oil, peanut oil, cocoa butter, beef tallow, and lard; wax such as carnauba wax, and beeswax; aliphatic alcohols such as octyldodecanol, cetanol, and stearyl alcohol; fatty acids such as oleic acid, palmitic acid, and stearic acid; fat-and-oil base materials such as hydrocarbons (e.g., squalane, white petrolatum, liquid paraffin, ceresin, and microcrystalline wax), and hydrophilic base materials such as gelatin, and macrogol. These can be used singly, or in a combination of two or more. Other additives such as the following can also be added: excipients such as light anhydrous silicic acid, crystalline cellulose, and dextrin; solubilization agents such as diisopropyl adipate, capric acid, crotamiton, and propylene carbonate; suspension agents such as propylene glycol alginate, sodium dioctyl sulfosuccinate, soybean lecithin, and povidone; surfactants or emulsifiers such as polyoxyethylene hydrogenated castor oil, polyoxyethylene sorbitan monolaurate, polyoxyethylene sorbitan monostearate, polyoxyethylene sorbitan monooleate, glycerin monostearate, and sucrose fatty acid ester; viscous agents such as carboxyvinyl polymers, xanthan gum, carboxymethyl cellulose, hydroxypropyl cellulose, and polyvinyl alcohols (partially saponified products); plasticizers such as triacetin, and isopropyl myristate; humectants such as glycerin, 1,3-butylene glycol, sodium DL-pyrrolidone carboxylate, and sodium hyaluronate; stabilizers such as sodium edetate, sorbitol, thymol, and polyoxyethylene polyoxypropylene glycol; antioxidants such as ascorbic acid, sodium erythorbate, tocopheryl acetate, and dibutyl hydroxytoluene; preservatives such as sorbic acid, sodium dehydroacetate, methyl parahydroxybenzoate, ethyl parahydroxybenzoate, and butyl parahydroxybenzoate; and pH adjusters such as hydrochloric acid, citric acid, sodium citrate, acetic acid, sodium acetate, sodium hydroxide, and sodium hydrogenphosphate. The amount of these additives varies according to the type and use of the additives for use, and the additives can be added at a concentration that can achieve the purpose of the additives. For example, when an ophthalmic formulation containing the active ingredient of the present invention (agents topically applied to the eyes: eye drops, eye ointments, eye washes etc.) is prepared, the following additives may be added: stabilizers (e.g., sodium hydrogen sulfite, sodium thiosulfate, sodium edetate, sodium citrate, ascorbic acid, and dibutylhydroxytoluene), solubilization agents (e.g., glycerin, propylene glycol, macrogol, and polyoxyethylene hydrogenated castor oil), suspension agents (e.g., polyvinyl pyrrolidone, hydroxypropyl methylcellulose, hydroxymethyl cellulose, and sodium carboxymethylcellulose), emulsifiers (e.g., polyvinyl pyrrolidone, soybean lecithin, egg yolk lecithin, polyoxyethylene hydrogenated castor oil, and polysorbate 80), buffers (e.g., phosphate buffer, acetate buffer, borate buffer, carbonate buffer, citrate buffer, Tris buffer, glutamic acid, and epsilon aminocaproic acid), viscous agents (e.g., water-soluble cellulose derivatives such as methylcellulose, hydroxyethyl cellulose, hydroxypropyl methylcellulose, and carboxymethylcellulose, sodium chondroitin sulfate, sodium hyaluronate, carboxyvinyl polymers, polyvinyl alcohols, polyvinylpyrrolidone, and macrogol), preservatives (e.g., benzalkonium chloride, benzethonium chloride, chlorhexidine gluconate, chlorobutanol, benzyl alcohol, sodium dehydroacetate, parahydroxybenzoic acid esters, sodium edetate, and boric acid), tonicity agents (e.g., sodium chloride, potassium chloride, glycerin, mannitol, sorbitol, boric acid, glucose, and propylene glycol), pH adjusters (e.g., hydrochloric acid, sodium hydroxide, phosphoric acid, acetic acid, boric acid, and citric acid), fresheners (e.g., 1-menthol, d-camphor, d-borneol, and mentha oil), ointment base materials (white petrolatum, refined lanolin, liquid paraffin, and vegetable oil (olive oil, camellia oil, and peanut oil)). The amount of these additives varies according to the type and use of the additives for use, and the additives can be added at a concentration that can achieve the purpose of the additives.

When the medicament of the present invention is formed into an otological composition such as ear drops or nasal drops, the composition can be produced in accordance with a method typically used in the field of pharmaceutical formulations. For example, the composition can be produced in accordance with the method described in the Japanese Pharmacopoeia, 17th Edition (General Rules for Preparations, Preparations for Otic Application, or Preparations for Nasal Application).

When the medicament of the present invention is formed into a dermatological composition, such as an external skin drug, such a composition can be produced in accordance with a method typically used in the field of pharmaceutical formulations. For example, the composition can be produced in accordance with the method described in the Japanese Pharmacopoeia, 17th Edition (General Rules for Preparations, Preparations for Cutaneous Application). When the medicament of the present invention is formed into an ophthalmic composition such as an eye drop or eye ointment, such a composition can be produced in accordance with a method typically used in the field of pharmaceutical formulations. For example, the composition can be produced in accordance with the method described in the Japanese Pharmacopoeia, 17th Edition (General Rules for Preparations, Preparations for Ophthalmic Application (e.g., Ophthalmic Liquids and Solutions, and Ophthalmic Ointments)).

The dose pf the medicament of the present invention varies according to the target disease and cannot be generalized. However, the dose can be set such that the concentration of the active ingredient of the present invention in a target tissue where the efficacy is to be exerted is, for example, 0.001 nM to 100 µM, and preferably 0.01 nM to 100 µM.

When the medicament of the present invention is topically used on an eye of an adult, a medicament containing, for example, 0.01 nM to 1000 µM, preferably 0.1 nM to 1000 µM, of the active ingredient of the present invention is preferably applied 1 to 8 times daily, preferably 1 to 5 times daily. An appropriate dose can be suitably determined according to the concentration and dosage form of the active ingredient of the present invention.

The medicament of the present invention may also contain any other one medicinal ingredient, or two or more medicinal ingredients, as long as the effects of the present invention are not impaired.

EXAMPLES

The present invention is described in detail below based on Examples; however, the present invention is not limited to the Examples.

The present invention is described in more detail below with reference to Reference Examples, Examples, Formulation Examples, and Test Examples; however, the present invention is not limited thereto.

In the Reference Examples, Examples, and Test Examples, all temperatures were specified in degrees Celsius (° C.) unless otherwise specified. All amounts and percentages are by weight unless otherwise specified. Reagents were purchased from reagent suppliers, such as Sigma-Aldrich Corporation, Tokyo Chemical Industry Co., Ltd., FUJIFILM Wako Pure Chemical Corporation, and Nacalai Tesque, Inc., and used without purification unless otherwise stated.

The operations in the Reference Examples and Examples were generally performed under argon atmosphere in an anhydrous solvent. The reaction was analyzed by thin-layer chromatography (TLC), and ended by determination based on the consumption of the starting substance. For TLC, silica gel 60F254 (Merck) was used, samples were developed in appropriate solvents and displayed at appropriate positions, and a UV detector was used for detection. Elution in column chromatography in the Reference Examples and Examples was carried out under observation by TLC unless otherwise mentioned. The silica gel for column chromatography used was SI silica gel (particle size: 30 to 50 µm) or NH silica gel (particle size: 60 µm) produced by Fuji Silysia Chemical Ltd., or silica gel (particle size: 40 µm) or amino silica gel (particle size: 40 µm) produced by Yamazen Corporation. The term "room temperature" generally means a temperature of about 10° C. to 35° C.

The following abbreviations were used in the Examples below.

mCPBA: 3-Chloroperbenzoic acid
M: Molarity
N: Normality
$CDCl_3$: Deuterated chloroform
$CD_3OD$: Deuterated methanol
$DMSO-d_6$: Deuterated dimethyl sulfoxide
$^1H$ NMR: Proton nuclear magnetic resonance
DBU: 1,8-Diazabicyclo[5.4.0]-7-undecene
DDQ: 2,3-Dichloro-5,6-dicyano-p-benzoquinone
DEAD: Diethyl azodicarboxylate
DIPEA: N,N-diisopropylethylamine
DMF: N, N-dimethylformamide
DMA: N,N-dimethylacetamide
DMSO: Dimethylsulfoxide
EDCI: 1-Ethyl-3-(3-dimethylaminopropyl)carbodiimide hydrochloride
HOBt: 1-Hydroxybenzotriazole
LDA: Lithium diisopropylamide
$PdCl_2(dppf)_2$-$CH_2Cl_2$: [1,1'-Bis(diphenylphosphino)ferrocene]palladium(II) dichloride dichloromethane adduct
TEA: Triethylamine
TFA: Trifluoroacetic acid
THF: Tetrahydrofuran
p-TsOH—$H_2O$: p-Toluenesulfonic acid monohydrate
[RhCl (cod)]$_2$: Chloro(1,5-cyclooctadiene) rhodium(I) (dimer)
HATU: O-(7-azabenzotriazol-1-yl)-N,N,N',N'-tetramethyluronium hexafluorophosphate
HBTU: O-(benzotriazol-1-yl)-N,N,N',N'-tetramethyluronium hexafluorophosphate.

$^1H$ NMR spectra were recorded on a Bruker instrument operating at 400 MHz. NMR spectra were obtained as $CDCl_3$ solutions using chloroform as a reference standard (7.26 ppm) or tetramethylsilane (0.00 ppm) inside as appropriate. Other NMR solvents were also used as needed. When peak multiplicities are reported, the following abbreviations are used: s (singlet), d (doublet), t (triplet), q (quartet), quin (quintet), septd (septet), m (multiplet), br (broad), dd (doublet of doublets), dt (doublet of triplets), and td (triplet of doublets). Coupling constants (J values) are reported in Hertz (Hz).

Reference Example 1

Production of (R)-4-ethyl-3,4-dihydro-2H-benzo[b][1,4,5]oxathiazepine 1,1-dioxide

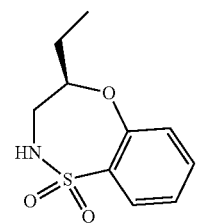

While stirring ammonia water (about 28%) (84 mL), (R)-(+)-butylene oxide (5.0 mL, 58.2 mmol) was added dropwise over 10 minutes, and the mixture was stirred at room temperature for 22 hours. The solvent of the mixture was distilled under reduced pressure, and the obtained oily substance was dissolved in THF/H₂O (72 mL/18 mL). Potassium carbonate (4.55 g, 32.9 mmol) and 2-fluorobenzenesulfonyl chloride (4.3 mL, 32.9 mmol) were added to the solution, and the mixture was stirred at room temperature for 2 hours. The obtained solution was diluted with water and extracted with ethyl acetate. The organic layer was washed with saturated saline and then dried over anhydrous sodium sulfate, and the solvent was distilled under reduced pressure. The obtained residue was dissolved in DMSO (130 mL), and potassium tert-butoxide (11 g, 98 mmol) was added and stirred at 80° C. for 1 hour. The obtained solution was adjusted to a pH of up to 5 with 2N hydrochloric acid, and then extracted with ethyl acetate. The organic layer was washed with water and then dried over anhydrous sodium sulfate, and the solvent was distilled under reduced pressure. Dichloromethane at 0° C. was added to the obtained residue, followed by filtration. The residue was dried under reduced pressure, thereby obtaining the title compound (3.36 g, 45%) as a white solid. The filtrate was concentrated under reduced pressure, and the residue was purified by silica gel column chromatography (hexane/ethyl acetate (v/v)=3/2→1/1), thereby obtaining the title compound (2.93 g, 39%) as a white solid.

¹H NMR (400 MHz, CDCl₃) δ 7.83 (1H, dd, J=7.6, 1.6 Hz), 7.47 (1H, td, J=7.6, 1.6 Hz), 7.19 (1H, td, J=7.6, 1.2 Hz), 7.17 (1H, dd, J=7.6, 1.2 Hz), 4.66 (1H, br s), 3.89-3.82 (1H, m), 3.70-3.62 (1H, m), 3.39 (1H, ddd, J=14.8, 5.2, 2.0 Hz), 1.83-1.71 (1H, m), 1.67-1.56 (1H, m), 1.13 (3H, t, J=7.2 Hz).

Reference Example 2

Production of (R)-4-methyl-3,4-dihydro-2H-benzo[b][1,4,5]oxathiazepine 1,1-dioxide

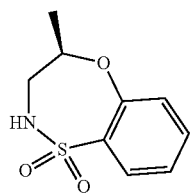

(R)-(−)-1-amino-2-propanol (2.89 g, 38.3 mmol), THF/water (125 mL/31.3 mL), potassium carbonate (5.29 g, 38.3 mmol), 2-fluorobenzenesulfonyl chloride (5.0 mL, 38.3 mmol), DMSO (120 mL), and potassium tert-butoxide (10.0 g, 89.1 mmol) were used as raw materials, and the same operation was performed as in step j of Reference Example 1, thereby obtaining the title compound (6.42 g, 79%) as a pale yellow solid.

¹H NMR (400 MHz, CDCl₃) δ 7.81 (1H, dd, J=8.0, 1.6 Hz), 7.46 (1H, td, J=8.0, 1.6 Hz), 7.19 (1H, td, J=8.0, 1.2 Hz), 7.15 (1H, dd, J=8.0, 1.2 Hz), 4.75 (1H, br s), 4.19-4.12 (1H, m), 3.67-3.59 (1H, m), 3.41 (1H, ddd, J=14.8, 5.2, 2.0 Hz), 1.40 (3H, d, J=6.4 Hz).

Reference Example 3

Production of (R)-4-ethyl-3,4-dihydro-2H-pyrido[2,3-b][1,4,5]oxathiazepine 1,1-dioxide

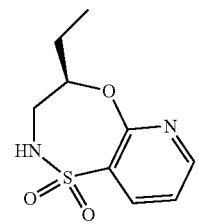

Ammonia water (about 28%) (2.9 mL), (R)-(+)-butylene oxide (172 μL, 2 mmol), THF/water (2.4 mL/0.6 mL), potassium carbonate (163.1 mg, 1.18 mmol), 2-chloropyridine-3-sulfonyl chloride (250 mg, 1.18 mmol), DMSO (4.7 mL), and potassium tert-butoxide (397 mg, 3.54 mmol) were used as raw materials, and the same operation was performed as in Reference Example 1, thereby obtaining the title compound (210.4 mg, 78%) as an oily brown substance.

¹H NMR (400 MHz, CDCl₃) δ 8.40 (1H, dd, J=4.8, 2.0 Hz), 8.15 (1H, dd, J=7.6, 2.0 Hz), 7.19 (1H, dd, J=7.6, 4.8 Hz), 6.34 (1H, br s), 4.26-4.21 (1H, m), 3.66-3.58 (1H, m), 3.50-3.44 (1H, m), 1.84-1.75 (1H, m), 1.71-1.65 (1H, m), 1.12 (3H, t, J=7.6 Hz).

Reference Example 4

Production of (R)-4-ethyl-3,4-dihydro-2H-pyrido[4,3-b][1,4,5]oxathiazepine 1,1-dioxide

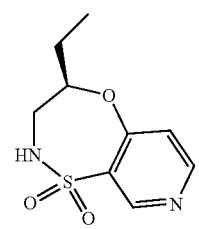

Ammonia water (about 28%) (4.35 mL), (R)-(+)-butylene oxide (258 μL, 3 mmol), THF/water (2.5 mL/1.0 mL), potassium carbonate (180 mg, 1.3 mmol), 4-chloro-pyridine-3-sulfonyl chloride (250 mg, 1.18 mmol), DMSO (8.0 mL), and potassium tert-butoxide (397 mg, 3.54 mmol) were used as raw materials, and the same operation was performed as in Reference Example 1, thereby obtaining the title compound (140.8 mg, 52%) as an oily colorless substance.

¹H NMR (400 MHz, CDCl₃) δ 8.82 (1H, s), 8.53 (1H, d, J=5.6 Hz), 7.04 (1H, d, J=5.6, Hz), 5.98 (1H, br s), 4.29-4.23 (1H, m), 3.56-3.46 (2H, m), 1.81-1.74 (1H, m), 1.72-1.63 (1H, m), 1.10 (3H, t, J=7.6 Hz).

Reference Example 5

Production of (R)-2-fluoro-N-(2-hydroxybutyl)benzenesulfonamide

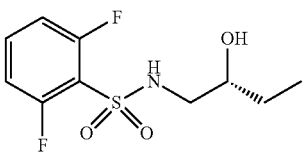 [SMILES: CC[C@@H](O)CNS(=O)(=O)c1c(F)cccc1F]

Potassium carbonate (203.0 mg, 1.5 mmol) and 2,6-difluorobenzenesulfonyl chloride (150 μL, 1.1 mmol) were added to a THF/water (4/1) (2.0 mL) solution of (R)-1-aminobutan-2-ol (127.6 mg, 1.4 mmol), and the mixture was stirred at room temperature for 2 hours. Water was added to the reaction solution, followed by extraction with ethyl acetate and drying over sodium sulfate. The solvent was removed by distillation under reduced pressure, thereby obtaining the title compound (318.1 mg, quant.) as a white solid.

$^1$H NMR (400 MHz, CDCl$_3$) δ 7.51 (1H, m), 7.04 (2H, t, J=8.4 Hz), 3.73-3.67 (1H, m), 3.28 (1H, dd, J=12.8, 3.2 Hz), 2.96 (1H, d, J=12.8, 8.0 Hz), 1.55-1.41 (2H, m), 0.94 (3H, t, J=7.6 Hz).

Reference Example 6

Production of (R)-4-ethyl-9-fluoro-3,4-dihydro-2H-benzo[b][1,4,5]oxathiazepine 1,1-dioxide

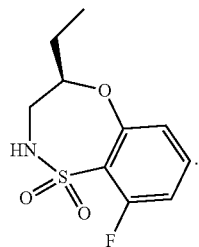

A DMSO (1.5 mL) solution of (R)-2-fluoro-N-(2-hydroxybutyl)benzenesulfonamide (161.0 mg, 0.65 mmol) and potassium tert-butoxide (150.7 mg, 1.3 mmol) was stirred under microwave irradiation at 100° C. for 2 hours. The reaction solution was returned to room temperature, adjusted to a pH of 6 with 1M hydrochloric acid, and extracted with ethyl acetate. The organic layer was washed with saturated saline and dried over sodium sulfate, and the solvent was removed by distillation under reduced pressure. The obtained residue was purified by silica gel column chromatography (hexane/ethyl acetate (v/v)=73/27→52/48), thereby obtaining the title compound (113.2 mg, 71%) as a white solid.

$^1$H NMR (400 MHz, CDCl$_3$) δ 7.38-7.33 (1H, m), 6.93-6.88 (2H, m), 5.26 (1H, br t, J=6.0 Hz), 4.34-4.27 (1H, m), 3.54 (1H, ddd, J=14.0, 6.4, 4.0 Hz), 3.23 (1H, ddd, J=14.0, 11.2, 6.8 Hz), 1.78-1.58 (2H, m), 1.07 (3H, t, J=7.6 Hz).

Reference Example 7

Production of [(but-3-en-1-yloxy)methyl]benzene

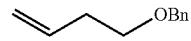

3-Buten-1-ol (2.5 mL, 29.5 mmol) at 0° C. was added to a THF (25 mL) solution of sodium hydride (60l) (2.36 g, 59 mmol), and the mixture was returned to room temperature and stirred for 30 minutes. Benzyl bromide (3.85 mL, 32.4 mmol) was added at 0° C. to the solution, and the mixture was stirred at room temperature for 20 hours. A saturated ammonium chloride aqueous solution was added to the mixture at 0° C. to stop the reaction, followed by extraction with ethyl acetate. The combined organic layer was concentrated under reduced pressure, and the residue was purified by silica gel column chromatography (hexane/ethyl acetate (v/v)=100/0→91/9), thereby obtaining the title compound (3.95 g, 83%) as an oily colorless substance.

$^1$H NMR (400 MHz, CDCl$_3$) δ 7.38-7.26 (5H, m), 5.91-5.79 (1H, m), 5.15-5.07 (1H, m), 5.08-5.02 (1H, m), 4.53 (2H, s), 3.54 (2H, t, J=6.8 Hz), 2.43-2.35 (2H, m).

Reference Example 8

Production of 2-[2-(benzyloxy)ethyl]oxirane

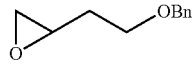 [SMILES: c1ccc(COCCC2CO2)cc1]

mCPBA (about 77%) (7.09 g, 31.6 mmol) was added at 0° C. to a dichloromethane (79 mL) solution of [(but-3-en-1-yloxy)methyl]benzene (3.95 g, 24.3 mmol). The mixture was returned to room temperature and stirred for 14 hours. The reaction mixture was diluted with water, and a saturated sodium hydrogen carbonate aqueous solution and a saturated sodium thiosulfate aqueous solution were added to stop the reaction. The mixture was extracted with dichloromethane, and the organic layer was concentrated under reduced pressure. The residue was purified by silica gel column chromatography (hexane/ethyl acetate (v/v)=93/7→72/28), thereby obtaining the title compound (4.11 g, 95%) as an oily colorless substance.

$^1$H NMR (400 MHz, CDCl$_3$) δ 7.38-7.26 (5H, m), 4.54 (2H, s), 3.68-3.58 (2H, m), 3.12-3.06 (1H, m), 2.79 (1H, dd, J=5.0, 4.2 Hz), 2.54 (1H, dd, J=5.0, 3.7 Hz), 1.97-1.86 (1H, m), 1.84-1.73 (1H, m).

Reference Example 9

Production of 1-amino-4-(benzyloxy)butan-2-ol

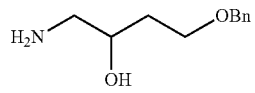 [SMILES: NCC(O)CCOCc1ccccc1]

2-[2-(Benzyloxy)ethyl]oxirane (4.11 g, 23.1 mmol) was added to ammonia water (about 28%) (86 mL). The reaction mixture was stirred for 15 hours, and then concentrated under reduced pressure, thereby obtaining the title compound (4.45 g, 99%) as an oily pale yellow substance.

$^1$H NMR (400 MHz, CDCl$_3$) δ 7.37-7.26 (5H, m), 4.52 (2H, s), 3.77-3.63 (3H, m), 2.79 (1H, dd, J=12.8, 3.6 Hz), 2.61 (1H, dd, J=12.8, 7.6 Hz), 1.77-1.71 (2H, m).

Reference Example 10

Production of 4-[2-(benzyloxy)ethyl]-3,4-dihydro-2H-benzo[b][1,4,5]oxathiazepine 1,1-dioxide

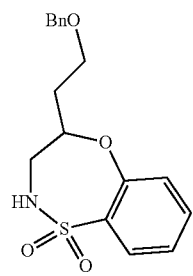 [SMILES: O=S1(=O)NCC(CCOCc2ccccc2)Oc2ccccc21]

Potassium carbonate (2.06 g, 14.9 mmol) and 2-fluorobenzenesulfonyl chloride (1.95 mL, 14.9 nmol) were added to a solution of 1-amino-4-(benzyloxy)butan-2-ol (4.4475 g, 22.8 mmol) in THF (29 mL) and water (7.3 mL). The reaction mixture was stirred for 1 hour, and 1N hydrochloric acid was added to stop the reaction. The mixture was extracted with ethyl acetate, and the organic layer was concentrated under reduced pressure. The obtained residue was dissolved in DMSO (135 mL), and potassium tert-butoxide (5.02 g, 44.7 mmol) was added to the solution. The reaction mixture was stirred at 80° C. for 1 hour, and 1N hydrochloric acid was added to stop the reaction. The mixture was extracted with ethyl acetate, washed with saturated saline, and concentrated under reduced pressure. The residue was purified by silica gel column chromatography (hexane/ethyl acetate (v/v)=91/9→60/40), thereby obtaining the title compound (3.88 g, 78%) as a colorless solid.

$^1$H NMR (400 MHz, CDCl$_3$) δ 7.83 (1H, d, J=7.6 Hz), 7.42 (1H, td, J=7.6, 1.6 Hz), 7.33-7.26 (5H, m), 7.20 (1H, t, J=7.6 Hz), 6.96 (1H, d, J=7.6 Hz), 4.63 (1H, br s), 4.55 (1H, d, J=12.0 Hz), 4.49 (1H, d, J=12.0 Hz), 4.11 (1H, br t, J=9.6 Hz), 3.85-3.63 (3H, m), 3.39-3.35 (1H, m), 2.00-1.86 (2H, m).

Reference Example 11

Production of (5-bromo-2-methylphenyl)methanol

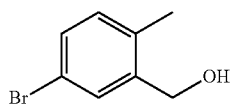

After a borane-tetrahydrofuran complex (about 0.9 mmol/L THF solution) (38.8 mL, 34.9 mmol) was added dropwise to a THF (50 mL) solution of 5-bromo-2-methylbenzoate (5.0 g, 25.3 mmol) at 0° C. over 10 minutes, the mixture was stirred at room temperature for 20 hours. Methanol (35 mL) was added to the obtained solution, and the mixture was stirred at room temperature for 2 hours. Then, the solvent was distilled under reduced pressure. Ethyl acetate was added to the residue, followed by washing with 1N hydrochloric acid. The organic layer was dried over anhydrous sodium sulfate, and the solvent was distilled under reduced pressure, thereby obtaining the title compound (5.0 g, 98%) as an oily light yellow substance.

$^1$H NMR (400 MHz, CDCl$_3$) δ 7.53 (1H, d, J=2.0 Hz), 7.32 (1H, dd, J=8.0, 2.0 Hz), 7.03 (1H, d, J=8.0 Hz), 4.66 (2H, d, J=5.6 Hz), 2.27 (3H, s), 1.64 (1H, t, J=5.6 Hz).

Reference Example 12

Production of (R)-2-(5-bromo-2-methylbenzyl)-4-ethyl-3,4-dihydro-2H-benzo[b][1,4,5]oxathiazepine 1,1-dioxide

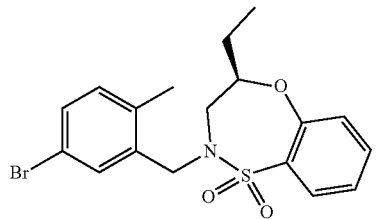 [SMILES: CC[C@@H]1CN(Cc2cc(Br)ccc2C)S(=O)(=O)c2ccccc2O1]

A 2.2M DEAD toluene solution (5.1 mL, 11.2 mmol) was added at 0° C. while stirring to a THF (39 mL) solution of (5-bromo-2-methylphenyl)methanol (2.0 g, 9.95 mmol), (R)-4-ethyl-3,4-dihydro-2H-benzo[b][1,4,5]oxathiazepine 1,1-dioxide (2.26 g, 9.95 mmol), and triphenylphosphine (2.61 g, 9.95 mmol). The solution was stirred at room temperature for 7 hours, and then diluted with water, followed by extraction with ethyl acetate. The organic layer was dried over sodium sulfate, and the solvent was distilled under reduced pressure. The residue was purified by silica gel column chromatography (hexane/ethyl acetate (v/v)=95/5→85/15), thereby obtaining the title compound (3.46 g, 85%) as a white solid.

$^1$H NMR (400 MHz, CDCl$_3$) δ 7.89 (1H, dd, J=7.6, 1.6 Hz), 7.52 (1H, td, J=7.6, 1.6 Hz), 7.39 (1H, d, J=2.0 Hz), 7.35 (1H, dd, J=8.0, 2.0 Hz), 7.26 (1H, td, J=7.6, 1.2 Hz), 7.21 (1H, dd, J=7.6, 1.2 Hz), 7.06 (1H, d, J=8.0 Hz), 4.51 (1H, d, J=14.4 Hz), 4.08-4.02 (1H, m), 3.85 (1H, d, J=14.4 Hz), 3.76 (1H, dd, J=15.2, 10.8 Hz), 3.06 (1H, dd, J=15.2, 2.0 Hz), 2.29 (3H, s), 1.79-1.70 (1H, m), 1.56-1.50 (1H, m), 1.11 (3H, t, J=7.2 Hz).

Reference Example 13

Production of (R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide

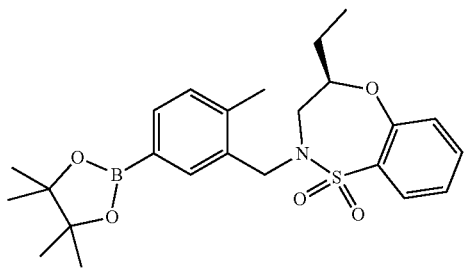 [SMILES: CC[C@@H]1CN(Cc2cc(B3OC(C)(C)C(C)(C)O3)ccc2C)S(=O)(=O)c2ccccc2O1]

A 1,4-dioxane solution (36 mL) of (R)-2-(5-bromo-2-methylbenzyl)-4-ethyl-3,4-dihydro-2H-benzo[b][1,4,5]oxathiazepine 1,1-dioxide (3.4 g, 8.29 mmol), bis(pinacolato)diboron (3.15 g, 12.4 mmol), potassium acetate (2.44 g, 24.9 mmol), and $PdCl_2(dppf)_2\text{-}CH_2Cl_2$ (408 mg, 0.5 mmol) was stirred at 100° C. for 6 hours. The reaction solution was filtered through Celite, and the filtrate was concentrated under reduced pressure. The residue was purified by silica gel column chromatography (hexane/ethyl acetate (v/v)=95/5→85/15), thereby obtaining the title compound (3.28 g, 86%) as a white solid.

$^1$H NMR (400 MHz, $CDCl_3$) δ 7.90 (1H, d, J=7.6 Hz), 7.68 (1H, d, J=7.6 Hz), 7.54 (1H, s), 7.52 (1H, t, J=7.6 Hz), 7.25 (1H, t, J=7.6 Hz), 7.22-7.20 (2H, m), 4.64 (1H, d, J=13.6 Hz), 4.09-4.04 (1H, m), 3.83 (1H, d, J=13.6 Hz), 3.74 (1H, dd, J=15.2, 10.8 Hz), 2.97 (1H, dd, J=15.2, 1.2 Hz), 2.43 (3H, s), 1.77-1.70 (1H, m), 1.51-1.42 (1H, m), 1.32 (12H, s), 1.05 (3H, t, J=7.2 Hz).

Reference Example 14

Production of 4-bromo-2-{[(4-methoxybenzyl)oxy]methyl}-1-methylbenzene

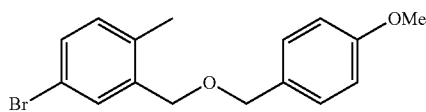 [SMILES: COc1ccc(COCc2cc(Br)ccc2C)cc1]

Sodium hydride (472 mg, 11.8 mmol) was added to a DMF (16 mL) solution of (5-bromo-2-methylphenyl)methanol (2.16 g, 10.8 mmol). The solution was stirred at room temperature for 30 minutes and then cooled to 0° C., and 4-methoxybenzyl chloride (1.53 mL, 11.3 mmol) was added. The solution was stirred at room temperature for 2 hours, and water was added to stop the reaction, followed by extraction with diethyl ether. The organic layer was washed with saturated saline and dried over sodium sulfate, and the solvent was distilled under reduced pressure. The residue was purified by silica gel column chromatography (hexane/ethyl acetate (v/v)=95/5→85/15), thereby obtaining the title compound (1.77 g, 61%) as an oily colorless substance.

$^1$H NMR (400 MHz, $CDCl_3$) δ 7.50 (1H, d, J=2.0 Hz), 7.32-7.28 (3H, m), 7.02 (1H, d, J=8.0 Hz), 6.90 (2H, d, J=8.4 Hz), 4.51 (2H, s), 4.46 (2H, s), 3.81 (3H, s), 2.24 (3H, s).

Reference Example 15

Production of 3-{[(4-methoxybenzyl)oxy]methyl}-4-methylbenzaldehyde

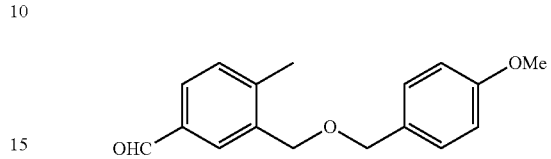

A 2.3M n-butyllithium hexane solution (980 μL, 2.25 mmol) was added dropwise at −78° C. under argon atmosphere to a THF (6 mL) solution of 4-bromo-2-{[(4-methoxybenzyl)oxy]methyl}-1-methylbenzene (600 mg, 1.87 mmol). The reaction mixture was stirred at −78° C. for 1 hour, DMF (290 μL, 3.75 mmol) was added, and the mixture was heated to room temperature and mixed for 1 hour. A saturated ammonium chloride aqueous solution was added to the mixture to end the reaction, followed by extraction with ethyl acetate. The organic layer was washed with water and saturated saline, and dried over sodium sulfate, and the solvent was distilled under reduced pressure. The residue was purified by silica gel column chromatography (hexane/ethyl acetate (v/v)=99/1→90/10), thereby obtaining the title compound (448.3 mg, 89%) as an oily colorless substance.

$^1$H NMR (400 MHz, $CDCl_3$) δ 9.97 (1H, s), 7.87 (1H, d, J=1.6 Hz), 7.72 (1H, dd, J=8.0, 1.6 Hz), 7.33-7.26 (3H, m), 6.90 (2H, br d, J=8.8 Hz), 4.56 (2H, s), 4.54 (2H, s), 3.82 (3H, s), 2.39 (3H, s).

Reference Example 16

Production of 2-(3-{[(4-methoxybenzyl)oxy]methyl}-4-methylphenyl)-4,4,5,5-tetramethyl-1,3,2-dioxaborolane

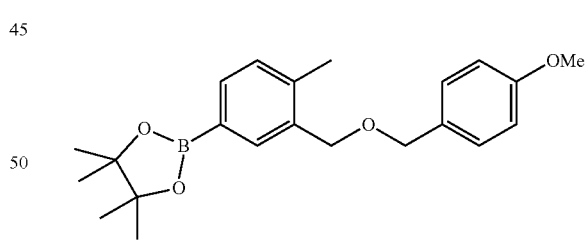

A 1,4-dioxane solution (68 mL) of 4-bromo-2-{[(4-methoxybenzyl)oxy]methyl}-1-methylbenzene (6.67 g, 20.77 mmol), bis(pinacolato)diboron (5.54 g, 21.81 mmol), potassium acetate (6.12 g, 62.31 mmol), and $PdCl_2(dppf)_2\text{-}CH_2Cl_2$ (848.1 mg, 1.04 mmol) was stirred at 100° C. for 6 hours. The reaction solution was filtered through Celite, and the filtrate was concentrated under reduced pressure. The residue was purified by silica gel column chromatography (hexane/ethyl acetate (v/v)=95/5→85/15), thereby obtaining the title compound (6.63 g, 87%) as an oily light yellow substance.

$^1$H NMR (400 MHz, $CDCl_3$) δ 7.73 (1H, s), 7.65 (1H, dd, J=7.2, 1.2 Hz), 7.27 (2H, d, J=8.8 Hz), 7.18 (1H, d, J=7.2

Hz), 6.88 (2H, br d, J=8.8 Hz), 4.52 (2H, s), 4.47 (2H, s), 3.81 (3H, s), 2.36 (3H, s), 1.34 (12H, s).

Reference Example 17

Production of methyl 3-(3-{[(4-methoxybenzyl)oxy]methyl}-4-methylphenyl)-3-[5-(2-methyl-1,3-dioxolan-2-yl)thiophen-2-yl]propanoate

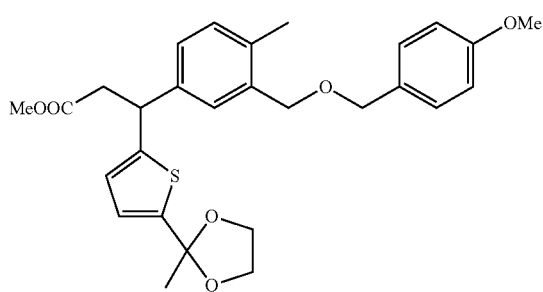 [SMILES: COC(=O)CC(c1ccc(C)c(COCc2ccc(OC)cc2)c1)c1ccc(C2(C)OCCO2)s1]

Triethylamine (2.7 mL, 19.5 mmol) was added to a 1,4-dioxane/water (9.6 mL/960 μL) solution of methyl (E)-3-[5-(2-methyl-1,3-dioxolan-2-yl)thiophen-2-yl]acrylate (3.30 g, 13.0 mmol), 2-(3-{[(4-methoxybenzyl)oxy]methyl}-4-methylphenyl)-4,4,5,5-tetramethyl-1,3,2-dioxaborolane (2.39 g, 6.49 mmol), and [RhCl(cod)]₂ (160 mg, 0.32 mmol). The reaction mixture was stirred at 50° C. for 2.5 hours. Water was added to the mixture, followed by extraction with ethyl acetate. The organic layer was washed with saturated saline and dried over sodium sulfate, and the solvent was distilled under reduced pressure. The residue was purified by silica gel column chromatography (hexane/ethyl acetate (v/v)=9/1→7/3), thereby obtaining the title compound (1.52 g, 47%) as an oily light yellow substance.

¹H NMR (400 MHz, CDCl₃) δ 7.28-7.24 (3H, m), 7.11-7.10 (2H, m), 6.88 (2H, br d, J=8.4 Hz), 6.81 (1H, d, J=3.6 Hz), 6.65 (1H, dd, J=3.6, 0.8 Hz), 4.67 (1H, t, J=7.6 Hz), 4.48 (2H, s), 4.46 (2H, s), 4.00-3.95 (2H, m), 3.94-3.89 (2H, m), 3.81 (3H, s), 3.59 (3H, s), 3.08 (1H, dd, J=15.6, 7.6 Hz), 2.99 (1H, dd, J=15.6, 7.6 Hz), 2.28 (3H, s), 1.71 (3H, s).

Reference Example 18

Production of methyl 3-(3-{[(4-methoxybenzyl)oxy]methyl}-4-methylphenyl)-2-methyl-3-[5-(2-methyl-1,3-dioxolan-2-yl)thiophen-2-yl]propanoate

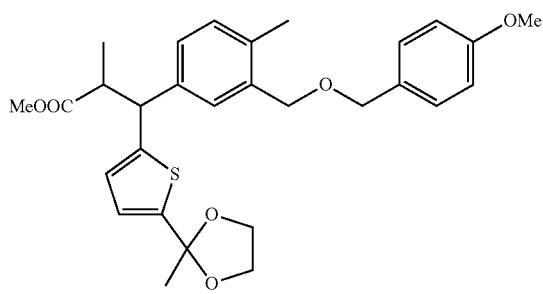 [SMILES: COC(=O)C(C)C(c1ccc(C)c(COCc2ccc(OC)cc2)c1)c1ccc(C2(C)OCCO2)s1]

A 2M LDA THF/heptane/ethylbenzene solution (1.83 mL, 3.67 mmol) was added under argon atmosphere at −78° C. to a THF (18 mL) solution of methyl 3-(3-{[(4-methoxybenzyl)oxy]methyl}-4-methylphenyl)-3-[5-(2-methyl-1,3-dioxolan-2-yl)thiophen-2-yl]propanoate (1.40 g, 2.82 mmol). The reaction mixture was stirred at −78° C. for 30 minutes, and then stirred at −40° C. for 20 minutes. Iodomethane (2.6 mL, 42.3 mmol) was added, and the mixture was heated to room temperature and stirred for 4 hours. Water was added to the mixture to stop the reaction, followed by extraction with ethyl acetate. The organic layer was washed with saturated saline and dried over sodium sulfate, and the solvent was distilled under reduced pressure. The residue was purified by silica gel column chromatography (hexane/ethyl acetate (v/v)=8%), thereby obtaining the title compound. The title compound could be separated into two isomer mixtures; isomer mixture 1 with a shorter retention time (isomer 1) (505.7 mg, 31%) and isomer mixture 2 with a longer retention time (isomer 2) (853.3 mg, 52%) were obtained as oily light yellow substances.

Isomer 1: ¹H NMR (400 MHz, CDCl₃) δ 7.28-7.26 (3H, m), 7.16 (1H, dd, J=8.0, 2.0 Hz), 7.06 (1H, d, J=8.0 Hz), 6.89 (2H, br d, J=8.8 Hz), 6.82 (1H, d, J=3.6 Hz), 6.74 (1H, d, J=3.6 Hz), 4.47 (2H, s), 4.43 (2H, s), 4.25 (1H, d, J=10.8 Hz), 4.01-3.97 (2H, m), 3.96-3.90 (2H, m), 3.81 (3H, s), 3.43 (3H, s), 3.24-3.16 (1H, m), 2.25 (3H, s), 1.71 (3H, s), 1.20 (3H, d, J=6.8 Hz). Isomer 2: ¹H NMR (400 MHz, CDCl₃) δ 7.28-7.23 (3H, m), 7.11-7.10 (2H, m), 6.89 (2H, br d, J=8.8 Hz), 6.77 (1H, d, J=3.6 Hz), 6.71 (1H, dd, J=3.6 Hz), 4.48 (2H, s), 4.47 (2H, s), 4.27 (1H, d, J=11.2 Hz), 3.99-3.95 (2H, m), 3.93-3.82 (2H, m), 3.82 (3H, s), 3.58 (3H, s), 3.21-3.16 (1H, m), 2.28 (3H, s), 1.69 (3H, s), 1.05 (3H, d, J=6.8 Hz).

Reference Example 19

Production of methyl 3-(5-acetylthiophen-2-yl)-3-(3-{[(4-methoxybenzyl)oxy]methyl}-4-methylphenyl)-2-methylpropanoate

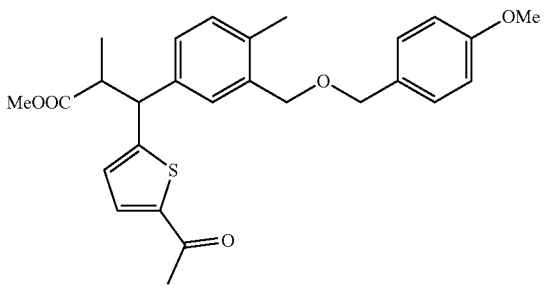 [SMILES: COC(=O)C(C)C(c1ccc(C)c(COCc2ccc(OC)cc2)c1)c1ccc(C(C)=O)s1]

2N hydrochloric acid (1.4 mL) was added to a tetrahydrofuran (2.8 mL) solution of methyl 3-(3-{[(4-methoxybenzyl)oxy]methyl}-4-methylphenyl)-2-methyl-3-[5-(2-methyl-1,3-dioxolan-2-yl)thiophen-2-yl]propanoate (isomer 1) (489 mg, 0.96 mmol), and the mixture was stirred at room temperature for 3 hours. The mixture was neutralized with a 1N sodium hydroxide aqueous solution and extracted with dichloromethane. The organic layer was washed with water and dried over sodium sulfate, and the solvent was distilled under reduced pressure, thereby obtaining isomer 2 (390.8 mg, 87%) of the title compound as an oily light yellow substance. Isomer 1 of the title compound was obtained in the same manner as for isomer 2.

Isomer 1: ¹H NMR (400 MHz, CDCl₃) δ 7.49 (1H, d, J=4.0 Hz), 7.28-7.24 (3H, m), 7.17 (1H, dd, J=8.0, 2.0 Hz), 7.07 (1H, d, J=8.0 Hz), 6.94-6.88 (3H, m), 4.46 (2H, s), 4.44

(2H, s), 4.36 (1H, d, J=11.2 Hz), 3.81 (3H, s), 3.45 (3H, s), 3.29-3.21 (1H, m), 2.45 (3H, s), 2.24 (3H, s), 1.21 (3H, d, J=6.8 Hz). Isomer 2: $^1$H NMR (400 MHz, CDCl$_3$) δ 7.46 (1H, d, J=4.0 Hz), 7.29-7.24 (3H, m), 7.11 (2H, s), 6.92-6.89 (3H, m), 4.49 (2H, s), 4.48 (2H, s), 4.36 (1H, d, J=11.2 Hz), 3.82 (3H, s), 3.60 (3H, s), 3.25-3.21 (1H, m), 2.46 (3H, s), 2.26 (3H, s), 1.08 (3H, d, J=6.8 Hz).

Reference Example 20

Production of methyl 3-(5-acetylthiophen-2-yl)-3-[3-(hydroxymethyl)-4-methylphenyl]-2-methylpropanoate

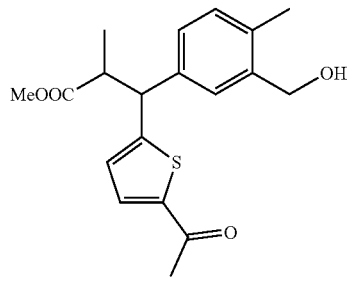 [SMILES: COC(=O)C(C)C(c1ccc(C)c(CO)c1)c1ccc(C(C)=O)s1]

DDQ (681 mg, 3.0 mmol) was added at 0° C. to a dichloromethane/water (10/1) (18.2 mL) solution of methyl 3-(5-acetylthiophen-2-yl)-3-(3-{[(4-methoxybenzyl)oxy]methyl}-4-methylphenyl)-2-methylpropanoate (700.9 mg, 1.5 mmol). The mixture was stirred at room temperature for 2.5 hours. A saturated sodium hydrogen carbonate aqueous solution was added to the reaction mixture, followed by extraction with dichloromethane. The organic layer was washed with saturated saline and dried over sodium sulfate, and the solvent was distilled under reduced pressure. The residue was purified by silica gel column chromatography (hexane/ethyl acetate (v/v)=6/4→4/6), thereby obtaining isomer 2 (436.3 mg, 84%) of the title compound as an oily light yellow substance. Isomer 1 of the title compound was obtained in the same manner as for isomer 2.

Isomer 1: $^1$H NMR (400 MHz, CDCl$_3$) δ 7.50 (1H, d, J=4.0 Hz), 7.30 (1H, br s), 7.16 (1H, dd, J=7.6, 2.0 Hz), 7.08 (1H, d, J=7.6 Hz), 6.95 (1H, d, J=4.0 Hz), 4.63 (2H, d, J=14.4 Hz), 4.36 (1H, d, J=10.8 Hz), 3.47 (3H, s), 3.31-3.21 (1H, m), 2.45 (3H, s), 2.26 (3H, s), 1.21 (3H, d, J=7.2 Hz).

Isomer 2: $^1$H NMR (400 MHz, CDCl$_3$) δ 7.46 (1H, d, J=4.0 Hz), 7.28 (1H, br s), 7.13 (2H, br s), 6.93 (1H, d, J=4.0 Hz), 4.68 (2H, d, J=5.6 Hz), 4.37 (1H, d, J=11.2 Hz), 3.60 (3H, s), 3.27-3.23 (1H, m), 2.46 (3H, s), 2.30 (3H, s), 1.09 (3H, d, J=6.8 Hz).

Reference Example 21

Production of 1-(5-bromothiophen-2-yl)ethan-1-ol

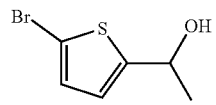

Sodium borohydride (458.2 mg, 12 mmol) was added at 10° C. to a methanol solution (40 mL) of 2-acetyl-5-bromothiophene (1.16 g, 5.6 mmol), and the mixture was stirred at 10° C. for 1 hour and 20 minutes. Water was added to the reaction solution, and the mixture was stirred at 0° C. for 15 minutes. After the reaction solution was concentrated under reduced pressure, ethyl acetate was added, followed by washing with water and saturated saline. After the organic layer was dried over sodium sulfate, the solvent was removed by distillation under reduced pressure, thereby obtaining the title compound (1.16 g, 99%) as an oily colorless and transparent substance.

$^1$H NMR (400 MHz, CDCl$_3$) δ 6.90 (1H, d, J=3.6 Hz), 6.72 (1H, d, J=3.6 Hz), 5.04 (1H, dq, J=5.6, 6.4 Hz), 1.97 (1H, d, J=4.8 Hz), 1.57 (3H, d, J=6.4 Hz).

Reference Example 22

Production of [1-(5-bromothiophen-2-yl)ethoxy](tert-butyl)dimethylsilane

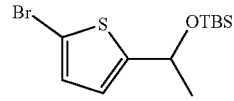

A dichloromethane solution (5.0 mL) of 4-dimethylaminopyridine (76.8 mg, 0.6 mmol), TEA (3.2 mL, 23 mmol), and tert-butyldimethylchlorosilane (1.66 g, 11 mmol) was added at 0° C. to a dichloromethane (12 mL) solution of 1-(5-bromothiophen-2-yl)ethan-1-ol (1.16 g, 5.6 mmol), and the mixture was stirred at room temperature overnight. 4-Dimethylaminopyridine (305.6 mg, 2.5 mmol) and tert-butyldimethylchlorosilane (981.6 mg, 6.5 mmol) were further added to the reaction solution, and the mixture was stirred at room temperature for 3 hours and 45 minutes. Ethyl acetate was added to the reaction solution, followed by washing with water and saturated saline, and the obtained organic layer was dried over sodium sulfate. After the solvent was removed by distillation under reduced pressure, the residue was purified by silica gel column chromatography (hexane/ethyl acetate (v/v)=1/0→95/5), thereby obtaining the title compound (1.28 g, 71%) as an oily colorless and transparent substance.

$^1$H NMR (400 MHz, CDCl$_3$), δ 6.86 (1H, d, J=4.0 Hz), 6.58 (1H, d, J=4.0 Hz), 5.01 (1H, q, J=6.4 Hz), 1.47 (3H, d, J=6.4 Hz), 0.91 (9H, s), 0.09 (3H, s), 0.06 (3H, s).

Reference Example 23

Production of (5-{1-[(tert-butyldimethylsilyl)oxy]ethyl}thiophen-2-yl) (3-{[(4-methoxybenzyl)oxy]methyl}-4-methylphenyl)methanol

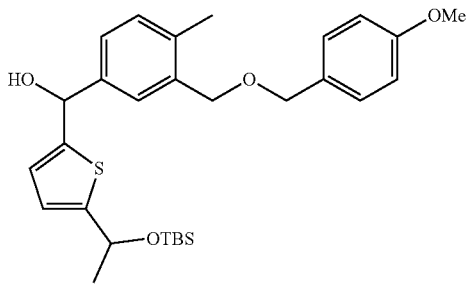 [SMILES: COc1ccc(COCc2cc(C(O)c3ccc(C(C)O[Si](C)(C)C(C)(C)C)s3)ccc2C)cc1]

After an anhydrous THF solution (5.0 mL) of [1-(5-bromothiophen-2-yl)ethoxy](tert-butyl)dimethylsilane (540.9 mg, 1.7 mmol) was cooled to −78° C., 2.5M n-butyllithium (0.75 mL, 1.9 mmol) was added dropwise, and the mixture was stirred at −78° C. for 30 minutes. A THF solution (5 mL) of 3-{[(4-methoxybenzyl)oxy]methyl}-4-methylbenzaldehyde (478.1 mg, 1.8 mmol) was added dropwise to the reaction solution, and the mixture was stirred at −78° C. for 1 hour, and then stirred at room temperature for 30 minutes. The reaction was stopped with a saturated ammonium chloride aqueous solution, followed by extraction with ethyl acetate, and the organic layer was washed with saturated saline. The organic layer was dried over sodium sulfate. After the solvent was removed by distillation under reduced pressure, the obtained crude product was purified by silica gel column chromatography (hexane/ethyl acetate (v/v)=90/10→69/31), thereby obtaining the title compound (740.4 mg, 86%) as an oily transparent yellow substance.

$^1$H NMR (400 MHz, CDCl$_3$) δ 7.41 (1H, s), 7.29-7.26 (3H, m), 7.16 (1H, d, J=7.6 Hz), 6.88 (1H, d, J=8.4 Hz), 6.67 (2H, d, J=4.4 Hz), 5.96 (1H, d, J=4.0 Hz), 5.17 (1H, q, J=6.4 Hz), 4.51 (2H, s), 4.48 (2H, s), 3.81 (3H, s), 2.32 (3H, s), 2.29 (1H, d, J=4.0 Hz), 1.47 (3H, d, J=6.4 Hz), 0.90 (9H, s), 0.07 (3H, s), 0.03 (3H, br s).

Reference Example 24

Production of methyl 3-(5-{1-[(tert-butyldimethylsilyl)oxy]ethyl}thiophen-2-yl)-3-(3-{[(4-methoxybenzyl)oxy]methyl}-4-methylphenyl)-2,2-dimethylpropanoate

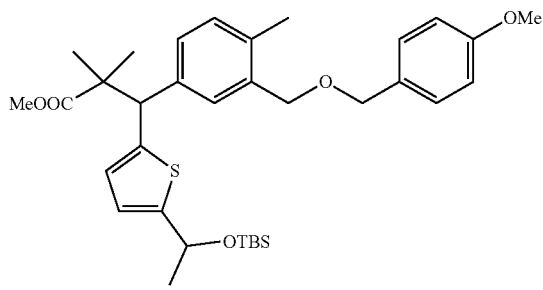 [SMILES: COC(=O)C(C)(C)C(c1ccc(C)c(COCc2ccc(OC)cc2)c1)c1ccc(C(C)O[Si](C)(C)C(C)(C)C)s1]

Trichloroacetonitrile (40 μL, 0.4 mmoL) and DBU (6 μL, 0.1 mmol) were added to an acetonitrile (2.0 mL) solution of ((5-{1-[(tert-butyldimethylsilyl)oxy]ethyl}thiophen-2-yl) (3-{[(4-methoxybenzyl)oxy]methyl}-4-methylphenyl) methanol (110.7 mg, 0.2 mmol), and the mixture was stirred at room temperature for 30 minutes. Dimethylketene methyl trimethylsilyl acetal (120 μL, 0.6 mmol) and bis(trifluoromethanesulfonyl)imide (8.2 mg, 0.03 mmol) were added to the reaction solution, and the mixture was stirred at room temperature for 1 hour. A saturated sodium hydrogen carbonate aqueous solution was added to the reaction solution to stop the reaction, followed by extraction with dichloromethane. The organic layer was dried over sodium sulfate, and the solvent was removed by distillation under reduced pressure. The obtained residue was purified by silica gel column chromatography (hexane/ethyl acetate (v/v)=95/5→74/26), thereby obtaining the title compound (824.8 mg, 73%) as an oily transparent yellow substance.

$^1$H NMR (400 MHz, CDCl$_3$) δ 7.32 (1H, dd, J=4.4, 1.2 Hz), 7.29-7.26 (2H, m), 7.21 (1H, td, J=7.6, 1.6 Hz), 7.08 (1H, d, J=7.6 Hz), 6.90 (1H, s), 6.88 (1H, s), 6.76-6.74 (1H, m), 6.64-6.63 (1H, m), 5.00 (1H, q, J=6.4 Hz), 4.63-4.62 (1H, m), 4.49 (2H, s), 4.47 (2H, br s), 3.81 (3H, s), 3.56 (3H, s), 2.27 (3H, s), 1.45 (3H, d, J=6.4 Hz), 1.29 (3H, s), 1.22 (3H, s), 0.89 (9H, br s), 0.05 (3H, s), 0.002 (3H, s).

Reference Example 25

Production of methyl 3-(5-acetylthiophen-2-yl)-3-[3-(hydroxymethyl)-4-methylphenyl]-2,2-dimethylpropanoate

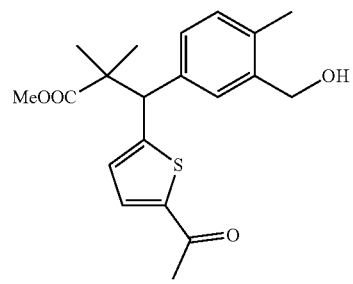 [SMILES: COC(=O)C(C)(C)C(c1ccc(C)c(CO)c1)c1ccc(C(C)=O)s1]

DDQ (612.2 mg, 2.7 mmol) was added at 0° C. to a mixed solution of methyl 3-(5-{1-[(tert-butyldimethylsilyl)oxy]ethyl}thiophen-2-yl)-3-(3-{[(4-methoxybenzyl)oxy]methyl}-4-methylphenyl)-2,2-dimethylpropanoate (773 mg, 1.3 mmol) in dichloromethane (16 mL) and water (1.2 mL), and the mixture was stirred at 0° C. for 1 hour and 20 minutes. A saturated sodium hydrogen carbonate aqueous solution was added to the reaction solution to stop the reaction, followed by extraction with dichloromethane. After the organic layer was dried over sodium sulfate, the solvent was removed by distillation under reduced pressure. The obtained crude product was purified by silica gel column chromatography (hexane/ethyl acetate (v/v)=93/7→72/28→50/50), thereby obtaining the title compound (204.1 mg, 44%) as an oily colorless and transparent substance.

$^1$H NMR (400 MHz, CDCl$_3$) δ 7.50 (1H, d, J=4.0 Hz), 7.34 (1H, d, J=1.6 Hz), 7.20 (1H, dd, J=7.6, 1.6 Hz), 7.11 (1H, d, J=7.6 Hz), 6.97 (1H, d, J=4.0 Hz), 4.17 (1H, s), 4.68 (2H, d, J=5.6 Hz), 3.61 (3H, s), 2.49 (3H, s), 2.31 (3H, s), 1.32 (3H, s), 1.24 (3H, s).

Reference Example 26

Production of methyl 3-(5-acetylthiophen-2-yl)-3-[3-(chloromethyl)-4-methylphenyl]-2,2-dimethylpropanoate

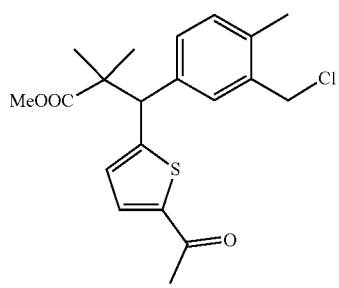 [SMILES: COC(=O)C(C)(C)C(c1ccc(C)c(CCl)c1)c1ccc(C(C)=O)s1]

DIPEA (300 µL, 1.7 mmol) and methanesulfonyl chloride (88 µL, 1.1 mmol) were added to a suspension of methyl 3-(5-acetylthiophen-2-yl)-3-[3-(hydroxymethyl)-4-methylphenyl]-2,2-dimethylpropanoate (204.1 mg, 0.57 mmol) and lithium chloride (123.1 mg, 2.9 mmol) in dichloromethane (6.0 mL), and the mixture was stirred at room temperature for 4.5 hours. Ethyl acetate was added to the reaction solution, followed by washing with a 10% citric acid aqueous solution, a saturated sodium hydrogen carbonate aqueous solution, and saturated saline. The organic layer was dried over sodium sulfate, and the solvent was removed by distillation under reduced pressure, thereby obtaining the title compound (218.3 mg, quant.) as an oily transparent light brown substance.

$^1$H NMR (400 MHz, CDCl$_3$) δ 7.51 (1H, d, J=4.0 Hz), 7.31-7.24 (2H, m), 7.14 (1H, d, J=8.0 Hz), 6.87 (1H, d, J=4.0 Hz), 4.70 (1H, s), 4.57 (2H, s), 3.60 (3H, s), 2.50 (3H, s), 2.38 (3H, s), 1.31 (3H, s), 1.24 (3H, s).

Reference Example 27

Production of methyl 3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoate

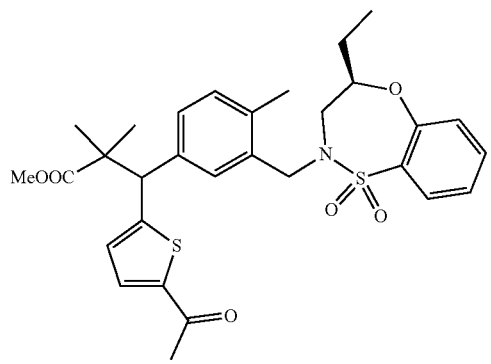 [SMILES: CC[C@@H]1CN(Cc2cc(C(c3ccc(C(C)=O)s3)C(C)(C)C(=O)OC)ccc2C)S(=O)(=O)c2ccccc2O1]

A DMF (0.50 mL) solution of methyl 3-(5-acetylthiophen-2-yl)-3-[3-(chloromethyl)-4-methylphenyl]-2,2-dimethylpropanoate (29.8 mg, 0.079 mmol), (R)-4-ethyl-3,4-dihydro-2H-benzo[b][1,4,5]oxathiazepine 1,1-dioxide (27.8 mg, 0.12 mmol), potassium carbonate (33.9 mg, 0.25 mmol), and tetrabutylammonium iodide (5.7 mg, 0.015 mmol) was stirred at 70° C. for 3 hours and 10 minutes. The reaction solution was cooled to room temperature, and ethyl acetate was added, followed by washing with water and saturated saline. The organic layer was dried over sodium sulfate, and the solvent was removed by distillation under reduced pressure. The obtained crude product was purified by silica gel column chromatography (hexane/ethyl acetate (v/v)=73/27→52/48), thereby obtaining the title compound (43.1 mg, 96%) as a white solid.

$^1$H NMR (400 Mz, CDCl$_3$) δ 7.87 (1H, dt, J=7.6, 1.2 Hz), 7.55-7.50 (1H, m), 7.49 (1H, d, J=4.0 Hz), 7.27-7.11 (5H, m), 6.97-6.95 (1H, m), 4.69 (1H, br s), 4.56-4.55 (1H, m), 3.83-3.80 (1H, m), 4.04-3.97 (1H, m), 3.73-3.71 (1H, m), 3.60 (3H, br s), 2.96-2.93 (1H, m), 2.49-2.48 (3H, m), 2.33 (3H, s), 1.81-1.56 (1H, m), 1.51-1.35 (1H, m), 1.29 (3H, br s), 1.23-1.21 (3H, m), 1.10-1.08 (3H, m).

Reference Example 28

Production of methyl 2-amino-5-bromo-3-nitrobenzoate

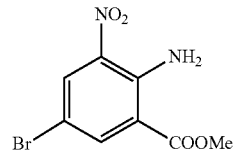 [SMILES: COC(=O)c1cc(Br)cc([N+](=O)[O-])c1N]

An acetic acid solution (5.0 mL) of bromine (5.0 g, 32 mmol) was added to an acetic acid (30 mL) solution of methyl 2-amino-3-nitrobenzoate (5.30 g, 27 mmol), and the mixture was stirred at room temperature for 1 hour. Crushed ice and water were added to the reaction solution, and the mixture was stirred at room temperature for 10 minutes. The resultant was filtered to obtain the precipitated solid, and the solid was washed with water, dissolved in ethyl acetate, washed with a 1M sodium hydroxide aqueous solution and saturated saline, and dried over sodium sulfate. The solvent was removed by distillation under reduced pressure, thereby obtaining the title compound (7.37 g, 99%) as a yellow solid.

$^1$H NMR (400 MHz, CDCl$_3$) δ 8.51 (1H, d, J=2.4 Hz), 8.44 (2H, br s), 8.32 (1H, d, J=2.4 Hz), 3.93 (3H, s).

Reference Example 29

Production of methyl 2,3-diamino-5-bromobenzoate

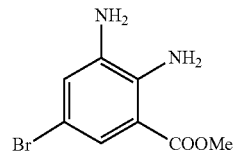 [SMILES: COC(=O)c1cc(Br)cc(N)c1N]

Tin(II) chloride (13.6 g, 72 mmol) was added to a methanol (100 mL) solution of methyl 2-amino-5-bromo-3-nitrobenzoate (3.97 g, 14 mmol), and the mixture was stirred at 75° C. for 1.5 hours. The reaction solution was returned to room temperature, and the reaction solution was concentrated under reduced pressure. Water was added, and a 1M sodium hydroxide aqueous solution (100 mL) and solid sodium hydrogen carbonate were added to adjust the pH to 9, followed by extraction with ethyl acetate. The obtained organic layer was dried over sodium sulfate, and the solvent was removed by distillation under reduced pressure. The obtained residue was purified by silica gel column chromatography (hexane/ethyl acetate (v/v)=70/30→49/51), thereby obtaining the title compound (2.60 g, 73%) as a brown solid.

$^1$H NMR (400 MHz, CDCl$_3$) δ 7.58 (1H, d, J=1.6 Hz), 6.94 (1H d, J=1.6 Hz), 5.55 (2H, br s), 3.87 (3H, s), 3.39 (2H, br s).

Reference Example 30

Production of methyl 6-bromo-1H-benzo[d]imidazole-4-carboxylate

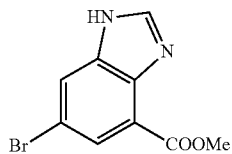

A formic acid (10 mL) solution of methyl 2,3-diamino-5-bromobenzoate (1.02 g, 4.2 mmol) was stirred at 100° C. for 1 hour. The reaction solution was returned to room temperature, and a 1M sodium hydroxide aqueous solution and solid sodium hydrogen carbonate were added to adjust the pH to 9, followed by extraction with ethyl acetate. The obtained organic layer was dried over sodium sulfate, and the solvent was removed by distillation under reduced pressure, thereby obtaining the title compound (1.06 g, 99%) as a purple solid.

$^1$H NMR (400 MHz, CDCl$_3$) δ 10.5 (1H, br s), 8.18 (1H, d, J=0.8 Hz), 8.14 (1H, s), 8.07 (1H, d, J=0.8 Hz), 4.02 (3H, s).

Reference Example 31

Production of (6-bromo-1-trityl-1H-benzo[d]imidazol-4-yl)methanol

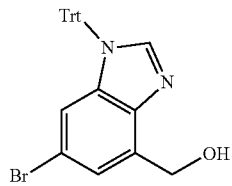

N-methylmorpholine (550 μL, 5.3 mmol) and trityl chloride (1.17 g, 4.2 mmol) were added to a dichloromethane (16 mL) solution of methyl 6-bromo-1H-benzo[d]imidazole-4-carboxylate (854.6 mg, 3.4 mmol), and the mixture was stirred at 55° C. for 2 hours. The reaction solution was returned to room temperature, and ethyl acetate was added, followed by washing with a saturated sodium carbonate aqueous solution and saturated saline, and drying over sodium sulfate. The solvent was removed by distillation under reduced pressure. The obtained residue was dissolved in THF (12 mL), and a 2M lithium boron hydride THF solution (3.4 mL, 6.8 mmol) was added and stirred at room temperature for 1 hour. Water was added to the reaction solution to stop the reaction, followed by extraction with ethyl acetate. The obtained organic layer was dried over sodium sulfate, and the solvent was removed by distillation under reduced pressure. The obtained residue was purified by silica gel column chromatography (hexane/ethyl acetate (v/v)=72/28→7/93→CH$_2$Cl$_2$/MeOH=100/0→95/5), thereby obtaining the title compound (1.17 g, 74%) as a light purple solid.

$^1$H NMR (400 MHz, CDCl$_3$) δ 7.85 (1H, s), 7.36-7.31 (9H, m), 7.21 (1H, s), 7.17-7.14 (6H, m), 6.50 (1H, s), 5.09 (2H, d, J=6.4 Hz), 3.67 (1H, t, J=6.4 Hz).

Reference Example 32

Production of (R)-2-[(6-bromo-1-trityl-1H-benzo[d]imidazol-4-yl)methyl]-4-ethyl-3,4-dihydro-2H-benzo[b][1,4,5]oxathiazepine 1,1-dioxide

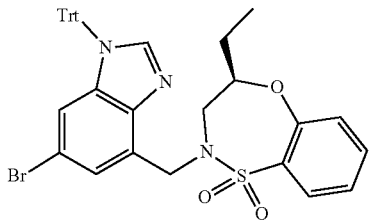

DIPEA (0.77 mL, 4.4 mmol) and methanesulfonyl chloride (115 μL, 1.5 mmol) were added to a dichloromethane (2.5 mL) solution of (6-bromo-1-trityl-1H-benzo[d]imidazol-4-yl)methanol (343.7 mg, 0.73 mmol) and lithium chloride (126.3 mg, 3.0 mmol), and the mixture was stirred at 25° C. for 12 hours. The reaction solution was diluted with ethyl acetate, washed with water and saturated saline, and dried over sodium sulfate, and the solvent was removed by distillation under reduced pressure. The obtained residue was dissolved in a mixed solvent of DMF (3.0 mL) and dichloromethane (1.0 mL), and (R)-4-ethyl-3,4-dihydro-2H-benzo[b][1,4,5]oxathiazepine 1,1-dioxide (173.9 mg, 0.77 mmol), tetrabutylammonium iodide (55.8 mg, 0.15 mmol), and potassium carbonate (315.6 mg, 2.3 mmol) were added to the reaction solution. The reaction solution was stirred at 40° C. for 5.5 hours, and returned to room temperature. Then, the resultant was diluted with a mixed solvent of ethyl acetate/hexane (1/1), washed with water and saturated saline, and dried over sodium sulfate, and the solvent was removed by distillation under reduced pressure. The obtained residue was purified by silica gel column chromatography (hexane/ethyl acetate (v/v)=69/31→48/52), thereby obtaining the title compound (471.8 mg, 95%) as a light orange solid.

$^1$H NMR (400 MHz, CDCl$_3$) δ 7.89 (1H, dd, J=7.6, 1.6 Hz), 7.78 (1H, s), 7.49 (1H, td, J=7.6, 1.6 Hz), 7.46 (1H, s), 7.34-7.30 (9H, m), 7.23 (1H, t, J=8.0 Hz), 7.17-7.11 (7H, m), 6.50 (1H, d, J=1.6 Hz), 4.77 (1H, d, J=16.0 Hz), 4.55 (1H, d, J=16.0 Hz), 4.05-3.96 (2H, m), 3.30 (1H, dt, J=13.6, 6.8 Hz), 1.78-1.67 (1H, mi), 1.54-1.44 (1H, m), 1.08 (3H, t, J=7.2 Hz).

Reference Example 33

Production of (R)-4-ethyl-2-{[6-(4,4,5,5-tetramethyl-1,3,2-dioxaborolan-2-yl)-1-trityl-1H-benzo[d]imidazol-4-yl]methyl}-3,4-dihydro-2H-benzo[b][1,4,5]oxathiazepine 1,1-dioxide

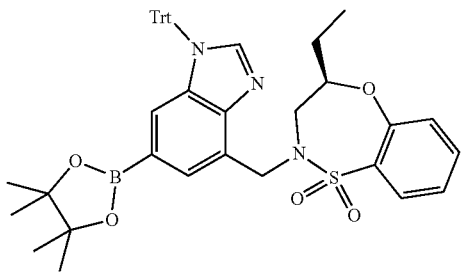

An anhydrous 1,4-dioxane (2.0 mL) solution of (R)-2-[(6-bromo-1-trityl-1H-benzo[d]imidazol-4-yl)methyl]-4-ethyl-3,4-dihydro-2H-benzo[b][1,4,5]oxathiazepine 1,1-dioxide (202.2 mg, 0.30 mmol), bis(pinacolato)diboron (83.0 mg, 0.33 mmol), PdCl$_2$(dppf)$_2$-CH$_2$Cl$_2$ (12.8 mg, 0.016 mmol), and potassium acetate (90.8 mg, 0.93 mmol) was stirred under argon atmosphere at 90° C. for 15.5 hours. The reaction solution was returned to room temperature and filtered through Celite, and the solvent of the obtained filtrate was removed by distillation under reduced pressure. The obtained residue was purified by silica gel column chromatography (hexane/ethyl acetate (v/v)=76/24→55/45), thereby obtaining a compound (170.6 mg), about half of which was an unreacted product. An anhydrous 1,4-dioxane (2.0 mL) solution of the obtained compound (0.13 mmol), bis(pinacolato)diboron (83.0 mg, 0.33 mmol), PdCl$_2$(dppf)$_2$-CH$_2$Cl$_2$ (12.8 mg, 0.016 mmol), and potassium acetate (90.8 mg, 0.93 mmol) was stirred again at 90° C. for 15.5 hours. The reaction solution was returned to room temperature and filtered through Celite, and the solvent of the obtained filtrate was removed by distillation under reduced pressure. The obtained residue was purified by silica gel column chromatography (hexane/ethyl acetate (v/v)=76/24→455/45), thereby obtaining the title compound (138.9 mg, 64%) as a white solid.

$^1$H NMR (400 MHz, CDCl$_3$) δ 7.92 (1H, d, J=7.6 Hz), 7.84 (1H, s), 7.71 (1H, s), 7.46 (1H, t, J=7.6 Hz), 7.32-7.28 (9H, m), 7.21 (1H, t, J=7.6 Hz), 7.16-7.14 (7H, m), 6.77 (1H, s), 4.81 (1H, d, J=14.8 Hz), 4.58 (1H, d, J=14.8 Hz), 4.06-3.94 (2H, m), 3.27 (1H, d, J=14.0 Hz), 1.72-1.62 (1H, m), 1.49-1.40 (1H, m), 1.20 (12H, s), 1.03 (3H, t, J=7.2 Hz).

Reference Example 34

Production of 5-bromo-3-methylthiophene-2-carbaldehyde

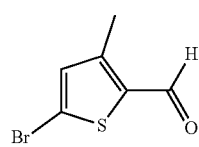

Bromine (5.0 g, 31 mmol) was added at 0° C. to a dichloromethane (25 mL) solution of 3-methylthiophene-2-carboxaldehyde (3.75 g, 30 mmol), and the mixture was stirred at 65° C. for 1 hour. The reaction solution was returned to room temperature, and the reaction solution was diluted with dichloromethane, and washed with a sodium thiosulfate aqueous solution, water, and saturated saline. The organic layer was dried over sodium sulfate, and the solvent was removed by distillation under reduced pressure. After the obtained residue was purified by silica gel chromatography (hexane/ethyl acetate (v/v)=98/2→90/10), followed by recrystallization with ethyl acetate/hexane, thereby obtaining the title compound (2.06 g, 33%) as a light yellow crystal. Further, after the filtrate was concentrated, hexane was added, and the precipitate was obtained by filtration, thereby obtaining the title compound (1.41 g, 23%) as a light brown solid.

$^1$H NMR (400 MHz, CDCl$_3$) δ 9.90 (1H, s), 6.96 (1H, s), 2.53 (3H, s).

Reference Example 35

Production of 5-bromo-3-methylthiophene-2-carboxylic acid

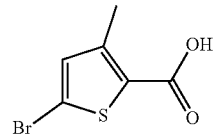

An acetone (3.0 mL) solution of 5-bromo-3-methylthiophene-2-carbaldehyde (317.1 mg, 1.6 mmol) was cooled to 0° C., and 2.5M Jones reagent (3.75 mL, 3.8 mmol) (CrO$_3$: 1.01 g, H$_2$SO$_4$: 1.0 mL, H$_2$O: 3.0 mL) was added. The mixture was stirred at 0° C. for 5 minutes, and then stirred at 25° C. for 2 hours and 15 minutes. Water was added to the reaction solution to stop the reaction, ethyl acetate was added to separate the organic layer and the aqueous layer, and the aqueous layer was extracted with ethyl acetate. The combined organic layer was washed with water and saturated saline, and dried over sodium sulfate, and the solvent was removed by distillation under reduced pressure, thereby obtaining the title compound (304.2 mg, 89%) as an orange solid.

$^1$H NMR (400 MHz, DMSO-d$_6$) δ 7.20 (1H, s), 2.43 (3H, s).

Reference Example 36

Production of 5-bromo-N-methylfuran-2-carboxamide

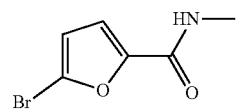

TEA (439 μL, 3.1 mmol) was added to an acetonitrile (3.3 mL) solution of 5-bromofuran-2-carboxylic acid (500 mg, 2.6 mmol), methylamine hydrochloride (212.3 mg, 3.1 mmol), EDCI (603 mg, 3.1 mmol), and HOBt (106.2 mg, 0.79 mmol). After the reaction mixture was stirred at room temperature for 14 hours, water was added, followed by extraction with dichloromethane. The organic layer was dried over sodium sulfate, and the solvent was distilled under reduced pressure. The residue was purified by silica gel column chromatography (hexane/ethyl acetate (v/v)=70/30→50/50), thereby obtaining the title compound (391.3 mg, 73%) as a white solid.

$^1$H NMR (400 MHz, CDCl$_3$) δ 7.04 (1H, d, J=3.6 Hz), 6.62 (1H, s), 6.42 (1H, d, J=3.6 Hz), 2.96 (3H, d, J=4.8 Hz).

Reference Example 37

Production of (5-bromofuran-2-yl)(pyrrolidin-1-yl)methanone

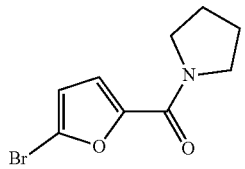 [SMILES: O=C(c1ccc(Br)o1)N1CCCC1]

5-Bromofuran-2-carboxylic acid (1.0 g, 5.2 mmol), pyrrolidine (517 μL, 6.3 mmol), EDCI (1.2 g, 6.3 mmol), HOBt (212 mg, 1.6 mmol), acetonitrile (6.6 mL), and TEA (878 μL, 6.3 mmol) were used as raw materials, and the same operation was performed as in Reference Example 36, thereby obtaining the title compound (748.8 mg, 58%) as a white solid.

$^1$H NMR (400 MHz, CDCl$_3$) δ 7.04 (1H, d, J=3.6 Hz), 6.43 (1H, d, J=3.6 Hz), 3.82 (2H, t, J=6.8 Hz), 3.63 (2H, t, J=6.8 Hz), 2.01 (2H, quin, J=6.8 Hz), 1.90 (2H, quin, J=6.8 Hz).

Reference Example 38

Production of 5-bromo-N-isopropylfuran-2-carboxamide

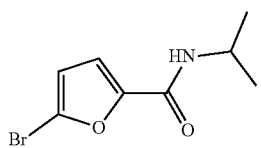

5-Bromofuran-2-carboxylic acid (1.0 g, 5.24 mmol), isopropylamine (540 μL, 6.3 mmol), EDCI (1.2 g, 6.3 mmol), HOBt (212 mg, 1.57 mmol), acetonitrile (6.6 mL), and TEA (878 μL, 6.3 mmol) were used as raw materials, and the same operation was performed as in Reference Example 36, thereby obtaining the title compound (714.3 mg, 59%) as an oily colorless substance.

$^1$H NMR (400 MHz, CDCl$_3$) δ 7.04 (1H, d, J=3.2 Hz), 6.43 (1H, d, J=3.2 Hz), 6.09 (1H, br s), 4.24 (1H, septd, J=6.4, 1.2 Hz), 1.26 (6H, d, J=6.4 Hz).

Reference Example 39

Production of 5-bromo-N-methylthiophene-2-carboxamide

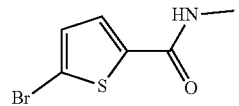

5-Bromothiophene-2-carboxylic acid (500 mg, 2.4 mmol), methylamine hydrochloride (325 mg, 4.8 mmol), EDCI (554 mg, 2.9 mmol), HOBt (97.7 mg, 0.72 mmol), acetonitrile (5.0 mL), and TEA (1.0 mL, 7.2 mmol) were used as raw materials, and the same operation was performed as in Reference Example 36, thereby obtaining the title compound (239.8 mg, 45%) as a white solid.

$^1$H NMR (400 MHz, CD$_3$OD) δ 7.40 (1H, d, J=4.0 Hz), 7.13 (1H, d, J=4.0 Hz), 2.86 (3H, s).

Reference Example 40

Production of 5-bromo-N-(2-methoxyethyl)furan-2-carboxamide

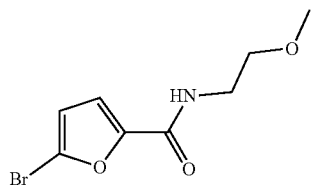

5-Bromofuran-2-carboxylic acid (300 mg, 1.6 mmol), 2-methoxyethylamine (340 μL, 5.2 mmol), EDCI (602 mg, 3.1 mmol), HOBt (212 mg, 1.6 mmol), acetonitrile (3.0 mL), and TEA (500 μL, 6.8 mmol) were used as raw materials, and the same operation was performed as in Reference Example 36, thereby obtaining the title compound (339.9 mg, 87%) as an oily pale yellow substance.

$^1$H NMR (400 MHz, CDCl$_3$) δ 7.06 (1H, d, J=3.6 Hz), 6.63 (1H, br s), 6.43 (1H, d, J=3.6 Hz), 3.63-3.59 (2H, m), 3.55-3.53 (2H, m), 3.40 (3H, s).

Reference Example 41

Production of N, 3-dimethylfuran-2-carboxamide

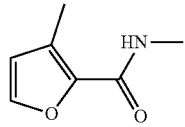

3-Methylfuran-2-carboxylic acid (720 mg, 5.7 mmol), methylamine hydrochloride (581 mg, 8.6 mmol), EDCI (1.3 g, 6.8 mmol), HOBt (459 mg, 3.4 mmol), acetonitrile (10 mL), and TEA (2.4 mL, 17 mmol) were used as raw materials, and the same operation was performed as in Reference Example 36, thereby obtaining the title compound (693.6 mg, 87%) as an oily colorless substance.

$^1$H NMR (400 MHz, CDCl$_3$) δ 6.32 (1H, s), 6.28 (1H, br s), 2.95 (3H, d, J=5.2 Hz), 2.40 (3H, s).

Reference Example 42

Production of 4-bromo-N-methylthiophene-2-carboxamide

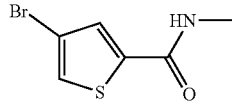

4-Bromothiophene-2-carboxylic acid (1.0 g, 4.83 mmol), methylamine hydrochloride (652 mg, 9.7 mmol), EDCI (1.1 g, 5.8 mnol), HOBt (392 mg, 2.9 mmol), acetonitrile (15 mL), and TEA (2.0 mL, 15 mmol) were used as raw materials, and the same operation was performed as in Reference Example 36, thereby obtaining the title compound (789.1 mg, 74%) as a white solid.

$^1$H NMR (400 MHz, CDCl$_3$) δ 7.37 (1H, d, J=1.2 Hz), 7.35 (1H, d, J=1.2 Hz), 5.93 (1H, br s), 3.00 (3H, d, J=4.8 Hz).

Reference Example 43

Production of N,4-dimethylthiophene-2-carboxamide

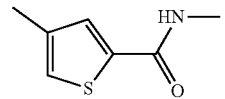

4-Methylthiophene-2-carboxylic acid (1.0 g, 7.0 mmol), methylamine hydrochloride (945.3 mg, 14 mmol), EDCI (1.61 g, 8.4 mmol), HOBt (662 mg, 4.9 mmol), acetonitrile (5.0 mL), dichloromethane (5.0 mL), and TEA (2.94 mL, 21 mmol) were used as raw materials, and the same operation was performed as in Reference Example 36, thereby obtaining the title compound (880.5 mg, 81%) as a white solid.

$^1$H NMR (400 MHz, CDCl$_3$) δ 7.45 (1H, d, J=1.2 Hz), 7.29 (1H, br s), 7.00 (1H, br s), 2.96 (3H, d, J=4.8 Hz), 2.20 (3H, d, J=0.8 Hz).

Reference Example 44

Production of N-methoxy-N,4-dimethylthiophene-2-carboxamide

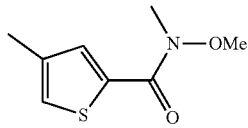

4-Methylthiophene-2-carboxylic acid (700 mg, 4.9 mmol), N,O-dimethylhydroxylamine hydrochloride (1.44 g, 15 nmol), EDCI (1.88 g, 9.8 mmol), HOBt (1.32 g, 9.8 mmol), dichloromethane (20 mL), and DIPEA (2.6 mL, 15 mmol) were used as raw materials, and the same operation was performed as in Reference Example 36, thereby obtaining the title compound (831.5 mg, 91%) as an oily colorless substance.

$^1$H NMR (400 MHz, CDCl$_3$) δ 7.75 (1H, d, J=1.6 Hz), 7.14 (1H, d, J=1.6 Hz), 3.76 (3H, s), 3.36 (3H, s), 2.28 (3H, s).

Reference Example 45

Production of 3-fluoro-N-methoxy-N-methylthiophene-2-carboxamide

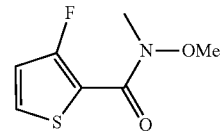

3-Fluorothiophene-2-carboxylic acid (500 mg, 3.4 mmol), N,O-dimethylhydroxylamine hydrochloride (1.0 g, 10 mmol), EDCI (1.31 g, 6.8 mmol), HOBt (924.3 mg, 6.8 mmol), dichloromethane (20 mL), and DIPEA (1.84 mL, 10 mmol) were used as raw materials, and the same operation was performed as in Reference Example 36, thereby obtaining the title compound (604.6 mg, 94%) as an oily colorless substance.

$^1$H NMR (400 MHz, CDCl$_3$) δ 7.38 (1H, dd, J=5.6, 4.0 Hz), 6.84 (1H, d, J=5.6 Hz), 3.74 (3H, s), 3.33 (3H, s).

Reference Example 46

Production of 5-bromo-N-(2,4-dimethoxybenzyl)thiophene-2-carboxamide

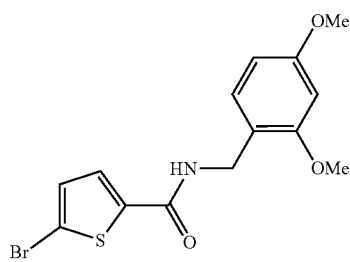 [SMILES: COc1ccc(CNC(=O)c2ccc(Br)s2)c(OC)c1]

5-Bromothiophene-2-carboxylic acid (400 mg, 1.9 mmol), 2,4-dimethoxybenzylamine (582 μL, 3.9 mmol), EDCI (1.31 g, 6.8 mmol), HOBt (924.3 mg, 6.8 mmol), dichloromethane (20 mL), and DIPEA (1.84 mL, 10 mmol) were used as raw materials, and the same operation was performed as in Reference Example 36, thereby obtaining the title compound (860.9 mg, quant.) as an oily colorless substance.

$^1$H NMR (400 MHz, CDCl$_3$) δ 7.21 (1H, d, J=8.0 Hz), 7.19 (1H, d, J=4.0 Hz), 6.98 (1H, d, J=4.0 Hz), 6.48 (1H, br s), 6.46 (1H, d, J=2.4 Hz), 6.43 (1H, dd, J=8.0, 2.4 Hz), 4.49 (2H, d, J=5.6 Hz), 3.84 (3H, s), 3.79 (3H, s).

Reference Example 47

Production of 5-bromo-N-methoxy-N-3-dimethyl-thiophene-2-carboxamide

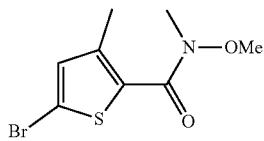

TEA (0.57 mL, 4.1 mmol) was added to a dichloromethane (5.0 mL) solution of 5-bromo-3-methylthiophene-2-carboxylic acid (302.3 mg, 1.4 mmol), N,O-dimethylhydroxylamine hydrochloride (267.4 mg, 2.7 mmol), and EDCI (397.6 mg, 2.1 mmol), and the mixture was stirred at 25° C. for 18 hours. The reaction solution was diluted with ethyl acetate, washed with 1M hydrochloric acid and saturated saline, and dried over sodium sulfate, and the solvent was removed by distillation under reduced pressure, thereby obtaining the title compound (315.3 mg, 87%) as an oily brown substance.

$^1$H NMR (400 MHz, CDCl$_3$) δ 6.87 (1H, s), 3.70 (3H, s), 3.29 (3H, s), 2.51 (3H, s).

Reference Example 48

Bromo-N-methoxy-N-methylthiazole-5-carboxamide

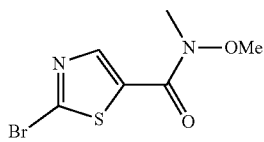

TEA (1.5 mL, 11 mmol) was added to a solution of 2-bromothiazole-5-carboxylic acid (707.9 mg, 3.4 mmol), N,O-dimethylhydroxylamine hydrochloride (667.5 mg, 6.8 mmol), and EDCI (977.9 mg, 5.1 mmol) in dichloromethane (17 mL) and DMF (3.0 mL), and the mixture was stirred at 25° C. for 13 hours. Ethyl acetate was added to the reaction solution, followed by washing with 1M hydrochloric acid and saturated saline. The organic layer was dried over sodium sulfate, and the solvent was removed by distillation under reduced pressure, thereby obtaining the title compound (519.1 mg, 61%) as a light yellow solid.

$^1$H NMR (400 MHz, CDCl$_3$) δ 8.32 (1H, s), 3.78 (3H, s), 3.36 (3H, s).

Reference Example 49

Production of 2-bromo-N-methoxy-N-4-dimethyl-thiazole-5-carboxamide

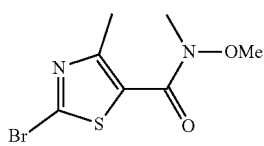

TEA (1.0 mL, 7.2 mmol) was added to a solution of 2-bromo-4-methylthiazole-5-carboxylic acid (500.2 mg, 2.3 mmol), N,O-dimethylhydroxylamine hydrochloride (452.8 mg, 4.6 mmol), and EDCI (654.6 mg, 3.4 mmol) in dichloromethane (8.0 mL) and DMF (2.0 mL), and the mixture was stirred at 25° C. for 8 hours. The reaction solution was diluted with ethyl acetate, and washed with 1M hydrochloric acid and saturated saline. The organic layer was dried over sodium sulfate, and the solvent was removed by distillation under reduced pressure, thereby obtaining the title compound (473.5 mg, 79%) as a white solid.

$^1$H NMR (400 MHz, CDCl$_3$) δ 3.66 (3H, s), 3.26 (3H, s), 2.68 (3H, s).

Reference Example 50

Production of 4-bromo-N-methoxy-N-methylthiophene-2-carboxamide

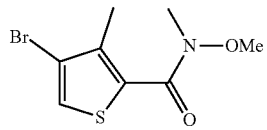

4-Bromothiophene-2-carboxylic acid (500 mg, 2.4 mmol), N,O-dimethylhydroxylamine hydrochloride (470 mg, 4.8 mmol), EDCI (924 mg, 4.8 mmol), HOBt (708 mg, 5.2 mmol), dichloromethane (20 mL), and DIPEA (1.29 mL, 7.2 mmol) were used as raw materials, and the same operation was performed as in Reference Example 36, thereby obtaining the title compound (510.5 mg, 85%) as an oily colorless substance.

$^1$H NMR (400 MHz, CDCl$_3$) δ 7.83 (1H, d, J=1.6 Hz), 7.44 (1H, d, J=1.6 Hz), 3.78 (3H, s), 3.37 (3H, s).

Reference Example 51

Production of 2-bromo-N-methoxy-N-methylthiophene-3-carboxamide

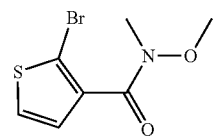

2-Bromothiophene-3-carboxylic acid (500 mg, 2.4 mmol), N,O-dimethylhydroxylamine hydrochloride (470 mg, 4.8 mmol), EDCI (924 mg, 4.8 mmol), HOBt (326 mg, 4.8 mmol), dichloromethane (20 mL), and DIPEA (1.29 mL, 7.2 mmol) were used as raw materials, and the same operation was performed as in Reference Example 36, thereby obtaining the title compound (606.7 mg, quant.) as an oily colorless substance.

$^1$H NMR (400 MHz, CDCl$_3$) δ 7.25 (1H, d, J=6.0 Hz), 7.04 (1H, d, J=6.0 Hz), 3.60 (3H, s), 3.34 (3H, s).

Reference Example 52

Production of
5-bromo-N-methoxy-N-methylfuran-2-carboxamide

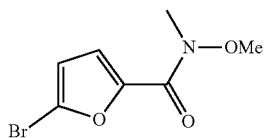

5-Bromofuran-2-carboxylic acid (500 mg, 2.6 mmol), N,O-dimethylhydroxylamine hydrochloride (767 mg, 7.9 mmol), EDCI (1.0 g, 5.2 mmol), HOBt (708 mg, 5.2 mmol), dichloromethane (20 mL), and DIPEA (1.4 mL, 7.9 mmol) were used as raw materials, and the same operation was performed as in Reference Example 36, thereby obtaining the title compound (555.3 mg, 90%) as an oily colorless substance.

$^1$H NMR (400 MHz, CDCl$_3$) δ 7.08 (1H, d, J=3.6 Hz), 6.44 (1H, d, J=3.6 Hz), 3.77 (3H, s), 3.33 (3H, s).

Reference Example 53

Production of N-[(5-bromofuran-2-yl)methyl]propan-2-amine

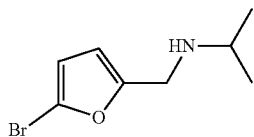

Isopropylamine (514 μL, 6.0 mmol) and acetic acid (50 μL, 0.79 mmol) were added to a methanol (7.0 mL) solution of 5-bromofuran-2-carbaldehyde (700 mg, 4.0 mmol), and the mixture was stirred at room temperature for 2 hours. Sodium borohydride (227 mg, 6.0 mmol) was added to the mixture, and stirred at room temperature for 16 hours. The mixture was diluted with a 1N sodium hydroxide aqueous solution, and extracted with dichloromethane. The organic layer was dried over sodium sulfate, and the solvent was distilled under reduced pressure, thereby obtaining the title compound (785.4 mg, 90%) as an oily pale yellow substance.

$^1$H NMR (400 MHz, CDCl$_3$) δ 6.21 (1H, d, J=3.2 Hz), 6.15 (1H, d, J=3.2 Hz), 3.75 (2H, s), 2.82 (1H, septd, J=6.4 Hz), 1.38 (1H, br s), 1.06 (6H, d, J=6.4 Hz).

Reference Example 54

Production of 5-(tert-butyl)-4,5-dihydro-6H-thieno[2,3-c]pyrrol-6-one

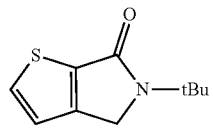

Tert-butylamine (4.0 mL, 38 mmol) and acetic acid (8.5 mL, 149 mmol) were added at 0° C. to an anhydrous dichloromethane solution (260 mL) of 2,3-thiophenedicarboxaldehyde (4.14 g, 30 mmol), and the mixture was stirred at 0° C. for 15 minutes, and then stirred at room temperature for 3.5 hours. After completion of the reaction, the reaction solution was washed with 1M hydrochloric acid and a saturated sodium hydrogen carbonate aqueous solution, the obtained organic layer was dried over sodium sulfate, and the solvent was removed by distillation under reduced pressure. The obtained residue was purified by silica gel column chromatography (hexane/ethyl acetate (v/v)=84/16→63/37), thereby obtaining the title compound (4.03 g, 70%) as a light orange solid.

$^1$H NMR (400 MHz, CDCl$_3$) δ 7.56 (1H, d, J=4.8 Hz), 6.99 (1H, d, J=4.8 Hz), 4.36 (2H, s), 1.54 (9H, s)

Reference Example 55

Production of 2-bromo-1,5,6,7-tetrahydro-4H-indol-4-one

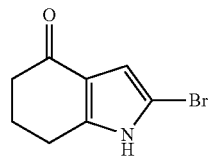 [SMILES: O=C1CCCc2[nH]c(Br)cc21]

N-bromosuccinimide (475.2 mg, 2.7 mmol) was added to a DMF (3.0 mL) solution of 1,5,6,7-tetrahydro-4H-indol-4-one (300 mg, 2.2 mmol), and the mixture was stirred at room temperature for 14 hours. A 4N sodium hydroxide aqueous solution was added to the reaction mixture, followed by extraction with ethyl acetate. The organic layer was dried over sodium sulfate, and the solvent was distilled under reduced pressure. The residue was purified by silica gel column chromatography (hexane/ethyl acetate (v/v)=6/4→5/5), thereby obtaining the title compound (220.5 mg, 76%) as a white solid.

$^1$H NMR (400 MHz, CDCl$_3$) δ 8.49 (1H, br s), 6.51 (1H, d, J=2.4 Hz), 2.79 (2H, t, J=6.4 Hz), 2.48 (2H, t, J=6.4 Hz), 2.15 (2H, quin, J=6.4 Hz).

Reference Example 56

Production of 5-bromo-N,3-dimethylfuran-2-carboxamide

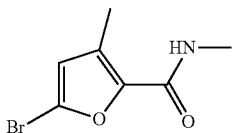

N,3-dimethylfuran-2-carboxamide (310 mg, 2.2 mmol), DMF (2.3 mL), N-bromosuccinimide (477 mg, 2.7 mmol), and TFA (341 μL, 4.5 mmol) were used as raw materials, and the same operation was performed as in Reference Example 55, thereby obtaining the title compound (205.3 mg, 42%) as an oily yellow substance.

¹H NMR (400 MHz, CDCl₃) δ 6.28 (1H, br s), 6.27 (1H, s), 2.95 (3H, d, J=4.8 Hz), 2.37 (3H, s).

Reference Example 57

Production of 5-bromo-N,4-dimethylthiophene-2-carboxamide

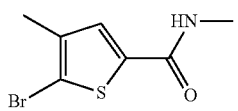

N,4-dimethylthiophene-2-carboxamide (600 mg, 3.9 mmol), dimethylformamide (6.0 mL), N-bromosuccinimide (822 mg, 4.6 mmol), and TFA (588 μL, 7.7 mmol) were used as raw materials, and the same operation was performed as in Reference Example 55, thereby obtaining the title compound (763.8 mg, 84%) as a white solid.

¹H NMR (400 MHz, CDCl₃) δ 7.19 (1H, s), 6.23 (1H, br s), 2.95 (3H, d, J=4.8 Hz), 2.18 (3H, s).

Reference Example 58

Production of 1-(5-bromo-2,4-dimethyl-1H-pyrrol-3-yl)ethan-1-one

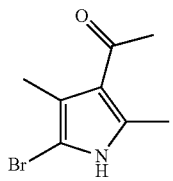

1-(2,4-Dimethyl-1H-pyrrol-3-yl)ethan-1-one (500 mg, 3.6 mmol), DMF (5.0 mL), and N-bromosuccinimide (778 mg, 4.4 mmol) were used as raw materials, and the same operation was performed as in Reference Example 55, thereby obtaining the title compound (538.9 mg, 68%) as a red solid.

¹H NMR (400 MHz, CDCl₃) δ 8.16 (1H, br s), 2.49 (3H, s), 2.42 (3H, s), 2.22 (3H, s).

Reference Example 59

Production of 1-(5-bromo-4-methylthiophen-2-yl)ethan-1-one

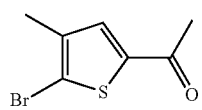

1-(4-Methylthiophen-2-yl)ethan-1-one (100 mg, 0.71 mmol), DMF (1.0 mL), N-bromosuccinimide (152.4 mg, 0.86 mmol), and TFA (110 μL, 1.4 mmol) were used as raw materials, and the same operation was performed as in Reference Example 55, thereby obtaining the title compound (118.6 mg, 76%) as a pale yellow solid.

¹H NMR (400 MHz, CDCl₃) δ 7.36 (1H, s), 2.48 (3H, s), 2.22 (3H, s).

Reference Example 60

Production of 5-bromo-3-fluoro-N-methoxy-N-methylthiophene-2-carboxamide

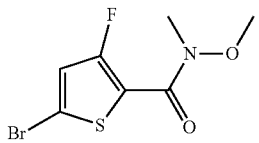

N-bromosuccinimide (1.17 g, 6.6 mmol) and TFA (1.0 mL, 13 nmol) were added to a DMF (6.0 mL) solution of 3-fluoro-N-methoxy-N-methylthiophene-2-carboxamide (620 mg, 3.3 mmol). After the reaction mixture was stirred at room temperature for 24 hours, a 1N sodium hydroxide aqueous solution was added, followed by extraction with ethyl acetate. The organic layer was washed with water and dried over sodium sulfate, and the solvent was distilled under reduced pressure. The residue was purified by silica gel column chromatography (hexane/ethyl acetate (v/v)=100/0→80/20), thereby obtaining the title compound (425.5 mg, 48%) as an oily colorless substance.

¹H NMR (400 MHz, CDCl₃) δ 6.89 (1H, s), 3.75 (3H, s), 3.30 (3H, s).

Reference Example 61

Production of 1-(5-bromo-2,4-dimethyl-1H-pyrrol-3-yl)ethan-1-one

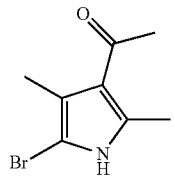

1-(2,4-Dimethyl-1H-pyrrol-3-yl)ethan-1-one (500 mg, 3.6 mnol), DMF (5.0 mL), and N-bromosuccinimide (778 mg, 4.4 mmol) were used as raw materials, and the same operation was performed as in Reference Example 55, thereby obtaining the title compound (538.9 mg, 68%) as a red solid.

¹H NMR (400 MHz, CDCl₃) δ 8.16 (1H, br s), 2.49 (3H, s), 2.42 (3H, s), 2.22 (3H, s).

Reference Example 62

Production of 1-(5-bromo-1-ethyl-1H-pyrrol-2-yl)ethan-1-one

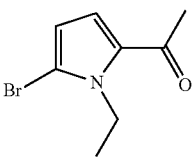

1-(1-Ethyl-1H-pyrrol-2-yl)ethan-1-one (600 μL, 4.3 mmol), DMF (6.0 mL), and N-bromosuccinimide (925 mg, 5.2 mmol) were used as raw materials, and the same operation was performed as in Reference Example 55, thereby obtaining the title compound (752 mg, 80%) as an oily colorless substance.

$^1$H NMR (400 MHz, CDCl$_3$) δ 6.91 (1H, d, J=1.6 Hz), 6.85 (1H, d, J=1.6 Hz), 4.33 (2H, q, J=7.2 Hz), 2.40 (3H, s), 1.35 (3H, t, J=7.2 Hz).

Reference Example 63

Production of (5-bromothiophen-2-yl)(cyclopropyl)methanone

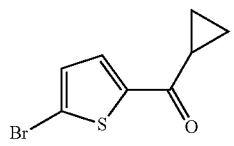 [SMILES: O=C(c1ccc(Br)s1)C1CC1]

Cyclopropyl(thiophen-2-yl)methanone (593 μL, 4.6 mmol), DMF (5.8 mL), N-bromosuccinimide (979 mg, 5.5 mmol), and TFA (704 μL, 9.2 mmol) were used as raw materials, and the same operation was performed as in Reference Example 55, thereby obtaining the title compound (56.8 mg, 5%) as an oily pale red substance.

$^1$H NMR (400 MHz, CDCl$_3$) δ 7.55 (1H, d, J=4.0 Hz), 7.12 (1H, d, J=4.0 Hz), 2.47-2.41 (1H, m), 1.25-1.21 (2H, m), 1.05-1.01 (2H, m)).

Reference Example 64

Production of 2-bromo-5-(tert-butyl)-4,5-dihydro-6H-thieno[2,3-c]pyrrol-6-one

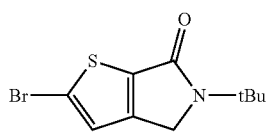 [SMILES: CC(C)(C)N1Cc2cc(Br)sc2C1=O]

N-bromosuccinimide (7.37 g, 41 mmol) and acetic acid (1.3 mL, 23 mmol) were added at 0° C. to a DMF (100 mL) solution of 5-(tert-butyl)-4,5-dihydro-6H-thieno[2,3-c]pyrrol-6-one (4.03 g, 21 mmol), and the mixture was stirred at room temperature for 8 hours. A saturated sodium hydrogen carbonate aqueous solution was added to the reaction solution to stop the reaction, followed by extraction with ethyl acetate/hexane (1/1). The obtained organic layer was dried over sodium sulfate, and the solvent was removed by distillation under reduced pressure. The obtained residue was purified by silica gel column chromatography (hexane/ethyl acetate (v/v)=96/4→75/25), thereby obtaining the title compound (4.27 g, 76%) as a light yellow solid.

$^1$H NMR (400 MHz, CDCl$_3$) δ 7.01 (1H, s), 4.33 (2H, s), 1.53 (9H, s).

Reference Example 65

Production of 4-bromo-1-methyl-1H-pyrrole-2-carbonitrile

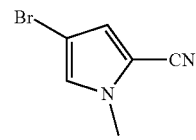

1-Methyl-1H-pyrrole-2-carbonitrile (300 mg, 2.8 mmol), DMF (7.0 mL), and N-bromosuccinimide (604.5 mg, 3.4 mmol) were used as raw materials, and the same operation was performed as in Reference Example 55, thereby obtaining the title compound (212.5 mg, 41%) as a white solid.

$^1$H NMR (400 MHz, CDCl$_3$) δ 6.81 (1H, d, J=1.6 Hz), 6.75 (1H, d, J=1.6 Hz), 3.76 (3H, s).

Reference Example 66

Production of 2-bromo-1-methyl-1,5,6,7-tetrahydro-4H-indol-4-one

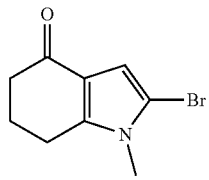

A DMSO (4.0 mL) solution of 2-bromo-1,5,6,7-tetrahydro-4H-indol-4-one (200 mg, 0.93 mmol) and potassium tert-butoxide (113.6 mg, 1.0 mmol) was stirred at 60° C. for 30 minutes. Iodomethane (86 μL, 1.4 mmol) was added and stirred at 60° C. for 7 hours. 1N hydrochloric acid was added to the mixture, followed by extraction with dichloromethane. The organic layer was washed with saturated saline and dried over sodium sulfate, and the solvent was distilled under reduced pressure. The residue was purified by silica gel column chromatography (hexane/ethyl acetate (v/v)=7/3→1/1), thereby obtaining the title compound (170.1 mg, 80%) as a pale yellow solid.

$^1$H NMR (400 MHz, CDCl$_3$) δ 6.52 (1H, s), 3.50 (3H, s), 2.73 (2H, t, J=6.4 Hz), 2.41 (2H, t, J=6.4 Hz), 2.14 (2H, quin, J=6.4 Hz).

Reference Example 67

Production of 1-(5-bromo-1,2,4-trimethyl-1H-pyrrol-3-yl)ethan-1-one

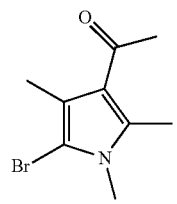

1-(5-Bromo-2,4-dimethyl-1H-pyrrol-3-yl)ethan-1-one (300 mg, 1.4 mmol) was added to a DMF (4.0 mL) solution of sodium hydride (50.4 mg, 1.7 mmol). The mixture was stirred at room temperature for 1 hour, and iodomethane (105 μL, 1.7 mmol) was added and stirred for 20 hours. Further, iodomethane (86 μL, 1.4 mmol) was added and stirred at 60° C. for 7 hours. Water was added to the mixture to stop the reaction, followed by extraction with ethyl acetate. The organic layer was washed with water and dried over sodium sulfate, and the solvent was distilled under reduced pressure. The residue was purified by silica gel column chromatography (hexane/ethyl acetate (v/v)=0→9/1), thereby obtaining the title compound (152.8 mg, 48%) as a pale red solid.

$^1$H NMR (400 MHz, CDCl$_3$) δ 3.50 (3H, s), 2.50 (3H, s), 2.41 (3H, s), 2.24 (3H, s).

Reference Example 68

Production of 1-(5-bromo-3-fluorothiophen-2-yl)ethan-1-one

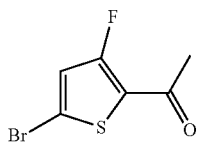

A methylmagnesium bromide (3M, 2-methyltetrahydrofuran solution) (0.80 mL, 2.4 mmol) solution was added at 0° C. to a THF (8.0 mL) solution of 5-bromo-3-fluoro-N-methoxy-N-methylthiophene-2-carboxamide (425 mg, 1.6 mmol). After the mixture was stirred at room temperature for 7.5 hours, the reaction was stopped with a saturated ammonium chloride aqueous solution, followed by extraction with diethyl ether. The organic layer was washed with a saturated ammonium chloride aqueous solution and dried over sodium sulfate, and the solvent was distilled under reduced pressure, thereby obtaining the title compound (190.8 mg, 54%) as an oily colorless substance.

$^1$H NMR (400 MHz, CDCl$_3$) δ 6.90 (1H, d, J=0.8 Hz), 2.52 (3H, d, J=3.2 Hz).

Reference Example 69

Production of 1-(4-methylthiophen-2-yl)ethan-1-one

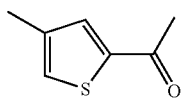

N-methoxy-N, 4-dimethylthiophene-2-carboxamide (400 mg, 2.2 mmol), THF (11 mL), and a methylmagnesium bromide (3M, 2-methyltetrahydrofuran solution) (1.1 mL, 3.2 mmol) solution were used as raw materials, and the same operation was performed as in Reference Example 68, thereby obtaining the title compound (275.1 mg, 91%) as an oily colorless substance.

$^1$H NMR (400 MHz, CDCl$_3$) δ 7.50 (1H, d, J=0.8 Hz), 7.22 (1H, br d, J=0.8 Hz), 2.53 (3H, s), 2.29 (3H, d, J=0.8 Hz).

Reference Example 70

Production of 1-(5-bromo-3-methylthiophen-2-yl)ethan-1-one

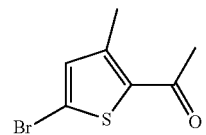

5-Bromo-N-methoxy-N, 3-dimethylthiophene-2-carboxamide (368 mg, 1.4 mmol), THF (7.0 mL), and a methylmagnesium bromide (3M, 2-methyltetrahydrofuran solution) (0.70 mL, 2.1 mmol) solution were used as raw materials, and the same operation was performed as in Reference Example 68, thereby obtaining the title compound (216.1 mg, 71%) as an oily yellow substance.

$^1$H NMR (400 MHz, CDCl$_3$) δ 6.93 (1H, s), 2.51 (3H, s), 2.47 (3H, s).

Reference Example 71

Production of 1-(2-bromothiazol-5-yl)ethan-1-one

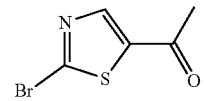

A methylmagnesium bromide (3M, 2-methyltetrahydrofuran solution) (0.68 mL, 2.0 mmol) solution was added to a THF (7.0 mL) solution of 2-bromo-N-methoxy-N-methylthiazole-5-carboxamide (507.5 mg, 2.0 mmol), and the mixture was stirred at 25° C. for 1 hour. Further, methylmagnesium bromide (3M, 0.15 mL, 0.45 mmol) was added and stirred at room temperature for 5 minutes. A saturated ammonium chloride aqueous solution was added to the reaction solution, followed by extraction with ethyl acetate. The organic layer was washed with saturated saline and dried over sodium sulfate, and the solvent was removed by distillation under reduced pressure, thereby obtaining the title compound (278 mg, 67%) as a light yellow solid.

$^1$H NMR (400 MHz, CDCl$_3$) δ 8.05, (1H, s), 2.56 (3H, s).

Reference Example 72

Production of 1-(2-bromo-4-methylthiazol-5-yl)ethan-1-one

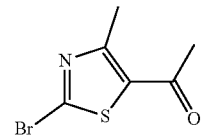

A methylmagnesium bromide (3M, 2-methyltetrahydrofuran solution) (0.3 mL, 0.9 mmol) solution was added at 0° C. to a THF (2.0 mL) solution of 2-bromo-N-methoxy-N-4-dimethylthiazole-5-carboxamide (209.0 mg, 0.8 mmol), and the mixture was stirred at room temperature for 10 minutes. A saturated ammonium chloride aqueous solution was added to the reaction solution to stop the reaction, followed by extraction with ethyl acetate. The organic layer was washed with saturated saline and dried over sodium sulfate, and the solvent was removed by distillation under reduced pressure. The obtained residue was purified by silica gel column chromatography (hexane/ethyl acetate (v/v)=82/18→61/39), thereby obtaining the title compound (146.8 mg, 85%) as an oily transparent yellow substance.

$^1$H NMR (400 MHz, CDCl$_3$) δ 2.72 (3H, s), 2.51 (3H, s).

Reference Example 73

Production of 1-(4-bromothiophen-2-yl)ethan-1-one

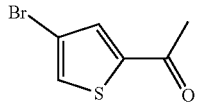

4-Bromo-N-methoxy-N-methylthiophene-2-carboxamide (510 mg, 2.0 mmol), THF (10 mL), and a methylmagnesium bromide (3M, 2-methyltetrahydrofuran solution) (1.0 mL, 3.0 mmol) solution were used as raw materials, and the same operation was performed as in Reference Example 68, thereby obtaining the title compound (406.9 mg, 97%) as an oily colorless substance.

$^1$H NMR (400 MHz, CDCl$_3$) δ 7.58 (1H, d, J=1.2 Hz), 7.53 (1H, d, J=1.2 Hz), 2.55 (3H, s).

Reference Example 74

Production of 1-(2-bromothiophen-3-yl)ethan-1-one

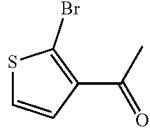

2-Bromo-N-methoxy-N-methylthiophene-3-carboxamide (550 mg, 2.2 mmol), THF (10 mL), and a methylmagnesium bromide (3M, 2-methyltetrahydrofuran solution) (1.1 mL, 3.3 mmol) solution were used as raw materials, and the same operation was performed as in Reference Example 68, thereby obtaining the title compound (128.8 mg, 29%) as an oily colorless substance.

$^1$H NMR (400 MHz, CDCl$_3$) δ 7.35 (1H, d, J=5.6 Hz), 7.23 (1H, d, J=5.6 Hz), 2.62 (3H, s).

Reference Example 75

Production of 1-(5-bromofuran-2-yl)ethan-1-one

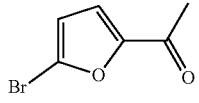

5-Bromo-N-methoxy-N-methylfuran-2-carboxamide (332.6 mg, 1.4 mmol), THF (7.0 mL), and methylmagnesium bromide (3M, 2-methyltetrahydrofuran solution) (0.7 mL, 2 mmol) were used as raw materials, and the same operation was performed as in Reference Example 68, thereby obtaining the title compound (223.3 mg, 78%) as a white solid.

$^1$H NMR (400 MHz, CDCl$_3$) δ 7.12 (1H, d, J=3.6 Hz), 6.49 (1H, d, J=3.6 Hz), 2.46 (3H, s).

Reference Example 76

Production of 2-(5-bromothiophen-2-yl)-2-methyl-1,3-dioxolane

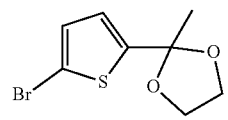

Ethylene glycol (0.95 mL, 17 mmol) and p-TsOH—H$_2$O (130 mg, 0.68 mmol) were added to a toluene (34 mL) solution of 1-(5-bromothiophen-2-yl)ethan-1-one (500 mg, 2.4 mmol), and the mixture was stirred under heating and refluxing for 25 hours. A saturated sodium hydrogen carbonate aqueous solution was added to the reaction mixture, followed by extraction with ethyl acetate. The organic layer was dried over sodium sulfate, and the solvent was distilled under reduced pressure. The residue was purified by silica gel column chromatography (hexane/ethyl acetate (v/v)=95/5→9/1), thereby obtaining the title compound (183.7 mg, 30%) as a white solid.

$^1$H NMR (400 MHz, CDCl$_3$) δ 6.90 (1H, d, J=4.0 Hz), 6.79 (1H, d, J=4.0 Hz), 4.06-4.00 (m, 2H), 3.99-3.93 (m, 2H), 1.73 (s, 3H).

Reference Example 77

Production of 2-(5-bromo-3-methylthiophen-2-yl)-2-methyl-1,3-dioxolone

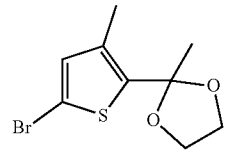

Ethylene glycol (1.2 mL, 22 mmol) and p-TsOH—H$_2$O (0.11 mmol) were added to a toluene (20 mL) solution of 1-(5-bromo-3-methylthiophen-2-yl)ethan-1-one (491.5 mg, 2.2 mmol), and the mixture was stirred under heating and refluxing for 10 hours. The reaction solution was returned to room temperature, and a saturated sodium hydrogen carbonate aqueous solution was added, followed by extraction with ethyl acetate. The organic layer was washed with saturated saline and dried over sodium sulfate, and the solvent was removed by distillation under reduced pressure, thereby obtaining the title compound (577.9 mg, 98%) as an oily transparent yellow substance.

$^1$H NMR (400 MHz, CDCl$_3$) δ 6.74 (1H, s), 4.06-3.99 (2H, m), 3.96-3.90 (2H, m), 2.23 (3H, s), 1.71 (3H, s).

Reference Example 78

Production of
2-bromo-5-(2-methyl-1,3-dioxolan-2-yl)thiazole

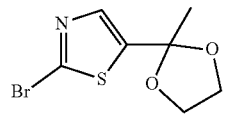

Ethylene glycol (800 μL) and p-TsOH—H₂O (12.7 mg, 0.067 mmol) were added to a toluene (8.0 mL) solution of 1-(2-bromothiazol-5-yl)ethan-1-one (278 mg, 1.3 mmol), and the mixture was stirred under heating and refluxing for 14 hours. The reaction solution was returned to room temperature, a saturated sodium hydrogen carbonate aqueous solution and ethyl acetate were added to separate the organic layer and the aqueous layer. The organic layer was washed with a saturated sodium hydrogen carbonate aqueous solution and dried over sodium sulfate, and the solvent was removed by distillation under reduced pressure, thereby obtaining the title compound (313.6 mg, 93%) as an oily yellow substance.

$^1$H NMR (400 MHz, CDCl$_3$) δ 7.49 (1H, s), 4.13-4.03 (2H, m), 3.99-3.91 (2H, m), 1.75 (3H, s).

Reference Example 79

Production of 2-bromo-4-methyl-5-(2-methyl-1,3-dioxolan-2-yl)thiazole

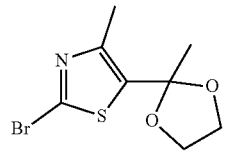

Ethylene glycol (0.40 mL) and p-TsOH—H₂O (6.3 mg, 0.033 mmol) were added to a toluene (8.0 mL) solution of 1-(2-bromo-4-methylthiazol-5-yl)ethan-1-one (146.8 mg, 0.67 mmol), and the mixture was stirred under heating and refluxing for 21 hours. The reaction solution was returned to room temperature, and a saturated sodium hydrogen carbonate aqueous solution was added, followed by extraction with ethyl acetate and washing with saturated saline. The solvent was removed by distillation under reduced pressure. Since the reaction did not proceed completely, toluene (8.0 mL), ethylene glycol (0.80 mL), and p-TsOH—H₂O (5.7 mg, 0.030 mmol) were added to the residue, and the mixture was stirred under heating and refluxing for 13 hours. The reaction solution was returned to room temperature, and a saturated sodium hydrogen carbonate aqueous solution was added, followed by extraction with ethyl acetate and washing with saturated saline. The solvent was removed by distillation under reduced pressure, thereby obtaining the title compound (172.2 mg, 98%) as an oily orange substance.

$^1$H NMR (400 MHz, CDCl$_3$) δ 4.09-4.01 (2H, m), 3.94-3.88 (2H, m), 2.43 (3H, s), 1.71 (3H, s).

Reference Example 80

Production of
2-(5-bromofuran-2-yl)-2-methyl-1,3-dioxolane

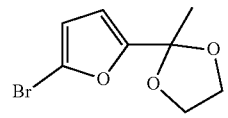

1-(5-Bromofuran-2-yl)ethan-1-one (533.5 mg, 2.8 mmol), ethylene glycol (1.7 mL, 31 mmol), p-TsOH—H₂O (27 mg, 0.14 mmol), and toluene (32 mL) were used as raw materials, and the same operation was performed as in Reference Example 76, thereby obtaining the title compound (496.3 mg, 76%) as an oily colorless substance.

$^1$H NMR (400 MHz, CDCl$_3$) δ 6.29 (1H, d, J=3.2 Hz), 6.23 (1H, d, J=3.2 Hz), 4.07-4.03 (2H, m), 4.01-3.97 (2H, m), 1.71 (3H, s).

Reference Example 81

Production of
2-(5-bromothiophen-3-yl)-2-methyl-1,3-dioxolane

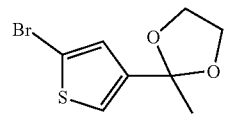

1-(5-Bromothiophen-3-yl)ethan-1-one (398 mg, 1.9 mmol), ethylene glycol (1.08 mL, 19. mmol), p-TsOH—H₂O (18.5 mg, 0.097 mmol), and toluene (22 mL) were used as raw materials, and the same operation was performed as in Reference Example 76, thereby obtaining the title compound (322.2 mg, 67%) as an oily colorless substance.

$^1$H NMR (400 MHz, CDCl$_3$) δ 7.17 (1H, d, J=1.6 Hz), 7.02 (1H, d, J=1.6 Hz), 4.07-3.98 (2H, m), 3.91-3.82 (2H, m), 1.64 (3H, s).

Reference Example 82

Production of 1-(5-bromothiophen-3-yl)ethan-1-ol

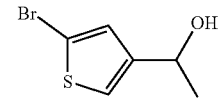

Methylmagnesium bromide (3M, 2-methyltetrahydrofuran solution) (907 μL, 2.7 mol) was added at 0° C. to a THF (8.0 mL) solution of 5-bromothiophene-3-carbaldehyde (200 μL, 1.8 mmol), and the mixture was stirred at room temperature for 1.5 hours. A saturated ammonium chloride aqueous solution was added to the mixture to stop the reaction, followed by extraction with ethyl acetate. The organic layer was washed with a saturated ammonium chloride aqueous solution and dried over sodium sulfate, and the solvent was distilled under reduced pressure, thereby obtaining the title compound (503.8 mg, quant.) as a white solid.

$^1$H NMR (400 MHz, CDCl$_3$) δ 6.97 (1H, d, J=0.8 Hz), 6.94 (1H, br s), 4.76 (1H, q, J=6.4 Hz), 2.20 (1H, br s), 1.38 (3H, d, J=6.4 Hz).

Reference Example 83

Production of 1-(5-bromothiophen-3-yl)ethan-1-one

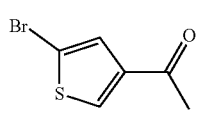

TEA (868 μL, 6.2 mmol) and a pyridine-sulfur trioxide complex (832 mg, 5.2 mmol) were added to a DMSO (8.0 mL) solution of 1-(5-bromothiophen-3-yl)ethan-1-ol (503.8 mg, 1.8 mmol), and the mixture was stirred at room temperature for 6 hours. The mixture was diluted with water and extracted with ethyl acetate. The organic layer was washed with saturated saline and dried over sodium sulfate, and the solvent was distilled under reduced pressure. The residue was purified by silica gel column chromatography (hexane/ethyl acetate (v/v)=95/5→80/20), thereby obtaining the title compound (397.2 mg, quant.) as a white solid.

$^1$H NMR (400 MHz, CDCl$_3$) δ 7.91 (1H, d, J=1.6 Hz), 7.49 (1H, d, J=1.6 Hz), 2.49 (3H, s).

Reference Example 84

Production of 5-(2-methyl-1,3-dioxolan-2-yl)thiazole-2-carbaldehyde

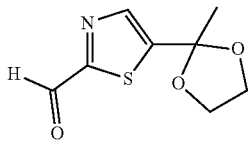

An anhydrous THF (2.5 mL) solution of 2-bromo-5-(2-methyl-1,3-dioxolan-2-yl)thiazole (215.2 mg, 0.86 mmol) was cooled to −78° C., and n-butyllithium (1.6M hexane solution) (0.6 mL, 0.96 mmol) was added and stirred at −78° C. for 30 minutes. Anhydrous DMF (240 μL, 3.1 mmol) was added to the reaction solution and stirred at −78° C. for 15 minutes. Then, the mixture was heated to −60° C. and further stirred for 50 minutes. A saturated ammonium chloride aqueous solution was added at −60° C. to the reaction solution, followed by extraction with diethyl ether and drying over sodium sulfate, and the solvent was removed by distillation under reduced pressure. The obtained residue was purified by silica gel column chromatography, thereby obtaining the title compound (96.0 mg, 56%) as an oily transparent yellow substance.

$^1$H NMR (400 MHz, CDCl$_3$) δ 9.93 (1H, s), 8.01 (1H, s), 4.12-4.06 (2H, m), 3.99-3.93 (2H, m), 1.80 (3H, s).

Reference Example 85

Production of 2-bromo-4,5-dihydro-6H-thieno[2,3-c]pyrrol-6-one

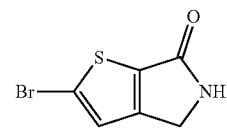

A solution of 2-bromo-5-(tert-butyl)-4,5-dihydro-6H-thieno[2,3-c]pyrrol-6-one (3.78 g, 14 mmol) in TFA (50 mL) and water (5.0 mL) was stirred at 105° C. for 19 hours. The reaction solution was cooled to room temperature, and the solution was concentrated by distillation under reduced pressure. A saturated sodium hydrogen carbonate aqueous solution was added to the obtained residue, followed by extraction with ethyl acetate. The obtained organic layer was dried over sodium sulfate, and the solvent was removed by distillation under reduced pressure, thereby obtaining the title compound (3.25 g, quant.) as a brown solid.

$^1$H NMR (400 MHz, CDCl$_3$) δ 7.08 (1H, s), 6.16 (1H, br s), 4.36 (2H, s).

Reference Example 86

Production of 1-(5-bromo-3-fluorothiophen-2-yl)ethan-1-ol

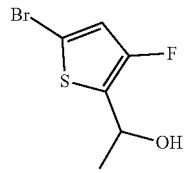

Sodium borohydride (203.5 mg, 5.4 mmol) was added to a methanol (3.6 mL) solution of 1-(5-bromo-3-fluorothiophen-2-yl)ethan-1-one (600.7 mg, 2.7 mmol), and the mixture was stirred at room temperature for 1.5 hours. The reaction mixture was concentrated under reduced pressure. The reaction was stopped with a 4N sodium hydroxide aqueous solution, followed by extraction with dichloromethane. The organic layer was washed with saturated saline and dried over sodium sulfate, and the solvent was distilled under reduced pressure, thereby obtaining the title compound (588.5 mg, 86%) as an oily pale red substance.

$^1$H NMR (400 MHz, CDCl$_3$) δ 6.75 (1H, br s), 5.22-5.17 (1H, m), 2.00 (1H, d, J=4.0 Hz), 1.54 (1H, d, J=6.4 Hz).

Reference Example 87

Production of [1-(5-bromo-3-fluorothiophen-2-yl)ethoxy](tert-butyl)dimethylsilane

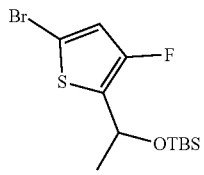 [SMILES: CC(O[Si](C)(C)C(C)(C)C)c1sc(Br)cc1F]

A DMF (4.1 mL) solution of tert-butyldimethylsilyl chloride (417.5 mg, 2.8 mmol) was added at 0° C. to a DMF (1.5 mL) solution of 1-(5-bromo-3-fluorothiophen-2-yl)ethan-1-ol (588.5 mg, 2.3 mmol) and imidazole (204.4 mg, 3.0 mmol), and the mixture was stirred at room temperature for 23 hours. The reaction mixture was diluted with water and extracted with diethyl ether. The organic layer was washed with saturated saline and dried over sodium sulfate, and the solvent was distilled under reduced pressure. The residue was purified by silica gel column chromatography (hexane/ethyl acetate (v/v)=1/0→95/5), thereby obtaining the title compound (581 mg, 74%) as an oily colorless substance.

$^1$H NMR (400 MHz, CDCl$_3$) δ 6.70 (1H, br s), 5.13 (1H, qd, J=6.4, 1.2 Hz), 1.45 (3H, d, J=6.4 Hz), 0.91 (9H, s), 0.082 (3H, s), 0.036 (3H, s).

Reference Example 88

Production of methyl (E)-3-(5-(methylcarbamoyl)furan-2-yl)acrylate

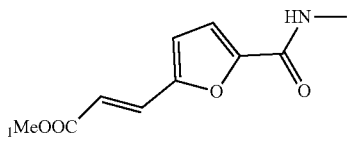

Methyl acrylate (215 μL, 2.4 mmol) and N,N-dicyclohexylmethylamine (515 μL, 2.4 mmol) were added to a DMA (1.4 mL) solution of 5-bromo-N-methylfuran-2-carboxamide (163.3 mg, 0.80 mmol), tetrabutylammonium chloride (32.7 mg, 0.04 mmol), and PdCl$_2$(dppf)$_2$-CH$_2$Cl$_2$ (22.2 mg, 0.08 mmol), and the mixture was stirred at 110° C. for 17 hours. The obtained solution was diluted with water and extracted with ethyl acetate. The organic layer was washed with water and dried over sodium sulfate, and the solvent was distilled under reduced pressure. The residue was purified by silica gel column chromatography (hexane/ethyl acetate (v/v)=3/2→2/3), thereby obtaining the title compound (103.8 mg, 62%) as a pale yellow solid.

$^1$H NMR (400 MHz, CDCl$_3$) δ 7.41 (1H, d, J=16.0 Hz), 7.13 (1H, d, J=3.6 Hz), 6.67 (1H, d, J=3.6 Hz), 6.52 (1H, br s), 6.41 (1H, d, J=16.0 Hz), 3.80 (3H, s), 3.01 (3H, d, J=4.8 Hz).

Reference Example 89

Production of methyl (E)-3-[5-(pyrrolidine-1-carbamoyl)furan-2-yl]acrylate

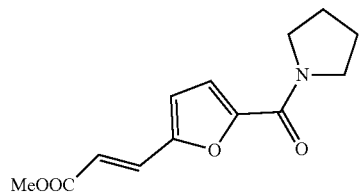 [SMILES: COC(=O)/C=C/c1ccc(C(=O)N2CCCC2)o1]

(5-Bromofuran-2-yl)(pyrrolidin-1-yl)methanone (583 mg, 2.4 mmol), tetrabutylammonium chloride (66.7 mg, 0.24 mmol), PdCl$_2$(dppf)$_2$-CH$_2$Cl$_2$ (98 mg, 0.12 mmol), DMA (4.8 mL), methyl acrylate (643 μL, 7.2 mmol), and N,N-dicyclohexylmethylamine (761 μL, 3.6 mmol) were used as raw materials, and the same operation was performed as in Reference Example 88, thereby obtaining the title compound (478.2 mg, 80%) as a brown solid.

$^1$H NMR (400 MHz, CDCl$_3$) δ 7.44 (1H, d, J=16.0 Hz), 7.14 (1H, d, J=3.6 Hz), 6.71 (1H, d, J=3.6 Hz), 6.37 (1H, d, J=16.0 Hz), 3.90 (2H, t, J=6.8 Hz), 3.80 (3H, s), 3.65 (2H, t, J=6.8 Hz), 2.05 (2H, quin, J=6.8 Hz), 1.92 (2H, quin, J=6.8 Hz).

Reference Example 90

Production of methyl (E)-3-[5-(isopropylcarbamoyl)furan-2-yl]acrylate

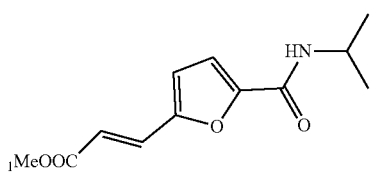

5-Bromo-N-isopropylfuran-2-carboxamide (546.2 mg, 2.4 mmol), tetrabutylammonium chloride (65.3 mg, 0.24 mmol), PdCl$_2$(dppf)$_2$-CH$_2$Cl$_2$ (98 mg, 0.12 mmol), DMA (4.5 mL), methyl acrylate (632 μL, 7.1 mmol), and N,N-dicyclohexylmethylamine (748 μL, 3.5 mmol) were used as raw materials, and the same operation was performed as in Reference Example 88, thereby obtaining the title compound (411.6 mg, 74%) as a white solid.

$^1$H NMR (400 MHz, CDCl$_3$) δ 7.43 (1H, d, J=16.0 Hz), 7.13 (1H, d, J=3.6 Hz), 6.68 (1H, d, J=3.6 Hz), 6.43 (1H, d, J=16.0 Hz), 6.15 (1H, br s), 4.27 (1H, septd, J=6.4, 1.2 Hz), 3.82 (3H, s), 1.28 (6H, d, J=6.4 Hz).

Reference Example 91

Production of methyl (E)-3-[5-(methylcarbamoyl)thiophen-2-yl]acrylate

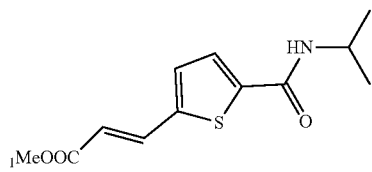

5-Bromo-N-methylthiophene-2-carboxamide (239 mg, 1.1 mmol), tetrabutylammonium chloride (30.6 mg, 0.11 mmol), PdCl$_2$(dppf)$_2$-CH$_2$Cl$_2$ (44.5 mg, 0.05 mmol), DMA (2.2 mL), methyl acrylate (296 μL, 3.3 mmol), and N,N-dicyclohexylmethylamine (347 μL, 1.6 mmol) were used as raw materials, and the same operation was performed as in Reference Example 88, thereby obtaining the title compound (16.1 mg, 7%) as a white solid.

$^1$H NMR (400 MHz, CDCl$_3$) δ 7.72 (1H, d, J=15.6 Hz), 7.39 (1H, d, J=3.6 Hz), 7.19 (1H, d, J=3.6 Hz), 6.31 (1H, d, J=15.6 Hz), 5.96 (1H, br s), 3.80 (3H, s), 3.01 (3H, d, J=4.8 Hz).

Reference Example 92

Production of methyl (E)-3-{5-[(2-methoxyethyl)carbamoyl]furan-2-yl}acrylate

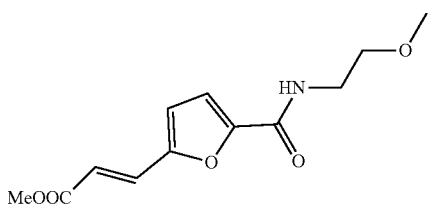 [SMILES: COCCNC(=O)c1ccc(/C=C/C(=O)OC)o1]

5-Bromo-N-(2-methoxyethyl) furan-2-carboxamide (270 mg, 1.1 mmol), tetrabutylammonium chloride (27 mg, 0.097 mmol), PdCl$_2$(dppf)$_2$-CH$_2$Cl$_2$ (40 mg, 0.049 mmol), DMA (2.2 mL), methyl acrylate (411 μL, 4.6 mmol), and N,N-dicyclohexylmethylamine (310 μL, 1.5 mmol) were used as raw materials, and the same operation was performed as in Reference Example 88, thereby obtaining the title compound (221.6 mg, 88%) as an oily brown substance.

$^1$H NMR (400 MHz, CDCl$_3$) δ 7.42 (1H, d, J=16.0 Hz), 7.14 (1H, d, J=3.6 Hz), 6.88 (1H, br s), 6.69 (1H, d, J=3.6 Hz), 6.46 (1H, d, J=16.0 Hz), 3.81 (3H, s), 3.66-3.62 (2H, m), 3.58-3.55 (2H, m), 3.41 (3H, s).

Reference Example 93

Production of methyl (E)-3-(5-acetylthiophen-2-yl)acrylate

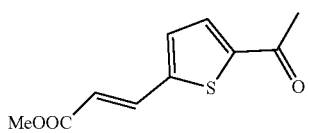

1-(5-Bromothiophen-2-yl)ethan-1-one (700 mg, 3.4 mmol), tetrabutylammonium chloride (95 mg, 0.34 mmol), PdCl$_2$(dppf)$_2$-CH$_2$Cl$_2$ (139.0 mg, 0.17 mmol), DMA (7.0 mL), methyl acrylate (457 μL, 0.17 mmol), and N,N-dicyclohexylmethylamine (1.1 mL, 5.1 mmol) were used as raw materials, and the same operation was performed as in Reference Example 88, thereby obtaining the title compound (304.8 mg, 43%) as a white solid.

$^1$H NMR (400 MHz, CDCl$_3$) δ 7.73 (1H, d, J=16.0 Hz), 7.60 (1H, d, J=4.0 Hz), 7.24 (1H, d, J=4.0 Hz), 6.39 (1H, d, J=16.0 Hz), 3.81 (3H, s), 2.56 (3H, s).

Reference Example 94

Production of methyl (E)-3-[4-methyl-5-(methylcarbamoyl)furan-2-yl]acrylate

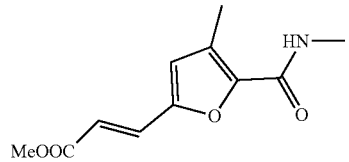 [SMILES: CNC(=O)c1oc(/C=C/C(=O)OC)cc1C]

5-Bromo-N, 3-dimethylfuran-2-carboxamide (200 mg, 0.92 mnol), tetrabutylammonium chloride (26 mg, 0.092 mmol), PdCl$_2$(dppf)$_2$-CH$_2$Cl$_2$ (38 mg, 0.046 mmol), DMA (1.5 mL), methyl acrylate (165 μL, 1.8 mmol), and N,N-dicyclohexylmethylamine (292 μL, 1.4 mmol) were used as raw materials, and the same operation was performed as in Reference Example 88, thereby obtaining the title compound (99.6 mg, 48%) as a white solid.

$^1$H NMR (400 MHz, CDCl$_3$) δ7.36 (1H, d, J=15.6 Hz), 6.53 (1H, s), 6.36 (1H, d, J=15.6 Hz), 6.34 (1H, br s), 3.80 (3H, s), 2.98 (3H, d, J=5.2 Hz), 2.39 (3H, s).

Reference Example 95

Production of methyl (E)-3-(5-sulfamoylthiophen-2-yl)acrylate

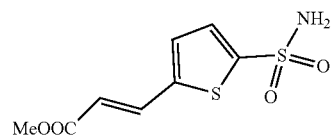 [SMILES: COC(=O)/C=C/c1ccc(S(N)(=O)=O)s1]

5-Bromothiophene-2-sulfonamide (593.2 mg, 2.5 mmol), tetrabutylammonium chloride (68.1 mg, 0.25 mmol), PdCl$_2$(dppf)$_2$-CH$_2$Cl$_2$ (100 mg, 0.12 mmol), DMA (4.0 mL), methyl acrylate (439 μL, 4.9 mmol), and N,N-dicyclohexylmethylamine (780 μL, 3.7 mmol) were used as raw materials, and the same operation was performed as in Reference Example 88, thereby obtaining the title compound (163.7 mg, 27%) as a yellow solid.

$^1$H NMR (400 MHz, CD$_3$OD) δ 7.80 (1H, d, J=16.0 Hz), 7.55 (1H, d, J=4.0 Hz), 7.37 (1H, d, J=4.0 Hz), 6.42 (1H, d, J=16.0 Hz), 3.81 (3H, s).

Reference Example 96

Production of methyl (E)-3-(thiophen-2-yl)acrylate

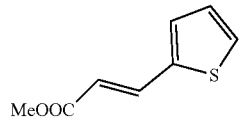 [SMILES: COC(=O)/C=C/c1cccs1]

2-Bromothiophene (235 μL, 2.5 mmol), tetrabutylammonium chloride (68.1 mg, 0.25 mmol), PdCl$_2$(dppf)$_2$-CH$_2$Cl$_2$ (100 mg, 0.12 mnol), DMA (4.0 mL), methyl acrylate (439 μL, 4.9 mmol), and N,N-dicyclohexylmethylamine (780 μL, 3.7 mmol) were used as raw materials, and the same operation was performed as in Reference Example 88, thereby obtaining the title compound (332.9 mg, 81%) as a white solid.

$^1$H NMR (400 MHz, CDCl$_3$) δ 7.79 (1H, d, J=16.0 Hz), 7.37 (1H, d, J=5.2 Hz), 7.25 (1H, d, J=3.6 Hz), 7.05 (1H, dd, J=5.2, 3.6 Hz), 6.24 (1H, d, J=16.0 Hz), 3.79 (3H, s).

Reference Example 97

Production of methyl (E)-3-[5-(methylcarbamoyl)thiophen-3-yl]acrylate

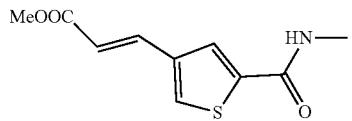

4-Bromo-N-methylthiophene-2-carboxamide (500 mg, 2.3 mnol), tetrabutylammonium chloride (64 mg, 0.23 mmol), PdCl$_2$(dppf)$_2$-CH$_2$Cl$_2$ (93.0 mg, 0.11 mmol), DMA (4.0 mL), methyl acrylate (407 μL, 4.5 mmol), and N,N-dicyclohexylmethylamine (723 μL, 3.4 mmol) were used as raw materials, and the same operation was performed as in Reference Example 88, thereby obtaining the title compound (213.7 mg, 42%) as a white solid.

$^1$H NMR (400 MHz, CDCl$_3$) δ 7.63 (1H, s), 7.60 (1H, d, J=16.0 Hz), 7.58 (1H, s), 6.27 (1H, d, J=16.0 Hz), 6.04 (1H, br s), 3.80 (3H, s), 3.01 (3H, d, J=4.8 Hz).

Reference Example 98

Production of methyl (E)-3{-[5-(isopropylamino)methyl]furan-2-yl}acrylate

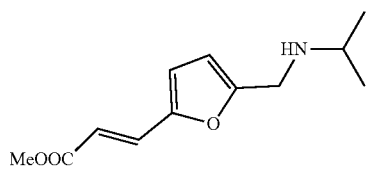 [SMILES: COC(=O)/C=C/c1ccc(CNC(C)C)o1]

N-[(5-bromofuran-2-yl)methyl]propan-2-amine (600 mg, 2.8 mmol), tetrabutylammonium chloride (78 mg, 0.28 mmol), PdCl$_2$(dppf)$_2$-CH$_2$Cl$_2$ (112 mg, 0.14 mmol), DMA (4.5 mL), methyl acrylate (493 μL, 5.5 mmol), and N,N-dicyclohexylmethylamine (875 μL, 4.1 mmol) were used as raw materials, and the same operation was performed as in Reference Example 88, thereby obtaining the title compound (158 mg, 26%) as an oily brown substance.

$^1$H NMR (400 MHz, CDCl$_3$) δ 7.38 (1H, d, J=15.6 Hz), 6.54 (1H, d, J=3.2 Hz), 6.27 (1H, d, J=15.6 Hz), 6.26 (1H, d, J=3.2 Hz), 3.81 (2H, s), 3.78 (3H, s), 2.85 (1H, septd, J=6.4 Hz), 1.09 (6H, d, J=6.4 Hz).

Reference Example 99

Production of methyl (E)-3-[3-methyl-5-(methylcarbamoyl)thiophen-2-yl]acrylate

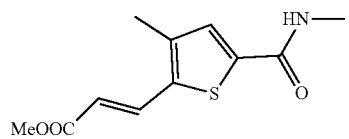 [SMILES: CNC(=O)c1cc(C)c(/C=C/C(=O)OC)s1]

5-Bromo-N, 4-dimethylthiophene-2-carboxamide (200 mg, 0.85 mmol), tetrabutylammonium chloride (24 mg, 0.085 mmol), PdCl$_2$(dppf)$_2$-CH$_2$Cl$_2$ (34.7 mg, 0.043 mmol), DMA (1.2 mL), methyl acrylate (152.5 μL, 1.7 mmol), and N,N-dicyclohexylmethylamine (270 μL, 1.3 mmol) were used as raw materials, and the same operation was performed as in Reference Example 88, thereby obtaining the title compound (171.5 mg, 84%) as a yellow solid.

$^1$H NMR (400 MHz, CDCl$_3$) δ 7.76 (1H, d, J=16.0 Hz), 7.34 (1H, s), 6.94 (1H, br s), 6.20 (1H, d, J=16.0 Hz), 3.79 (3H, s), 2.98 (3H, d, J=4.8 Hz), 2.28 (3H, s).

Reference Example 100

Production of methyl (E)-3-(1-methyl-4-oxo-4,5,6,7-tetrahydro-1H-indol-2-yl)acrylate

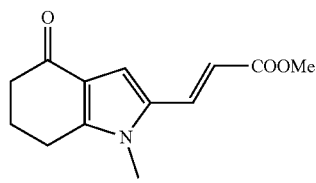 [SMILES: COC(=O)/C=C/c1cc2c(n1C)CCCC2=O]

2-Bromo-1-methyl-1,5,6,7-tetrahydro-4H-indol-4-one (170 mg, 2.3 mmol), tetrabutylammonium chloride (21 mg, 0.085 mmol), PdCl$_2$(dppf)$_2$-CH$_2$Cl$_2$ (31 mg, 0.038 mmol), DMA (0.90 mL), methyl acrylate (135 μL, 1.5 mmol), and N,N-dicyclohexylmethylamine (240 μL, 1.1 mmol) were used as raw materials, and the same operation was performed as in Reference Example 88, thereby obtaining the title compound (154.6 mg, 88%) as a brown solid.

$^1$H NMR (400 MHz, CDCl$_3$) δ 7.56 (1H, d, J=15.6 Hz), 7.00 (1H, s), 6.23 (1H, d, J=15.6 Hz), 3.78 (3H, s), 3.61 (3H, s), 2.79 (2H, t, J=6.4 Hz), 2.47 (2H, t, J=6.4 Hz), 2.17 (2H, quin, J=6.4 Hz).

Reference Example 101

Production of methyl (E)-3-(5-acetyl-1-methyl-1H-pyrrol-2-yl) acrylate

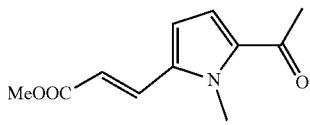

1-(5-Bromo-1-methyl-1H-pyrrol-2-yl)ethan-1-one (402.7 mg, 1.8 mmol), tetrabutylammonium chloride (66 mg, 0.24 mmol), PdCl$_2$(dppf)$_2$-CH$_2$Cl$_2$ (96.4 mg, 0.12 mmol), dimethylacetamide (1.8 mL), methyl acrylate (423 μL, 4.7 mmol), and N,N-dicyclohexylmethylamine (750 μL, 3.5 mmol) were used as raw materials, and the same operation was performed as in Reference Example 88, thereby obtaining the title compound (153.1 mg, 17%) as a white solid.

$^1$H NMR (400 MHz, CDCl$_3$) δ 7.64 (1H, d, J=15.6 Hz), 6.95 (1H, d, J=4.4 Hz), 6.60 (1H, d, J=4.4 Hz), 6.37 (1H, d, J=15.6 Hz), 4.01 (3H, s), 3.81 (3H, s), 2.46 (3H, s).

Reference Example 102

Production of methyl (E)-3-(5-acetyl-3-methylthiophen-2-yl)acrylate

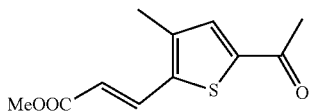

1-(5-Bromo-4-methylthiophen-2-yl)ethan-1-one (200 mg, 0.91 mmol), tetrabutylammonium chloride (25.4 mg, 0.091 mmol), PdCl$_2$(dppf)$_2$-CH$_2$Cl$_2$ (37.6 mg, 0.046 mmol), DMA (1.6 mL), methyl acrylate (164 μL, 1.8 mmol), and N,N-dicyclohexylmethylamine (290 μL, 1.4 mmol) were used as raw materials, and the same operation was performed as in Reference Example 88, thereby obtaining the title compound (176.2 mg, 87%) as a yellow solid.

$^1$H NMR (400 MHz, CDCl$_3$) δ 7.76 (1H, d, J=15.6 Hz), 7.43 (1H, s), 6.29 (1H, d, J=15.6 Hz), 3.80 (3H, s), 2.52 (3H, s), 2.34 (3H, s).

Reference Example 103

Production of methyl (E)-3-(5-acetyl-4-fluorothiophen-2-yl)acrylate

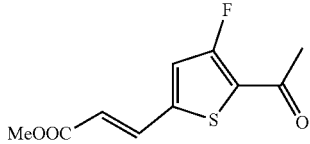

1-(5-Bromo-3-fluorothiophen-2-yl)ethan-1-one (140 mg, 0.46 mmol), tetrabutylammonium chloride (12.8 mg, 0.046 mmol), PdCl$_2$(dppf)$_2$-CH$_2$Cl$_2$ (18.8 mg, 0.023 mmol), DMA (1.0 mL), methyl acrylate (82.5 μL, 0.92 mmol), and N,N-dicyclohexylmethylamine (146 μL, 0.69 mmol) were added and heated under microwave irradiation at 120° C. for 1.5 hours. The obtained solution was diluted with water and extracted with ethyl acetate. The organic layer was washed with water and dried over sodium sulfate, and the solvent was distilled under reduced pressure. The residue was purified by silica gel column chromatography (hexane/ethyl acetate (v/v)=9/1→7/3), thereby obtaining the title compound (51.3 mg, 49%) as a brown powder.

$^1$H NMR (400 MHz, CDCl$_3$) δ 7.60 (1H, d, J=16.0 Hz), 7.00 (1H, s), 6.39 (1H, d, J=16.0 Hz), 3.81 (3H, s), 2.58 (3H, d, J=2.8 Hz).

Reference Example 104

Production of methyl (E)-3-{5-[(2,4-dimethoxybenzyl)carbamoyl]thiophen-2-yl}acrylate

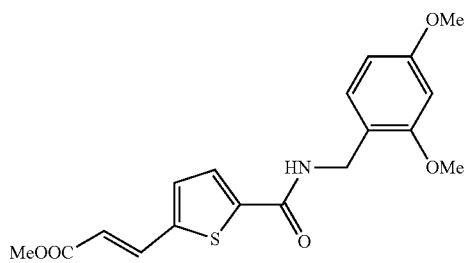 [SMILES: COC(=O)/C=C/c1ccc(C(=O)NCc2ccc(OC)cc2OC)s1]

5-Bromo-N-(2,4-dimethoxybenzyl)thiophene-2-carboxamide (400 mg, 1.1 mmol), tetrabutylammonium chloride (31 mg, 0.11 mmol), PdCl$_2$(dppf)$_2$-CH$_2$Cl$_2$ (45.7 mg, 0.11 mmol), DMA (2.0 mL), methyl acrylate (201 μL, 2.2 mmol), and N,N-dicyclohexylmethylamine (356 μL, 1.7 mmol) were used as raw materials, and the same operation was performed as in Reference Example 103, thereby obtaining the title compound (99.4 mg, 25%) as a white solid.

$^1$H NMR (400 MHz, CDCl$_3$) δ 7.67 (1H, d, J=16.0 Hz), 7.41 (1H, d, J=4.0 Hz), 7.19 (1H, d, J=8.4 Hz), 7.13 (1H, d, J=4.0 Hz), 6.85 (1H, t, J=5.6 Hz), 6.43 (1H, d, J=2.4 Hz), 6.41 (1H, dd, J=8.0, 2.4 Hz), 6.26 (1H, d, J=16.0 Hz), 4.49 (2H, d, J=5.6 Hz), 3.81 (3H, s), 3.77 (3H, s), 3.76 (3H, s).

Reference Example 105

Production of methyl (E)-3-(5-acetyl-4-methylthiophen-2-yl)acrylate

1-(5-Bromo-3-methylthiophen-2-yl) ethan-1-one (216 mg, 0.99 mmol), tetrabutylammonium chloride (14 mg, 0.049 mmol), PdCl$_2$(dppf)$_2$-CH$_2$Cl$_2$ (81 mg, 0.099 mmol), DMA (2.0 mL), methyl acrylate (177 μL, 2.0 mmol), and N,N-dicyclohexylmethylamine (314 μL, 1.5 mmol) were used as raw materials, and the same operation was performed as in Reference Example 103, thereby obtaining the title compound (120.9 mg, 55%) as a yellow solid.

$^1$H NMR (400 MHz, CDCl$_3$) δ 7.66 (1H, d, J=16.0 Hz), 7.07 (1H, s), 6.35 (1H, d, J=16.0 Hz), 3.81 (3H, s), 2.53 (3H, s), 2.52 (3H, s).

Reference Example 106

Production of methyl (E)-3-(4-acetyl-1,3,5-trimethyl-1H-pyrrol-2-yl)acrylate

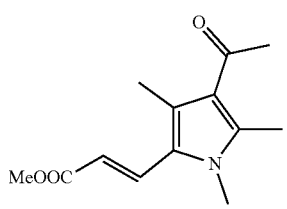 [SMILES: COC(=O)/C=C/c1c(C)c(C(C)=O)c(C)n1C]

1-(5-Bromo-1,2,4-trimethyl-1H-pyrrol-3-yl)ethan-1-one (120 mg, 0.52 mmol), tetrabutylammonium chloride (14.5 mg, 0.052 mmol), PdCl$_2$(dppf)$_2$-CH$_2$Cl$_2$ (21.2 mg, 0.026 mmol), DMA (0.70 mL), methyl acrylate (93.3 μL, 1.0 mmol), and N,N-dicyclohexylmethylamine (165 μL, 0.78 mmol) were used as raw materials, and the same operation was performed as in Reference Example 103, thereby obtaining the title compound (35.2 mg, 29%) as a pale yellow solid.

$^1$H NMR (400 MHz, CDCl$_3$) δ 7.68 (1H, d, J=16.0 Hz), 6.03 (1H, d, J=16.0 Hz), 3.80 (3H, s), 3.59 (3H, s), 2.51 (3H, s), 2.46 (3H, s), 2.40 (3H, s).

Reference Example 107

Production of methyl (E)-3-(5-acetyl-1-ethyl-1H-pyrrol-2-yl)acrylate

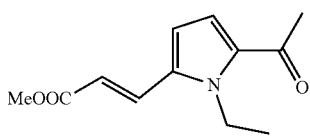 [SMILES: CCn1c(/C=C/C(=O)OC)ccc1C(C)=O]

1-(5-Bromo-1-ethyl-1H-pyrrol-2-yl)ethan-1-one (500 mg, 2.3 mmol), tetrabutylammonium chloride (64 mg, 0.23 mmol), PdCl$_2$(dppf)$_2$-CH$_2$Cl$_2$ (94.3 mg, 0.12 mmol), DMA (3.5 mL), methyl acrylate (414 μL, 4.6 mmol), and N,N-dicyclohexylmethylamine (733 μL, 3.5 mmol) were used as raw materials, and the same operation was performed as in Reference Example 103, thereby obtaining the title compound (23.2 mg, 5%) as a pale yellow solid.

$^1$H NMR (400 MHz, CDCl$_3$) δ 7.54 (1H, d, J=16.0 Hz), 7.12 (1H, d, J=1.6 Hz), 7.08 (1H, d, J=1.6 Hz), 6.16 (1H, d, J=16.0 Hz), 4.35 (2H, q, J=7.2 Hz), 3.77 (3H, s), 2.46 (3H, s), 1.37 (3H, t, J=7.2 Hz).

Reference Example 108

Production of methyl (E)-3-[5-(cyclopropanecarbonyl)thiophen-2-yl]acrylate

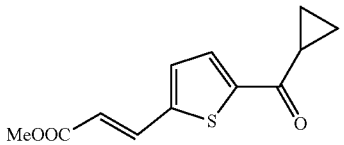 [SMILES: COC(=O)/C=C/c1ccc(C(=O)C2CC2)s1]

(5-Bromothiophen-2-yl) (cyclopropyl)methanone (56 mg, 0.24 mmol), tetrabutylammonium chloride (3.4 mg, 0.012 mmol), PdCl$_2$(dppf)$_2$-CH$_2$Cl$_2$ (20 mg, 0.024 mmol), DMA (0.60 mL), methyl acrylate (43.4 μL, 0.48 mmol), and N,N-dicyclohexylmethylamine (77 μL, 0.36 mmol) were used as raw materials, and the same operation was performed as in Reference Example 103, thereby obtaining the title compound (34 mg, 60%) as a pale yellow solid.

$^1$H NMR (400 MHz, CDCl$_3$) δ 7.74 (1H, d, J=16.0 Hz), 7.72 (1H, d, J=4.0 Hz), 7.27 (1H, d, J=4.0 Hz), 6.39 (1H, d, J=16.0 Hz), 3.81 (3H, s), 2.51 (1H, tt, J=8.0, 4.4 Hz), 1.28-1.25 (2H, m), 1.08-1.04 (2H, m).

Reference Example 109

Production of methyl (E)-3-[5-(2-methyl-1,3-dioxolan-2-yl)thiophen-2-yl]acrylate

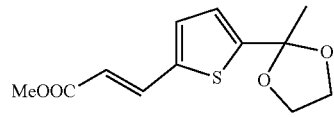 [SMILES: COC(=O)/C=C/c1ccc(C2(C)OCCO2)s1]

2-(5-Bromothiophen-2-yl)-2-methyl-1,3-dioxolane (180 mg, 0.72 mmol), tetrabutylammonium chloride (20 mg, 0.072 mmol), PdCl$_2$(dppf)$_2$-CH$_2$Cl$_2$ (29.4 mg, 0.036 mmol), DMA (1.1 mL), methyl acrylate (129 μL, 1.4 mmol), and N,N-dicyclohexylmethylamine (232 μL, 1.1 mmol) were used as raw materials, and the same operation was performed as in Reference Example 103, thereby obtaining the title compound (135.5 mg, 74%) as a white solid.

$^1$H NMR (400 MHz, CDCl$_3$) δ 7.71 (1H, d, J=15.6 Hz), 7.10 (1H, d, J=3.6 Hz), 6.97 (18, d, J=3.6 Hz), 6.18 (1H, d, J=15.6 Hz), 4.08-4.02 (m, 2H), 3.98-3.95 (m, 2H), 3.78 (3H, s), 1.76 (s, 3H).

Reference Example 110

Production of methyl (E)-3-(5-cyanothiophen-2-yl)acrylate

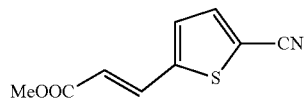 [SMILES: COC(=O)/C=C/c1ccc(C#N)s1]

5-Bromothiophene-2-carbonitrile (289 μL, 2.7 mmol), tetrabutylammonium chloride (74 mg, 0.27 mmol), PdCl$_2$ (dppf)₂-CH₂Cl₂ (109 mg, 0.13 mmol), DMA (3.3 mL), methyl acrylate (477 μL, 5.3 mmol), and N,N-dicyclohexylmethylamine (845 μL, 4.0 mmol) were used as raw materials, and the same operation was performed as in Reference Example 103, thereby obtaining the title compound (77.6 mg, 15%) as a white solid.

¹H NMR (400 MHz, CDCl₃) δ 7.71 (1H, d, J=16.0 Hz), 7.55 (1H, d, J=4.0 Hz), 7.23 (1H, d, J=4.0 Hz), 6.36 (1H, d, J=16.0 Hz), 3.82 (3H, s).

Reference Example 111

Production of methyl (E)-3-[4-methyl-5-(2-methyl-1,3-dioxolan-2-yl)thiophen-2-yl]acrylate

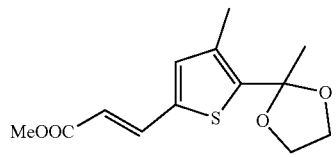 [SMILES: COC(=O)/C=C/c1cc(C)c(C2(C)OCCO2)s1]

2-(5-Bromo-3-methylthiophen-2-yl)-2-methyl-1,3-dioxolone (306.1 mg, 1.2 mmol), PdCl₂(dppf)₂-CH₂Cl₂ (48.8 mg, 0.0060 mmol), and tetrabutylammonium chloride (27.8 mg, 0.12 mmol) were added to a flask. DMA (1.7 mL), N,N-dicyclohexylmethylamine (500 μL, 2.4 mmol), and methyl acrylate (210 μL, 2.3 mmol) were added, and the mixture was heated under microwave irradiation at 130° C. for 3 hours. Further, the mixture was heated under microwave irradiation at 130° C. for 1 hour, and the reaction solution was returned to room temperature. The reaction solution was diluted with ethyl acetate, washed with water and saturated saline, and dried over sodium sulfate, and the solvent was removed by distillation under reduced pressure. The obtained residue was purified by silica gel column chromatography (hexane/ethyl acetate (v/v)=98/2→77/23), thereby obtaining the title compound (160.8 mg, 52%) as an oily transparent yellow substance.

¹H NMR (400 MHz, CDCl₃) δ 7.61 (1H, d, J=15.6 Hz), 6.92 (1H, s), 6.11 (1H, d, J=15.6 Hz), 4.07-3.98 (2H, m), 3.94-3.88 (2H, m), 3.74 (3H, s), 2.23 (3H, s), 1.70 (3H, s).

Reference Example 112

Production of methyl (E)-3-(6-oxo-5,6-dihydro-4H-thieno[2,3-c]pyrrol-2-yl)acrylate

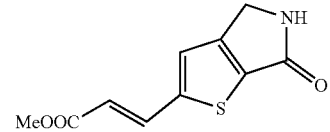 [SMILES: COC(=O)/C=C/c1cc2c(s1)C(=O)NC2]

Methyl acrylate (250 μL, 2.8 mmol) and N,N-dicyclohexylamine (600 μL, 2.8 mmol) were added to a DMA (1.8 mL) solution of 2-bromo-4,5-dihydro-6H-thieno(2,3-c)pyrrol-6-one (301.3 mg, 1.4 mmol), PdCl₂(dppf)₂-CH₂Cl₂ (59.4 mg, 0.073 mmol), and tetrabutylammonium chloride (40.3 mg, 0.15 mmol), and the mixture was heated under microwave irradiation at 130° C. for 3 hours. The reaction solution was cooled to room temperature, and ethyl acetate and 1M hydrochloric acid were added to separate the organic layer and the aqueous layer. The aqueous layer was extracted with ethyl acetate, and the combined organic layer was washed with saturated saline and dried over sodium sulfate. The solvent was removed by distillation under reduced pressure, followed by purification by silica gel column chromatography (hexane/ethyl acetate (v/v)=19/81→0/100), thereby obtaining the title compound (171 mg, 55%) as an orange solid.

¹H NMR (400 MHz, CDCl₃) δ 7.77 (1H, d, J=15.6 Hz), 7.18 (1H, s), 6.54 (1H, br s), 6.37 (1H, d, J=15.6 Hz), 4.38 (2H, s), 3.81 (3H, s).

Reference Example 113

Production of methyl (E)-3-(5-acetylfuran-2-yl)acrylate

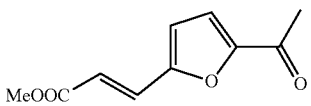

1-(5-Bromofuran-2-yl)ethan-1-one (220 mg, 1.16 mmol), tetrabutylammonium chloride (16 mg, 0.058 mmol), PdCl₂(dppf)₂-CH₂Cl₂ (94 mg, 0.115 mmol), DMA (2.0 mL), methyl acrylate (206 μL, 2.3 mmol), and N,N-dicyclohexylmethylamine (364 μL, 1.72 mmol) were used as raw materials, and the same operation was performed as in Reference Example 103, thereby obtaining the title compound (90.0 mg, 40%) as a pale yellow solid.

¹H NMR (400 MHz, CDCl₃) δ 7.43 (1H, d, J=16.0 Hz), 7.17 (1H, d, J=3.6 Hz), 6.69 (1H, d, J=3.6 Hz), 6.54 (1H, d, J=16.0 Hz), 3.79 (1H, s), 2.49 (3H, s).

Reference Example 114

Production of methyl (E)-3-(5-acetylthiophen-3-yl)acrylate

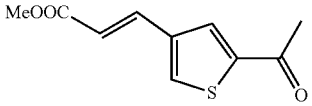

1-(4-Bromothiophen-2-yl)ethan-1-one (200 mg, 0.98 mmol), tetrabutylammonium chloride (13.6 mg, 0.049 mmol), PdCl₂(dppf)-CH₂Cl₂ (80 mg, 0.098 mmol), DMA (2.0 mL), methyl acrylate (176 μL, 2.0 mmol), and N,N-dicyclohexylmethylamine (310 μL, 1.47 mmol) were used as raw materials, and the same operation was performed as in Reference Example 103, thereby obtaining the title compound (114.3 mg, 56%) as an orange solid.

¹H NMR (400 MHz, CDCl₃) δ 7.82 (1H, d, J=1.2 Hz), 7.74 (1H, d, J=1.2 Hz), 7.62 (1H, d, J=16.0 Hz), 6.32 (1H, d, J=16.0 Hz), 3.81 (3H, s), 2.59 (3H, s).

Reference Example 115

Production of methyl (E)-3-(4-acetylthiophen-2-yl)acrylate

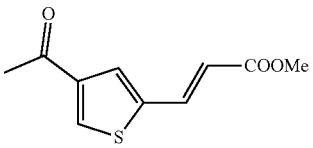

1-(5-Bromothiophen-3-yl)ethan-1-one (380 mg, 1.9 mmol), tetrabutylammonium chloride (25.7 mg, 0.093 mmol), PdCl$_2$(dppf)$_2$-CH$_2$Cl$_2$ (151 mg, 0.19 mmol), DMA (3.8 mL), methyl acrylate (344 μL, 3.7 mmol), and N,N-dicyclohexylmethylamine (586 μL, 2.8 mmol) were used as raw materials, and the same operation was performed as in Reference Example 103, thereby obtaining the title compound (151.8 mg, 39%) as a pale green powder.

$^1$H NMR (400 MHz, CDCl$_3$) δ 8.03 (1H, s), 7.73 (1H, d, J=16.0 Hz), 7.64 (1H, br s), 6.27 (1H, d, J=16.0 Hz), 3.80 (3H, s), 2.52 (3H, s).

Reference Example 116

Production of methyl (E)-3-(5-cyano-1-methyl-1H-pyrrol-3-yl)acrylate

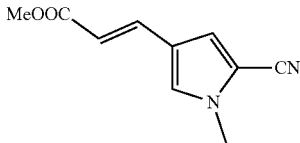

4-Bromo-1-methyl-1H-pyrrole-2-carbonitrile (131.9 mg, 0.71 mmol), tetrabutylammonium chloride (19.7 mg, 0.071 mmol), PdCl$_2$(dppf)$_2$-CH$_2$Cl$_2$ (58 mg, 0.071 mmol), DMA (1.2 mL), methyl acrylate (128 μL, 1.4 mmol), and N,N-dicyclohexylmethylamine (227 μL, 1.1 mmol) were used as raw materials, and the same operation was performed as in Reference Example 103, thereby obtaining the title compound (33.5 mg, 25%) as a pale yellow solid.

$^1$H NMR (400 MHz, CDCl$_3$) δ 7.48 (1H, d, J=16.0 Hz), 7.01 (1H, d, J=1.6 Hz), 6.96 (1H, d, J=1.6 Hz), 6.13 (1H, d, J=16.0 Hz), 3.80 (3H, s), 3.77 (3H, s).

Reference Example 117

Production of methyl (E)-3-(3-acetylthiophen-2-yl)acrylate

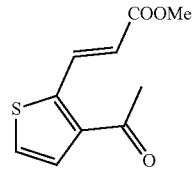

1-(2-Bromothiophen-3-yl)ethan-1-one (128.8 mg, 0.63 mmol), tetrabutylammonium chloride (8.8 mg, 0.032 mmol), PdCl$_2$(dppf)$_2$-CH$_2$Cl$_2$ (51.4 mg, 0.065 mmol), DMA (1.3 mL), methyl acrylate (113 μL, 1.3 mmol), and N,N-dicyclohexylmethylamine (200 μL, 0.95 mmol) were used as raw materials, and the same operation was performed as in Reference Example 103, thereby obtaining the title compound (62.1 mg, 47%) as a pale yellow solid.

$^1$H NMR (400 MHz, CDCl$_3$) δ 8.51 (1H, d, J=16.0 Hz), 7.40 (1H, d, J=5.6 Hz), 7.28 (1H, d, J=5.6 Hz), 6.34 (1H, d, J=16.0 Hz), 3.78 (3H, s), 2.54 (3H, s).

Reference Example 118

Production of methyl (E)-3-[5-(2-methyl-1,3-dioxolan-2-yl)furan-2-yl]acrylate

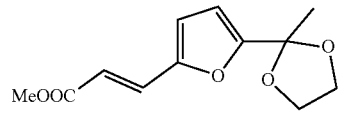 [SMILES: COC(=O)/C=C/c1ccc(C2(C)OCCO2)o1]

2-(5-Bromofuran-2-yl)-2-methyl-1,3-dioxolane (200 mg, 0.86 mmol), tetrabutylammonium chloride (12 mg, 0.043 mmol), PdCl$_2$(dppf)$_2$-CH$_2$Cl$_2$ (70.1 mg, 0.086 mmol), DMA (2.0 mL), methyl acrylate (160 μL, 1.7 mmol), and N,N-dicyclohexylmethylamine (272 μL, 1.3 mmol) were used as raw materials, and the same operation was performed as in Reference Example 103, thereby obtaining the title compound (168.8 mg, 83%) as an oily yellow substance.

$^1$H NMR (400 MHz, CDCl$_3$) δ 7.39 (1H, d, J=15.6 Hz), 6.52 (1H, d, J=3.6 Hz), 6.39 (1H, d, J=3.6 Hz), 6.32 (1H, d, J=15.6 Hz), 4.09-4.05 (2H, m), 4.04-4.00 (2H, m), 3.78 (3H, s), 1.75 (3H, s).

Reference Example 119

Production of methyl (E)-3-[4-(2-methyl-1,3-dioxolan-2-yl)thiophen-2-yl]acrylate

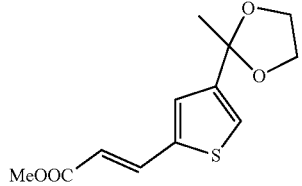 [SMILES: COC(=O)/C=C/c1cc(C2(C)OCCO2)cs1]

2-(5-Bromothiophen-3-yl)-2-methyl-1,3-dioxolane (160 mg, 0.64 mmol), tetrabutylammonium chloride (8.9 mg, 0.032 nmol), PdCl$_2$(dppf)$_2$-CH$_2$Cl$_2$ (52.4 mg, 0.064 mmol), DMA (1.3 mL), methyl acrylate (115 μL, 1.3 mmol), and N,N-dicyclohexylmethylamine (203 μL, 0.96 mmol) were used as raw materials, and the same operation was performed as in Reference Example 103, thereby obtaining the title compound (137.7 mg, 84%) as an oily colorless substance.

$^1$H NMR (400 MHz, CDCl$_3$) δ 7.72 (1H, d, J=15.6 Hz), 7.31 (1H, s), 7.21 (1H, s), 6.22 (1H, d, J=15.6 Hz), 4.06-4.02 (2H, m), 3.89-3.86 (2H, m), 3.79 (3H, s), 1.66 (3H, s).

Reference Example 120

Production of ethyl (E)-3-(thiazol-5-yl)acrylate

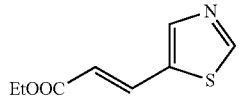 [SMILES: CCOC(=O)/C=C/c1cncs1]

A THF (2.0 mL) solution of potassium tert-butoxide (123.4 mg, 1.1 mmol) and triethyl phosphonoacetate (220 µL, 1.1 mmol) was stirred at −5° C. for 30 minutes. Then, thiazole-5-carboaldehyde (100 mg, 0.88 mmol) was added, and the mixture was stirred at −5° C. for 2 hours, and then stirred at room temperature for 21 hours. The reaction solution was diluted with water and extracted with ethyl acetate. The organic layer was washed with a saturated sodium hydrogen carbonate aqueous solution and dried over sodium sulfate, and the solvent was distilled under reduced pressure. The residue was purified by silica gel column chromatography (hexane/ethyl acetate (v/v)=9/1→7/3), thereby obtaining the title compound (143.5 mg, 89%) as a white solid.

$^1$H NMR (400 MHz, CDCl$_3$) δ 8.80 (1H, s), 8.01 (1H, s), 7.82 (1H, d, J=15.6 Hz), 6.26 (1H, d, J=15.6 Hz), 4.26 (2H, q, J=7.2 Hz), 1.33 (3H, t, J=7.2 Hz).

Reference Example 121

Production of methyl (E)-3-[5-(2-methyl-1,3-dioxolan-2-yl)thiazol-2-yl]acrylate

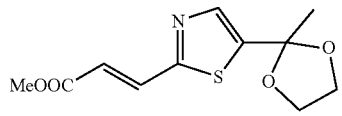 [SMILES: COC(=O)/C=C/c1ncc(C2(C)OCCO2)s1]

Methyl (triphenylphosphoranylidene)acetate (424.2 mg, 1.3 mmol) was added to a toluene (1.5 mL) solution of 5-(2-methyl-1,3-dioxolan-2-yl)thiazole-2-carbaldehyde (85.2 mg, 0.42 mmol), and the mixture was stirred at 120° C. for 1 hour. The reaction solution was returned to room temperature, and the solvent was distilled under reduced pressure. The obtained residue was purified by silica gel column chromatography (hexane/ethyl acetate (v/v)=81/19→62/38), thereby obtaining the title compound (111.5 mg, quant.) as a white solid.

$^1$H NMR (400 MHz, CDCl$_3$) δ 7.79 (1H, s), 7.70 (1H, d, J=15.6 Hz), 6.65 (1H, d, J=15.6 Hz), 4.14-4.04 (2H, m), 3.99-3.91 (2H, m), 3.82 (3H, s), 1.78 (3H, s).

Reference Example 122

Production of methyl (E)-3-[4-methyl-5-(2-methyl-1,3-dioxolan-2-yl)thiazol-2-yl]acrylate

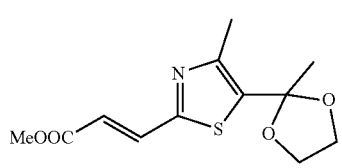 [SMILES: COC(=O)/C=C/c1nc(C)c(C2(C)OCCO2)s1]

Methyl (triphenylphosphoranylidene)acetate (160.7 mg, 0.48 mmol) was added to a toluene (1.0 mL) solution of 4-methyl-5-(2-methyl-1,3-dioxolan-2-yl) thiazole-2-carbaldehyde (32.5 mg, 0.15 mmol), and the mixture was stirred at 120° C. for 1.5 hours. The reaction solution was returned to room temperature, the solvent was distilled under reduced pressure, and the obtained residue was purified by silica gel column chromatography (hexane/ethyl acetate (v/v)=86/14→65/35), thereby obtaining the title compound (34.6 mg, 85%) as an oily transparent orange substance.

$^1$H NMR (400 MHz, CDCl$_3$) δ 7.63 (1H, d, J=15.6 Hz), 6.60 (1H, d, J=15.6 Hz), 4.08-4.02 (2H, m), 3.94-3.86 (2H, m), 3.80 (3H, s), 2.49 (3H, s), 1.74 (3H, s).

Reference Example 123

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl) furan-2-yl]propanoate

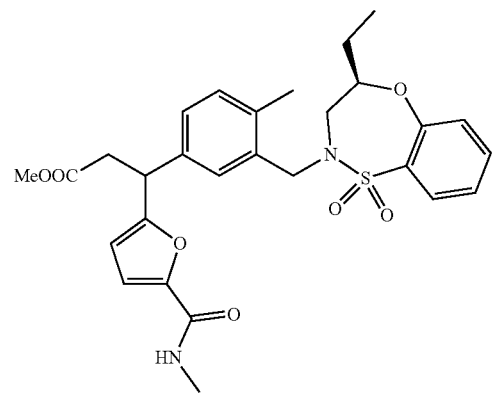 [SMILES: CC[C@@H]1CN(Cc2cc(C(CC(=O)OC)c3ccc(C(=O)NC)o3)ccc2C)S(=O)(=O)c2ccccc2O1]

TEA (168 µL, 1.2 mmol) was added to a 1,4-dioxane/water (3/1) (1.0 mL) solution of (R)-4-ethyl-2-[2-methyl-5-(4,4,5,5-tetramethyl-1,3,2-dioxaborolan-2-yl)benzyl)-3,4-dihydro-2H-benzo[b][1,4,5]oxathiazepine 1,1-dioxide (165 mg, 0.36 mmol), methyl (E)-3-[5-(methylcarbamoyl)furan-2-yl]acrylate (50 mg, 0.24 mmol), and [RhCl(cod)]$_2$ (5.9 mg, 0.012 mmol), and the mixture was stirred under heating and refluxing for 14 hours. The obtained solution was diluted with water and extracted with ethyl acetate. The organic layer was washed with water and dried over sodium sulfate, and the solvent was distilled under reduced pressure. The residue was purified by silica gel column chromatography (hexane/ethyl acetate (v/v)=3/2→2/3), thereby obtaining the title compound (22.9 mg, 18%) as an oily colorless substance.

$^1$H NMR (400 MHz, CDCl$_3$) δ 7.88 (1H, d, J=8.0 Hz), 7.53 (1H, td, J=8.0, 1.6 Hz), 7.28-7.21 (3H, m), 7.14-7.07 (2H, m), 6.98 (1H, d, J=3.2 Hz), 6.37 (1H, br s), 6.15 (1H, t, J=3.2 Hz), 4.55-4.49 (2H, m), 4.04-3.99 (1H, m), 3.87-3.84 (1H, m), 3.80-3.73 (1H, m), 3.62 (3H, br s), 3.12-3.00 (3H, m), 2.95-2.94 (3H, m), 2.30 (3H, br s), 1.76-1.66 (1H, m), 1.53-1.41 (1H, m), 1.09 (3H, t, J=7.2 Hz).

Reference Example 124

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(pyrrolidine-1-carbonyl) furan-2-yl]propanoate

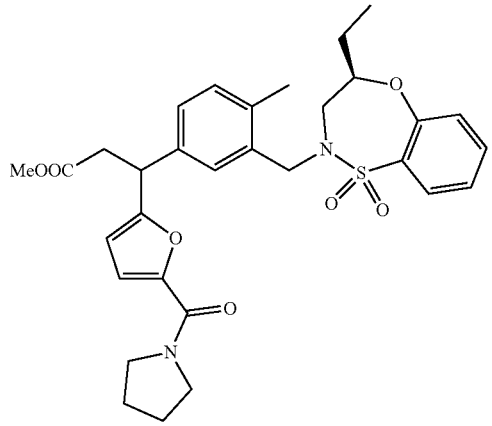 [SMILES: CC[C@@H]1CN(Cc2cc(C(CC(=O)OC)c3ccc(C(=O)N4CCCC4)o3)ccc2C)S(=O)(=O)c2ccccc2O1]

(R)-4-ethyl-2-[2-methyl-5-(4,4,5,5-tetramethyl-1,3,2-dioxaborolan-2-yl)benzyl)-3,4-dihydro-2H-benzo[b][1,4,5] oxathiazepine 1,1-dioxide (240 mg, 0.52 mmol), methyl (E)-3-[5-(pyrrolidine-1-carbonyl)furan-2-yl]acrylate (84 mg, 0.34 mmol), [RhCl(cod)]$_2$ (17.4 mg, 0.035 mmol), 1,4-dioxane/DMA/water (3/3/1) (0.7 mL), and TEA (74 µL, 0.53 mmol) were used as raw materials, and the same operation was performed as in Reference Example 123, thereby obtaining the title compound (85.0 mg, 50%) as an oily colorless substance.

$^1$H NMR (400 MHz, CDCl$_3$) δ 7.88 (1H, d, J=7.6 Hz), 7.52 (1H, t, J=7.6 Hz), 7.29-7.12 (5H, m), 6.97 (1H, d, J=3.2 Hz), 6.11 (1H, d, J=3.2 Hz), 4.57-4.53 (2H, m), 4.03-3.98 (1H, m), 3.81 (1H, d, J=14.4 Hz), 3.78-3.67 (3H, m), 3.61-3.58 (5H, m), 3.14-3.10 (1H, m), 2.99-2.87 (2H, m), 2.32 (3H, s), 1.99-1.95 (2H, m), 1.88-1.85 (2H, m), 1.74-1.64 (1H, m), 1.50-1.42 (1H, m), 1.08 (3H, t, J=7.2 Hz).

Reference Example 125

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(isopropylcarbamoyl)furan-2-yl]propanoate

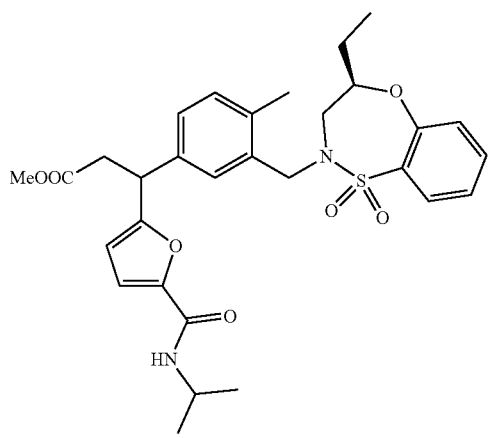 [SMILES: CC[C@@H]1CN(Cc2cc(C(CC(=O)OC)c3ccc(C(=O)NC(C)C)o3)ccc2C)S(=O)(=O)c2ccccc2O1]

(R)-4-ethyl-2-[2-methyl-5-(4,4,5,5-tetramethyl-1,3,2-dioxaborolan-2-yl)benzyl)-3,4-dihydro-2H-benzo[b][1,4,5] oxathiazepine 1,1-dioxide (206 mg, 0.45 mmol), methyl (E)-3-[5-(isopropylcarbamoyl)furan-2-yl]acrylate (70 mg, 0.3 mmol), [RhCl(cod)]$_2$ (15 mg, 0.030 mmol), 1,4-dioxane/water (6/1) (0.7 mL), and TEA (152 µL, 1.5 mmol) were used as raw materials, and the same operation was performed as in Reference Example 123, thereby obtaining the title compound (38.2 mg, 22%) as an oily pale yellow substance.

$^1$H NMR (400 MHz, CDCl$_3$) δ 7.88 (1H, dd, J=8.0, 1.6 Hz), 7.53 (1H, td, J=8.0, 1.6 Hz), 7.26 (1H, t, J=8.0 Hz), 7.21 (1H, d, J=8.0 Hz), 7.16-7.08 (3H, m), 6.98 (1H, d, J=3.6 Hz), 6.14-6.10 (1H, m), 6.05 (1H, br s), 4.56-4.51 (2H, m), 4.26-4.19 (1H, m), 4.03-4.00 (1H, m), 3.87-3.74 (2H, m), 3.64 (3H, s), 3.07-2.99 (2H, m), 2.88-2.85 (1H, m), 2.33 (3H, br s), 1.76-1.65 (1H, m), 1.51-1.42 (1H, m), 1.26-1.22 (6H, m), 1.09-1.08 (3H, m).

Reference Example 126

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl)thiophen-2-yl]propanoate

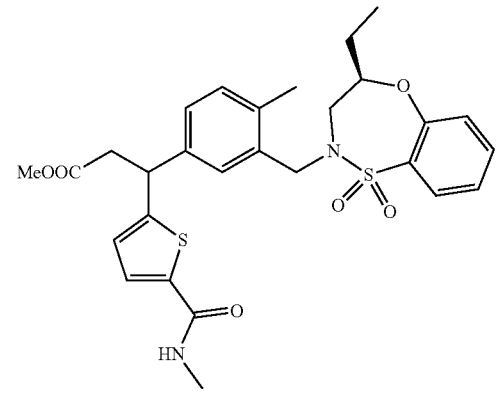

(R)-4-ethyl-2-[2-methyl-5-(4,4,5,5-tetramethyl-1,3,2-dioxaborolan-2-yl)benzyl)-3,4-dihydro-2H-benzo[b][1,4,5] oxathiazepine 1,1-dioxide (240 mg, 0.52 mmol), methyl (E)-3-[5-(methylcarbamoyl)thiophen-2-yl]acrylate (79 mg, 0.35 mmol), [RhCl(cod)]$_2$ (17.4 mg, 0.035 mmol), 1,4-dioxane/DMA/water (3/3/1) (0.7 mL), and TEA (74 µL, 0.53 mmol) were used as raw materials, and the same operation was performed as in Reference Example 123, thereby obtaining the title compound (48.7 mg, 25%) as an oily pale yellow substance.

$^1$H NMR (400 MHz, CDCl$_3$) δ 7.88 (1H, dd, J=8.0, 1.6 Hz), 7.52 (1H, br t, J=8.0 Hz), 7.29-7.19 (3H, m), 7.14 (2H, br s), 7.07 (1H, d, J=6.8 Hz), 6.78-6.77 (1H, m), 5.99 (1H, br s), 4.69 (1H, t, J=7.6 Hz), 4.56 (1H, dd, J=14.0, 5.2 Hz), 4.02-3.95 (1H, m), 3.82-3.69 (2H, m), 3.60 (3H, s), 3.09 (1H, dd, J=16.0, 7.6 Hz), 3.01-2.90 (5H, m), 2.34 (3H, br s), 1.69-1.62 (1H, m), 1.46-1.38 (1H, m), 1.06 (3H, t, J=7.2 Hz).

Reference Example 127

Production of methyl 3-(3-{[(R)-4-ethyl-1,1-dioxide-3,4-dihydro-2H-benzo[b][1,4,5]oxathiazepin-2-yl]methyl}-4-methylphenyl)-3-{5-[(2-methoxyethyl)carbamoyl]furan-2-yl}propanoate

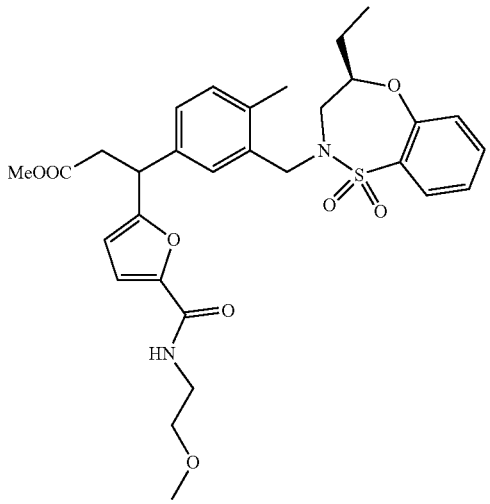 [SMILES: CC[C@@H]1CN(Cc2cc(C(CC(=O)OC)c3ccc(C(=O)NCCOC)o3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5] oxathiazepine 1,1-dioxide (192 mg, 0.42 mmol), methyl (E)-3-(5-[(2-methoxyethyl)carbamoyl]furan-2-yl)acrylate (70 mg, 0.28 mmol), [RhCl(cod)]$_2$ (13.8 mg, 0.028 mmol), 1,4-dioxane/water (6/1) (0.7 mL), and TEA (60 µL, 0.42 mmol) were used as raw materials, and the same operation was performed as in Reference Example 123, thereby obtaining the title compound (11.1 mg, 7%) as an oily pale yellow substance.

$^1$H NMR (400 MHz, CDCl$_3$) δ 7.88 (1H, dd, J=8.0, 1.6 Hz), 7.52 (1H, td, J=8.0, 1.6 Hz), 7.26 (1H, t, J=8.0 Hz), 7.23 (1H, d, J=8.0 Hz), 7.16-7.09 (3H, m), 6.99 (1H, d, J=3.6 Hz), 6.55 (1H, br s), 6.12 (1H, t, J=3.6 Hz), 4.57-4.51 (2H, m), 4.04-4.00 (1H, m), 3.87-3.71 (2H, m), 3.63 (3H, s), 3.60-3.51 (4H, m), 3.37 (3H, s), 3.11-2.85 (3H, m), 2.33 (3H, br s), 1.78-1.67 (1H, m), 1.51-1.41 (1H, m), 1.08 (3H, t, J=7.6 Hz).

Reference Example 128

Production of methyl 3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate

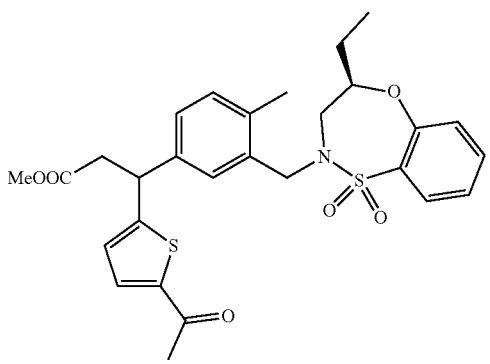 [SMILES: CC[C@@H]1CN(Cc2cc(C(CC(=O)OC)c3ccc(C(C)=O)s3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5] oxathiazepine 1,1-dioxide (274.4 mg, 0.6 mmol), methyl (E)-3-(5-acetylthiophen-2-yl)acrylate (105 mg, 0.5 mmol), [RhCl(cod)]$_2$ (12.3 mg, 0.025 mmol), 1,4-dioxane/water (7/1) (1.0 mL), and TEA (210 µL, 1.5 mmol) were used as raw materials, and the same operation was performed as in Reference Example 123, thereby obtaining the title compound (138.0 mg, 50%) as an oily pale yellow substance.

$^1$H NMR (400 MHz, CDCl$_3$) δ 7.88 (1H, dd, J=8.0, 1.6 Hz), 7.52 (1H, td, J=8.0, 1.6 Hz), 7.50 (1H, d, J=4.0 Hz), 7.27-7.20 (2H, m), 7.17-7.12 (2H, m), 7.08 (1H, d, J=8.4 Hz), 6.87 (1H, br t, J=2.4 Hz), 4.72 (1H, t, J=7.6 Hz), 4.58-4.56 (1H, m), 4.03-3.96 (1H, m), 3.83-3.69 (2H, m), 3.61 (3H, s), 3.13-2.91 (3H, m), 2.48 (3H, br s), 2.34 (3H, br s), 1.73-1.63 (1H, m), 1.47-1.39 (1H, m), 1.07 (3H, t, J=7.6 Hz).

Reference Example 129

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[4-methyl-5-(methylcarbamoyl)furan-2-yl]propanoate

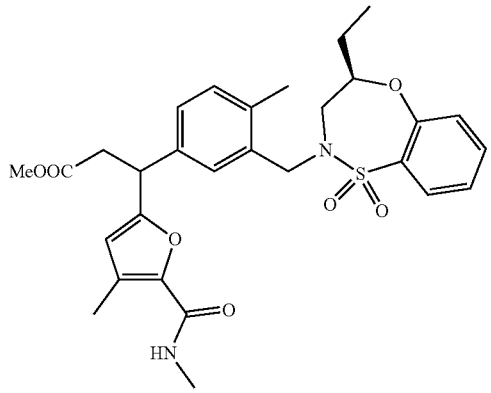 [SMILES: CC[C@@H]1CN(Cc2cc(C(CC(=O)OC)c3cc(C)c(C(=O)NC)o3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5] oxathiazepine 1,1-dioxide (247 mg, 0.54 mmol), methyl (E)-3-[4-methyl-5-(methylcarbamoyl)furan-2-yl]acrylate (100 mg, 0.45 mmol), [RhCl(cod)]$_2$ (11.3 mg, 0.023 mmol), 1,4-dioxane/water (6/1) (1.0 mL), and TEA (189 µL, 1.4 mmol) were used as raw materials, and the same operation was performed as in Reference Example 123, thereby obtaining the title compound (48.2 mg, 19%) as an oily pale yellow substance.

$^1$H NMR (400 MHz, CDCl$_3$) δ 7.88 (1H, dd, J=7.6, 1.6 Hz), 7.53 (1H, td, J=7.6, 1.6 Hz), 7.27-7.19 (3H, m), 7.13 (1H, d, J=7.6 Hz), 7.10-7.06 (1H, m), 6.27 (1H, br s), 5.98 (1H, d, J=3.2 Hz), 4.49-4.44 (2H, m), 4.05-3.98 (1H, m), 3.89-3.72 (2H, m), 3.63 (3H, s), 3.09-2.84 (6H, m), 2.34-2.30 (6H, m), 1.78-1.59 (1H, m), 1.52-1.41 (1H, m), 1.09 (3H, t, J=7.2 Hz).

Reference Example 130

Production of methyl 3-(3-{[(R)-4-ethyl-1,1-dioxide-3,4-dihydro-2H-benzo[b][1,4,5]oxathiazepin-2-yl]methyl)-4-methylphenyl}-3-(5-sulfamoylthiophen-2-yl)propanoate

103

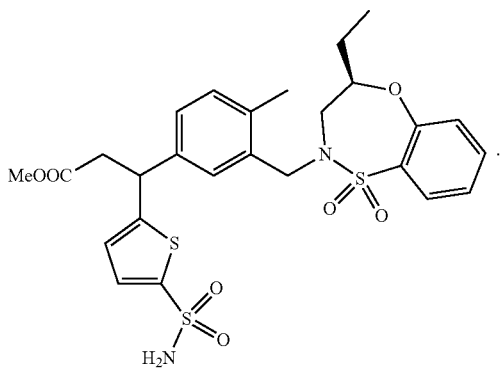 [SMILES: CC[C@@H]1CN(Cc2cc(C(CC(=O)OC)c3ccc(S(N)(=O)=O)s3)ccc2C)S(=O)(=O)c2ccccc2O1]

TEA (84 µL, 0.6 mmol) was added to a 1,4-dioxane/water (1/1) (0.8 mL) solution of (R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (137.2 mg, 0.3 mmol), methyl (E)-3-(5-sulfamoylthiophen-2-yl)acrylate (50 mg, 0.2 mmol), and [RhCl(cod)]$_2$ (9.9 mg, 0.02 mmol), and the mixture was stirred under microwave irradiation at 120° C. for 1 hour. The obtained solution was diluted with water and extracted with ethyl acetate. The organic layer was washed with water and dried over sodium sulfate, and the solvent was distilled under reduced pressure. The residue was purified by silica gel column chromatography (hexane/ethyl acetate (v/v)=4/1→3/2), thereby obtaining the title compound (98.9 mg, 85%) as a white solid.

$^1$H NMR (400 MHz, CDCl$_3$) δ 7.84 (1H, br d, J=8.0 Hz), 7.51 (1H, td, J=8.0, 1.6 Hz), 7.42 (1H, d, J=4.0 Hz), 7.27-7.19 (2H, m), 7.15-7.11 (3H, m), 6.78 (1H, d, J=4.0 Hz), 4.71 (1H, t, J=8.0 Hz), 4.51 (1H, d, J=14.4 Hz), 4.03-3.97 (1H, m), 3.83-3.82 (1H, m), 3.77-3.69 (1H, m), 3.61 (3H, s), 3.11-2.95 (3H, m), 2.30 (3H, s), 1.74-1.63 (1H, m), 1.51-1.43 (1H, m), 1.08-1.07 (3H, m).

Reference Example 131

Production of methyl 3-(3-{[(R)-4-ethyl-1,1-dioxide-3,4-dihydro-2H-benzo[b][1,4,5]oxathiazepin-2-yl]methyl}-4-methylphenyl)-3-(thiophen-2-yl) propanoate

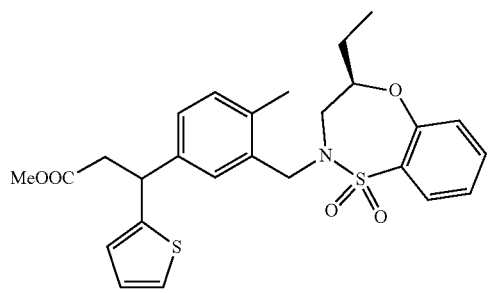 [SMILES: CC[C@@H]1CN(Cc2cc(C(CC(=O)OC)c3cccs3)ccc2C)S(=O)(=O)c2ccccc2O1]

104

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (247 mg, 0.54 mmol), methyl (E)-3-(thiophen-2-yl)acrylate (76 mg, 0.45 mmol), [RhCl(cod)]$_2$ (11.3 mg, 0.023 mmol), 1,4-dioxane/water (3/1) (1.0 mL), and TEA (189 µL, 1.4 mmol) were used as raw materials, and the same operation was performed as in Reference Example 123, thereby obtaining the title compound (133 mg, 60%) as a white solid.

$^1$H NMR (400 MHz, CDCl$_3$) δ7.88 (1H, dd, J=8.0, 1.6 Hz), 7.51 (1H, td, J=8.0, 1.6 Hz), 7.26-7.12 (5H, m), 7.03 (1H, d, J=14.4 Hz), 6.89 (1H, br t, J=4.0 Hz), 6.81 (1H, br t, J=4.0 Hz), 4.71 (1H, t, J=7.6 Hz), 4.60-4.57 (1H, m), 4.01-3.92 (1H, m), 3.80-3.68 (2H, m), 3.59 (3H, br s), 3.13-3.06 (1H, m), 3.02-2.87 (2H, m), 2.36 (3H, br s), 1.71-1.59 (1H, m), 1.44-1.32 (1H, m), 1.07-1.06 (3H, m).

Reference Example 132

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl)thiophen-3-yl]propanoate

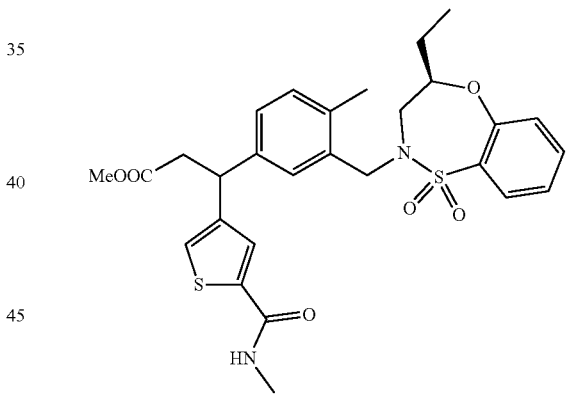

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (137.2 mg, 0.3 mmol), methyl (E)-3-[5-(methylcarbamoyl)thiophen-3-yl]acrylate (45.1 mg, 0.2 mmol), [RhCl(cod)]; (9.9 mg, 0.02 mmol), 1,4-dioxane/water (1/1) (0.8 mL), and TEA (84 µL, 0.6 mmol) were used as raw materials, and the same operation was performed as in Reference Example 130, thereby obtaining the title compound (77.5 mg, 70%) as a white solid.

$^1$H NMR (400 MHz, CDCl$_3$) δ 7.85 (1H, dd, J=8.0, 1.6 Hz), 7.52 (1H, td, J=8.0, 1.6 Hz), 7.31-7.30 (1H, m), 7.25 (1H, t, J=8.0 Hz), 7.21 (1H, d, J=8.0 Hz), 7.11-7.05 (4H, m), 6.37 (1H, br s), 4.51-4.47 (2H, m), 4.02-3.95 (1H, m), 3.84-3.70 (2H, m), 3.58 (3H, s), 3.05-2.92 (3H, m), 2.89 (3H, d, J=4.8 Hz), 2.28 (3H, s), 1.74-1.61 (1H, m), 1.50-1.39 (1H, m), 1.08-1.07 (3H, m).

Reference Example 133

Production of methyl 3-(3-(((R)-4-ethyl-1,1-dioxide-3,4-dihydro-2H-benzo[b][1,4,5]oxathiazepin-2-yl)methyl)-4-methylphenyl)-3-(3-methyl-5-(methylcarbamoyl)thiophen-2-yl)propanoate

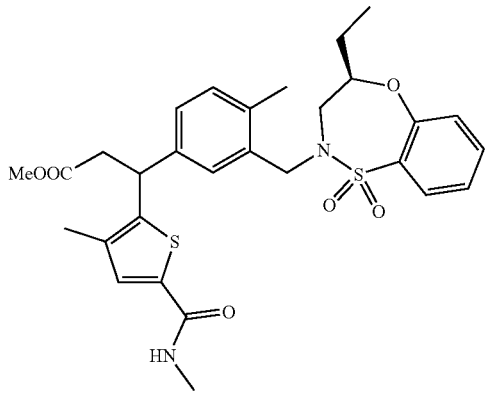 [SMILES: CC[C@@H]1CN(Cc2cc(C(CC(=O)OC)c3sc(C(=O)NC)cc3C)ccc2C)S(=O)(=O)c2ccccc2O1]

(R)-4-ethyl-2-(2-methyl-5-(4,4,5,5-tetramethyl-1,3,2-dioxaborolan-2-yl)benzyl)-3,4-dihydro-2H-benzo[b][1,4,5]oxathiazepine 1,1-dioxide (226.4 mg, 0.5 mmol), methyl (E)-3-[3-methyl-5-(methylcarbamoyl)thiophen-2-yl]acrylate (80 mg, 0.3 mmol), [RhCl(cod)]$_2$ (16.3 mg, 0.03 mmol), 1,4-dioxane/water (1/1) (1.6 mL), and TEA (138.4 μL, 1.0 mmol) were used as raw materials, and the same operation was performed as in Reference Example 130, thereby obtaining the title compound (148.1 mg, 78%) as a white solid.

$^1$H NMR (400 MHz, CDCl$_3$) δ 7.87 (1H, br d, J=8.0 Hz), 7.52 (1H, br t, J=8.0 Hz), 7.26 (1H, d, J=8.0 Hz), 7.23-7.19 (1H, m), 7.17 (1H, br s), 7.14-7.11 (2H, m), 7.05 (1H, br d, J=5.6 Hz), 6.08 (1H, br s), 4.72 (1H, t, J=8.0 Hz), 4.56-4.55 (1H, m), 4.00-3.95 (1H, m), 3.78-3.68 (2H, m), 3.59 (3H, s), 2.99 (2H, dd, J=7.6, 7.6 Hz), 2.94-2.90 (4H, m), 2.33 (3H, br s), 2.10 (3H, s), 1.73-1.60 (1H, m), 1.45-1.38 (1H, m), 1.07-1.06 (3H, m).

Reference Example 134

Production of ethyl 3-(3-{[(R)-4-ethyl-1,1-dioxide-3,4-dihydro-2H-benzo[b][1,4,5]oxathiazepin-2-yl]methyl}-4-methylphenyl)-3-(thiazol-5-yl)propanoate

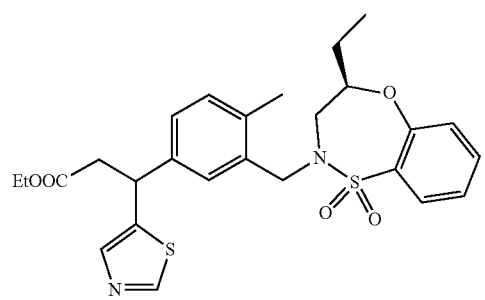 [SMILES: CCOC(=O)CC(c1ccc(C)c(CN2C[C@@H](CC)Oc3ccccc3S2(=O)=O)c1)c1cncs1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (206 mg, 0.45 mmol), ethyl (E)-3-(thiazol-5-yl)acrylate (55 mg, 0.3 mmol), [RhCl(cod)]$_2$ (15 mg, 0.03 mmol), 1,4-dioxane/water (1/1) (1.0 mL), and TEA (126 μL, 0.9 mmol) were used as raw materials, and the same operation was performed as in Reference Example 130, thereby obtaining the title compound (97.3 mg, 63%) as a pale red solid.

$^1$H NMR (400 MHz, CDCl$_3$) δ 8.80 (1H, s), 7.88 (1H, dd, J=7.6, 1.6 Hz), 7.63 (1H, d, J=3.6 Hz), 7.52 (1H, td, J=7.6, 2.0 Hz), 7.25 (1H, td, J=7.6, 1.2 Hz), 7.20 (1H, dd, J=8.0, 0.8 Hz), 7.17-7.12 (2H, m), 7.08 (1H, d, J=7.6 Hz), 4.77 (1H, t, J=8.0 Hz), 4.57 (1H, dd, J=14.0, 5.2 Hz), 4.09-3.98 (3H, m), 3.83-3.69 (2H, m), 3.11-2.91 (3H, m), 2.34 (3H, br s), 1.71-1.65 (1H, m), 1.46-1.40 (1H, m), 1.16 (3H, t, J=7.2 Hz), 1.09-1.05 (3H, m).

Reference Example 135

Production of methyl 3-(3-{[(R)-4-ethyl-1,1-dioxide-3,4-dihydro-2H-benzo[b][1,4,5]oxathiazepin-2-yl]methyl}-4-methylphenyl)-3-(1-methyl-4-oxo-4,5,6,7-tetrahydro-1H-indol-2-yl)propanoate

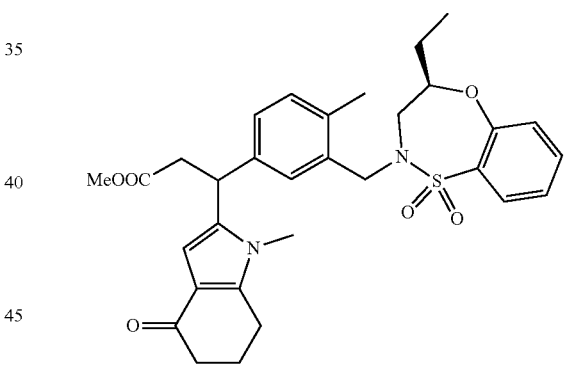

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (206 mg, 0.5 mmol), methyl (E)-3-(1-methyl-4-oxo-4,5,6,7-tetrahydro-1H-indol-2-yl)acrylate (70 mg, 0.3 mmol), [RhCl(cod)]$_2$ (15 mg, 0.03 mmol), 1,4-dioxane/water (1/1) (1.0 mL), and TEA (126 μL, 0.9 mmol) were used as raw materials, and the same operation was performed as in Reference Example 130, thereby obtaining the title compound (149.8 mg, 91%) as an oily pale yellow substance.

$^1$H NMR (400 MHz, CDCl$_3$) δ 7.87-7.82 (1H, m), 7.55-7.50 (1H, m), 7.28-7.19 (2H, m), 7.13-7.10 (1H, m), 7.06-7.01 (1H, m), 6.96 (1H, s), 6.48 (1H, d, J=4.0 Hz), 4.52-4.51 (1H, m), 4.41 (1H, t, J=8.0 Hz), 4.00-3.95 (1H, m), 3.80-3.72 (2H, m), 3.61 (1H, s), 3.23 (3H, br s), 3.04-2.87 (2H, m), 2.80-2.73 (1H, m), 2.67-2.62 (2H, m), 2.46-2.42 (2H, m), 2.34 (3H, br s), 2.14-2.10 (2H, m), 1.75-1.62 (1H, m), 1.50-1.39 (1H, m), 1.11-1.04 (3H, m).

Reference Example 136

Production of methyl 3-(5-acetyl-1-methyl-1H-pyrrol-2-yl)-3-(3-{[(R)-4-ethyl-1,1-dioxide-3,4-dihydro-2H-benzo[b][1,4,5]oxathiazepin-2-yl]methyl}-4-methylphenyl) propanoate

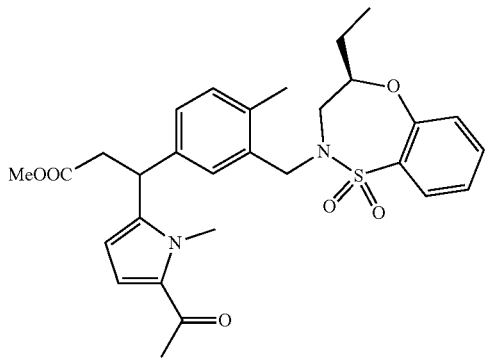 [SMILES: CC[C@@H]1CN(Cc2cc(C(CC(=O)OC)c3ccc(C(C)=O)n3C)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (206 mg, 0.5 mmol), methyl (E)-3-(5-acetyl-1-methyl-1H-pyrrol-2-yl)acrylate (62.2 mg, 0.3 mmol), [RhCl(cod)]$_2$ (15 mg, 0.03 mmol), 1,4-dioxane/water (1/1) (1.0 mL), and TEA (126 µL, 0.9 mmol) were used as raw materials, and the same operation was performed as in Reference Example 130, thereby obtaining the title compound (129.3 mg, 80%) as an oily colorless substance.

$^1$H NMR (400 MHz, CDCl$_3$) δ 7.88 (1H, dd, J=7.6, 1.6 Hz), 7.52 (1H, t, J=7.6 Hz), 7.25 (1H, t, J=7.6 Hz), 7.20 (1H, d, J=7.6 Hz), 7.12-7.10 (1H, m), 7.02-6.92 (3H, m), 6.13 (1H, d, J=4.4 Hz), 4.57-4.46 (2H, m), 4.00-3.93 (1H, m), 3.80-3.73 (1H, m), 3.68-3.65 (4H, m), 3.63 (3H, br s), 3.05-2.81 (3H, m), 2.39 (3H, s), 2.34-2.31 (3H, m), 1.74-1.61 (1H, m), 1.47-1.40 (1H, m), 1.09-1.05 (3H, m).

Reference Example 137

Production of methyl 3-(5-acetyl-3-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl) propanoate

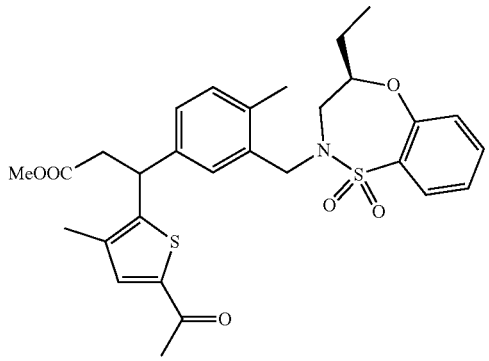 [SMILES: CC[C@@H]1CN(Cc2cc(C(CC(=O)OC)c3sc(C(C)=O)cc3C)ccc2C)S(=O)(=O)c2ccccc2O1]

(R)-4-ethyl-2-(2-methyl-5-(4,4,5,5-tetramethyl-1,3,2-dioxaborolan-2-yl)benzyl)-3,4-dihydro-2H-benzo[b][1,4,5]oxathiazepine 1,1-dioxide (206 mg, 0.5 mmol), methyl (E)-3-(5-acetyl-3-methylthiophen-2-yl)acrylate (67.3 mg, 0.3 mmol), [RhCl(cod)]$_2$ (15 mg, 0.03 mmol), 1,4-dioxane/water (1/1) (2.0 mL), and TEA (126 µL, 0.9 mmol) were used as raw materials, and the same operation was performed as in Reference Example 130, thereby obtaining the title compound (123.3 mg, 74%) as an oily pale yellow substance.

$^1$H NMR (400 MHz, CDCl$_3$) δ7.87 (1H, dt, J=8.0, 2.0 Hz), 7.52 (1H, br t, J=8.0 Hz), 7.38 (1H, s), 7.28-7.20 (2H, m), 7.17-7.12 (2H, m), 7.05 (1H, d, J=8.0 Hz), 4.74-4.73 (1H, m), 4.58-4.55 (1H, m), 4.03-3.95 (1H, m), 3.80-3.66 (2H, m), 3.60 (3H, br s), 3.07-2.86 (3H, m), 2.46 (3H, br s), 2.35 (3H, br s), 2.16 (3H, s), 1.74-1.60 (1H, m), 1.46-1.36 (1H, m), 1.08-1.07 (3H, m).

Reference Example 138

Production of methyl 3-(5-acetyl-4-fluorothiophen-2-yl)-3-(3-{[(R)-4-ethyl-1,1-dioxide-3,4-dihydro-2H-benzo[b][1,4,5]oxathiazepin-2-yl]methyl}-4-methylphenyl) propanoate

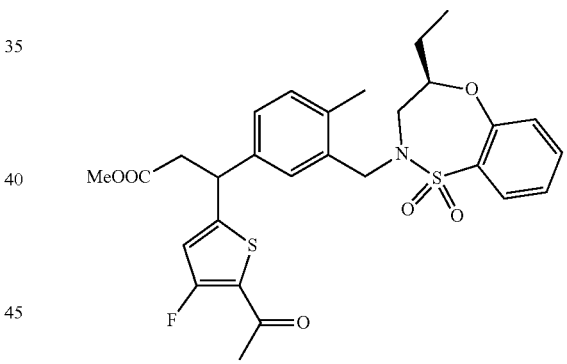

(R)-4-ethyl-2-[2-methyl-5-(4,4,5,5-tetramethyl-1,3,2-dioxaborolan-2-yl)benzyl)-3,4-dihydro-2H-benzo[b][1,4,5]oxathiazepine 1,1-dioxide (75.5 mg, 0.17 mmol), methyl (E)-3-(5-acetyl-4-fluorothiophen-2-yl)acrylate (51.3 mg, 0.23 mmol), [RhCl(cod)]$_2$ (5.4 mg, 0.011 mmol), 1,4-dioxane/water (1/1) (0.9 mL), and TEA (69 µL, 0.49 mmol) were used as raw materials, and the same operation was performed as in Reference Example 130, thereby obtaining the title compound (53.6 mg, 56%) as a pale yellow solid.

$^1$H NMR (400 MHz, CDCl$_3$) δ 7.88 (1H, dd, J=8.0, 1.6 Hz), 7.52 (1H, td, J=8.0, 1.6 Hz), 7.26 (1H, td, J=8.0, 1.2 Hz), 7.21 (1H, dd, J=8.0, 1.2 Hz), 7.18-7.07 (3H, m), 6.64 (1H, s), 4.61-4.53 (2H, m), 4.06-3.98 (1H, m), 3.87-3.69 (2H, m), 3.63 (3H, s), 3.09-2.94 (3H, m), 2.50 (3H, br s), 2.35 (3H, br s), 1.74-1.65 (1H, m), 1.49-1.42 (1H, m), 1.08-1.07 (3H, m).

Reference Example 139

Production of methyl 3-{5-[(2,4-dimethoxybenzyl)carbamoyl]thiophen-2-yl}-3-(3-{[(R)-4-ethyl-1,1-dioxide-3,4-dihydro-2H-benzo[b][1,4,5]oxathiazepin-2-yl]methyl}-4-methylphenyl) propanoate

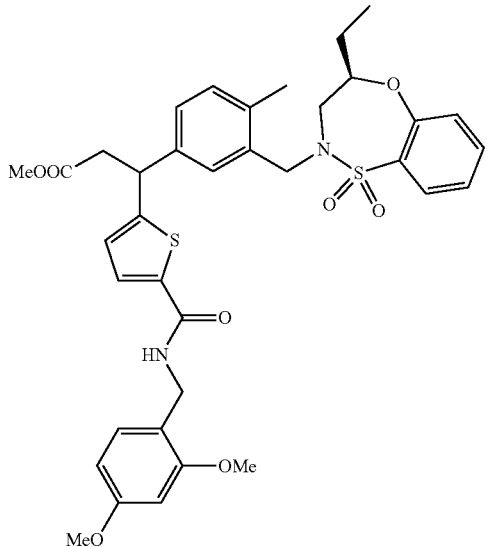 [SMILES: CC[C@@H]1CN(Cc2cc(C(CC(=O)OC)c3ccc(C(=O)NCc4ccc(OC)cc4OC)s3)ccc2C)S(=O)(=O)c2ccccc2O1]

(R)-4-ethyl-2-[2-methyl-5-(4,4,5,5-tetramethyl-1,3,2-dioxaborolan-2-yl)benzyl)-3,4-dihydro-2H-benzo[b][1,4,5] oxathiazepine 1,1-dioxide (150 mg, 0.328 mmol), methyl (E)-3-(5-[(2,4-dimethoxybenzyl) carbamoyl]thiophen-2-yl) acrylate (80 mg, 0.22 mmol), [RhCl(cod)]$_2$ (10.8 mg, 0.022 nmol), 1,4-dioxane/water (1/1) (1.0 mL), and TEA (92.2 μL, 0.66 mnol) were used as raw materials, and the same operation was performed as in Reference Example 130, thereby obtaining the title compound (112.4 mg, 74%) as an oily pale brown substance.

$^1$H NMR (400 MHz, CDCl$_3$) δ 7.86 (1H, dd, J=8.0, 1.6 Hz), 7.51 (1H, br t, J=8.0 Hz), 7.27-7.24 (2H, m), 7.22-7.18 (2H, m), 7.13 (2H, br s), 7.04 (1H, br d, J=8.0 Hz), 6.76 (1H, br t, J=3.6 Hz), 6.45-6.40 (3H, m), 4.67 (1H, t, J=7.6 Hz), 4.56-4.55 (1H, m), 4.47 (2H, d, J=5.6 Hz), 3.99-3.93 (1H, m), 3.84-3.67 (8H, m), 3.59 (3H, s), 3.09-2.88 (3H, m), 2.33 (3H, s), 1.67-1.58 (1H, m), 1.44-1.36 (1H, m), 1.04-1.03 (3H, m).

Reference Example 140

Production of methyl 3-(5-acetyl-4-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl) propanoate

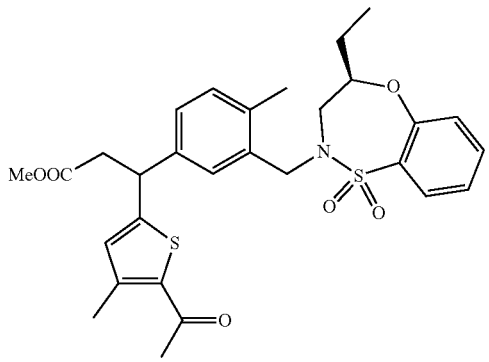 [SMILES: CC[C@@H]1CN(Cc2cc(C(CC(=O)OC)c3cc(C)c(C(C)=O)s3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5] oxathiazepine 1,1-dioxide (150 mg, 0.3 mmol), methyl (E)-3-(5-acetyl-4-methylthiophen-2-yl)acrylate (50 mg, 0.2 mmol), [RhCl(cod)]$_2$ (10.8 mg, 0.02 mmol), 1,4-dioxane/water (1/1) (1.0 mL), and TEA (92.2 IL, 0.7 mmol) were used as raw materials, and the same operation was performed as in Reference Example 130, thereby obtaining the title compound (77.9 mg, 64%) as a pale yellow solid.

$^1$H NMR (400 MHz, CDCl$_3$) δ 7.89-7.86 (1H, m), 7.52 (1H, br t, J=8.0 Hz), 7.28-7.08 (5H, m), 6.69 (1H, br s), 4.66 (1H, t, J=7.6 Hz), 4.60-4.48 (1H, m), 4.04-3.97 (1H, m), 3.85-3.70 (2H, m), 3.62-3.60 (3H, m), 3.12-2.87 (3H, m), 2.45-2.42 (3H, m), 2.35-2.31 (3H, m), 1.73-1.63 (1H, m), 1.47-1.39 (1H, m), 1.08-1.05 (3H, m).

Reference Example 141

Production of methyl 3-(4-acetyl-1,3,5-trimethyl-1H-pyrrol-2-yl)-3-(3-{[(R)-4-ethyl-1,1-dioxide-3,4-dihydro-2H-benzo[b][1,4,5]oxathiazepin-2-yl]methyl}-4-methylphenyl)propanoate

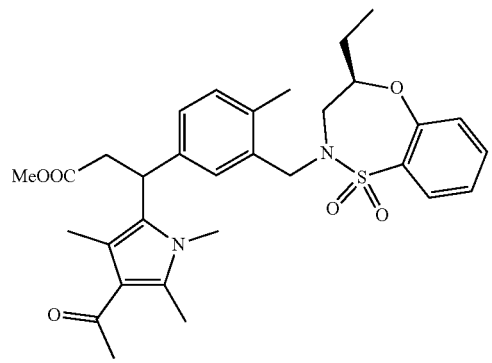 [SMILES: CC[C@@H]1CN(Cc2cc(C(CC(=O)OC)c3c(C)c(C(C)=O)c(C)n3C)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5] oxathiazepine 1,1-dioxide (93.3 mg, 0.20 mmol), methyl (E)-3-(4-acetyl-1,3,5-trimethyl-1H-pyrrol-2-yl) acrylate (30 mg, 0.14 mmol), [RhCl(cod)]$_2$ (7.0 mg, 0.014 mmol), 1,4-dioxane/water (1/1) (0.8 mL), and TEA (57 μL, 0.41 mmol) were used as raw materials, and the same operation was performed as in Reference Example 130, thereby obtaining the title compound (20.1 mg, 26%) as an oily colorless substance.

$^1$H NMR (400 MHz, CDCl$_3$) δ 7.89-7.85 (1H, m), 7.52 (1H, td, J=8.0, 1.6 Hz), 7.25 (1H, t, J=8.0 Hz), 7.20 (1H, d, J=8.0 Hz), 7.11 (1H, br d, J=8.0 Hz), 7.01-6.93 (2H, m), 4.85-4.80 (1H, m), 4.55-4.51 (1H, m), 3.99-3.94 (1H, m), 3.80-3.69 (2H, m), 3.65 (3H, br s), 3.25-3.17 (4H, m), 2.99-2.88 (2H, m), 2.43-2.42 (6H, m), 2.34-2.32 (3H, m), 2.22 (3H, s), 1.75-1.61 (1H, m), 1.48-1.32 (1H, m), 1.07-1.05 (3H, m).

Reference Example 142

Production of methyl 3-(5-acetyl-1-ethyl-1H-pyrrol-2-yl)-3-(3-{[(R)-4-ethyl-1,1-dioxide-3,4-dihydro-2H-benzo[b][1,4,5]oxathiazepin-2-yl]methyl}-4-methylphenyl)propanoate

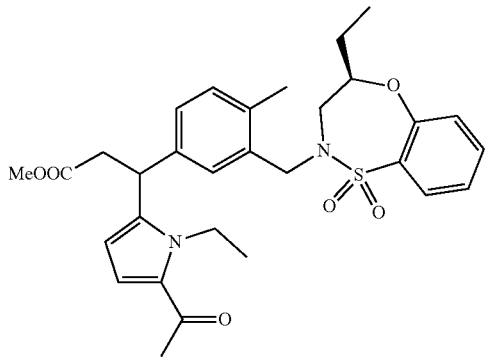 [SMILES: CC[C@@H]1CN(Cc2cc(C(CC(=O)OC)c3ccc(C(C)=O)n3CC)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (123.5 mg, 0.27 mmol), methyl (E)-3-(5-acetyl-1-ethyl-1H-pyrrol-2-yl)acrylate (40 mg, 0.18 mmol), [RhCl(cod)]$_2$ (9.0 mg, 0.018 mmol), 1,4-dioxane/water (1/1) (0.8 mL), and TEA (75.5 μL, 0.54 mmol) were used as raw materials, and the same operation was performed as in Reference Example 130, thereby obtaining the title compound (37.2 mg, 37%) as an oily pale yellow substance.

$^1$H NMR (400 MHz, CDCl$_3$) δ 7.89 (1H, dd, J=8.0, 1.6 Hz), 7.52 (1H, td, J=8.0, 1.6 Hz), 7.25 (1H, t, J=8.0 Hz), 7.20 (1H, d, J=8.0 Hz), 7.15-7.08 (3H, m), 6.70 (1H, dd, J=4.8, 2.0 Hz), 6.62 (1H, dd, J=4.8, 2.0 Hz), 4.55 (1H, d, J=14.0 Hz), 4.35 (1H, t, J=8.0 Hz), 4.26 (1H, q, J=7.2 Hz), 4.03-3.99 (1H, m), 3.84-3.70 (2H, m), 3.60 (3H, s), 3.00-2.93 (2H, m), 2.90-2.82 (1H, m), 2.36 (3H, s), 2.33 (3H, s), 1.73-1.63 (1H, m), 1.47-1.39 (1H, m), 1.30 (3H, t, J=7.2 Hz), 1.07 (3H, t, J=7.2 Hz).

Reference Example 143

Production of methyl 3-[5-(cyclopropanecarbonyl)thiophen-2-yl]-3-(3-{[(R)-4-ethyl-1,1-dioxide-3,4-dihydro-2H-benzo[b][1,4,5]oxathiazepin-2-yl]methyl}-4-methylphenyl)propanoate

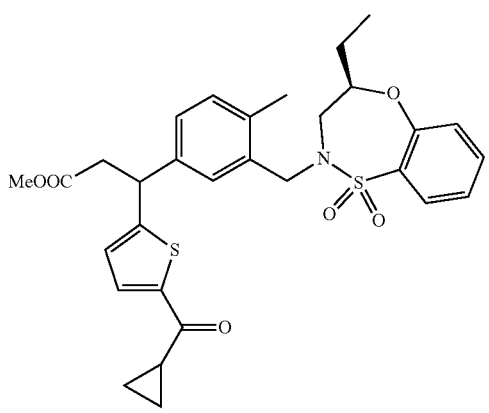 [SMILES: CC[C@@H]1CN(Cc2cc(C(CC(=O)OC)c3ccc(C(=O)C4CC4)s3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (99 mg, 0.2 mmol), methyl (E)-3-[5-(cyclopropanecarbonyl)thiophen-2-yl]acrylate (34 mg, 0.14 mmol), [RhCl(cod)]$_2$ (7.1 mg, 0.014 mmol), 1,4-dioxane/water (1/1) (0.8 mL), and TEA (60 μL, 0.43 mmol) were used as raw materials, and the same operation was performed as in Reference Example 130, thereby obtaining the title compound (45.5 mg, 56%) as an oily colorless substance.

$^1$H NMR (400 MHz, CDCl$_3$) δ 7.88 (1H, dd, J=7.6, 1.6 Hz), 7.63 (1H, d, J=3.6 Hz), 7.52 (1H, td, J=7.6, 1.6 Hz), 7.25 (1H, dd, J=7.6, 0.8 Hz), 7.22 (1H, br d, J=7.6 Hz), 7.15 (2H, br s), 7.06 (1H, d, J=10.4 Hz), 6.90-6.88 (1H, m), 4.73 (1H, t, J=7.6 Hz), 4.60-4.54 (1H, m), 4.00-3.97 (1H, m), 3.81-3.77 (1H, m), 3.76-3.71 (1H, m), 3.61 (3H, s), 3.14-2.89 (3H, m), 2.47-2.43 (1H, m), 2.35 (3H, br s), 1.70-1.61 (1H, m), 1.44-1.39 (1H, m), 1.21-1.17 (2H, m), 1.06 (3H, t, J=7.2 Hz), 1.00-0.96 (2H, m).

Reference Example 144

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(2-methyl-1,3-dioxolan-2-yl)thiophen-2-yl]propanoate

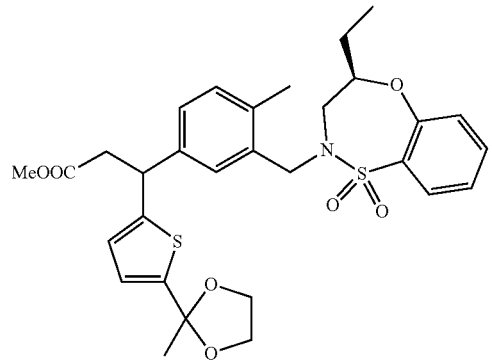 [SMILES: CC[C@@H]1CN(Cc2cc(C(CC(=O)OC)c3ccc(C4(C)OCCO4)s3)ccc2C)S(=O)(=O)c2ccccc2O1]

TEA (132 μL, 0.95 mmol) was added under argon atmosphere to a 1,4-dioxane/water (1/1) (1.7 mL) mixed solution of (R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (216 mg, 0.47 mmol), methyl (E)-3-[5-(2-methyl-1,3-dioxolan-2-yl)thiophen-2-yl]acrylate (80 mg, 0.32 mmol), and [RhCl(cod)]$_2$ (15.5 mg, 0.032 mnol), and the mixture was heated under microwave irradiation at 140° C. for 2 hours. Water was added to the mixture, followed by extraction with ethyl acetate. The organic layer was washed with saturated saline and dried over sodium sulfate, and the solvent was concentrated under reduced pressure. The residue was purified by silica gel column chromatography (hexane/ethyl acetate (v/v)=9/1→7/3), thereby obtaining the title compound (90.9 mg, 49%) as an oily colorless substance.

$^1$H NMR (400 MHz, CDCl$_3$) δ 7.89 (1H, dd, J=8.0, 1.6 Hz), 7.52 (1H, td, J=8.0, 1.6 Hz), 7.26 (1H, br t, J=8.0 Hz), 7.21 (1H, dd, J=8.0, 1.6 Hz), 7.14 (2H, br s), 7.06 (1H, s), 6.81 (1H, d, J=3.6 Hz), 6.62 (1H, d, J=3.6 Hz), 4.63 (1H, t, J=8.0 Hz), 4.58 (1H, d, J=14.0 Hz), 4.03-3.96 (3H, m), 3.93-3.90 (2H, m), 3.81-3.77 (1H, m), 3.73 (1H, dd, J=15.2, 10.8 Hz), 3.59 (3H, s), 3.10-3.07 (1H, m), 3.00-2.93 (2H, m), 2.35 (3H, s), 1.76-1.61 (1H, m), 1.70 (3H, s), 1.49-1.41 (1H, m), 1.11.06 (3H, m).

Reference Example 145

Production of methyl 3-(5-cyanothiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate

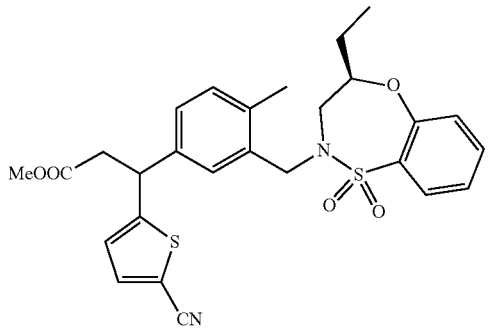 [SMILES: CC[C@@H]1CN(Cc2cc(C(CC(=O)OC)c3ccc(C#N)s3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (137.2 mg, 0.3 mmol), methyl (E)-3-(5-cyanothiophen-2-yl)acrylate (38.6 mg, 0.2 mmol), [RhCl(cod)]₂ (9.9 mg, 0.02 mmol), 1,4-dioxane/water (1/1) (0.8 mL), and TEA (83.9 μL, 0.6 mmol) were used as raw materials, and the same operation was performed as in Reference Example 130, thereby obtaining the title compound (22.2 mg, 21%) as a white solid.

¹H NMR (400 MHz, CDCl₃) δ 7.88 (1H, dd, J=7.6, 1.6 Hz), 7.53 (1H, td, J=7.6, 1.6 Hz), 7.44 (1H, dd, J=4.0, 0.8 Hz), 7.28-7.16 (3H, m), 7.13-7.10 (2H, m), 6.85 (1H, br d, J=4.0 Hz), 4.73 (1H, t, J=7.6 Hz), 4.58-4.52 (1H, m), 4.06-3.98 (1H, m), 3.88-3.81 (1H, m), 3.76-3.69 (1H, m), 3.63 (3H, s), 3.13-2.93 (3H, m), 2.34 (3H, br s), 1.77-1.64 (1H, m), 1.50-1.39 (1H, m), 1.12-1.06 (3H, m).

Reference Example 146

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[4-methyl-5-(2-methyl-1,3-dioxolan-2-yl)thiophen-2-yl]propanoate

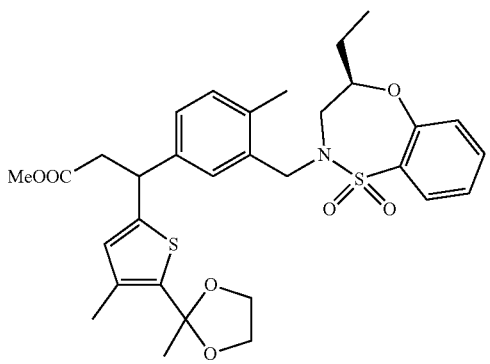 [SMILES: CC[C@@H]1CN(Cc2cc(C(CC(=O)OC)c3cc(C)c(C4(C)OCCO4)s3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (499.7 mg, 1.1 mmol), methyl (E)-3-[4-methyl-5-(2-methyl-1,3-dioxolan-2-yl)thiophen-2-yl]acrylate (146.8 mg, 1.1 mmol), and [RhCl(cod)]₂ (17.1 mg, 0.035 mmol) were purged with an argon atmosphere. 1,4-Dioxane/water (1/1) (1.2 mL) and TEA (250 μL, 1.8 mmol) were added, and the mixture was heated under microwave irradiation at 120° C. for 1.5 hours. The reaction solution was returned to room temperature, diluted with ethyl acetate, and washed with water and saturated saline, and the solvent was distilled under reduced pressure. The obtained residue was purified by silica gel column chromatography (ethyl acetate/hexane/TEA=23/75/2), thereby obtaining the title compound (204.3 mg, 62%) as a light yellow solid.

¹H NMR (400 MHz, CDCl₃) δ 7.89 (1H, dd, J=8.0, 1.6 Hz), 7.52 (1H, t, J=7.6 Hz), 7.28-7.24 (1H, m), 7.22 (1H, d, J=8.0 Hz), 7.14 (2H, s), 7.06 (1H, s), 6.45 (1H, s), 4.60-4.53 (2H, m), 4.06-3.95 (3H, m), 3.92-3.86 (2H, m), 3.79 (1H, br d, J=14.0 Hz), 3.74-3.72 (1H, m), 3.58 (3H, s), 3.05-3.01 (1H, m), 3.00-2.89 (2H, m), 2.35 (3H, s), 2.18 (3H, s), 1.74-1.64 (1H, m), 1.67 (3H, s), 1.52-1.42 (1H, m), 1.09-1.08 (3H, m).

Reference Example 147

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(2-methyl-1,3-dioxolan-2-yl)thiazol-2-yl]propanoate

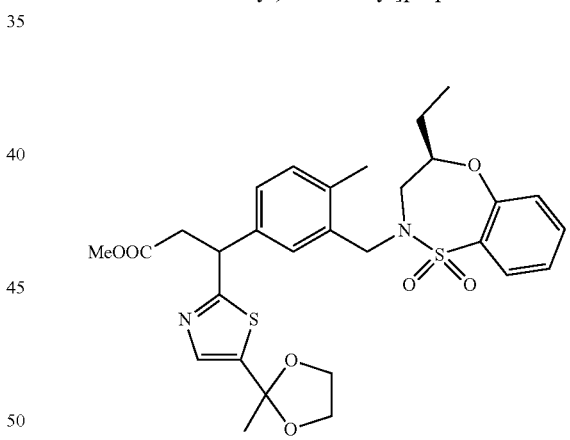

TEA (66 μL, 0.47 mmol) was added to a 1,4-dioxane/water (2/1) (0.5 mL) solution of (R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (56.7 mg, 0.13 mmol), methyl (E)-3-[5-(2-methyl-1,3-dioxolan-2-yl)thiazol-2-yl]acrylate (21.8 mg, 0.085 mmol), and [RhCl(cod)]₂ (7.1 mg, 0.016 mmol), and the mixture was heated under microwave irradiation at 50° C. for 4 hours. The reaction solution was returned to room temperature, diluted with ethyl acetate, washed with water, and dried over sodium sulfate, and the solvent was distilled under reduced pressure. The obtained residue was purified by silica gel column chromatography (hexane/ethyl acetate (v/v)=91/9→70/30), thereby obtaining the title compound (23.7 mg, 47%) as an oily colorless and transparent substance.

$^1$H NMR (400 MHz, CDCl$_3$) δ 7.89 (1H, dd, J=7.6, 1.2 Hz), 7.56 (1H, s), 7.52 (1H, td, J=8.0, 1.2 Hz), 7.24-7.24 (1H, m), 7.22-7.15 (3H, m), 7.13-7.12 (1H, m), 4.72 (1H, t, J=7.6 Hz), 4.58-4.57 (1H, d, J=14.0 Hz), 4.05-3.98 (2H, m), 3.94-3.88 (2H, m), 3.81-3.79 (1H, m), 3.74-3.71 (1H, m), 3.61 (3H, s), 3.42-3.35 (1H), 3.01-2.92 (2H, m), 2.36 (3H, s), 1.74-1.63 (1H, m), 1.70 (3H, s), 1.53-1.38 (1H, m), 1.09 (3H, t, J=7.6 Hz).

Reference Example 148

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[4-methyl-5-(2-methyl-1,3-dioxolan-2-yl) thiazol-2-yl]propanoate

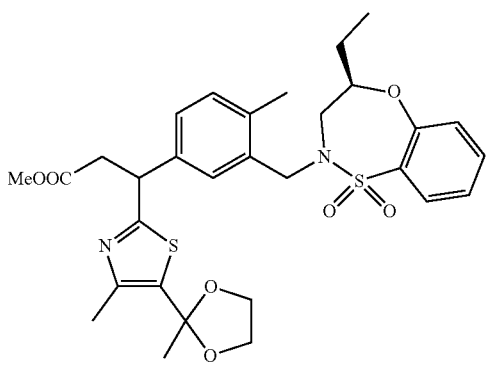

TEA (70 µL, 0.5 mmol) was added to a 1,4-dioxane/water (2/1) (0.5 mL) solution of (R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (62.6 mg, 0.1 mmol), methyl (E)-3-[4-methyl-5-(2-methyl-1,3-dioxolan-2-yl) thiazol-2-yl]acrylate (13.7 mg, 0.05 mmol), and [RhCl(cod)]$_2$ (6.3 mg, 0.01 mmol), and the mixture was heated under microwave irradiation at 50° C. for 4 hours. The reaction solution was returned to room temperature, diluted with ethyl acetate, washed with water and saturated saline, and dried over sodium sulfate, and the solvent was distilled under reduced pressure. The obtained residue was purified by silica gel column chromatography (hexane/ethyl acetate (v/v)=68/32→147/53), thereby obtaining the title compound (32.8 mg, quant.) as an oily colorless and transparent substance.

$^1$H NMR (400 MHz, CDCl$_3$) δ 7.90 (1H, d, J=7.6 Hz), 7.52 (1H t, J=7.2 Hz), 7.28-7.20 (3H, m), 7.17-7.14 (2H, m), 4.68-4.63 (1H, m), 4.58 (1H, d, J=14.0 Hz) 4.06-3.94 (3H, m), 3.88-3.79 (3H, m), 3.76-3.70 (1H, m), 3.60 (3H, s), 3.35 (1H, dt, J=16.0, 6.0 Hz), 3.00-2.93 (2H, m), 2.41 (3H, s), 2.36 (3H, s), 1.74-1.66 (4H, m), 1.51-1.45 (1H, m), 1.09 (3H, t, J=7.2 Hz).

Reference Example 149

Production of methyl 3-(3-{[(R)-4-ethyl-1,1-dioxide-3,4-dihydro-2H-benzo[b][1,4,5]oxathiazepin-2-yl]methyl}-4-methylphenyl)-3-(6-oxo-5,6-dihydro-4H-thieno[2,3-c]pyrrol-2-yl) propanoate

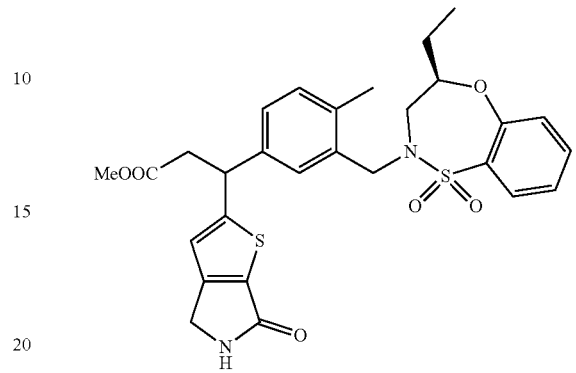

TEA (100 µL, 0.7 mmol) was added to a 1,4-dioxane/water (2/1) (0.7 mL) solution of (R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (64.6 mg, 0.1 mmol), methyl (E)-3-(oxo-5,6-dihydro-4H-thieno[2,3-c]pyrrol-2-yl)acrylate (16.2 mg, 0.07 mmol), and [RhCl(cod)]$_2$ (7.6 mg, 0.02 mmol), and the mixture was heated under microwave irradiation at 50° C. for 3 hours. The reaction solution was cooled to room temperature, then diluted with ethyl acetate, and washed with water and saturated saline. The obtained organic layer was dried over sodium sulfate, and the solvent was distilled under reduced pressure. The obtained residue was purified by silica gel column chromatography (hexane/ethyl acetate (v/v)=9/1→0/100), thereby obtaining the title compound (20.1 mg, 50%) as an oily brown substance.

$^1$H NMR (400 MHz, CDCl$_3$) δ 7.88 (1H, d, J=7.6 Hz), 7.52 (1H, t, J=7.6 Hz), 7.27-7.18 (2H, m), 7.16 (2H, s), 7.11 (1H, d, J=3.6 Hz), 6.80 (1H, s), 6.47 (1H, s), 4.75 (1H, t, J=8.0 Hz), 4.56 (1H, d, J=14.4 Hz), 4.28 (2H, s), 4.04-3.97 (1H, m), 3.83-3.81 (1H, m), 3.75-3.68 (1H, m), 3.62 (3H, s), 3.12 (1H, dd, J=15.6, 8.0 Hz), 3.03 (1H, dd, J=15.6, 8.0 Hz), 2.96-2.94 (1H, m), 2.33 (3H, s), 1.73-1.64 (1H, m), 1.47-1.39 (1H, m), 1.07-1.06 (3H, m).

Reference Example 150

Production of methyl 3-(5-acetylfuran-2-yl)-3-(3-{[(R)-4-ethyl-1,1-dioxide-3,4-dihydro-2H-benzo[b][1,4,5]oxathiazepin-2-yl]methyl}-4-methylphenyl)propanoate

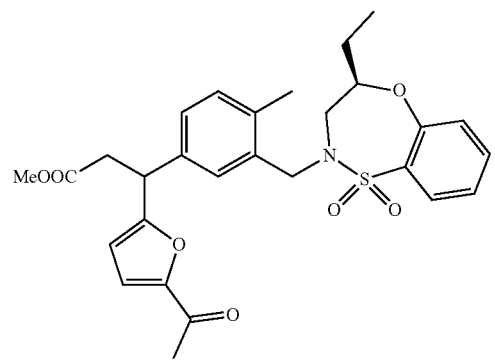 [SMILES: CC[C@@H]1CN(Cc2cc(C(CC(=O)OC)c3ccc(C(C)=O)o3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (120 mg, 0.3 mmol), methyl (E)-3-(5-acetylfuran-2-yl)acrylate (60.2 mg, 0.3 mmol), [RhCl(cod)]$_2$ (6.4 mg, 0.01 mmol), 1,4-dioxane/water (3/1) (0.4 mL), and TEA (109 µL, 0.8 mmol) were used as raw materials, and the same operation was performed as in Reference Example 130, thereby obtaining the title compound (29.9 mg, 22%) as an oily colorless substance.

$^1$H NMR (400 MHz, CDCl$_3$) δ 7.88 (1H, dd, J=7.6, 1.6 Hz), 7.52 (1H, td, J=7.6, 1.6 Hz), 7.25 (1H, td, J=7.6, 1.2 Hz), 7.20 (1H, d, J=8.4 Hz), 7.16-7.11 (3H, m), 7.07 (1H, d, J=3.6 Hz), 6.16 (1H, t, J=3.6 Hz), 4.59-4.52 (2H, m), 4.05-3.99 (1H, m), 3.83-3.81 (1H, m), 3.76-3.69 (1H, m), 3.62 (3H, s), 3.17-3.11 (1H, m), 3.00-2.88 (2H, m), 2.40 (3H, s), 2.32 (3H, br s), 1.74-1.66 (1H, m), 1.50-1.41 (1H, m), 1.08-1.07 (3H, m).

Reference Example 151

Production of methyl 3-(5-acetylthiophen-3-yl)-3-(3-{[(R)-4-ethyl-1,1-dioxide-3,4-dihydro-2H-benzo[b][1,4,5]oxathiazepin-2-yl]methyl}-4-methylphenyl)propanoate

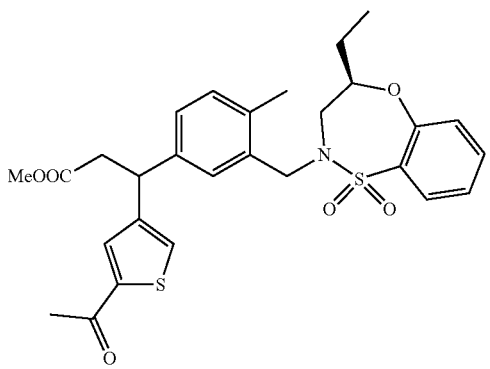 [SMILES: CC[C@@H]1CN(Cc2cc(C(CC(=O)OC)c3csc(C(C)=O)c3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (150 mg, 0.33 mmol), methyl (E)-3-(5-acetylthiophen-3-yl)acrylate (102.5 mg, 0.39 mmol), [RhCl(cod)]$_2$ (8.1 mg, 0.016 mmol), 1,4-dioxane/water (3/1) (0.7 mL), and TEA (138 µL, 0.98 mmol) were used as raw materials, and the same operation was performed as in Reference Example 130, thereby obtaining the title compound (52.0 mg, 29%) as an oily pale yellow substance.

$^1$H NMR (400 MHz, CDCl$_3$) δ 7.87 (1H, dd, J=8.0, 1.6 Hz), 7.51 (1H, td, J=8.0, 1.6 Hz), 7.45 (1H, dd, J=3.2, 1.2 Hz), 7.29 (1H, br s), 7.24 (1H, td, J=8.0, 1.2 Hz), 7.20 (1H, br d, J=8.0 Hz), 7.14-7.12 (1H, m), 7.09-7.06 (2H, m), 4.55-4.51 (2H, m), 4.03-3.96 (1H, m), 3.84-3.66 (2H, m), 3.60 (3H, s), 3.06-3.00 (1H, m), 2.98-2.90 (2H, m), 2.48 (3H, s), 2.31 (3H, br s), 1.72-1.62 (1H, m), 1.46-1.37 (1H, m), 1.06 (3H, t, J=7.2 Hz).

Reference Example 152

Production of methyl 3-(4-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl) propanoate

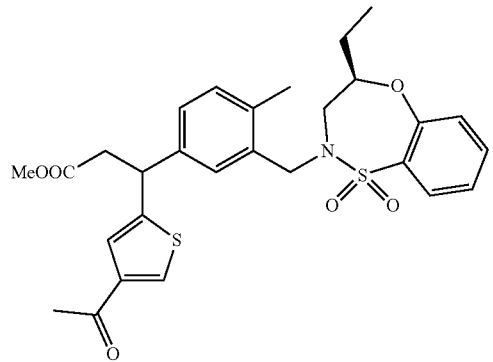 [SMILES: CC[C@@H]1CN(Cc2cc(C(CC(=O)OC)c3cc(C(C)=O)cs3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (150 mg, 0.33 mmol), methyl (E)-3-(4-acetylthiophen-2-yl)acrylate (102.5 mg, 0.39 mmol), [RhCl(cod)]$_2$ (8.1 mg, 0.016 mmol), 1,4-dioxane/water (3/1) (0.7 mL), and TEA (138 µL, 0.98 mmol) were used as raw materials, and the same operation was performed as in Reference Example 130, thereby obtaining the title compound (25.5 mg, 14%) as an oily brown substance.

$^1$H NMR (400 MHz, CDCl$_3$) δ 7.88 (1H, dd, J=8.0, 1.6 Hz), 7.84 (1H, d, J=1.6 Hz), 7.52 (1H, br t, J=8.0 Hz), 7.27-7.19 (3H, m), 7.16-7.11 (2H, m), 7.05 (1H, d, J=10.4 Hz), 4.66 (1H, t, J=7.6 Hz), 4.57-4.56 (1H, m), 4.00-3.97 (1H, m), 3.82-3.68 (2H, m), 3.61 (3H, s), 3.10 (1H, dd, J=15.6, 7.6 Hz), 3.01-2.99 (2H, m), 2.46 (3H, s), 2.35 (3H, br s), 1.72-1.62 (1H, m), 1.48-1.36 (1H, m), 1.06 (3H, t, J=7.6 Hz).

Reference Example 153

Production of methyl 3-(5-cyano-1-methyl-1H-pyrrol-3-yl)-3-(3-{[(R)-4-ethyl-1,1-dioxide-3,4-dihydro-2H-benzo[b][1,4,5]oxathiazepin-2-yl]methyl}-4-methylphenyl)propanoate

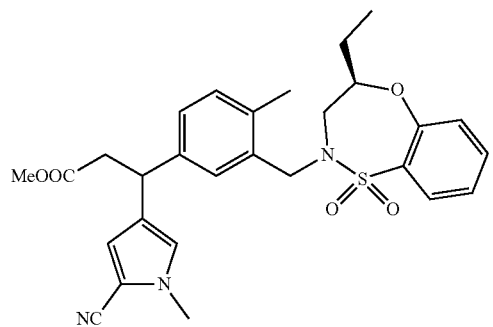 [SMILES: CC[C@@H]1CN(Cc2cc(C(CC(=O)OC)c3cc(C#N)n(C)c3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (150 mg, 0.33 mmol), methyl (E)-3-(5-cyano-1-methyl-1H-pyrrol-3-yl)acrylate (74 mg, 0.39 mmol), [RhCl(cod)]₂ (8.1 mg, 0.016 mmol), 1,4-dioxane/water (3/1) (0.7 mL), and TEA (138 µL, 0.98 mmol) were used as raw materials, and the same operation was performed as in Reference Example 130, thereby obtaining the title compound (52.4 mg, 30%) as an oily pale yellow substance.

¹H NMR (400 MHz, CDCl₃) δ 7.88 (1H, dd, J=8.0, 1.6 Hz), 7.52 (1H, td, J=8.0, 1.6 Hz), 7.25 (1H, td, J=8.0, 1.2 Hz), 7.21 (1H, d, J=8.0 Hz), 7.12 (1H, d, J=8.0 Hz), 7.08-7.04 (2H, m), 6.56-6.53 (2H, m), 4.54-4.53 (1H, m), 4.33 (1H, t, J=8.0 Hz), 4.05-3.98 (1H, m), 3.86-3.69 (2H, m), 3.68 (3H, s), 3.60 (3H, s), 2.99-2.79 (3H, m), 2.32 (3H, s), 1.75-1.66 (1H, m), 1.51-1.39 (1H, m), 1.09-1.08 (3H, m).

Reference Example 154

Production of methyl 3-(3-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl) propanoate

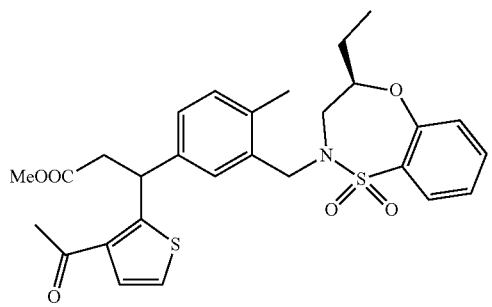 [SMILES: CC[C@@H]1CN(Cc2cc(C(CC(=O)OC)c3sccc3C(C)=O)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (110 mg, 0.2 mmol), methyl (E)-3-(3-acetylthiophen-2-yl)acrylate (61 mg, 0.3 mmol), [RhCl(cod)]₂ (5.9 mg, 0.01 mmol), 1,4-dioxane/water (9/1) (0.6 mL), and TEA (101 µL, 0.7 mmol) were used as raw materials, and the same operation was performed as in Reference Example 130, thereby obtaining the title compound (24.6 mg, 19%) as an oily pale brown substance.

¹H NMR (400 MHz, CDCl₃) δ 7.88 (1H, dd, J=8.0, 1.6 Hz), 7.52 (1H, br t, J=8.0 Hz), 7.34 (1H, d, J=5.6 Hz), 7.27-7.20 (3H, m), 7.16-7.10 (3H, m), 5.65 (1H, dd, J=8.0, 8.0 Hz), 4.61-4.59 (1H, m), 4.04-3.99 (1H, m), 3.80-3.72 (2H, m), 3.56 (3H, s), 3.13-3.07 (1H, m), 3.02-2.90 (2H, m), 2.49 (3H, s), 2.35 (3H, br s), 1.71-1.59 (1H, m), 1.51-1.42 (1H, m), 1.13-1.06 (3H, m).

Reference Example 155

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(2-methyl-1,3-dioxolan-2-yl)furan-2-yl]propanoate

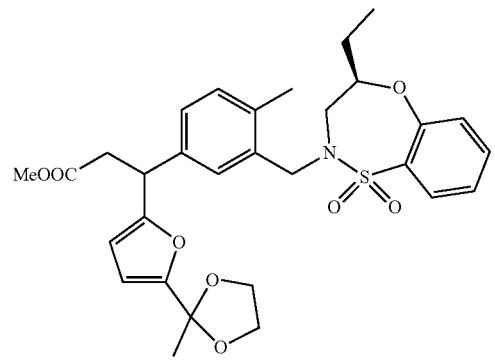 [SMILES: CC[C@@H]1CN(Cc2cc(C(CC(=O)OC)c3ccc(C4(C)OCCO4)o3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (115 mg, 0.25 mmol), methyl (E)-3-[5-(2-methyl-1,3-dioxolan-2-yl) furan-2-yl]acrylate (60 mg, 0.25 mmol), [RhCl(cod)]₂ (6.2 mg, 0.013 mmol), 1,4-dioxane/water (9/1) (0.4 mL), and TEA (106 µL, 0.76 mmol) were used as raw materials, and the same operation was performed as in Reference Example 130, thereby obtaining the title compound (13.5 mg, 9%) as an oily light yellow substance.

¹H NMR (400 MHz, CDCl₃) δ 7.89 (1H, dd, J=8.0, 1.6 Hz), 7.52 (1H, t, J=8.0 Hz), 7.25 (1H, t, J=8.0 Hz), 7.20 (1H, d, J=8.0 Hz), 7.13-7.12 (2H, m), 7.06 (1H, s), 6.17 (1H, d, J=3.2 Hz), 5.85 (1H, d, J=3.2 Hz), 4.56 (1H, d, J=14.0 Hz), 4.48 (1H, t, J=8.0 Hz), 4.04-3.93 (5H, m), 3.81-3.69 (2H, m), 3.60 (3H, s), 3.07 (1H, d, J=15.2, 7.2 Hz), 2.97 (1H, d, J=15.2 Hz), 2.88-2.80 (1H, m), 2.34 (3H, s), 1.75-1.65 (4H, m), 1.50-1.43 (1H, m), 1.08 (3H, t, J=7.2 Hz).

Reference Example 156

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[4-(2-methyl-1,3-dioxolan-2-yl)thiophen-2-yl]propanoate

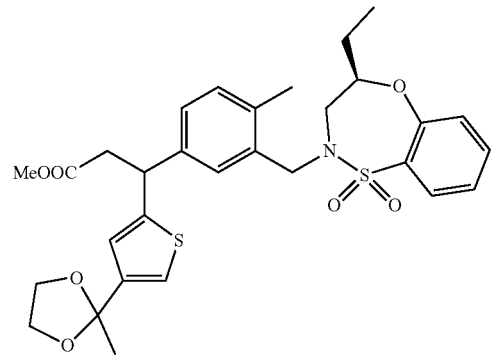 [SMILES: CC[C@@H]1CN(Cc2cc(C(CC(=O)OC)c3cc(C4(C)OCCO4)cs3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (165 mg, 0.36 mmol), methyl (E)-3-[4-(2-methyl-1,3-dioxolan-2-yl)thiophen-2-yl]acrylate (137 mg, 0.54 mmol), [RhCl(cod)]$_2$ (8.9 mg, 0.018 mmol), 1,4-dioxane/water (10/1) (0.77 mL), and TEA (151 μL, 1.08 mmol) were used as raw materials, and the same operation was performed as in Reference Example 130, thereby obtaining the title compound (83.4 mg, 40%) as an oily colorless substance.

$^1$H NMR (400 MHz, CDCl$_3$) δ 7.89 (1H, dd, J=8.0, 1.6 Hz), 7.51 (1H, td, J=8.0, 1.6 Hz), 7.25 (1H, br t, J=8.0 Hz), 7.20 (1H, br d, J=8.0 Hz), 7.15-7.14 (2H, m), 7.07 (2H, br s), 6.77 (1H, dt, J=4.8, 1.2 Hz), 4.64-4.62 (1H, m), 4.58-4.57 (1H, m), 4.03-3.96 (3H, m), 3.89-3.69 (4H, m), 3.59 (3H, s), 3.08 (1H, dd, J=15.6, 6.8 Hz), 3.00-2.93 (2H, m), 2.35 (3H, br s), 1.73-1.70 (1H, m), 1.62 (3H, s), 1.45-1.41 (1H, m), 1.09-1.07 (3H, m).

Reference Example 157

Production of methyl 3-(3-{[(R)-4-ethyl-1,1-dioxide-3,4-dihydro-2H-benzo[b][1,4,5]oxathiazepin-2-yl]methyl}-4-methylphenyl)-2-methyl-3-[5-(2-methyl-1,3-dioxolan-2-yl)thiophen-2-yl]propanoate

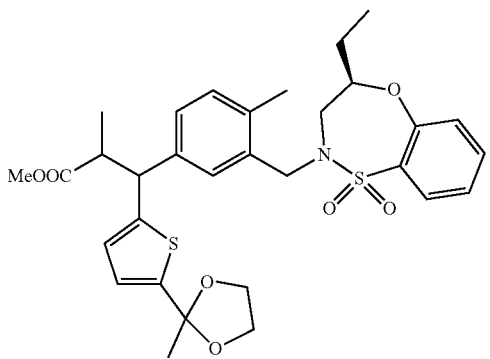 [SMILES: CC[C@@H]1CN(Cc2cc(C(c3ccc(C4(C)OCCO4)s3)C(C)C(=O)OC)ccc2C)S(=O)(=O)c2ccccc2O1]

A 1M LDA THF/hexane (150 μL, 0.15 mmol) solution was added under argon atmosphere at −78° C. to a THF (0.6 mL) solution of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(2-methyl-1,3-dioxolan-2-yl)thiophen-2-yl]propanoate (49.5 mg, 0.085 mmol). The reaction mixture was stirred at −78° C. for 30 minutes, and stirred at −40° C. for 20 minutes. Iodomethane (106 μL, 1.7 mmol) was added, and the mixture was heated to room temperature and stirred for 3 hours. Water was added to the mixture to stop the reaction, followed by extraction with ethyl acetate. The organic layer was washed with saturated saline and dried over sodium sulfate, and the solvent was concentrated under reduced pressure. The residue was purified by silica gel column chromatography (hexane/ethyl acetate (v/v)=9/1→7/3), thereby obtaining the title compound (40.1 mg, 79%) as an oily colorless substance. The title compound could be separated into two isomer mixtures; isomer 1 with a shorter retention time and isomer 2 with a longer retention time were obtained.

Isomer 1: $^1$H NMR (400 MHz, CDCl$_3$) δ 7.90 (1H, dd, J=8.0, 1.6 Hz), 7.53 (1H, td, J=8.0, 1.6 Hz), 7.26 (1H, br t, J=8.0 Hz), 7.22 (1H, dd, J=8.0, 1.6 Hz), 7.14 (2H, br s), 7.06 (1H, d, J=11.2 Hz), 6.77 (1H, dd, J=3.6, 0.8 Hz), 6.69 (1H, br d, J=3.6 Hz), 4.60-4.57 (1H, m), 4.28-4.25 (1H, m), 4.02-3.88 (5H, m), 3.86-3.69 (2H, m), 3.59 (3H, s), 3.19-3.13 (1H, m), 2.95 (1H, dd, J=15.2, 2.0 Hz), 2.36-2.34 (3H, m), 1.73-1.62 (4H, m), 1.46-1.38 (1H, m), 1.11-1.04 (6H, m).

Isomer 2: $^1$H NMR (400 MHz, CDCl$_3$) δ 7.89 (1H, dd, J=8.0, 1.6 Hz), 7.53 (1H, td, J=8.0, 1.6 Hz), 7.26 (1H, br t, J=8.0 Hz), 7.22 (1H, dd, J=8.0, 1.6 Hz), 7.20-7.17 (1H, m), 7.11-7.07 (2H, m), 6.82 (1H, d, J=3.6 Hz), 6.73 (1H, t, J=3.6 Hz), 4.57 (1H, d, J=14.0 Hz), 4.21 (1H, d, J=11.2 Hz), 4.07-3.89 (5H, m), 3.79-3.68 (2H, m), 3.43 (3H, s), 3.21-3.10 (1H, m), 2.94 (1H, dd, J=15.2, 8.8 Hz), 2.33 (3H, s), 1.73-1.65 (4H, m), 1.51-1.42 (1H, m), 1.20 (3H, d, J=6.8 Hz), 1.15-1.07 (3H, m).

Reference Example 158

Production of methyl 3-(3-{[(R)-4-ethyl-1,1-dioxide-3,4-dihydro-2H-benzo[b][1,4,5]oxathiazepin-2-yl]methyl}-4-methylphenyl)-2-methyl-3-[4-methyl-5-(2-methyl-1,3-dioxolan-2-yl)thiophen-2-yl]propanoate

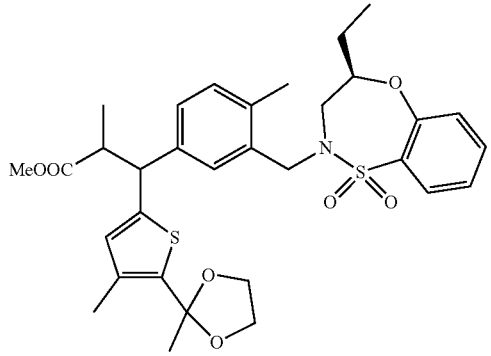 [SMILES: CC[C@@H]1CN(Cc2cc(C(c3cc(C)c(C4(C)OCCO4)s3)C(C)C(=O)OC)ccc2C)S(=O)(=O)c2ccccc2O1]

A THF (200 μL) solution of diisopropylamine (30 μL, 0.21 mmol) was cooled to −78° C. and stirred for 10 minutes. A 1.6M n-butyllithium hexane solution (110 μL, 0.18 mmol) was added at −78° C., and the mixture was heated to −40° C. and then stirred for 30 minutes. The resultant was cooled again to −78° C., and a THF (400 μL) solution of methyl 3-(3-{[(R)-4-ethyl-1,1-dioxide-3,4-dihydro-2H-benzo[b][1,4,5]oxathiazepin-2-yl]methyl}-4-methylphenyl)-3-[4-methyl-5-(2-methyl-1,3-dioxolan-2-yl)thiophen-2-yl]propanoate (41.5 mg, 0.069 mmol) was added dropwise to the reaction solution. After stirring at −78° C. for 10 minutes, the resultant was heated to −40° C. and then stirred for 10 minutes. Iodomethane (90 IL, 1.4 mmol) was added to the reaction solution, and the mixture was stirred at −40° C. for 15 minutes, then heated to room temperature, and stirred for 2 hours. Water was added to the reaction solution, followed by extraction with ethyl acetate. The organic layer was dried over sodium sulfate, and the solvent was removed by distillation under reduced pressure. The obtained residue was purified by silica gel column chromatography (ethyl acetate/hexane/TEA (v/v)=23/75/2), thereby obtaining the title compound (31.2 mg, 74%) as an oily brown substance.

$^1$H NMR (400 MHz, CDCl$_3$) δ 7.89 (1H, d, J=7.6 Hz), 7.53 (1H, t, J=7.6 Hz), 7.28-7.21 (2H, m), 7.18-7.04 (3H, m), 6.57-6.51 (1H, m), 4.59-4.57 (1H, m), 4.20-4.19 (1H, m), 4.07-3.94 (3H, m), 3.92-3.82 (3H, m), 3.78-3.69 (1H, m), 3.60-3.42 (3H, m), 3.16-3.08 (1H, m), 3.00-2.92 (1H, m), 2.37-2.33 (3H, m), 2.19-2.16 (3H, m), 1.74-1.62 (1H, m), 1.66-1.65 (3H, m), 1.53-1.37 (1H, m), 1.21-0.99 (6H, m).

Reference Example 159

Production of methyl 3-(3-{[(R)-4-ethyl-1,1-dioxide-3,4-dihydro-2H-benzo[b][1,4,5]oxathiazepin-2-yl]methyl}-4-methylphenyl)-2-methyl-3-[5-(2-methyl-1,3-dioxolan-2-yl)furan-2-yl]propanoate

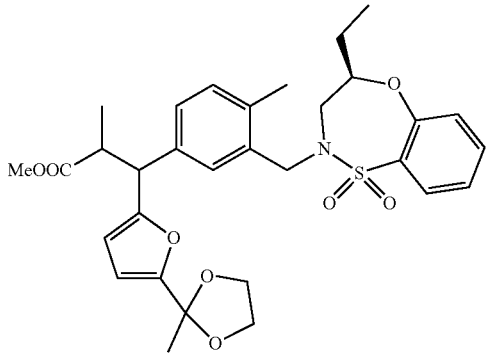

Methyl 3-(3-{[(R)-4-ethyl-1,1-dioxide-3,4-dihydro-2H-benzo[b][1,4,5]oxathiazepin-2-yl]methyl}-4-methylphenyl)-3-[5-(2-methyl-1,3-dioxolan-2-yl) furan-2-yl]propanoate (55.7 mg, 0.098 mmol), a 1M LDA THF/hexane solution (150 μL, 0.15 mmol), iodomethane (106 μL, 1.7 mmol), and THF (0.6 mL) were used as raw materials, and the same operation was performed as in Reference Example 157, thereby obtaining the title compound (40.1 mg, 79%) as an oily colorless substance.
$^1$H NMR (400 MHz, CDCl$_3$) δ 7.89 (1H, br d, J=8.0 Hz), 7.52 (1H, br t, J=8.0 Hz), 7.28-7.23 (1H, m), 7.22-7.04 (4H, m), 6.18-6.14 (1H, m), 6.01-5.92 (1H, m), 4.58-4.51 (1H, m), 4.15-4.08 (1H, m), 4.04-3.94 (5H, m), 3.85-3.71 (2H, m), 3.63-3.44 (3H, m), 3.23-3.16 (1H, m), 2.98-2.93 (1H, m), 2.35-2.31 (3H, m), 1.69-1.66 (4H, m), 1.52-1.48 (1H, m), 1.16-0.98 (6H, m).

Reference Example 160

Production of methyl 3-(3-{[(R)-4-ethyl-1,1-dioxide-3,4-dihydro-2H-benzo[b][1,4,5]oxathiazepin-2-yl]methyl}-4-methylphenyl)-2-methyl-3-[4-(2-methyl-1,3-dioxolan-2-yl)thiophen-2-yl]propanoate

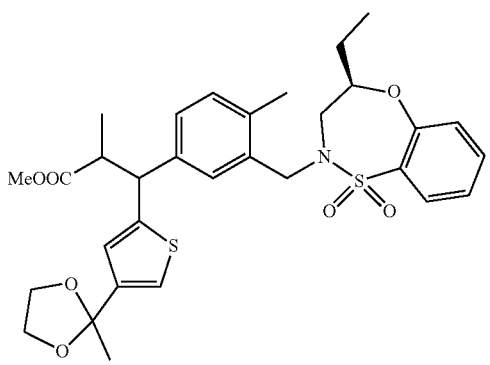 [SMILES: CC[C@@H]1CN(Cc2cc(C(c3cc(C4(C)OCCO4)cs3)C(C)C(=O)OC)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-[4-(2-methyl-1,3-dioxolan-2-yl)thiophen-2-yl]propanoate (83 mg, 0.14 mmol), THF (0.9 mL), a 2M LDA THF/heptane/ethylbenzene solution (92 μL, 0.18 mmol), and iodomethane (133 μL, 2.1 mmol) were used as raw materials, and the same operation was performed as in Reference Example 157, thereby obtaining the title compound (58.0 mg, 81%) as an oily colorless substance. The title compound could be separated into two isomer mixtures by purification by silica gel column chromatography; isomer 1 with a shorter retention time (17.0 mg) and isomer 2 with a longer retention time (30.7 mg) were obtained as oily colorless substances.

Isomer 1: $^1$H NMR (400 MHz, CDCl$_3$) δ 7.89 (1H, dd, J=7.6, 1.6 Hz), 7.53 (1H, br t, J=8.0 Hz), 7.28-7.25 (1H, m), 7.24-7.18 (2H, m), 7.11-7.08 (3H, m), 6.86 (1H, dd, J=6.0, 1.2 Hz), 4.57-4.56 (1H, m), 4.24-4.23 (1H, m), 4.03-3.99 (3H, m), 3.85-3.68 (4H, m), 3.43 (3H, s), 3.19-3.12 (1H, m), 2.96-2.91 (1H, m), 2.32 (3H, s), 1.73-1.69 (1H, m), 1.62 (3H, s), 1.51-1.44 (1H, m), 1.20-1.19 (3H, m), 1.24-1.09 (3H, m).

Isomer 2: $^1$H NMR (400 MHz, CDCl$_3$) δ 7.89 (1H, br d, J=8.0 Hz), 7.53 (1H, td, J=8.0, 1.6 Hz), 7.28-7.24 (1H, m), 7.22-7.19 (1H, m), 7.16-7.14 (2H, m), 7.09-7.07 (1H, m), 7.03 (1H, br s), 6.83 (1H, br s), 4.60-4.57 (1H, m), 4.28-4.27 (1H, m), 4.04-3.97 (3H, m), 3.87-3.69 (4H, m), 3.58 (3H, br s), 3.19-3.12 (1H, m), 2.97-2.93 (1H, m), 2.36-2.34 (3H, m), 1.71-1.67 (1H, m), 1.62-1.61 (3H, m), 1.46-1.37 (1H, m), 1.11-1.03 (6H, m).

Reference Example 161

Production of methyl 3-[5-(dimethylcarbamoyl)furan-2-yl]-3-(3-{[(R)-4-ethyl-1,1-dioxide-3,4-dihydro-2H-benzo[b][1,4,5]oxathiazepin-2-yl]methyl}-4-methylphenyl)propanoate

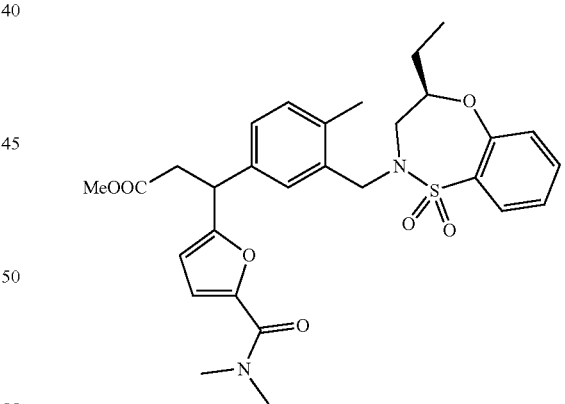

A 1M LDA THF solution (96 μL, 0.096 mmol) was added at −78° C. to a THF (2.0 mL) solution of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl) furan-2-yl]propanoate (43 mg, 0.08 mmol). The reaction mixture was stirred at −78° C. for 20 minutes and at −40° C. for 15 minutes. Iodomethane (100 μL, 1.6 mnol) was added, and the mixture was stirred at room temperature for 3 hours. Then, the reaction was stopped with water, followed by extraction with ethyl acetate. The organic layer was dried over sodium sulfate, and the solvent was distilled under reduced pressure. The residue was purified by silica gel column chromatography (hexane/ethyl acetate (v/v)=3/7→1/1), thereby obtaining the title compound (26.4 mg, 60%) as a pale yellow solid.

$^1$H NMR (400 MHz, CDCl$_3$) δ 7.89 (1H, dd, J=7.6, 1.6 Hz), 7.52 (1H, t, J=7.6 Hz), 7.26 (1H, t, J=7.6 Hz), 7.21 (1H, d, J=7.6 Hz), 7.15-7.10 (3H, m), 6.90 (1H, d, J=3.6 Hz), 6.10 (1H, d, J=3.6 Hz), 4.56-4.52 (2H, m), 4.04-3.99 (1H, m), 3.82 (1H, d, J=14 Hz), 3.76-3.69 (1H, m), 3.61 (3H, s), 3.13-2.86 (9H, m), 2.32 (3H, s), 1.75-1.65 (1H, m), 1.52-1.42 (1H, m), 1.08 (3H, t, J=7.2 Hz).

Reference Example 162

Production of methyl 3-(5-carbamoylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate

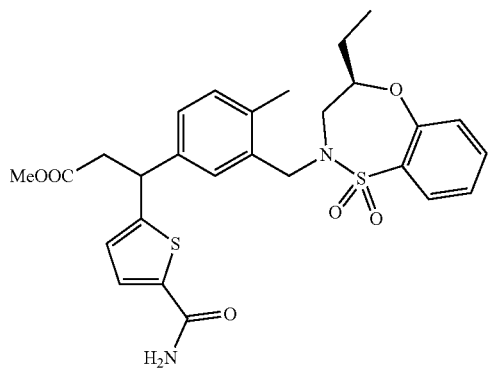 [SMILES: CC[C@@H]1CN(Cc2cc(C(CC(=O)OC)c3ccc(C(N)=O)s3)ccc2C)S(=O)(=O)c2ccccc2O1]

TFA (750 μL, 9.8 mnol) was added under argon atmosphere to a dichloromethane (1 mL) solution of methyl 3-{5-[(2,4-dimethoxybenzyl)carbamoyl]thiophen-2-yl}-3-(3-{[(R)-4-ethyl-1,1-dioxide-3,4-dihydro-2H-benzo[b][1,4,5]oxathiazepin-2-yl]methyl}-4-methylphenyl)propanoate (83.4 mg, 0.12 mmol), and the mixture was stirred at room temperature for 2 hours. The solvent was concentrated under reduced pressure, and the residue was neutralized with a 1N sodium hydroxide aqueous solution and extracted with methanol/dichloromethane (1/10). The organic layer was dried over sodium sulfate, and the solvent was distilled under reduced pressure, thereby obtaining the title compound (99.4 mg, quant.) as a pale yellow solid.

$^1$H NMR (400 MHz, CDCl$_3$) δ 7.87 (1H, dd, J=8.0, 1.6 Hz), 7.52 (1H, br t, J=8.0 Hz), 7.35 (1H, d, J=3.6 Hz), 7.25 (1H, t, J=8.0 Hz), 7.20 (1H, br d, J=8.0 Hz), 7.14 (2H, br s), 7.08 (1H, d, J=8.4 Hz), 6.81-6.79 (1H, m), 6.01 (2H, br s), 4.70 (1H, t, J=8.0 Hz), 4.57-4.55 (1H, m), 4.02-3.95 (1H, m), 3.82-3.69 (2H, m), 3.60 (3H, s), 3.09 (1H, dd, J=15.6, 7.6 Hz), 3.02-2.91 (2H, m), 2.33 (3H, s), 1.72-1.62 (1H, m), 1.46-1.38 (1H, m), 1.07-1.06 (3H, m).

Reference Example 163

Production of methyl 3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoate

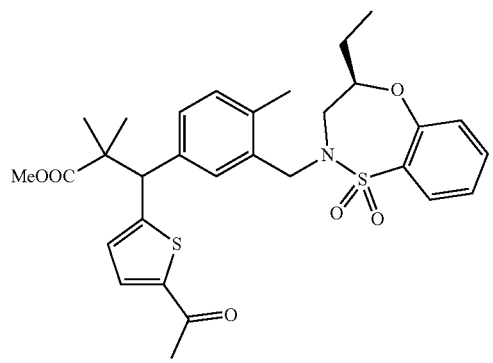 [SMILES: CC[C@@H]1CN(Cc2cc(C(c3ccc(C(C)=O)s3)C(C)(C)C(=O)OC)ccc2C)S(=O)(=O)c2ccccc2O1]

A DMF (0.50 mL) solution of methyl 3-(5-acetylthiophen-2-yl)-3-[3-(chloromethyl)-4-methylphenyl]-2,2-dimethylpropanoate (29.8 mg, 0.079 mmol), (R)-4-ethyl-3,4-2H-benzo[b][1,4,5]oxathiazepine 1,1-dioxide (27.8 mg, 0.12 mmol), potassium carbonate (33.9 mg, 0.25 mmol), and tetrabutylammonium iodide (5.7 mg, 0.015 mmol) was stirred at 70° C. for 3 hours. The reaction solution was cooled to room temperature, and ethyl acetate was added, followed by washing with water and saturated saline. The organic layer was dried over sodium sulfate, and the solvent was distilled under reduced pressure. The obtained residue was purified by silica gel column chromatography (hexane/ethyl acetate (v/v)=73/27→52/48), thereby obtaining the title compound (43.1 mg, 96%) as a white solid.

$^1$H NMR (400 Mz, CDCl$_3$) δ 7.87 (1H, dt, J=7.6, 1.2 Hz), 7.55-7.50 (1H, m), 7.49 (1H, d, J=4.0 Hz), 7.27-7.11 (5H, m), 6.97-6.95 (1H, m), 4.69-4.67 (1H, m), 4.56-4.55 (1H, m), 4.04-3.97 (1H, m), 3.83-3.69 (2H, m), 3.60 (3H, brs), 2.97-2.90 (1H, m), 2.49-2.48 (3H, m), 2.33 (3H, s), 1.81-1.56 (1H, m), 1.51-1.35 (1H, m), 1.29 (3H, br s), 1.23/−1.21 (3H, m), 1.10-1.08 (3H, m).

Reference Example 164

Production of methyl 3-(5-acetylthiophen-2-yl)-3-(3-{[(R)-4-ethyl-9-fluoro-1,1-dioxide-3,4-dihydro-2H-benzo[b][1,4,5]oxathiazepin-2-yl]methyl}-4-methylphenyl)-2,2-dimethylpropanoate

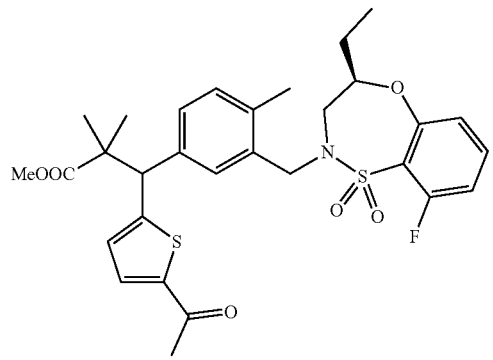 [SMILES: CC[C@@H]1CN(Cc2cc(C(c3ccc(C(C)=O)s3)C(C)(C)C(=O)OC)ccc2C)S(=O)(=O)c2c(F)cccc2O1]

Methyl 3-(5-acetylthiophen-2-yl)-3-[3-(chloromethyl)-4-methylphenyl]-2,2-dimethylpropanoate (23.4 mg, 0.062 mmol), (R)-4-ethyl-9-fluoro-3,4-dihydro-2H-benzo[b][1,4,5]oxathiazepine 1,1-dioxide (18.3 mg, 0.075 mmol), potassium carbonate (27.2 mg, 0.20 mmol), tetrabutylammonium iodide (5.3 mg, 0.014 mmol), and DMF (1.0 mL) were used as raw materials, and the same operation was performed as in Reference Example 163, thereby obtaining the title compound (31.8 mg, 88%) as a white solid.

$^1$H NMR (400 MHz, CDCl$_3$) δ 7.51 (1H, dd, J=4.0, 1.6 Hz), 7.44-7.39 (1H, m), 7.29/7.28 (1H, m), 7.25-7.22 (1H, m), 7.14 (1H, br d, J=8.0 Hz), 7.00-6.94 (3H, m), 4.72 (1H, s), 4.58-4.55 (1H, m), 4.50-4.43 (1H, m), 4.31-4.28 (1H, m), 3.62 (3H, s), 3.33 (1H, d, J=14.4, 4.0 Hz), 3.10 (1H, d, J=14.4, 1.2 Hz), 2.49 (3H, br s), 2.34 (3H, br s), 1.68-1.56 (1H, m), 1.55-1.45 (1H, m), 1.32 (3H, br s), 1.25 (3H, s), 1.02-1.01 (3H, m).

Reference Example 165

Production of methyl 3-(5-acetylthiophen-2-yl)-3-(3-{[(R)-4-ethyl-1,1-dioxide-3,4-dihydro-2H-pyrido[2,3-b][1,4,5]oxathiazepin-2-yl]methyl}-4-methylphenyl)-2,2-dimethylpropanoate

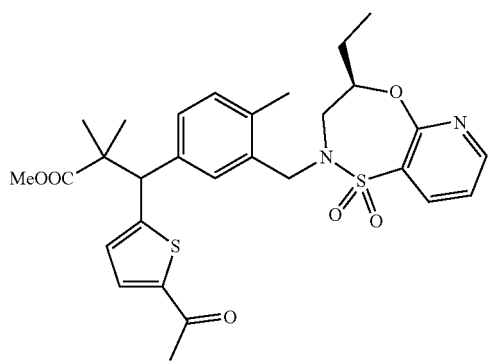 [SMILES: CC[C@@H]1CN(Cc2cc(C(c3ccc(C(C)=O)s3)C(C)(C)C(=O)OC)ccc2C)S(=O)(=O)c2cccnc2O1]

Methyl 3-(5-acetylthiophen-2-yl)-3-[3-(hydroxymethyl)-4-methylphenyl]-2,2-dimethylpropanoate (50 mg, 0.139 mmol), (R)-4-ethyl-3,4-dihydro-2H-pyrido[2,3-b][1,4,5]oxathiazepine 1,1-dioxide (38.1 mg, 0.167 mmol), triphenylphosphine (73 mg, 0.278 mmol), THF (0.4 mL), and a 2.2M DEAD toluene solution (126 μL, 0.278 mmol) were used as raw materials, and the same operation was performed as in Reference Example 12, thereby obtaining the title compound (39.4 mg, 50%) as an oily pale yellow substance.

$^1$H NMR (400 MHz, CDCl$_3$) δ 8.51-8.49 (1H, m), 8.26 (1H, br d, J=8.0 Hz), 7.51 (1H, d, J=4.0 Hz), 7.30-7.24 (2H, m), 7.21 (1H, s), 7.14 (1H, d, J=8.0 Hz), 6.98 (1H, t, J=4.0 Hz), 4.69 (1H, d, J=5.6 Hz), 4.47-4.42 (2H, m), 4.11-4.05 (1H, m), 3.62-3.59 (4H, m), 3.16 (1H, br d, J=15.2 Hz), 2.50 (3H, s), 2.33 (3H, br s), 1.81-1.68 (1H, m), 1.60-1.52 (1H, m), 1.30 (3H, s), 1.24 (3H, s), 1.09 (3H, t, J=7.2 Hz).

Reference Example 166

Production of methyl 3-(5-acetylthiophen-2-yl)-3-[3-({4-[2-(benzyloxy)ethyl]-1,1-dioxide-3,4-dihydro-2H-benzo[b][1,4,5]oxathiazepin-2-yl}methyl)-4-methylphenyl]-2-methylpropanoate

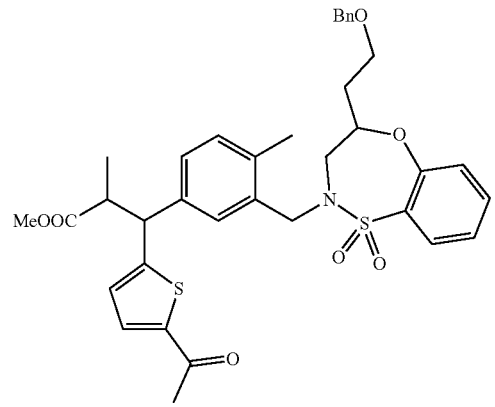 [SMILES: COC(=O)C(C)C(c1ccc(C)c(CN2CC(CCOCc3ccccc3)Oc3ccccc3S2(=O)=O)c1)c1ccc(C(C)=O)s1]

Methyl 3-(5-acetylthiophen-2-yl)-3-[3-(hydroxymethyl)-4-methylphenyl]-2,2-dimethylpropanoate (22 mg, 0.064 mmol), 4-[2-(benzyloxy)ethyl]-3,4-dihydro-2H-benzo[b][1,4,5]oxathiazepine 1,1-dioxide (23 mg, 0.070 mmol), triphenylphosphine (20.1 mg, 0.077 mmol), THF (0.27 mL), and a 2.2M DEAD toluene solution (38 μL, 0.083 mmol) were used as raw materials, and the same operation was performed as in Reference Example 12, thereby obtaining the title compound (29.6 mg, 70%) as an oily colorless substance.

$^1$H NMR (400 MHz, CDCl$_3$) δ 7.88 (1H, br d, J=8.0 Hz), 7.49 (1H, br t, J=8.0 Hz), 7.43 (1H, t, J=4.0 Hz), 7.35-7.24 (6H, m), 7.14-7.09 (3H, m), 7.00 (1H, br t, J=8.0 Hz), 6.89 (1H, br t, J=4.0 Hz), 4.60-4.47 (3H, m), 4.36-4.31 (2H, m), 3.87-3.73 (3H, m), 3.66-3.61 (1H, m), 3.59 (3H, br s), 3.25-3.18 (1H, m), 2.93-2.88 (1H, m), 2.43 (3H, br s), 2.31 (3H, br s), 1.92-1.83 (1H, m), 1.67-1.60 (1H, m), 1.06 (3H, d, J=7.2 Hz).

Reference Example 167

Production of methyl 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoate

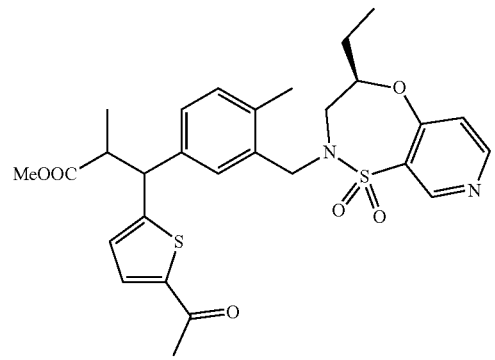 [SMILES: CC[C@@H]1CN(Cc2cc(C(c3ccc(C(C)=O)s3)C(C)C(=O)OC)ccc2C)S(=O)(=O)c2cnccc2O1]

Methyl 3-(5-acetylthiophen-2-yl)-3-[3-(hydroxymethyl)-4-methylphenyl]-2-methylpropanoate (50 mg, 0.14 mmol), (R)-4-ethyl-3,4-dihydro-2H-pyrido[4,3-b][1,4,5]oxathiazepine 1,1-dioxide (38.1 mg, 0.17 mmol), triphenylphosphine (43.7 mg, 0.17 mmol), THF (3.7 mL), and a 2.2M DEAD toluene solution (100 μL, 0.22 mmol) were used as raw materials, and the same operation was performed as in Reference Example 12, thereby obtaining the title compound (24.8 mg, 31%) as an oily colorless substance.

$^1$H NMR (400 MHz, CDCl$_3$) δ 9.03 (1H, s), 8.66 (1H, dd, J=5.6, 2.0 Hz), 7.47 (1H, dd, J=4.0, 2.4 Hz), 7.17 (2H, s), 7.12-7.09 (2H, n), 6.93-6.92 (1H, m), 4.47-4.44 (1H, m), 4.38 (2H, d, J=12.0 Hz), 4.21-4.09 (1H, m), 3.61 (3H, s), 3.51-3.41 (1H, m), 3.23-3.11 (2H, m), 2.47 (3H, br s), 2.33 (3H, s), 1.74-1.63 (1H, m), 1.56-1.47 (1H, m), 1.08-1.02 (6H, m).

Reference Example 168

Production of methyl 3-(5-acetylthiophen-2-yl)-3-(3-{[4-(2-hydroxyethyl)-1,1-dioxide-3,4-dihydro-2H-benzo[b][1,4,5]oxathiazepin-2-yl]methyl}-4-methylphenyl)-2-methylpropanoate

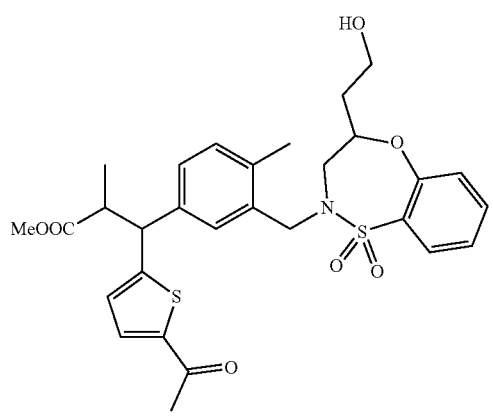 [SMILES: COC(=O)C(C)C(c1ccc(C)c(CN2CC(CCO)Oc3ccccc3S2(=O)=O)c1)c1ccc(C(C)=O)s1]

Palladium carbon (35.7 mg) was added to a methanol/dichloromethane (0.6 mL/0.4 mL) solution of methyl 3-(5-acetylthiophen-2-yl)-3-[3-({4-[2-(benzyloxy)ethyl]-1,1-dioxide-3,4-dihydro-2H-benzo[b][1,4,5]oxathiazepin-2-yl}methyl)-4-methylphenyl]-2-methylpropanoate (126 mg, 0.19 mmol), and the mixture was stirred at room temperature for 32 hours. The mixture was filtered through Celite, and the filtrate was concentrated under reduced pressure. The residue was purified by silica gel column chromatography (hexane/ethyl acetate (v/v)=1/1→0/1), thereby obtaining the title compound (44.4 mg, 41%) as an oily colorless substance.

$^1$H NMR (400 MHz, CDCl$_3$) δ 7.89 (1H, dd, J=8.0, 1.6 Hz), 7.69-7.44 (3H, m), 7.29-7.22 (1H, m), 7.17-7.10 (3H, m), 6.93 (1H, d, J=4.0 Hz), 4.77-4.59 (1H, m), 4.44-4.33 (2H, m), 4.02-3.80 (4H, m), 3.60-3.55 (3H, m), 3.31-3.09 (1H, m), 2.92-2.81 (1H, m), 2.49-2.34 (6H, m), 1.96-1.77 (1H, m), 1.62-1.45 (1H, m), 1.07-1.00 (3H, m).

Reference Example 169

Production of (5-{1-[(tert-butyldimethylsilyl)oxy]ethyl}-4-fluorothiophen-2-yl) (3-{[(4-methoxybenzyl)oxy]methyl}-4-methylphenyl)methanol

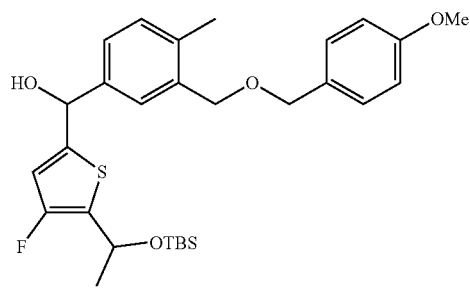 [SMILES: COc1ccc(COCc2cc(C(O)c3cc(F)c(C(C)O[Si](C)(C)C(C)(C)C)s3)ccc2C)cc1]

A 2M n-butyllithium cyclohexane solution (354 μL, 0.71 mmol) was added at −78° C. to a THF (2.0 mL) solution of [1-(5-bromo-3-fluorothiophen-2-yl)ethoxy](tert-butyl)dimethylsilane (200 mg, 0.59 mmol). The mixture was stirred at −78° C. for 30 minutes, and a THF (1.5 mL) solution of 3-{[(4-methoxybenzyl)oxy]methyl}-4-methylbenzaldehyde (135.1 mg, 0.50 mmol) was added. The reaction mixture was stirred at −78° C. for 1.5 hours, and heated to room temperature. After the mixture was stirred for 1.5 hours, a saturated ammonium chloride aqueous solution was added to stop the reaction, followed by extraction with ethyl acetate. The organic layer was washed with saturated saline and dried over sodium sulfate, and the solvent was distilled under reduced pressure. The residue was purified by silica gel column chromatography (hexane/ethyl acetate (v/v)=1/0→95/5), thereby obtaining the title compound (168.3 mg, 63%) as an oily colorless substance.

$^1$H NMR (400 MHz, CDCl$_3$) δ 7.31 (1H, br s), 7.22-7.16 (3H, m), 7.10 (1H, d, J=7.6 Hz), 6.82 (2H, br d, J=8.8 Hz), 6.40 (1H, d, J=20.8 Hz), 5.76 (1H, br s), 5.09 (1H, q, J=6.4 Hz), 4.44-4.43 (4H, m), 3.74 (3H, s), 2.32 (1H, br s), 2.25 (3H, s), 1.39-1.38 (3H, m), 0.82 (9H, br s), 0.01 (3H, br s), −0.05 (3H, br s).

Reference Example 170

Production of methyl 3-(5-{1-[(tert-butyldimethylsilyl)oxy]ethyl}-4-fluorothiophen-2-yl)-3-(3-{[(4-methoxybenzyl)oxy]methyl}-4-methylphenyl)-2,2-dimethylpropanoate

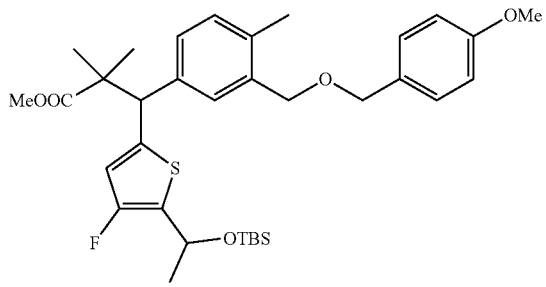 [SMILES: COC(=O)C(C)(C)C(c1ccc(C)c(COCc2ccc(OC)cc2)c1)c1cc(F)c(C(C)O[Si](C)(C)C(C)(C)C)s1]

Trichloroacetonitrile (80 μL, 0.79 mmol) and DBU (3 μL, 0.020 mmol) were added to an acetonitrile (4.8 mL) solution of (5{1-[(tert-butyldimethylsilyl)oxy]ethyl}-4-fluorothiophen-2-yl)(3-{[(4-methoxybenzyl)oxy)]methyl}-4-methylphenyl)methanol (210 mg, 0.40 mmol). The mixture was stirred at room temperature for 45 minutes, and an acetonitrile (111 μL) solution of dimethylketene methyl trimethylsilyl acetal (201 μL, 0.99 mmol) and bis-(trifluoromethanesulfonyl)imide (11.1 mg, 0.040 mmol) was added and stirred at room temperature for 3.5 hours. A saturated potassium carbonate aqueous solution was added to the mixture, followed by extraction with dichloromethane. The organic layer was washed with saturated saline and dried over sodium sulfate, and the solvent was distilled under reduced pressure. The residue was purified by silica gel column chromatography (hexane/ethyl acetate (v/v)=1/0→85/15), thereby obtaining the title compound (184.3 mg, 76%) as an oily colorless substance.

$^1$H NMR (400 MHz, CDCl$_3$) δ 7.25-7.22 (3H, m), 7.13 (1H, br t, J=8.0 Hz), 7.04 (1H, dd, J=8.0, 3.2 Hz), 6.84 (2H, br d, J=8.8 Hz), 6.55 (1H, d, J=19.6 Hz), 5.07 (1H, q, J=6.4 Hz), 4.45-4.41 (5H, m), 3.77 (3H, s), 3.54 (3H, s), 2.23 (3H, s), 1.39-1.36 (3H, m), 1.24 (3H, s), 1.15 (3H, s), 0.82 (9H, br s), 0.001 (3H, br s), −0.07 (3H, br s).

Reference Example 171

Production of methyl 3-(5-{1-[(tert-butyldimethylsilyl)oxy]ethyl}-4-fluorothiophen-2-yl)-3-[3-(hydroxymethyl)-4-methylphenyl]-2,2-dimethylpropanoate

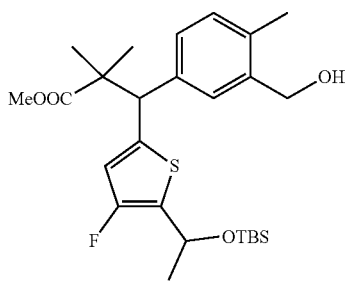 [SMILES: COC(=O)C(C)(C)C(c1ccc(C)c(CO)c1)c1cc(F)c(C(C)O[Si](C)(C)C(C)(C)C)s1]

Methyl 3-(5-{1-[(tert-butyldimethylsilyl)oxy]ethyl}-4-fluorothiophen-2-yl)-3-(3-{[(4-methoxybenzyl)oxy]methyl}-4-methylphenyl)-2,2-dimethylpropanoate (204 mg, 0.33 mmol), dichloromethane (2.9 mL), water (290 μL), and DDQ (82.6 mg, 0.36 mmol) were used as raw materials, and the same operation was performed as in Reference Example 25, thereby obtaining the title compound (109.3 mg, 66%) as an oily colorless substance.

$^1$H NMR (400 MHz, CDCl$_3$) δ7.31 (1H, s), 7.18 (1H, br t, J=8.0 Hz), 7.10 (1H, dd, J=8.0, 4.0 Hz), 6.60 (1H, d, J=19.6 Hz), 5.12 (1H, q, J=6.4 Hz), 4.67 (2H, br s), 4.50-4.47 (1H, m), 3.60 (3H, s), 2.31 (3H, s), 2.32 (3H, s), 1.59 (1H, br s), 1.43-1.42 (3H, m), 1.29 (3H, s), 1.20 (3H, br s), 0.87 (9H, br s), 0.054-0.051 (3H, m), 0.00-0.015 (3H, m).

Reference Example 172

Production of methyl 3-(5-{1-[(tert-butyldimethylsilyl)oxy]ethyl}-4-fluorothiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoate

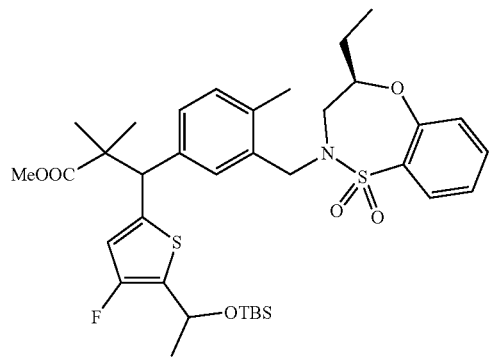 [SMILES: CC[C@@H]1CN(Cc2cc(C(c3cc(F)c(C(C)O[Si](C)(C)C(C)(C)C)s3)C(C)(C)C(=O)OC)ccc2C)S(=O)(=O)c2ccccc2O1]

Methyl 3-(5-{1-[(tert-butyldimethylsilyl)oxy]ethyl}-4-fluorothiophen-2-yl)-3-[3-(hydroxymethyl)-4-methylphenyl]-2,2-dimethylpropanoate (65 mg, 0.13 mmol), (R)-4-ethyl-3,4-dihydro-2H-benzo[b][1,4,5]oxathiazepine 1,1-dioxide (33 mg, 0.15 mmol), triphenylphosphine (38 mg, 0.15 mmol), THF (0.4 mL), and a 2.2M DEAD toluene solution (78 μL, 0.17 mmol) were used as raw materials, and the same operation was performed as in Reference Example 12, thereby obtaining the title compound (66.2 mg, 71%) as a white solid.

$^1$H NMR (400 MHz, CDCl$_3$) δ 7.84 (1H, d, J=8.0 Hz), 7.47 (1H, br t, J=8.0 Hz), 7.23-7.13 (3H, m), 7.11-7.07 (2H, m), 6.57-6.50 (1H, m), 5.09-5.06 (1H, m), 4.52-4.49 (1H, m), 4.42-4.38 (1H, m), 3.99-3.95 (1H, m), 3.80-3.65 (2H, m), 3.55 (3H, br s), 2.95-2.89 (1H, m), 2.29 (3H, br s), 1.69-1.59 (1H, m), 1.39-1.36 (4H, m), 1.22-1.21 (3H, m), 1.14-1.13 (3H, m), 1.06-1.02 (3H, m), 0.82-0.79 (9H, m), 0.004--0.009 (3H, m), −0.052--0.091 (3H, m).

Reference Example 173

Production of 3-(3-{[(R)-4-ethyl-1,1-dioxide-3,4-dihydro-2H-benzo[b][1,4,5]oxathiazepin-2-yl]methyl}-4-methylphenyl)-3-[4-fluoro-5-(1-hydroxyethyl)thiophen-2-yl]-2,2-dimethylpropanoic acid

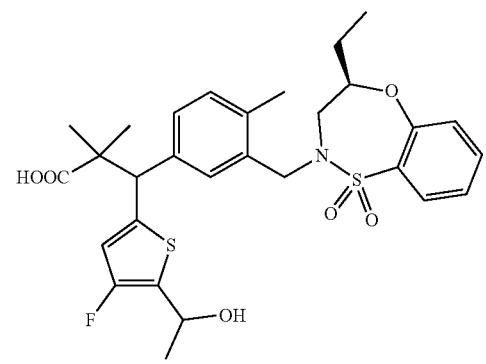 [SMILES: CC[C@@H]1CN(Cc2cc(C(c3cc(F)c(C(C)O)s3)C(C)(C)C(=O)O)ccc2C)S(=O)(=O)c2ccccc2O1]

A 4N sodium hydroxide aqueous solution (310 µL, 1.2 mmol) was added to a methanol/1,4-dioxane (0.5 mL/0.5 mL) solution of methyl 3-(5-{1-[(tert-butyldimethylsilyl)oxy]ethyl}-4-fluorothiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoate (87.2 mg, 0.12 mmol), and the mixture was stirred under microwave irradiation at 100° C. for 1 hour. 1N hydrochloric acid was added to the mixture, followed by extraction with dichloromethane. The organic layer was washed with saturated saline and dried over sodium sulfate, and the solvent was distilled under reduced pressure, thereby obtaining the title compound (90.7 mg, quant.) as an oily pale yellow substance.

$^1$H NMR (400 MHz, CDCl$_3$) δ 7.88 (1H, br d, J=8.0 Hz), 7.52 (1H, br t, J=8.0 Hz), 7.27-7.20 (4H, m), 7.13-7.11 (1H, r), 6.69-6.64 (1H, m), 5.13 (1H, q, J=6.4 Hz), 4.58-4.48 (2H, m), 4.02-4.00 (1H, m), 3.86-3.73 (2H, m), 3.01-2.96 (1H, m), 2.32 (3H, s), 1.73-1.60 (1H, m), 1.52-1.48 (3H, m), 1.45-1.41 (1H, n), 1.29 (3H, s), 1.18 (3H, s), 1.10-1.06 (3H, m).

Reference Example 174

Production of methyl 3-(3-{[(R)-4-ethyl-1,1-dioxide-3,4-dihydro-2H-benzo[b][1,4,5]oxathiazepin-2-yl]methyl}-4-methylphenyl)-3-[4-fluoro-5-(1-hydroxyethyl)thiophen-2-yl]-2,2-dimethylpropanoate

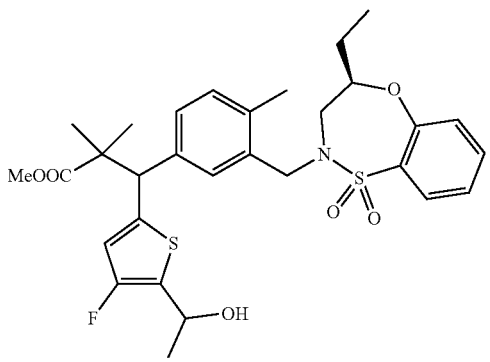 [SMILES: CC[C@@H]1CN(Cc2cc(C(c3cc(F)c(C(C)O)s3)C(C)(C)C(=O)OC)ccc2C)S(=O)(=O)c2ccccc2O1]

A 1N tetrabutylammonium fluoride THF solution (188 µL, 0.19 mmol) was added to a THF (0.2 mL) solution of methyl 3-(5-(1-[(tert-butyldimethylsilyl)oxy]ethyl)-4-fluorothiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoate (66 mg, 0.094 mmol), and the mixture was stirred at room temperature for 2 hours. A saturated sodium hydrogen carbonate aqueous solution was added to the mixture, followed by extraction with ethyl acetate. The organic layer was washed with saturated saline and dried over sodium sulfate, and the solvent was distilled under reduced pressure, thereby obtaining the title compound (62.1 mg, quant.) as a white solid.

$^1$H NMR (400 MHz, CDCl$_3$) δ 7.88 (1H, dd, J=8.0, 1.6 Hz), 7.52 (1H, br t, J=8.0 Hz), 7.27-7.17 (4H, m), 7.12 (1H, d, J=7.6 Hz), 6.63-6.61 (1H, m), 5.15 (1H, q, J=6.4 Hz), 4.54-4.50 (1H, m), 4.48 (1H, br s), 4.05-4.01 (1H, m), 3.83 (1H, d, J=14.0 Hz), 3.76-3.70 (1H, m), 3.62 (3H, br s), 3.39-3.35 (1H, m), 3.00-2.95 (1H, m), 2.33 (3H, s), 1.72-1.66 (1H, m), 1.52-1.50 (3H, m), 1.48-1.42 (1H, m), 1.28 (3H, s), 1.19 (3H, br s), 1.09 (3H, t, J=7.2 Hz).

Reference Example 175

Production of methyl 3-(5-acetyl-4-fluorothiophen-2-yl)3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoate

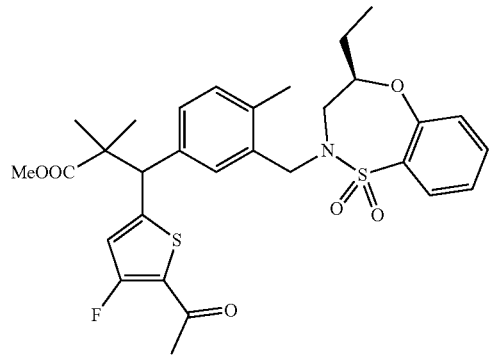 [SMILES: CC[C@@H]1CN(Cc2cc(C(c3cc(F)c(C(C)=O)s3)C(C)(C)C(=O)OC)ccc2C)S(=O)(=O)c2ccccc2O1]

TEA (47 µL, 0.34 mmol) and a pyridine-sulfur trioxide complex (32.9 mg, 0.21 mmol) were added to a DMSO (0.4 mL) solution of methyl 3-(3-{[(R)-4-ethyl-1,1-dioxide-3,4-dihydro-2H-benzo[b][1,4,5]oxathiazepin-2-yl]methyl}-4-methylphenyl)-3-[4-fluoro-5-(1-hydroxyethyl)thiophen-2-yl]-2,2-dimethylpropanoate (62.1 mg, 0.094 mmol). The reaction mixture was stirred at room temperature for 20 hours. The mixture was diluted with water and extracted with ethyl acetate. The organic layer was washed with saturated saline and dried over sodium sulfate, and the solvent was distilled under reduced pressure, thereby obtaining the title compound (48.1 mg, 87%) as an oily colorless substance.

$^1$H NMR (400 MHz, CDCl$_3$) δ 7.89 (1H, dt, J=8.0, 1.6 Hz), 7.53 (1H, br t, J=8.0 Hz), 7.29-7.14 (5H, m), 6.75 (1H, br d, J=6.8 Hz), 4.57-4.54 (2H, m), 4.06-4.00 (1H, m), 3.85-3.82 (1H, m), 3.77-3.71 (1H, m), 3.64 (3H, br s), 3.00-2.93 (1H, m), 2.51 (3H, br s), 2.34 (3H, s), 1.71-1.65 (1H, m), 1.50-1.38 (1H, m), 1.30 (3H, s), 1.20 (3H, s), 1.09-1.08 (3H, m).

Reference Example 176

Production of methyl 3-(4-{[(R)-4-ethyl-1,1-dioxide-3,4-dihydro-2H-benzo[b][1,4,5]oxathiazepin-2-yl]methyl}-1-trityl-1H-benzo[d]imidazol-6-yl)-3-[5-(2-methyl-1,3-dioxolan-2-yl)thiophen-2-yl]propanoate

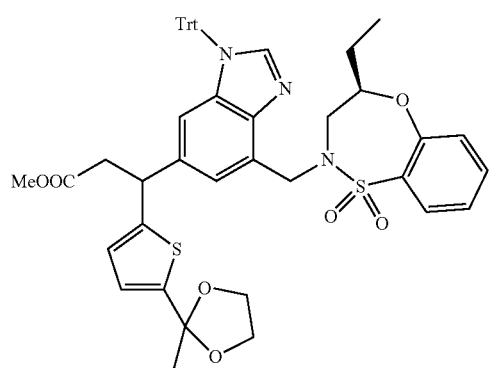

(R)-4-ethyl-2-{[6-(4,4,5,5-tetramethyl-1,3,2-dioxaborolan-2-yl)-1-trityl-1H-benzo[d]imidazol-4-yl]methyl}-3,4-dihydro-2H-benzo[b][1,4,5]oxathiazepine 1,1-dioxide (126.9 mg, 0.17 mmol), methyl (E)-3-[5-(2-methyl-1,3-dioxolan-2-yl)thiophen-2-yl)]acrylate (88.4 mg, 0.35 mmol), and [RhCl(cod)]$_2$ (9.3 mg, 0.019 mmol) were added to a flask, and argon replacement was carried out. Then, 1,4-dioxane/water (1/1) (0.8 mL) and TEA (75 μL, 0.54 mmol) were added, and the mixture was heated under microwave irradiation at 140° C. for 3 hours. The reaction solution was returned to room temperature, diluted with ethyl acetate, washed with water and saturated saline, and dried over sodium sulfate, and the solvent was distilled under reduced pressure. The obtained residue was purified by silica gel column chromatography (hexane/ethyl acetate (v/v)=71/29→1/1), thereby obtaining the title compound (86.6 mg, 58%) as a light yellow solid.

$^1$H NMR (400 MHz, CDCl$_3$) δ 7.88 (1H, d, J=7.6 Hz), 7.78 (1H, s), 7.47-7.42 (1H, m), 7.31-7.26 (9H, m), 7.22-7.18 (1H, m), 7.15-7.11 (8H, m), 6.70 (1H, d, J=2.0 Hz), 6.29-6.26 (2H, m), 4.77 (1H, d, J=15.2 Hz), 4.55-4.54 (1H, m), 4.48 (1H, q, J=7.2 Hz), 4.03-3.84 (6H, m), 3.53 (3H, s), 3.29-3.23 (1H, m), 2.76-2.69 (1H, m), 2.59-2.51 (1H, m), 1.73-1.64 (1H, m), 1.68 (3H, s), 1.45-1.40 (1H, m), 1.03-1.02 (3H, m).

Reference Example 177

Production of methyl 3-(5-acetylthiophen-2-yl)-3-(4-{[(R)-4-ethyl-1,1-dioxide-3,4-dihydro-2H-benzo[b][1,4,5]oxathiazepin-2-yl]methyl}-1H-benzo[d]imidazol-6-yl)propanoate

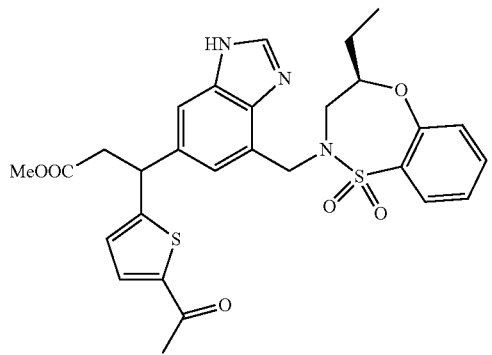 [SMILES: CC[C@@H]1CN(Cc2cc(C(CC(=O)OC)c3ccc(C(C)=O)s3)cc3[nH]cnc23)S(=O)(=O)c2ccccc2O1]

Triethylsilane (0.1 mL) and TFA (1.0 mL) were added to a dichloromethane (0.9 mL) solution of methyl 3-(4-{[(R)-4-ethyl-1,1-dioxide-3,4-dihydro-2H-benzo[b][1,4,5]oxathiazepin-2-yl]methyl}-1-trityl-1H-benzo[d]imidazol-6-yl)-3-[5-(2-methyl-1,3-dioxolan-2-yl)thiophen-2-yl]propanoate (49.8 mg, 0.058 mmol), and the mixture was stirred at room temperature for 30 minutes. The reaction solution was adjusted to basicity with a saturated sodium hydrogen carbonate aqueous solution, extracted with ethyl acetate, and dried over sodium sulfate, and the solvent was removed by distillation under reduced pressure. The obtained residue was purified by silica gel column chromatography (dichloromethane/methanol=100/0→95/5) and preparative thin-layer chromatography (dichloromethane/methanol=97/3), thereby obtaining the title compound (23.2 mg, 70%) as a white solid.

$^1$H NMR (400 MHz, CDCl$_3$) δ 10.6 (1H, s), 8.11 (1H, s), 7.90 (1H, dd, J=7.6, 1.2 Hz), 7.74 (1H, s), 7.56 (1H, t, J=7.6 Hz), 7.52-7.48 (1H, m), 7.31-7.24 (2H, m), 6.91 (1H, s), 6.88 (1H, br s), 4.87 (1H, t, J=7.6 Hz), 4.75-4.72 (1H, m), 4.15-4.07 (1H, m), 3.97-3.93 (1H, m), 3.74-3.71 (1H, m), 3.60 (3H, br s), 3.21-3.07 (3H, m), 2.47 (3H, s), 1.82-1.74 (1H, m), 1.59-1.51 (1H, m), 1.15-1.14 (3H, m).

Reference Example 178

Production of methyl 3-(5-acetyl-4-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoate

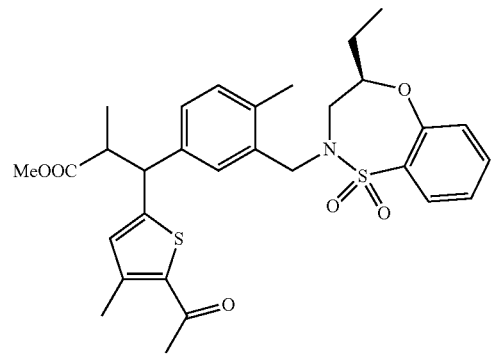 [SMILES: CC[C@@H]1CN(Cc2cc(C(c3cc(C)c(C(C)=O)s3)C(C)C(=O)OC)ccc2C)S(=O)(=O)c2ccccc2O1]

1M hydrochloric acid (0.1 mL, 0.1 mmol) was added to a THF (0.5 mL) solution of methyl 3-(3-{[(R)-4-ethyl-1,1-dioxide-3,4-dihydro-2H-benzo[b][1,4,5]oxathiazepin-2-yl]methyl}-4-methylphenyl)-2-methyl-3-[4-methyl-5-(2-methyl-1,3-dioxolan-2-yl)thiophen-2-yl]propanoate (31.2 mg, 0.05 mmol), and the mixture was stirred at room temperature for 1 hour. The reaction solution was diluted with ethyl acetate, washed with water and saturated saline, and dried over sodium sulfate, and the solvent was removed by distillation under reduced pressure, thereby obtaining the title compound (26.7 mg, 92%) as an oily transparent brown substance.

$^1$H NMR (400 MHz, CDCl$_3$) δ 7.89 (1H, d, J=7.6 Hz), 7.53 (1H, t, J=7.6 Hz), 7.26 (1H, t, J=7.6 Hz), 7.22 (1H, d, J=8.0 Hz), 7.17-7.07 (3H, m), 6.77-6.32 (1H, m), 4.60-4.53 (1H, m), 4.30-4.25 (1H, m), 4.06-3.98 (1H, m), 3.89-3.79 (1H, m), 3.75-3.68 (1H, m), 3.62-3.46 (3H, m), 3.24-3.14 (1H, m), 2.99-2.92 (1H, m), 2.47-2.42 (6H, m), 2.34-2.31 (3H, m), 1.73-1.62 (1H, m), 1.49-1.33 (1H, m), 1.11-1.04 (6H, m).

Reference Example 179

Production of methyl 3-(5-acetylthiazol-2-yl)-3-(3-{[(R)-4-ethyl-1,1-dioxide-3,4-dihydro-2H-benzo[b][1,4,5]oxathiazepin-2-yl]methyl}-4-methylphenyl)-propanoate

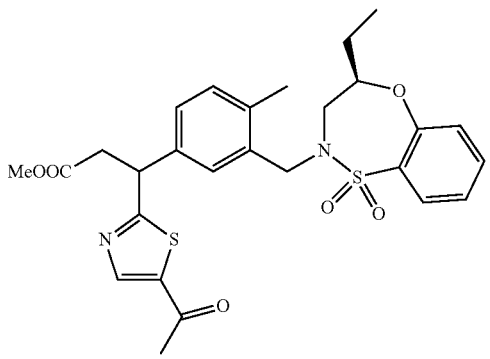 [SMILES: CC[C@@H]1CN(Cc2cc(C(CC(=O)OC)c3ncc(C(C)=O)s3)ccc2C)S(=O)(=O)c2ccccc2O1]

1M hydrochloric acid (0.1 mL) was added to a THF (0.5 mL) solution of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(2-methyl-1,3-dioxolan-2-yl) thiazol-2-yl]propanoate (23.7 mg, 0.040 mmol), and the mixture was stirred for 2 hours. Further, 6M hydrochloric acid (0.1 mL) was added, and the mixture was stirred at room temperature for 2 hours. The reaction solution was diluted with ethyl acetate, washed with water, and dried over sodium sulfate, and the solvent was removed by distillation under reduced pressure, thereby obtaining the title compound (19.0 mg, 89%) an oily white substance.

$^1$H NMR (400 MHz, CDCl$_3$) δ 8.17 (1H, br s), 7.89 (1H, dd, J=7.6, 1.6 Hz), 7.52 (1H, td, J=7.6, 1.6 Hz), 7.28-7.24 (1H, m), 7.22-7.14 (4H, m), 4.79 (1H, t, J=7.6 Hz), 4.57-4.55 (1H, m), 4.07-3.97 (1H, m), 3.84-3.81 (1H, m), 3.76-3.66 (1H, m), 3.63 (3H, s), 3.43-3.42 (1H, m), 3.02-2.96 (2H, m), 2.52 (3H, s), 2.35 (3H, br s), 1.75-1.64 (1H, m), 1.51-1.39 (1H, m), 1.09-1.07 (3H, m).

Reference Example 180

Production of methyl 3-(5-acetyl-4-methylthiazol-2-yl)-3-(3-{[(R)-4-ethyl-1,1-dioxide-3,4-dihydro-2H-benzo[b][1,4,5]oxathiazepin-2-yl]methyl}-4-methylphenyl)-propanoate

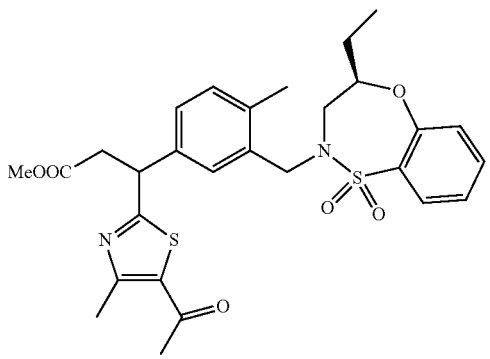 [SMILES: CC[C@@H]1CN(Cc2cc(C(CC(=O)OC)c3nc(C)c(C(C)=O)s3)ccc2C)S(=O)(=O)c2ccccc2O1]

3M hydrochloric acid (0.1 mL, 0.3 mmol) was added to a THF (0.5 mL) solution of methyl 3-(3-{[(R)-4-ethyl-1,1-dioxide-3,4-dihydro-2H-benzo[b][1,4,5]oxathiazepin-2-yl]methyl}-4-methylphenyl)-3-[4-methyl-5-(2-methyl-1,3-dioxolan-2-yl) thiazol-2-yl]propanoate (32.8 mg, 0.06 mmol), and the mixture was stirred at room temperature for 5 hours. Ethyl acetate was added to the reaction solution, followed by washing with water and saturated saline. The organic layer was dried over sodium sulfate, and the solvent was removed by distillation under reduced pressure. The obtained residue was purified by silica gel column chromatography (hexane/ethyl acetate=1/1→dichloromethane/methanol=98/2), thereby obtaining the title compound (24.8 mg, 82%) as a white solid.

$^1$H NMR (400 MHz, CDCl$_3$) δ 7.89 (1H, d, J=7.6 Hz), 7.52 (1H, t, J=7.6 Hz), 7.28-7.24 (1H, m), 7.22-7.15 (4H, m), 4.73 (1H, t, J=7.6 Hz), 4.58-4.56 (1H, m), 4.07-3.98 (1H, m), 3.85-3.82 (1H, m), 3.76-3.70 (1H, m), 3.62 (3H, s), 3.43-3.42 (1H, m), 3.01-2.94 (2H, m), 2.68 (3H, s), 2.44 (3H, s), 2.36 (3H, br s), 1.77-1.62 (1H, m), 1.52-1.38 (1H, m), 1.11-1.05 (3H, m).

Reference Example 181

Production of methyl 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoate

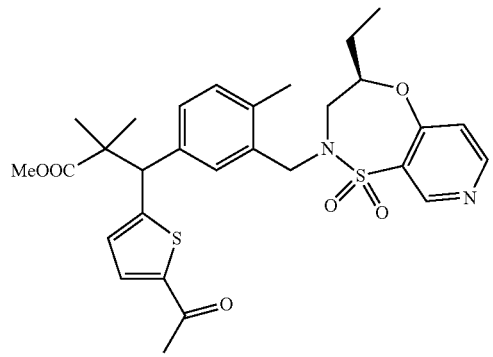 [SMILES: CC[C@@H]1CN(Cc2cc(C(c3ccc(C(C)=O)s3)C(C)(C)C(=O)OC)ccc2C)S(=O)(=O)c2cnccc2O1]

A DMF (6.9 mL) solution of methyl 3-(5-acetylthiophen-2-yl)-3-[3-(chloromethyl)-4-methylphenyl]-2,2-dimethylpropanoate (87.4 mg, 0.231 mmol), (R)-4-ethyl-3,4-dihydro-2H-pyrido[4,3-b][1,4,5]oxathiazepine 1,1-dioxide (52.7 mg, 0.231 mmol), potassium carbonate (96.0 mg, 0.693 mmol), and tetrabutylammonium iodide (17.1 mg, 0.046 mmol) was stirred at room temperature for 3.5 hours. The reaction solution was cooled to room temperature, and ethyl acetate was added, followed by washing with water and saturated saline. The organic layer was dried over sodium sulfate, and the solvent was removed by distillation under reduced pressure. The obtained crude product was purified by silica gel column chromatography (hexane/ethyl acetate (v/v)=67/33→46/54), thereby obtaining the title compound (181.0 mg, quant.) as an oily light yellow substance.

$^1$H NMR (400 Mz, CDCl$_3$) δ 9.03 (1H, s), 8.66 (1H, dd, J=5.6, 1.6 Hz), 7.51 (1H, dd, J=4.0, 1.6 Hz), 7.24-7.20 (2H, m), 7.16-7.14 (1H, m), 7.12-7.08 (1H, m), 6.98-6.96 (1H, m), 4.70/4.69 (1H, s), 4.46-4.37 (2H, m), 4.22-4.16 (1H, m), 3.60 (3H, br s), 3.53-3.44 (1H, m), 3.18-3.12 (1H, m), 2.50

(3H, br s), 2.32 (3H, br s), 1.72-1.63 (1H, m), 1.54-1.47 (1H, m), 1.30 (3H, br s), 1.24-1.22 (3H, m), 1.07-1.02 (3H, m).

Reference Example 182

Production of methyl 3-(5-acetylthiophen-2-yl)-3-(3-{[(4-methoxybenzyl)oxy]methyl}-4-methylphenyl)propanoate

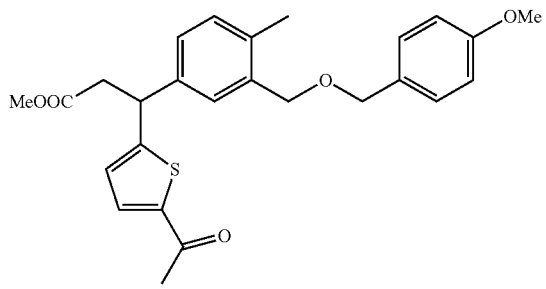 [SMILES: COC(=O)CC(c1ccc(C)c(COCc2ccc(OC)cc2)c1)c1ccc(C(C)=O)s1]

2N hydrochloric acid (0.9 mL) was added to a tetrahydrofuran (1.8 mL) solution of methyl 3-(3-{[(4-methoxybenzyl)oxy]methyl}-4-methylphenyl)-3-[5-(2-methyl-1,3-dioxolan-2-yl)thiophen-2-yl]propanoate (297.6 mg, 0.60 mmol), and the mixture was stirred at room temperature for 2 hours. The mixture was diluted with water and extracted with dichloromethane. The organic layer was washed with saturated saline and dried over sodium sulfate, and the solvent was distilled under reduced pressure, thereby obtaining the title compound (230.4 mg, 85%) as an oily light yellow substance.

$^1$H NMR (400 MHz, CDCl$_3$) δ 7.49 (1H, d, J=4.0 Hz), 7.28-7.24 (3H, m), 7.11 (2H, br s), 6.90-6.86 (3H, m), 4.74 (1H, t, J=8.0 Hz), 4.48 (2H, s), 4.47 (2H, s), 3.82 (3H, s), 3.62 (3H, s), 3.15-3.00 (2H, m), 2.48 (3H, s), 2.27 (3H, s).

Reference Example 183

Production of methyl 3-(5-acetylthiophen-2-yl)-3-[3-(hydroxymethyl)-4-methylphenyl]propanoate

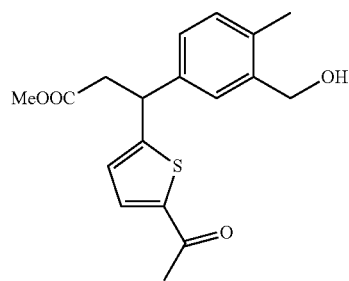 [SMILES: COC(=O)CC(c1ccc(C)c(CO)c1)c1ccc(C(C)=O)s1]

DDQ (231.1 mg, 1.02 mmol) was added at 0° C. to a dichloromethane/water (10/1) (5.28 mL) solution of methyl 3-(5-acetylthiophen-2-yl)-3-(3-{[(4-methoxybenzyl)oxy]methyl}-4-methylphenyl)propanoate (230.4 mg, 0.509 mmol). The mixture was stirred at room temperature for 2 hours. A saturated sodium hydrogen carbonate aqueous solution was added to the reaction mixture, followed by extraction with dichloromethane. The organic layer was washed with saturated saline and dried over sodium sulfate, and the solvent was distilled under reduced pressure. The residue was purified by silica gel column chromatography (hexane/ethyl acetate (v/v)=57/43→36/64), thereby obtaining the title compound (149.6 mg, 85%) as an oily colorless substance.

$^1$H NMR (400 MHz, CDCl$_3$) δ 7.49 (1H, d, J=4.0 Hz), 7.29 (1H, br s), 7.10 (2H, br s), 6.87 (1H, br d, J=4.0 Hz), 4.74 (1H, t, J=8.0 Hz), 4.64 (2H, s), 3.60 (3H, s), 3.15-3.01 (2H, m), 2.46 (3H, s), 2.28 (3H, s).

Reference Example 184

Production of methyl 3-(5-acetylthiophen-2-yl)-3-[3-(chloromethyl)-4-methylphenyl]propanoate

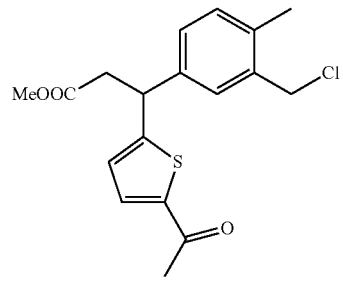 [SMILES: COC(=O)CC(c1ccc(C)c(CCl)c1)c1ccc(C(C)=O)s1]

DIPEA (115.7 μL, 0.68 mmol) and methanesulfonyl chloride (41.8 μL, 0.54 mmol) were added to a dichloromethane (3.5 mL) suspension of methyl 3-(5-acetylthiophen-2-yl)-3-[3-(hydroxymethyl)-4-methylphenyl]propanoate (150.0 mg, 0.45 mmol) and lithium chloride (38.4 mg, 0.91 mmol), and the mixture was stirred at room temperature for 19 hours. Dichloromethane was added to the reaction solution, followed by washing with a saturated sodium hydrogen carbonate aqueous solution and saturated saline. The organic layer was dried over sodium sulfate, and the solvent was distilled under reduced pressure. The residue was purified by silica gel column chromatography (hexane/ethyl acetate (v/v)=67/33→46/54), thereby obtaining the title compound (105.0 mg, 67%) as an oily colorless substance.

$^1$H NMR (400 MHz, CDCl$_3$) δ 7.51 (1H, d, J=4.0 Hz), 7.21 (1H, br s), 7.15 (2H, br s), 6.87 (1H, br d, J=4.0 Hz), 4.74 (1H, t, J=8.0 Hz), 4.56 (2H, s), 3.62 (3H, s), 3.15-3.00 (2H, m), 2.48 (3H, s), 2.38 (3H, s).

Reference Example 185

Production of methyl 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)propanoate

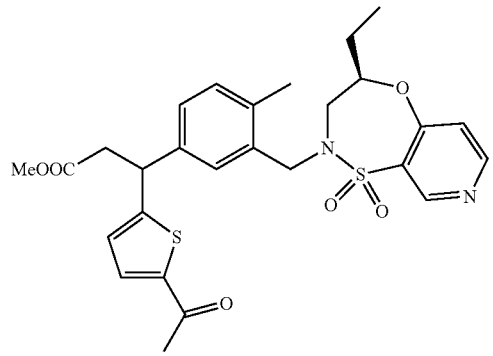 [SMILES: CC[C@@H]1CN(Cc2cc(C(CC(=O)OC)c3ccc(C(C)=O)s3)ccc2C)S(=O)(=O)c2cnccc2O1]

A DMF (3.0 mL) solution of methyl 3-(5-acetylthiophen-2-yl)-3-[3-(chloromethyl)-4-methylphenyl]propanoate (35.0 mg, 0.10 mmol), (R)-4-ethyl-3,4-dihydro-2H-pyrido[4,3-b][1,4,5]oxathiazepine 1,1-dioxide (23.0 mg, 0.10 mmol), potassium carbonate (41.5 mg, 0.30 mmol), and tetrabutylammonium iodide (7.4 mg, 0.02 mmol) was stirred at room temperature for 4 hours. Ethyl acetate was added to the reaction solution, followed by washing with water and saturated saline. The organic layer was dried over sodium sulfate, and the solvent was removed by distillation under reduced pressure. The obtained crude product was purified by silica gel column chromatography (hexane/ethyl acetate (v/v)=55/45→36/64), thereby obtaining the title compound (48.2 mg, 89%) as an oily colorless substance.

$^1$H NMR (400 Mz, CDCl$_3$) δ 9.02 (1H, s), 8.65 (1H, d, J=5.6 Hz), 7.50 (1H, br d, J=4.0 Hz), 7.17 (2H, br s), 7.11-7.08 (2H, m), 6.88 (1H, br d, J=4.0 Hz), 4.73 (1H, t, J=7.6 Hz), 4.45-4.37 (2H, m), 4.16-4.09 (1H, m), 3.62 (3H, s), 3.51-3.43 (1H, m), 3.17-3.09 (2H, m), 3.05-3.00 (1H, m), 2.49 (3H, s), 2.33 (3H, s), 1.74-1.65 (1H, m), 1.56-1.50 (1H, m), 1.04 (3H, br t, J=7.6 Hz).

Reference Example 186

Production of methyl 3-[4-fluoro-5-(1-hydroxyethyl)thiophen-2-yl]-3-(3-{[(4-methoxybenzyl)oxy]methyl}-4-methylphenyl)-2,2-dimethylpropanoate

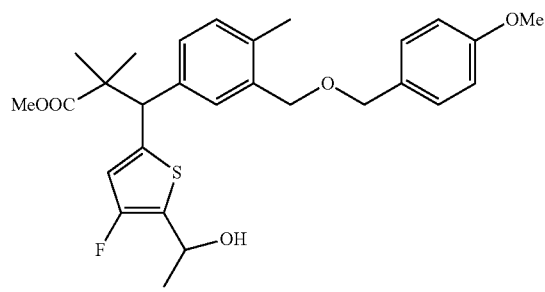 [SMILES: COC(=O)C(C)(C)C(c1ccc(C)c(COCc2ccc(OC)cc2)c1)c1cc(F)c(C(C)O)s1]

A 1N tetrabutylammonium fluoride THF solution (550 μL, 0.55 mmol) was added to a THF (2.0 mL) solution of methyl 3-(5-{1-[(tert-butyldimethylsilyl)oxy]ethyl}-4-fluorothiophen-2-yl)-3-(3-{[(4-methoxybenzyl)oxy]methyl}-4-methylphenyl)-2,2-dimethylpropanoate (131.8 mg, 0.21 mmol), and the mixture was stirred at room temperature for 1.5 hours. The solvent was removed by distillation under reduced pressure, and the obtained crude product was purified by silica gel column chromatography (hexane/ethyl acetate (v/v)=76/24→55/45), thereby obtaining the title compound (95.5 mg, 94%) as an oily colorless substance.

$^1$H NMR (400 MHz, CDCl$_3$) δ 7.29-7.27 (3H, m), 7.16 (1H, d, J=8.0 Hz), 7.10 (1H, d, J=8.0 Hz), 6.89 (2H, d, J=8.4 Hz), 6.64, 6.63 (each 0.5H, s), 5.18-5.12 (1H, m), 4.51-4.48 (5H, m), 3.82 (3H, s), 3.61 (3H, s), 2.28 (3H, s), 1.87 (1H, br s), 1.51, 1.50 (each 1.5H, d, J=6.4 Hz, thiophene β-CH$_3$ regioisomers), 1.30 (3H, s), 1.20 (3H, s).

Reference Example 187

Production of methyl 3-[5-acetyl-4-fluorothiophen-2-yl]-3-(3-{[(4-methoxybenzyl)oxy]methyl}-4-methylphenyl)-2,2-dimethylpropanoate

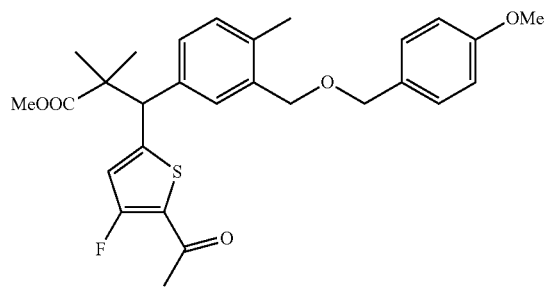 [SMILES: COC(=O)C(C)(C)C(c1ccc(C)c(COCc2ccc(OC)cc2)c1)c1cc(F)c(C(C)=O)s1]

Manganese dioxide (822.2 mg, 9.45 mmol) was added to a dichloromethane (2.0 mL) solution of methyl 3-[4-fluoro-5-(1-hydroxyethyl)thiophen-2-yl]-3-(3-{[(4-methoxybenzyl)oxy]methyl}-4-methylphenyl)-2,2-dimethylpropanoate (95.5 mg, 0.19 mmol). The reaction mixture was stirred at room temperature for 2.5 hours. Further, manganese dioxide (317.7 mg, 3.65 mmol) was added, and the mixture was stirred at room temperature for 1 hour. The mixture was diluted with water and extracted with ethyl acetate. The organic layer was washed with saturated saline and dried over sodium sulfate, and the solvent was removed by distillation under reduced pressure. The obtained crude product was purified by silica gel column chromatography (hexane/ethyl acetate (v/v)=86/14→65/35), thereby obtaining the title compound (92.1 mg, 97%) as an oily colorless substance.

$^1$H NMR (400 MHz, CDCl$_3$) δ 7.29-7.27 (3H, m), 7.15 (1H, dd, J=7.6, 1.2 Hz), 7.11 (1H, d, J=7.6 Hz), 6.90 (2H, d, J=8.4 Hz), 6.75 (1H, s), 4.55 (1H, s), 4.49 (2H, s), 4.48 (2H, s), 3.82 (3H, s), 3.62 (3H, s), 2.51, 2.50 (each 1.5H, s), 2.28 (3H, s), 1.32 (3H, s), 1.21 (3H, s).

Reference Example 188

Production of methyl 3-(5-acetyl-4-fluorothiophen-2-yl)-3-[3-(hydroxymethyl)-4-methylphenyl]-2,2-dimethylpropanoate

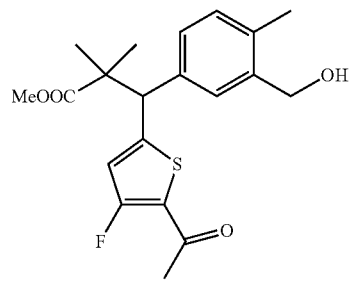 [SMILES: COC(=O)C(C)(C)C(c1ccc(C)c(CO)c1)c1cc(F)c(C(C)=O)s1]

Methyl 3-[5-acetyl-4-fluorothiophen-2-yl]-3-(3-{[(4-methoxybenzyl)oxy]methyl}-4-methylphenyl)-2,2-dimethylpropanoate (92.1 mg, 0.18 mmol), dichloromethane (2.5 mL), water (250 μL), and DDQ (63.9 mg, 0.28 mmol) were used as raw materials, and the same operation was performed as in Reference Example 25, thereby obtaining the title compound (65.7 mg, 94%) as an oily colorless substance.

$^1$H NMR (400 MHz, CDCl$_3$) δ 7.31 (1H, d, J=1.6 Hz), 7.15 (1H, dd, J=8.0, 1.6 Hz), 7.11 (1H, d, J=8.0 Hz), 6.75 (1H, s), 4.67 (2H, s), 4.55 (1H, s), 3.63 (3H, s), 2.50, 2.49 (each 1.5H, s, acetyl regioisomers), 2.29 (3H, s), 1.32 (3H, s), 1.20 (3H, s).

Reference Example 189

Production of methyl 3-(5-acetyl-4-fluorothiophen-2-yl)-3-[3-(chloromethyl)-4-methylphenyl]-2,2-dimethylpropanoate

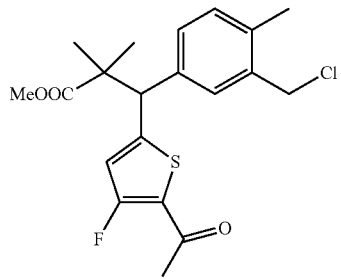 [SMILES: COC(=O)C(C)(C)C(c1ccc(C)c(CCl)c1)c1cc(F)c(C(C)=O)s1]

DIPEA (90 µL, 0.52 mmol) and methanesulfonyl chloride (27 µL, 0.35 mmol) were added to a dichloromethane (1.5 mL) suspension of methyl 3-(5-acetylthiophen-2-yl)-3-[3-(hydroxymethyl)-4-methylphenyl]propanoate (65.7 mg, 0.17 mmol) and lithium chloride (40.1 mg, 0.95 mmol), and the mixture was stirred at room temperature for 20 hours. Ethyl acetate was added to the reaction solution, followed by washing with a 10% citric acid aqueous solution, a saturated sodium hydrogen carbonate aqueous solution, and saturated saline. The organic layer was dried over sodium sulfate, and the solvent was removed by distillation under reduced pressure, thereby obtaining the title compound (71.8 mg, quant.) as an oily transparent light brown substance.

$^1$H NMR (400 MHz, CDCl$_3$) δ 7.23 (1H, d, J=1.6 Hz), 7.21 (1H, dd, J=8.0, 1.6 Hz), 7.15 (1H, d, J=8.0 Hz), 6.76 (1H, s), 4.57 (2H, s), 4.44 (1H, s), 3.64 (3H, s), 2.514, 2.507 (each 1.5H, s), 2.39 (3H, s), 1.32 (3H, s), 1.22 (3H, s).

Reference Example 190

Production of methyl 3-(5-acetyl-4-fluorothiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoate

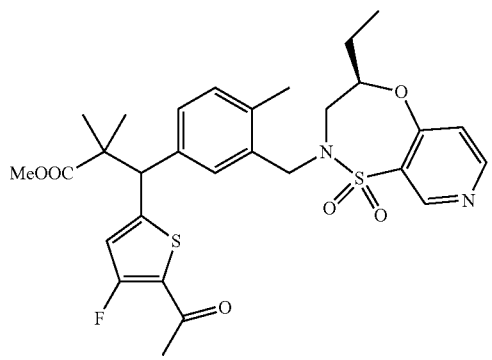 [SMILES: CC[C@@H]1CN(Cc2cc(C(c3cc(F)c(C(C)=O)s3)C(C)(C)C(=O)OC)ccc2C)S(=O)(=O)c2cnccc2O1]

A DMF (1.0 mL) solution of methyl 3-(5-acetyl-4-fluorothiophen-2-yl)-3-[3-(chloromethyl)-4-methylphenyl]-2,2-dimethylpropanoate (0.17 mmol), (R)-4-ethyl-3,4-dihydro-2H-pyrido[4,3-b][1,4,5]oxathiazepine 1,1-dioxide (41.0 mg, 0.18 mmol), potassium carbonate (72.3 mg, 0.52 mmol), and tetrabutylammonium iodide (13.1 mg, 0.035 mmol) was stirred at room temperature for 2 hours. The reaction solution was cooled to room temperature, and ethyl acetate was added, followed by washing with water and saturated saline. The organic layer was dried over sodium sulfate, and the solvent was removed by distillation under reduced pressure. The obtained crude product was purified by silica gel column chromatography (hexane/ethyl acetate (v/v)=57/43→36/64), thereby obtaining the title compound (93.7 mg, 92%) as an oily colorless substance.

$^1$H NMR (400 Mz, CDCl$_3$) δ 9.02 (1H, s), 8.65 (1H, dd, J=5.6, 0.4 Hz), 7.21 (1H, dd, J=7.6, 1.6 Hz), 7.17-7.14 (2H, m), 7.09 (1H, d, J=5.6, 2.0 Hz), 6.76, 6.75 (each 0.5H, s), 4.55, 4.54 (each 0.5H, s), 4.47-4.36 (2H, m), 4.16, 4.14 (each 0.5H, d, J=14.4 Hz), 3.640, 3.639 (each 1.5H, s), 3.51-3.43 (1H, m), 3.17 (1H, dt, J=15.2, 2.8 Hz), 2.51, 2.50 (each 1.5H, s), 2.33, 2.32 (each 1.5H, s), 1.74-1.63 (1H, m), 1.60-1.49 (1H, m), 1.30, 1.29 (each 1.5H, s), 1.20 (3H, s), 1.05 (3H, t, J=7.2 Hz).

Reference Example 191

Production of 3-(5-acetyl-4-methoxythiophen-2-yl)-3-(3-{[(4-methoxybenzyl)oxy]methyl}-4-methylphenyl)-2,2-dimethylpropanoic acid

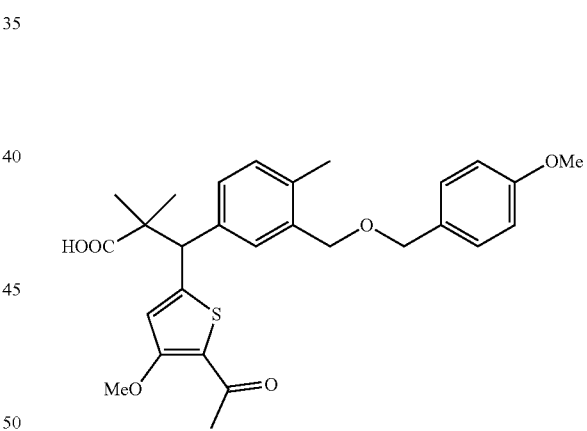

Methyl 3-[5-acetyl-4-fluorothiophen-2-yl]-3-(3-{[(4-methoxybenzyl)oxy]methyl}-4-methylphenyl)-2,2-dimethylpropanoate (609.6 mg, 1.2 mmol), methanol/1,4-dioxane (1/1) (10.0 mL), and a 4N sodium hydroxide aqueous solution (5.0 mL, 20 mmol) were used as raw materials, and the same operation was performed as in Example 43, thereby obtaining the title compound (497.2 mg, 82%) as an orange solid.

$^1$H NMR (400 MHz, CDCl$_3$) δ 7.32 (1H, d, J=2.0 Hz), 7.27 (2H, d, J=8.8 Hz), 7.21 (1H, dd, J=8.0, 2.0 Hz), 7.10 (1H, d, J=8.0 Hz), 6.89 (2H, d, J=8.8 Hz), 6.73 (1H, s), 4.63 (1H, s), 4.48 (4H, s), 3.87 (3H, s), 3.81 (3H, s), 2.46 (3H, s), 2.27 (3H, s), 1.34 (3H, s), 1.25 (3H s).

Reference Example 192

Production of 2-(trimethylsilyl)ethyl 3-(5-acetyl-4-methoxythiophen-2-yl)-3-(3-{[(4-methoxybenzyl)oxy]methyl}-4-methylphenyl)-2,2-dimethylpropanoate

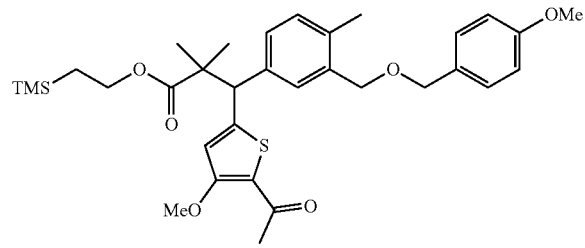 [SMILES: COc1ccc(COCc2cc(C(c3cc(OC)c(C(C)=O)s3)C(C)(C)C(=O)OCC[Si](C)(C)C)ccc2C)cc1]

2-(Trimethylsilyl)ethanol (520 μL, 3.0 mmol), DIPEA (430 μL, 3.0 mmol), and 4-dimethylaminopyridine (63.5 mg, 0.52 mnol) were added to a dimethylformamide (5.0 mL) solution of 3-(5-acetyl-4-methoxythiophen-2-yl)-3-(3-{[(4-methoxybenzyl)oxy]methyl}-4-methylphenyl)-2,2-dimethylpropanoic acid (491.7 mg, 1.0 mmol), and HBTU (568.4 mg, 1.5 mmol). After the mixture was stirred at room temperature for 22 hours, DMAP (63.1 mg, 0.52 mmol) was further added, and the mixture was stirred at room temperature for 3 hours. Further, 2-(trimethylsilyl)ethanol (280 μL, 2.0 mmol) and DMAP (119.5 mg, 1.0 mmol) were added, and the mixture was stirred at room temperature for 19.5 hours. Then, the reaction solution was diluted with hexane/ethyl acetate (1/1), and washed with 1N hydrochloric acid, a saturated sodium hydrogen carbonate aqueous solution, and saturated saline. The organic layer was dried over sodium sulfate, and the solvent was distilled under reduced pressure. The residue was purified by silica gel column chromatography (hexane/ethyl acetate (v/v)=86/14→65/35), thereby obtaining the title compound (409.4 mg, 69%) as an oily transparent yellow substance.

$^1$H NMR (400 MHz, CDCl$_3$) δ 7.31-7.26 (3H, m), 7.18 (1H, dd, J=7.6, 1.6H), 7.10 (1H, d, J=7.6 Hz), 6.89 (2H, d, J=8.8 Hz), 6.71 (1H, s), 4.61 (1H, s), 4.48 (4H, s), 4.10-4.05 (2H, m), 3.89 (3H, s), 3.81 (3H, s), 2.46, (3H, s), 2.27 (3H, s), 1.32 (3H, s), 1.21 (3H, s), 0.89-0.86 (2H, m), 0.01 (9H, s).

Reference Example 193

Production of 2-(trimethylsilyl)ethyl 3-(5-acetyl-4-methoxythiophen-2-yl)-3-[3-(hydroxymethyl)-4-methylphenyl]-2,2-dimethylpropanoate

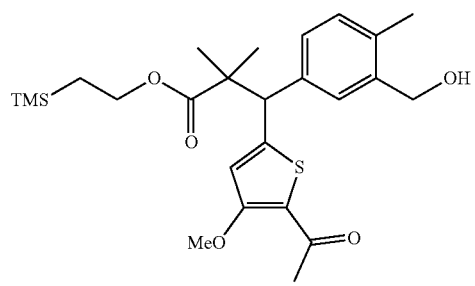 [SMILES: COc1cc(C(c2ccc(C)c(CO)c2)C(C)(C)C(=O)OCC[Si](C)(C)C)sc1C(C)=O]

2-(Trimethylsilyl)ethyl 3-(5-acetyl-4-methoxythiophen-2-yl)-3-(3-{[(4-methoxybenzyl)oxy]methyl}-4-methylphenyl)-2,2-dimethylpropanoate (409.3 mg, 0.69 mmol), dichloromethane (6.0 mL), water (600 μL), and DDQ (188.4 mg, 0.83 mmol) were used as raw materials, and the same operation was performed as in Reference Example 25, thereby obtaining the title compound (316.9 mg, 97%) as an oily colorless substance.

$^1$H NMR (400 MHz, CDCl$_3$) δ 7.32 (1H, d, J=2.0 Hz), 7.21 (1H, dd, J=8.0, 2.0 Hz), 7.11 (1H, d, J=8.0 Hz), 6.73 (1H, s), 4.67 (2H, d, J=5.6 Hz), 4.62 (1H, s), 4.10-4.06 (2H, m), 3.91 (3H, s), 2.46 (3H, s), 2.31 (3H, s), 1.56 (1H, t, J=5.6 Hz), 1.32 (3H, s), 1.22 (3H, s), 0.90-0.86 (2H, m), 0.02 (9H, s).

Reference Example 194

Production of 2-(trimethylsilyl)ethyl 3-(5-acetyl-4-methoxythiophen-2-yl)-3-[3-(chloromethyl)-4-methylphenyl]-2,2-dimethylpropanoate

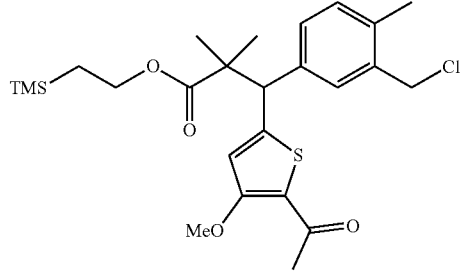 [SMILES: COc1cc(C(c2ccc(C)c(CCl)c2)C(C)(C)C(=O)OCC[Si](C)(C)C)sc1C(C)=O]

DIPEA (115 μL, 0.66 mmol) and methanesulfonyl chloride (34 μL, 0.44 mmol) were added to a dichloromethane (2.0 mL) suspension of 2-(trimethylsilyl)ethyl 3-(5-acetyl-4-methoxythiophen-2-yl)-3-[3-(hydroxymethyl)-4-methylphenyl]-2,2-dimethylpropanoate (101.8 mg, 0.22 mmol) and lithium chloride (49.6 mg, 1.2 mmol), and the mixture was stirred at room temperature for 15.5 hours. Ethyl acetate was added to the reaction solution, followed by washing with a 10% citric acid aqueous solution, a saturated sodium hydrogen carbonate aqueous solution, and saturated saline. The organic layer was dried over sodium sulfate, and the solvent was removed by distillation under reduced pressure, thereby obtaining the title compound (110.3 mg, quant.) as an oily transparent light brown substance.

$^1$H NMR (400 MHz, CDCl$_3$) δ 7.26-7.23 (2H, m), 7.12 (1H, d, J=7.6 Hz), 6.72 (1H, s), 4.60 (1H, s), 4.56 (2H, s), 4.09-4.05 (2H, m), 3.91 (3H, s), 2.73 (3H, s), 2.46 (3H, s), 1.31 (3H, s), 1.22 (3H, s), 0.88-0.84 (2H, m), 0.10 (9H, s).

Reference Example 195

Production of 2-(trimethylsilyl)ethyl 3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoate

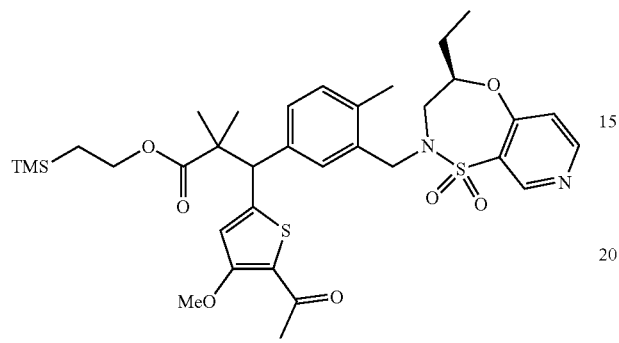

A DMF (1.0 mL) solution of 2-(trimethylsilyl)ethyl 3-(5-acetyl-4-methoxythiophen-2-yl)-3-[3-(chloromethyl)-4-methylphenyl]-2,2-dimethylpropanoate (the entire amount of the compound synthesized in Reference Example 194), (R)-4-ethyl-3,4-dihydro-2H-pyrido[4,3-b][1,4,5]oxathiazepine 1,1-dioxide (51.0 mg, 0.22 mmol), potassium carbonate (59.6 mg, 0.43 mmol), and tetrabutylammonium iodide (18.8 mg, 0.051 mmol) was stirred at 25° C. for 1 hour, and then further stirred at 40° C. for 1 hour. The reaction solution was cooled to room temperature, and hexane/ethyl acetate (1/1) was added, followed by washing with water and saturated saline. The organic layer was dried over sodium sulfate, and the solvent was removed by distillation under reduced pressure. The obtained crude product was purified by silica gel column chromatography (hexane/ethyl acetate (v/v)=63/37→42/58), thereby obtaining the title compound (154.1 mg, quant.) as an oily colorless and transparent substance.

$^1$H NMR (400 Mz, CDCl$_3$) δ 9.01 (1H, s), 8.66, 8.65 (each 0.5H, d, J=5.6 Hz), 7.24-7.22 (2H, m), 7.14 (1H, d, J=8.0 Hz), 7.10, 7.09 (each 0.5H, d, J=5.6 Hz), 6.76, 6.75 (each 0.5H, s), 4.60, 4.59 (each 0.5H, s), 4.45-4.36 (2H, m), 4.16-4.05 (3H, m), 3.933, 3.932 (each 1.5H, s), 3.53-3.44 (1H, m), 3.18-3.11 (1H, m), 2.46 (3H, s), 2.32 (3H, s), 1.73-1.61 (1H, m), 1.58-1.46 (1H, m), 1.30 (3H, s), 1.21, 1.20 (each 1.5H, s), 1.05, 1.03 (each 1.5H, t, J=7.2 Hz), 0.90-0.86 (2H, m), 0.02, 0.01 (each 4.5H, s).

Reference Example 196

Production of 2-(5-bromo-3-fluorothiophen-2-yl)-2-methyl-1,3-dioxolane

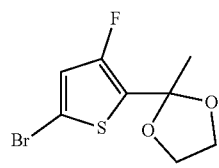

1-(5-Bromo-3-fluorothiophen-2-yl)ethan-1-one (350.0 mg, 1.57 mmol), ethylene glycol (0.957 mL, 17.3 mmol), p-TsOH—H$_2$O (15.0 mg, 0.08 mmol), and toluene (9.7 mL) were used as raw materials, and the same operation was performed as in Reference Example 76, thereby obtaining the title compound (386.9 mg, 92%) as an oily pale dark brown substance.

$^1$H NMR (400 MHz, CDCl$_3$) δ 6.78 (1H, br s), 4.07-4.03 (2H, m), 4.02-3.97 (2H, m), 1.77 (3H, s).

Reference Example 197

Production of methyl (E)-3-[4-fluoro-5-(2-methyl-1,3-dioxolan-2-yl)thiophen-2-yl]acrylate

2-(5-Bromo-3-fluorothiophen-2-yl)-2-methyl-1,3-dioxolane (150 mg, 0.56 mmol), tetrabutylammonium chloride (7.8 mg, 0.028 mmol), PdCl$_2$(dppf)$_2$-CH$_2$Cl$_2$ (45.9 mg, 0.056 mmol), DMA (0.74 mL), methyl acrylate (151 μL, 1.7 mmol), and N,N-dicyclohexylmethylamine (359 μL, 1.7 mmol) were used as raw materials, and the same operation was performed as in Reference Example 88, thereby obtaining the title compound (86.3 mg, 56%) as a pale yellow solid.

$^1$H NMR (400 MHz, CDCl$_3$) δ 7.58 (1H, d, J=16.0 Hz), 6.93 (1H, s), 6.20 (1H, d, J=16.0 Hz), 4.10-4.03 (2H, m), 4.02-3.99 (2H, m), 3.79 (3H, s), 1.80 (3H, s).

Reference Example 198

Production of methyl 3-[4-fluoro-5-(2-methyl-1,3-dioxolan-2-yl)thiophen-2-yl]-3-(3-{[(4-methoxybenzyl)oxy]methyl}-4-methylphenyl)propanoate

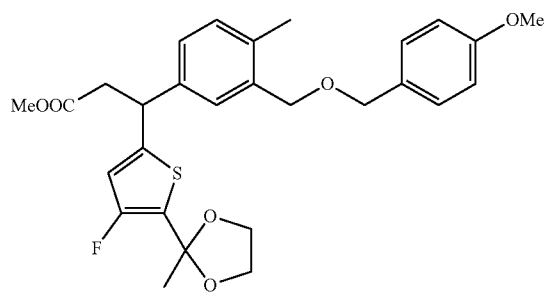 [SMILES: COC(=O)CC(c1ccc(C)c(COCc2ccc(OC)cc2)c1)c1cc(F)c(C2(C)OCCO2)s1]

A 2N potassium hydroxide solution (32 μL, 0.063 mmol) was added under argon atmosphere to a toluene (0.48 mL) solution of 2-(3-{[(4-methoxybenzyl)oxy]methyl}-4-methylphenyl)-4,4,5,5-tetramethyl-1,3,2-dioxaborolane (46.7 mg, 0.13 mmol), methyl (E)-3-[4-fluoro-5-(2-methyl-1,3- dioxolan-2-yl)thiophen-2-yl]acrylate (86.3 mg, 0.32 mmol), and [RhCl(cod)]$_2$ (6.3 mg, 0.013 mmol), and the mixture was heated at 100° C. for 1.5 hours. Water was added to the mixture, followed by extraction with ethyl acetate. The organic layer was washed with saturated saline and dried over sodium sulfate, and the solvent was concentrated under reduced pressure. The residue was purified by silica gel column chromatography (hexane/ethyl acetate (v/v)=87/13→66/34), thereby obtaining the title compound (43.7 mg, 67%) as an oily pale yellow substance.

$^1$H NMR (400 MHz, CDCl$_3$) δ 7.27 (2H, br d, J=6.8 Hz), 7.21 (1H, br s), 7.13-7.07 (2H, m), 6.89 (2H, br d, J=6.8 Hz), 6.52 (1H, br s), 4.55 (1H, t, J=8.0 Hz), 4.48 (4H, br s), 4.01-3.91 (4H, m), 3.82 (3H, s), 3.61 (3H, s), 3.06-2.92 (2H, m), 2.28 (3H, s), 1.74 (3H, s).

Reference Example 199

Production of methyl 3-[4-fluoro-5-(2-methyl-1,3-dioxolan-2-yl)thiophen-2-yl]-3-(3-{[(4-methoxybenzyl)oxy]methyl}-4-methylphenyl)-2-methylpropanoate

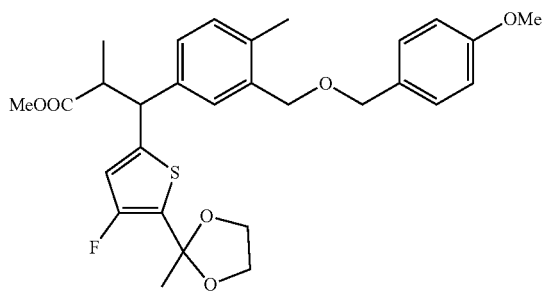 [SMILES: COC(=O)C(C)C(c1ccc(C)c(COCc2ccc(OC)cc2)c1)c1cc(F)c(C2(C)OCCO2)s1]

A 2M LDA THF/heptane/ethylbenzene solution (0.17 mL, 0.34 mmol) was added under argon atmosphere at −78° C. to a THF (2.0 mL) solution of methyl 3-[4-fluoro-5-(2-methyl-1,3-dioxolan-2-yl)thiophen-2-yl]-3-(3-{[(4-methoxybenzyl)oxy]methyl}-4-methylphenyl)propanoate (170 mg, 0.33 mmol). The reaction mixture was stirred at −78° C. for 30 minutes, and then stirred at −40° C. for 20 minutes. Iodomethane (0.3 mL, 4.9 mmol) was added, and the mixture was heated to room temperature and stirred for 3 hours. Water was added to the mixture to stop the reaction, followed by extraction with ethyl acetate. The organic layer was washed with saturated saline and dried over sodium sulfate, and the solvent was distilled under reduced pressure. The residue was purified by silica gel column chromatography (hexane/ethyl acetate (v/v)=8%), thereby obtaining the title compound (141.1 mg, 81%) as an oily colorless substance.

$^1$H NMR (400 MHz, CDCl$_3$) δ 7.27 (2H, br d, J=8.8 Hz), 7.24-7.20 (1H, m), 7.13-7.06 (2H, m), 6.90 (2H, br d, J=8.8 Hz), 6.61-6.52 (1H, m), 4.49 (4H, br s), 4.17-4.14 (1H, m), 3.98-3.89 (4H, m), 3.82 (3H, s), 3.63-3.43 (3H, m), 3.19-2.92 (1H, m), 2.28-2.25 (3H, m), 1.74-1.72 (3H, m), 1.23-1.02 (3H, m).

Reference Example 200

Production of methyl 3-(5-acetyl-4-fluorothiophen-2-yl)-3-(3-{[(4-methoxybenzyl)oxy]methyl}-4-methylphenyl)-2-methylpropanoate

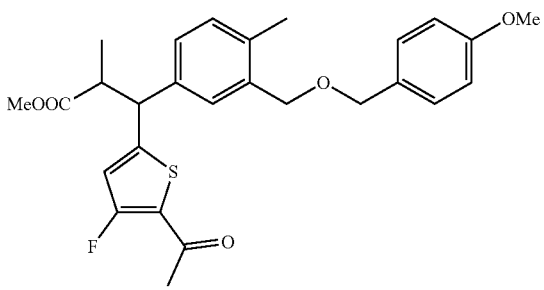 [SMILES: COC(=O)C(C)C(c1ccc(C)c(COCc2ccc(OC)cc2)c1)c1cc(F)c(C(C)=O)s1]

2N hydrochloric acid (1.2 mL) was added to a tetrahydrofuran (3.5 mL) solution of methyl 3-[4-fluoro-5-(2-methyl-1,3-dioxolan-2-yl)thiophen-2-yl]3-(3-{[(4-methoxybenzyl)oxy]methyl}-4-methylphenyl)-2-methylpropanoate (243.2 mg, 0.46 mmol), and the mixture was stirred at room temperature for 15 hours. The mixture was neutralized with a 1N sodium hydroxide aqueous solution and extracted with dichloromethane. The organic layer was washed with water and dried over sodium sulfate, and the solvent was distilled under reduced pressure, thereby obtaining the title compound (216.5 mg, 97%) as an oily light yellow substance.

$^1$H NMR (400 MHz, CDCl$_3$) δ 7.28 (2H, d, J=8.4 Hz), 7.24-7.21 (1H, m), 7.14-7.06 (2H, m), 6.90 (2H, d, J=8.4 Hz), 6.71-6.63 (1H, m), 4.50-4.46 (4H, m), 4.27-4.22 (1H, m), 3.82 (3H, s), 3.65 (3H, s), 3.23-3.14 (1H, m), 2.50-2.48 (3H, m), 2.27-2.25 (3H, m), 1.24-1.06 (3H, m).

Reference Example 201

Production of methyl 3-(5-acetyl-4-fluorothiophen-2-yl)-3-[3-(hydroxymethyl)-4-methylphenyl]-2-methylpropanoate

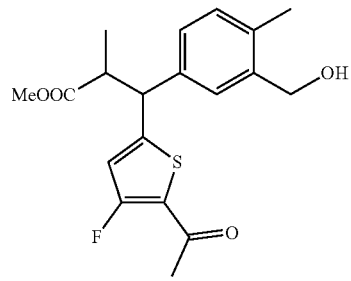 [SMILES: COC(=O)C(C)C(c1ccc(C)c(CO)c1)c1cc(F)c(C(C)=O)s1]

DDQ (38.1 mg, 0.17 mmol) was added at 0° C. to a dichloromethane/water (10/1) (3.5 mL) solution of methyl 3-(5-acetylthiophen-2-yl)-3-(3-{[(4-methoxybenzyl)oxy]methyl}-4-methylphenyl)-2-methylpropanoate (68.5 mg, 0.14 mmol). The mixture was stirred at room temperature for 3 hours. A saturated sodium hydrogen carbonate aqueous solution was added to the reaction mixture, followed by extraction with dichloromethane. The organic layer was washed with saturated saline and dried over sodium sulfate, and the solvent was distilled under reduced pressure. The residue was purified by silica gel column chromatography (hexane/ethyl acetate (v/v)=87/13→66/34), thereby obtaining the title compound (34.5 mg, 68%) as an oily light yellow substance.

¹H NMR (400 MHz, CDCl₃) δ 7.28-7.26 (1H, m), 7.15-7.04 (2H, m), 6.73-6.65 (1H, m), 4.69-4.64 (2H, m), 4.28-4.23 (1H, m), 3.65-3.48 (3H, m), 3.26-2.98 (1H, m), 2.50-2.47 (3H, m), 2.30-2.28 (3H, m), 1.80 (1H, br s), 1.25-1.07 (3H, m).

Reference Example 202

Production of methyl 3-(5-acetyl-4-fluorothiophen-2-yl)-3-[3-(chloromethyl)-4-methylphenyl]-2-methylpropanoate

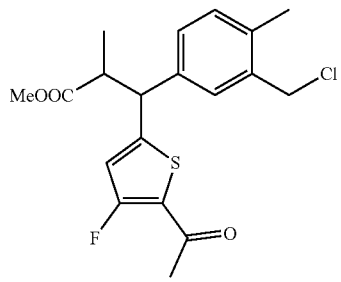 [SMILES: COC(=O)C(C)C(c1ccc(C)c(CCl)c1)c1cc(F)c(C(C)=O)s1]

DIPEA (42.7 µL, 0.25 mmol) and methanesulfonyl chloride (78 µL, 0.17 mmol) were added to a dichloromethane (0.75 mL) suspension of methyl 3-(5-acetyl-4-fluorothiophen-2-yl)-3-[3-(hydroxymethyl)-4-methylphenyl]-2-methylpropanoate (30.4 mg, 0.083 mmol) and lithium chloride (64.1 mg, 0.334 mmol), and the mixture was stirred at room temperature for 16 hours. Water was added to the reaction solution, followed by extraction with dichloromethane. The organic layer was dried over sodium sulfate, and the solvent was removed by distillation under reduced pressure. The residue was purified by silica gel column chromatography (hexane/ethyl acetate (v/v)=97/3→76/24), thereby obtaining the title compound (23.0 mg, 72%) as an oily light yellow substance.

¹H NMR (400 MHz, CDCl₃) δ 7.21-7.11 (3H, m), 6.73-6.70 (1H, m), 4.57-4.55 (2H, m), 4.28-4.21 (1H, m), 3.66-3.48 (3H, m), 3.23-3.14 (1H, m), 2.51-2.48 (3H, m), 2.39-2.36 (3H, m), 1.25-1.07 (3H, m).

Reference Example 203

Production of methyl 3-(5-acetyl-4-fluorothiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoate

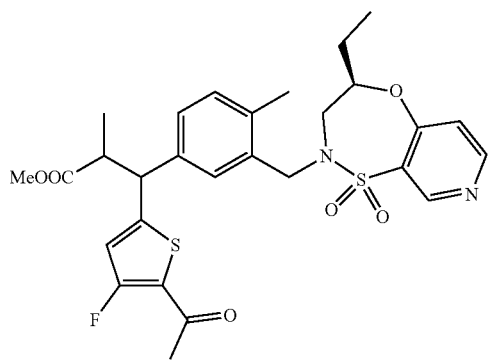 [SMILES: CC[C@@H]1CN(Cc2cc(C(c3cc(F)c(C(C)=O)s3)C(C)C(=O)OC)ccc2C)S(=O)(=O)c2cnccc2O1]

A DMF (1.3 mL) solution of methyl 3-(5-acetyl-4-fluorothiophen-2-yl)-3-[3-(chloromethyl)-4-methylphenyl]-2-methylpropanoate (23.0 mg, 0.06 mmol), (R)-4-ethyl-3,4-dihydro-2H-pyrido[4,3-b][1,4,5]oxathiazepine 1,1-dioxide (13.7 mg, 0.06 mmol), potassium carbonate (24.9 mg, 0.18 mmol), and tetrabutylammonium iodide (4.4 mg, 0.012 mmol) was stirred at room temperature for 3 hours. The reaction solution was cooled to room temperature, and hexane/ethyl acetate (4/6) was added, followed by washing with water and saturated saline. The organic layer was dried over sodium sulfate, and the solvent was removed by distillation under reduced pressure. The obtained crude product was purified by silica gel column chromatography (hexane/ethyl acetate (v/v)=67/33→446/54), thereby obtaining the title compound (29.6 mg, 86%) as an oily light yellow substance.

¹H NMR (400 Mz, CDCl₃) δ 9.03 (1H, s), 8.66 (1H, br d, J=5.6 Hz), 7.20-7.08 (4H, m), 6.73-6.70 (1H, m), 4.49-4.40 (2H, m), 4.30-4.13 (2H, m), 3.66-3.40 (4H, m), 3.21-3.13 (2H, m), 2.51-2.48 (3H, m), 2.34-2.32 (3H, m), 1.75-1.65 (1H, m), 1.61-1.50 (1H, m), 1.24-1.03 (6H, m).

Reference Example 204

Production of 3-(5-acetyl-4-methoxythiophen-2-yl)-3-(3-{[(4-methoxybenzyl)oxy]methyl}-4-methylphenyl)-2-methylpropanoic acid

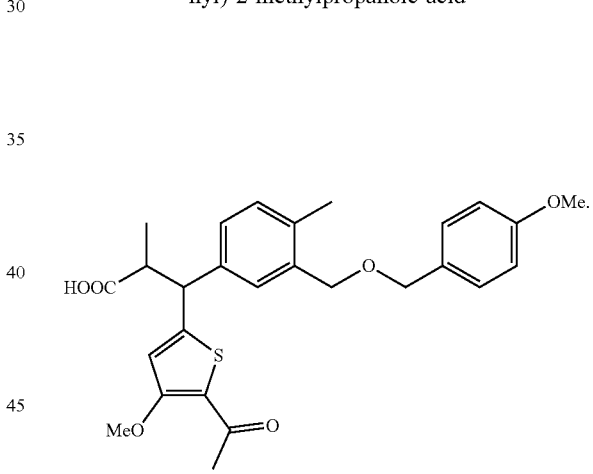

Methyl 3-(5-acetyl-4-fluorothiophen-2-yl)-3-(3-{[(4-methoxybenzyl)oxy]methyl}-4-methylphenyl)-2-methylpropanoate (216 mg, 0.45 mmol), methanol/1,4-dioxane (1/1) (3.2 mL), and a 4N sodium hydroxide aqueous solution (1.1 mL, 4.5 mmol) were used as raw materials, and the same operation was performed as in Reference Example 43, thereby obtaining the title compound (248.9 mg, quant.) as an oily dark brown substance.

¹H NMR (400 MHz, CDCl₃) δ 7.28-7.06 (5H, m), 6.90-6.87 (2H, m), 6.70-6.68 (1H, m), 4.49-4.44 (4H, m), 4.25-4.21 (1H, m), 3.91-3.80 (3H, m), 3.81 (3H, br s), 3.25-3.15 (1H, m), 2.44-2.42 (3H, m), 2.26-2.23 (3H, m), 1.25-1.07 (3H, m).

Reference Example 205

Production of 2-(trimethylsilyl)ethyl 3-(5-acetyl-4-methoxythiophen-2-yl)-3-(3-{[(4-methoxybenzyl)oxy]methyl}-4-methylphenyl)-2-methylpropanoate

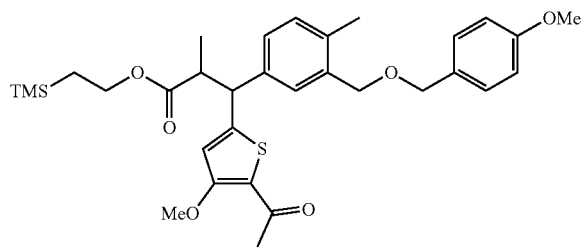 [SMILES: COc1ccc(COCc2cc(C(c3cc(OC)c(C(C)=O)s3)C(C)C(=O)OCC[Si](C)(C)C)ccc2C)cc1]

2-(Trimethylsilyl)ethanol (0.37 mL, 2.58 mmol), DIPEA (0.27 mL, 1.55 mmol), and 4-dimethylaminopyridine (126.1 mg, 1.03 mmol) were added to a dimethylformamide (4.7 mL) solution of 3-(5-acetyl-4-methoxythiophen-2-yl)-3-(3-{[(4-methoxybenzyl)oxy]methyl}-4-methylphenyl)-2-methylpropanoic acid (248.9 mg, 0.52 mmol) and HATU (294.3 mg, 0.77 mmol). After the reaction mixture was stirred at room temperature for 22 hours, water was added, followed by extraction with hexane/ethyl acetate (1/1). The organic layer was dried over sodium sulfate, and the solvent was distilled under reduced pressure. The residue was purified by silica gel column chromatography (hexane/ethyl acetate (v/v)=100/0→85/15), thereby obtaining the title compound (74.7 mg, 25%) as a white solid.

$^1$H NMR (400 MHz, CDCl$_3$) δ 7.26 (2H, br d, J=8.8 Hz), 7.21 (1H, s), 7.09 (2H, s), 6.88 (2H, br d, J=8.8 Hz), 6.67 (1H, s), 4.47 (2H, s), 4.43 (2H, s), 4.24 (1H, d, J=11.2 Hz), 4.10-4.05 (2H, m), 3.86 (3H, s), 3.80 (3H, s), 3.17-3.09 (1H, m), 2.41 (3H, s), 2.24 (3H, s), 1.04 (3H, d, J=6.8 Hz), 0.89-0.85 (2H, m), −0.00 (9H, s).

Reference Example 206

Production of 2-(trimethylsilyl)ethyl 3-(5-acetyl-4-methoxythiophen-2-yl)-3-[3-(hydroxymethyl)-4-methylphenyl]-2-methylpropanoate

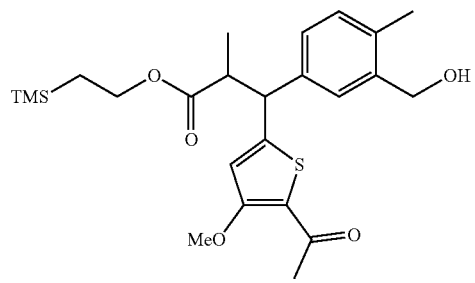 [SMILES: COc1cc(C(c2ccc(C)c(CO)c2)C(C)C(=O)OCC[Si](C)(C)C)sc1C(C)=O]

Methyl 3-[5-acetyl-4-fluorothiophen-2-yl]-3-(3-{[(4-methoxybenzyl)oxy]methyl}-4-methylphenyl)-2-methylpropanoate (74.7 mg, 0.13 mmol), dichloromethane (3 mL), water (0.17 mL), and DDQ (34.9 mg, 0.15 mmol) were used as raw materials, and the same operation was performed as in Reference Example 25, thereby obtaining the title compound (57.9 mg, 98%) as an oily colorless substance.

$^1$H NMR (400 MHz, CDCl$_3$) δ 7.28 (1H, s), 7.12 (2H, br s), 6.70 (1H, s), 4.67 (2H, br s), 4.27 (1H, d, J=11.2 Hz), 4.15-4.04 (2H, m), 3.90 (3H, s), 3.19-3.12 (1H, m), 2.43 (3H, s), 2.30 (3H, s), 1.72 (1H, br s), 1.06 (3H, d, J=7.2 Hz), 0.91-0.87 (2H, m), 0.02 (9H, s).

Reference Example 207

Production of 2-(trimethylsilyl)ethyl 3-(5-acetyl-4-methoxythiophen-2-yl)-3-[3-(chloromethyl)-4-methylphenyl]-2-methylpropanoate

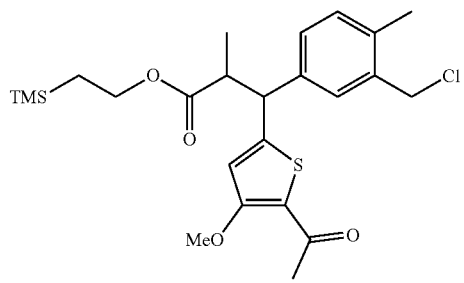 [SMILES: COc1cc(C(c2ccc(C)c(CCl)c2)C(C)C(=O)OCC[Si](C)(C)C)sc1C(C)=O]

DIPEA (85.7 µL, 0.50 mmol) and methanesulfonyl chloride (29.0 µL, 0.38 mmol) were added to a dichloromethane (1.1 mL) suspension of 2-(trimethylsilyl)ethyl 3-(5-acetyl-4-methoxythiophen-2-yl)-3-[3-(hydroxymethyl)-4-methylphenyl]-2-methylpropanoate (57.9 mg, 0.13 mmol) and lithium chloride (26.5 mg, 0.63 mmol), and the mixture was stirred at room temperature for 2.5 hours. Water was added to the reaction solution, followed by extraction with dichloromethane. The organic layer was dried over sodium sulfate, and the solvent was removed by distillation under reduced pressure, thereby obtaining the title compound (77.1 mg, quant.) as an oily pale yellow substance.

$^1$H NMR (400 MHz, CDCl$_3$) δ 7.18 (1H, s), 7.13 (2H, br s), 6.68 (1H, s), 4.55 (2H, s), 4.25 (1H, d, J=11.2 Hz), 4.10-4.05 (2H, m), 3.88 (3H, s), 3.16-3.08 (1H, m), 2.42 (3H, s), 2.36 (3H, s), 1.04 (3H, d, J=7.2 Hz), 0.89-0.85 (2H, m), −0.00 (9H, s).

Reference Example 208

Production of 2-(trimethylsilyl)ethyl 3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoate

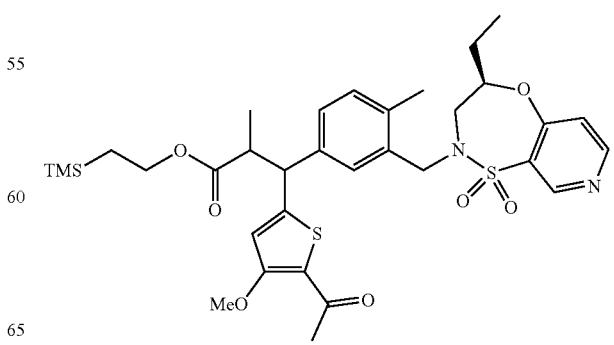

A DMF (3.4 mL) solution of 2-(trimethylsilyl)ethyl 3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoate (75.0 mg, 0.16 mmol), (R)-4-ethyl-3,4-dihydro-2H-pyrido[4,3-b][1,4,5]oxathiazepine 1,1-dioxide (35.6 mg, 0.16 mmol), potassium carbonate (64.7 mg, 0.47 mmol), and tetrabutylammonium iodide (11.5 mg, 0.031 mmol) was stirred at room temperature for 7 hours. Water was added to the reaction solution, followed by extraction with hexane/ethyl acetate (1/1). The organic layer was washed with saturated saline and dried over sodium sulfate, and the solvent was removed by distillation under reduced pressure. The obtained crude product was purified by silica gel column chromatography (hexane/ethyl acetate (v/v)=67/33→46/54), thereby obtaining the title compound (54.2 mg, 52%) as an oily pale yellow substance.

$^1$H NMR (400 Mz, CDCl$_3$) δ 9.02 (1H, s), 8.66 (1H, br d, J=5.6 Hz), 7.16-7.09 (4H, m), 6.72 (1H, s), 4.47-4.35 (2H, m), 4.29-4.08 (4H, m), 3.92 (3H, br s), 3.52-3.41 (1H, m), 3.19-3.09 (2H, m), 2.44 (3H, m), 2.33 (3H, s), 1.75-1.64 (1H, m), 1.57-1.49 (1H, m), 1.06-1.02 (6H, m), 0.92-0.87 (2H, m), 0.02 (9H, s).

Example 1

Production of 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl)furan-2-yl]propanoic acid (Compound 26)

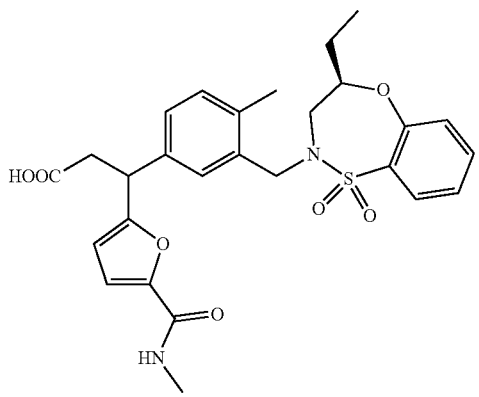 [SMILES: CC[C@@H]1CN(Cc2cc(C(CC(=O)O)c3ccc(C(=O)NC)o3)ccc2C)S(=O)(=O)c2ccccc2O1]

A 2N sodium hydroxide aqueous solution (220 μL, 0.44 mmol) was added to a methanol/1,4-dioxane solution (2/1) (0.6 mL) of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl)furan-2-yl]propanoate (47.7 mg, 0.088 mmol), and the mixture was stirred at room temperature for 21 hours. 1N hydrochloric acid was added, followed by extraction with dichloromethane/methanol (10/1). The organic layer was dried over sodium sulfate, and the solvent was distilled under reduced pressure. The residue was purified by preparative thin-layer chromatography (methanol/dichloromethane (v/v)=1/9), thereby obtaining the title compound (27.7 mg, 60%) as a white solid.

$^1$H NMR (400 MHz, CDCl$_3$) δ 7.85 (1H, d, J=8.0 Hz), 7.52 (1H, td, J=8.0, 1.6 Hz), 7.27-7.20 (3H, m), 7.12-7.06 (2H, m), 6.96 (1H, d, J=3.2 Hz), 6.59 (1H, br s), 6.14-6.21 (1H, m), 4.53-4.47 (2H, m), 4.01-3.97 (1H, m), 3.87-3.73 (2H, m), 3.13-2.87 (6H, m), 2.28 (3H, br s), 1.73-1.63 (1H, m), 1.50-1.40 (1H, m), 1.07-1.06 (3H, m).

Example 2

Production of 3-(3-{[(R)-4-ethyl-1,1-dioxide-3,4-dihydro-2H-benzo[b][1,4,5]oxathiazepin-2-yl]methyl}-4-methylphenyl)-3-[5-(pyrrolidine-1-carbonyl)furan-2-yl]propanoic acid (Compound 28)

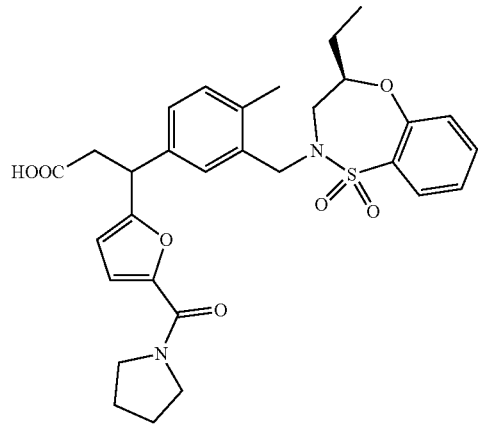 [SMILES: CC[C@@H]1CN(Cc2cc(C(CC(=O)O)c3ccc(C(=O)N4CCCC4)o3)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl)furan-2-yl]propanoate (85 mg, 0.15 mmol), methanol/dichloromethane (2/1) (0.75 mL), and a 2N sodium hydroxide aqueous solution (570 μL, 1.1 mmol) were used as raw materials, and the same operation was performed as in Example 1, thereby obtaining the title compound (38.3 mg, 47%) as a pale yellow solid.

$^1$H NMR (400 MHz, CDCl$_3$) δ7.87 (1H, dd, J=7.6, 1.6 Hz), 7.52 (1H, t, J=7.6 Hz), 7.27-7.19 (2H, m), 7.12-7.10 (3H, m), 6.94 (1H, d, J=3.6 Hz), 6.09 (1H, br s), 4.55-4.51 (2H, m), 4.02-3.96 (1H, m), 3.77 (1H, d, J=12.4 Hz), 3.76-3.66 (3H, m), 3.58 (1H, t, J=6.8 Hz), 3.14 (1H, dd, J=16.0, 8.0 Hz), 2.96 (1H, d, J=15.2 Hz), 2.99-2.87 (2H, m), 2.31 (3H, s), 1.96-1.91 (2H, m), 1.88-1.71 (2H, m), 1.69-1.61 (1H, m), 1.48-1.42 (1H, m), 1.06-1.05 (3H, m).

Example 3

Production of 3-(3-{[(R)-4-ethyl-1,1-dioxide-3,4-dihydro-2H-benzo[b][1,4,5]oxathiazepin-2-yl]methyl}-4-methylphenyl)-3-[5-(isopropylcarbamoyl)furan-2-yl]propanoic acid (Compound 29)

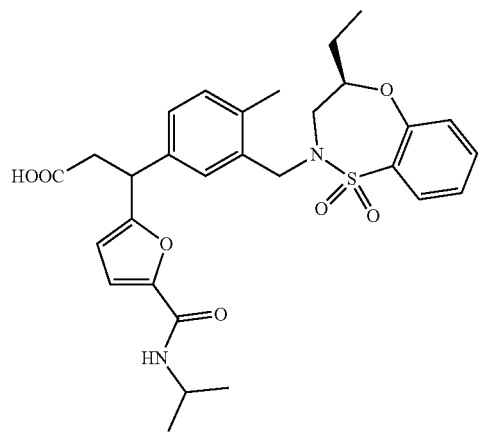 [SMILES: CC[C@@H]1CN(Cc2cc(C(CC(=O)O)c3ccc(C(=O)NC(C)C)o3)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-[5-(isopropylcarbamoyl)furan-2-yl]propanoate (70 mg, 0.12 mmol), methanol/dichloromethane (2/1) (0.75 mL), and a 2N sodium hydroxide aqueous solution (510 μL, 1.0 mmol) were used as raw materials, and the same operation was performed as in Example 1, thereby obtaining the title compound (37.8 mg, 55%) as a pale yellow solid.

$^1$H NMR (400 MHz, CDCl$_3$) δ 7.86 (1H, dd, J=8.0, 1.6 Hz), 7.52 (1H, t, J=8.0 Hz), 7.27-7.06 (5H, m), 6.95 (1H, d, J=3.6 Hz), 6.21 (1H, d, J=8.0 Hz), 6.10-6.09 (1H, m), 4.52-4.48 (2H, m), 4.22-4.14 (1H, m), 4.02-3.95 (1H, m), 3.85-3.71 (2H, m), 3.08-2.82 (3H, m), 2.30 (3H, br s), 1.72-1.62 (1H, m), 1.49-1.38 (1H, m), 1.20-1.18 (6H, m), 1.07-1.06 (3H, m).

Example 4

Production of 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl)thiophen-2-yl]propanoic acid (Compound 21)

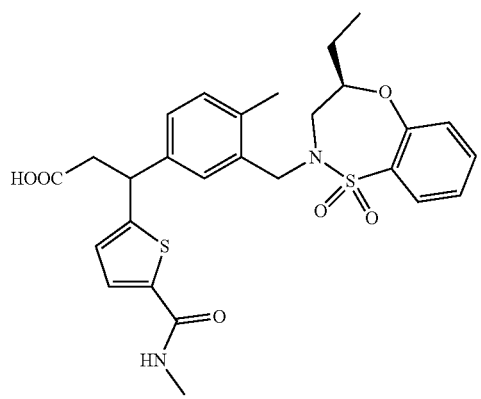 [SMILES: CC[C@@H]1CN(Cc2cc(C(CC(=O)O)c3ccc(C(=O)NC)s3)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl)thiophen-2-yl]propanoate (38.4 mg, 0.069 mmol), methanol (0.7 mL) and a 4N sodium hydroxide aqueous solution (170 μL, 0.68 mmol) were used as raw materials, and the same operation was performed as in Example 1, thereby obtaining the title compound (18.8 mg, 51%) as a pale yellow solid.

$^1$H NMR (400 MHz, CDCl$_3$) δ7.86 (1H, dd, J=8.0, 1.6 Hz), 7.51 (1H, td, J=8.0, 1.6 Hz), 7.29-7.18 (3H, m), 7.12-7.06 (3H, m), 6.76-6.75 (1H, m), 6.32 (1H, br s), 4.65 (1H, t, J=8.0 Hz), 4.53-4.52 (1H, m), 3.98-3.93 (1H, m), 3.81-3.67 (2H, m), 3.10-2.90 (3H, m), 2.87 (3H, d, J=4.8 Hz), 2.30 (3H, s), 1.67-1.56 (1H, m), 1.43-1.32 (1H, m), 1.04 (3H, t, J=7.2 Hz).

Example 5

Production of 3-(3-{[(R)-4-ethyl-1,1-dioxide-3,4-dihydro-2H-benzo[b][1,4,5]oxathiazepin-2-yl]methyl}-4-methylphenyl)-3-{5-[(2-methoxyethyl)carbamoyl]furan-2-yl}propanoic acid (Compound 30)

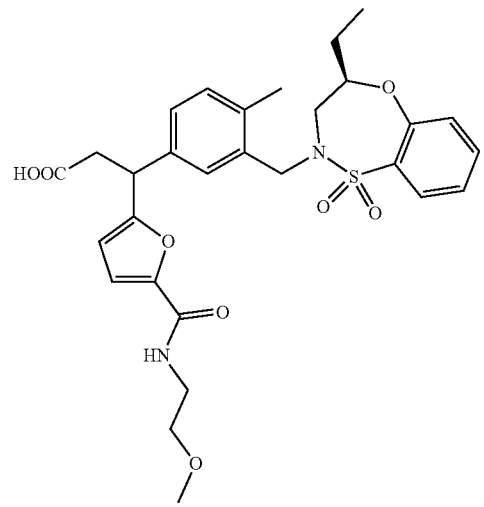 [SMILES: CC[C@@H]1CN(Cc2cc(C(CC(=O)O)c3ccc(C(=O)NCCOC)o3)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-{5-[(2-methoxyethyl)carbamoyl]furan-2-yl}propanoate (11.1 mg, 0.019 mmol), methanol (0.3 mL), and a 4N sodium hydroxide aqueous solution (150 μL, 0.6 mmol) were used as raw materials, and the same operation was performed as in Example 1, thereby obtaining the title compound (10.8 mg, 92%) as a white solid.

$^1$H NMR (400 MHz, CDCl$_3$) δ 7.87 (1H, dd, J=8.0, 1.6 Hz), 7.52 (1H, td, J=8.0, 1.6 Hz), 7.25 (1H, t, J=8.0 Hz), 7.20 (1H, d, J=8.0 Hz), 7.16-7.11 (3H, m), 6.98 (1H, d, J=3.6 Hz), 6.77 (1H, br s), 6.10-6.09 (1H, m), 4.55-4.51 (2H, m), 4.01-3.98 (1H, m), 3.86-3.70 (2H, m), 3.58-3.53 (4H, m), 3.36 (3H, s), 3.16-3.09 (1H, m), 3.01-2.89 (2H, m), 2.32 (3H, br s), 1.73-1.63 (1H, m), 1.49-1.38 (1H, m), 1.07-1.06 (3H, m).

Example 6

Production of 3-[5-(dimethylcarbamoyl)furan-2-yl]-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 27)

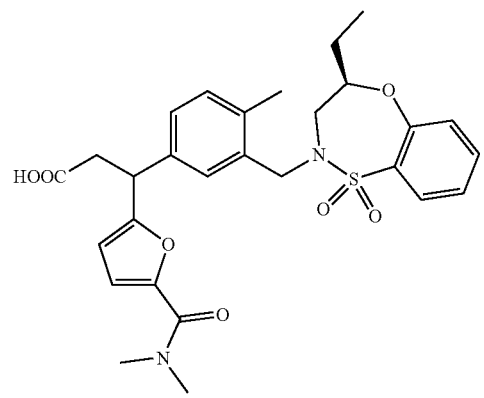 [SMILES: CC[C@@H]1CN(Cc2cc(C(CC(=O)O)c3ccc(C(=O)N(C)C)o3)ccc2C)S(=O)(=O)c2ccccc2O1]

Methyl 3-[5-(dimethylcarbamoyl) furan-2-yl]-3-(3-{[(R)-4-ethyl-1,1-dioxide-3,4-dihydro-2H-benzo[b][1,4,5]oxathiazepin-2-yl]methyl}-4-methylphenyl)propanoate (26 mg, 0.047 mmol), methanol (0.3 mL), and a 4N sodium hydroxide aqueous solution (100 µL, 0.4 mmol) were used as raw materials, and the same operation was performed as in Example 1, thereby obtaining the title compound (10.1 mg, 38%) as a pale yellow solid.

¹H NMR (400 MHz, CDCl₃) δ 7.87 (1H, dd, J=8.0, 1.6 Hz), 7.52 (1H, t, J=8.0 Hz), 7.25 (1H, t, J=8.0 Hz), 7.20 (1H, d, J=8.0 Hz), 7.12 (3H, br s), 6.88 (1H, d, J=3.6 Hz), 6.08 (1H, d, J=3.6 Hz), 4.55-4.51 (2H, m), 4.03-3.98 (1H, m), 3.82 (1H, d, J=14.4 Hz), 3.75-3.68 (1H, m), 3.16-2.86 (9H, m), 2.31 (3H, s), 1.72-1.63 (1H, m), 1.49-1.40 (1H, m), 1.07-1.06 (3H, m).

Example 7

Production of 3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 5)

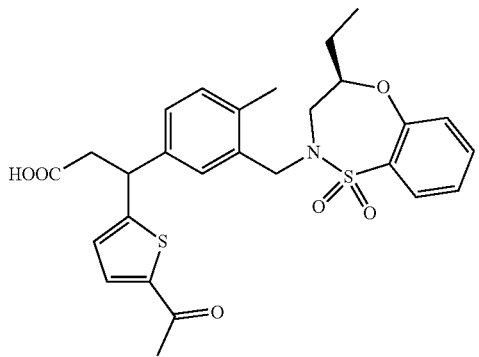 [SMILES: CC[C@@H]1CN(Cc2cc(C(CC(=O)O)c3ccc(C(C)=O)s3)ccc2C)S(=O)(=O)c2ccccc2O1]

Methyl 3-(5-acetylthiophen-2-yl)3-(3-{[(R)-4-ethyl-1,1-dioxide-3,4-dihydro-2H-benzo[b][1,4,5]oxathiazepin-2-yl]methyl}-4-methylphenyl)propanoate (100 mg, 0.18 mmol), methanol/dichloromethane (1/1) (0.8 mL), and a 4N sodium hydroxide aqueous solution (180 µL, 0.72 mmol) were used as raw materials, and the same operation was performed as in Example 1, thereby obtaining the title compound (58.9 mg, 62%) as a pale yellow solid.

¹H NMR (400 MHz, CDCl₃) δ 7.87 (1H, br d, J=8.0 Hz), 7.52 (1H, td, J=8.0, 1.6 Hz), 7.50 (1H, d, J=3.6 Hz), 7.25 (1H, t, J=8.0 Hz), 7.20 (1H, br d, J=8.0 Hz), 7.16-7.12 (2H, m), 7.08 (1H, d, J=9.2 Hz), 6.88-6.86 (1H, m), 4.68 (1H, t, J=7.6 Hz), 4.55-4.54 (1H, m), 4.02-3.95 (1H, m), 3.82-3.79 (1H, m), 3.74-3.67 (1H, m), 3.12 (1H, dd, J=16.0, 7.6 Hz), 3.03 (1H, dd, J=16.0, 8.0 Hz), 2.94-2.92 (1H, m), 2.47 (3H, s), 2.33-2.32 (3H, s), 1.70-1.60 (1H, m), 1.45-1.35 (1H, m), 1.05 (3H, t, J=7.6 Hz).

Example 8

Production of 3-(3-{[(R)-4-ethyl-1,1-dioxide-3,4-dihydro-2H-benzo[b][1,4,5]oxathiazepin-2-yl]methyl}-4-methylphenyl)-3-[4-methyl-5-(methylcarbamoyl) furan-2-yl]propanoic acid (Compound 31)

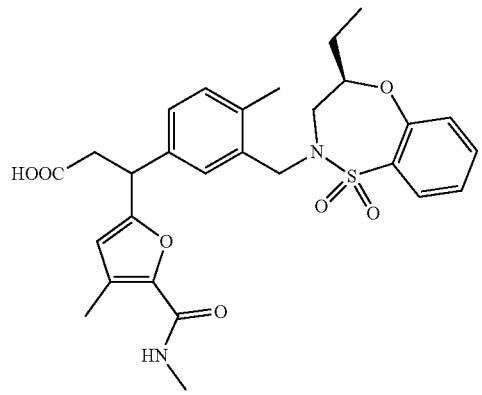 [SMILES: CC[C@@H]1CN(Cc2cc(C(CC(=O)O)c3cc(C)c(C(=O)NC)o3)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-[4-methyl-5-(methylcarbamoyl)furan-2-yl]propanoate (45 mg, 0.081 mmol), methanol/dichloromethane (1/1) (0.8 mL), and a 4N sodium hydroxide aqueous solution (101 µL, 0.405 mmol) were used as raw materials, and the same operation was performed as in Example 1, thereby obtaining the title compound (25.0 mg, 57%) as a pale yellow solid.

¹H NMR (400 MHz, CDCl₃) δ 7.86 (1H, dd, J=8.0, 1.6 Hz), 7.52 (1H, td, J=8.0, 1.6 Hz), 7.27-7.19 (3H, m), 7.12-7.05 (2H, m), 6.38 (1H, br s), 5.96 (1H, d, J=3.6 Hz), 4.51-4.42 (2H, m), 4.03-3.96 (1H, m), 3.88-3.71 (2H, m), 3.08-2.97 (2H, m), 2.88-2.86 (4H, m), 2.28 (6H, br s), 1.73-1.64 (1H, m), 1.51-1.38 (1H, m), 1.07-1.06 (3H, m).

Example 9

Production of 3-(3-{[(R)-4-ethyl-1,1-dioxide-3,4-dihydro-2H-benzo[b][1,4,5]oxathiazepin-2-yl]methyl}-4-methylphenyl)-3-(5-sulfamoylthiophen-2-yl)propanoic acid (Compound 18)

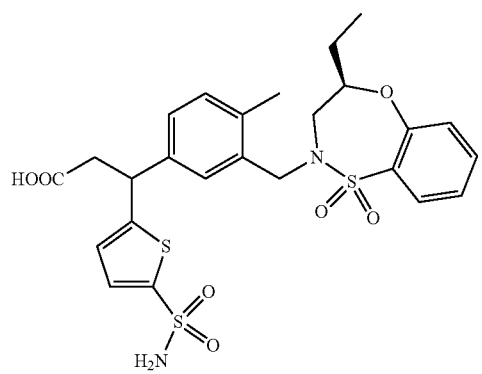 [SMILES: CC[C@@H]1CN(Cc2cc(C(CC(=O)O)c3ccc(S(N)(=O)=O)s3)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-(5-sulfamoylthiophen-2-yl)propanoate (78.9 mg, 0.14 mmol), methanol/dichloromethane (1/1) (0.8 mL), and a 4N sodium hydroxide aqueous solution (136 μL, 0.55 mmol) were used as raw materials, and the same operation was performed as in Example 1, thereby obtaining the title compound (47.5 mg, 62%) as a white solid.

$^1$H NMR (400 MHz, CDCl$_3$) δ 7.82 (1H, dt, J=8.0, 1.6 Hz), 7.50 (1H, td, J=8.0, 1.6 Hz), 7.37 (1H, d, J=4.0 Hz), 7.25-7.09 (5H, m), 6.77 (1H, d, J=3.6 Hz), 5.40 (2H, br s), 4.67 (1H, t, J=8.0 Hz), 4.48 (1H, d, J=14.4 Hz), 4.00-3.95 (1H, m), 3.83-3.82 (1H, m), 3.78-3.68 (1H, m), 3.13-2.94 (3H, m), 2.27 (3H, s), 1.69-1.59 (1H, m), 1.46-1.40 (1H, m), 1.05-1.04 (3H, m).

Example 10

Production of 3-(3-{[(R)-4-ethyl-1,1-dioxide-3,4-dihydro-2H-benzo[b][1,4,5]oxathiazepin-2-yl]methyl}-4-methylphenyl)-3-(thiophen-2-yl)propanoic acid (Compound 17)

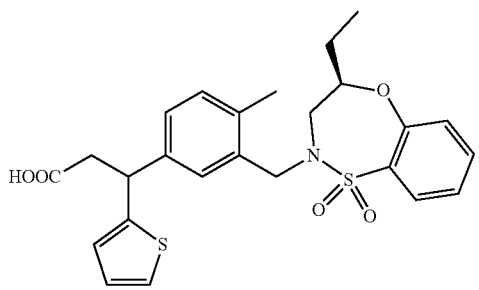 [SMILES: CC[C@@H]1CN(Cc2cc(C(CC(=O)O)c3cccs3)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-(thiophen-2-yl)propanoate (110 mg, 0.22 mmol), methanol/dichloromethane (2/1) (0.8 mL), and a 4N sodium hydroxide aqueous solution (220 μL, 0.88 mmol) were used as raw materials, and the same operation was performed as in Example 1, thereby obtaining the title compound (95.6 mg, 90%) as a white solid.

$^1$H NMR (400 MHz, CDCl$_3$) δ7.86 (1H, dd, J=8.0, 1.6 Hz), 7.50 (1H, td, J=8.0, 1.6 Hz), 7.25-7.17 (2H, m), 7.13-7.09 (3H, m), 7.04 (1H, d, J=9.6 Hz), 6.87-6.85 (1H, m), 6.80-6.78 (1H, m), 4.65 (1H, t, J=7.6 Hz), 4.54 (1H, d, J=14.0 Hz), 3.99-3.89 (1H, m), 3.79-3.65 (2H, m), 3.09-2.93 (3H, m), 1.65-1.55 (1H, m), 1.42-1.29 (1H, m), 1.04-1.03 (3H, m).

Example 11

Production of 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl)thiophen-3-yl]propanoic acid (Compound 22)

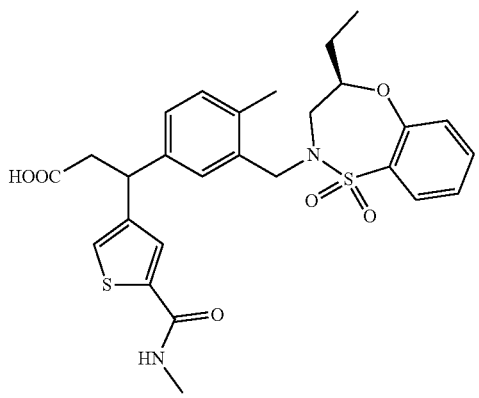 [SMILES: CC[C@@H]1CN(Cc2cc(C(CC(=O)O)c3csc(C(=O)NC)c3)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-[5-(methylcarbamoyl)thiophen-3-yl]propanoate (77 mg, 0.14 mmol), methanol/dichloromethane (2/1) (1.2 mL), and a 4N sodium hydroxide aqueous solution (138 μL, 0.55 mmol) were used as raw materials, and the same operation was performed as in Example 1, thereby obtaining the title compound (52.4 mg, 70%) as a white solid.

$^1$H NMR (400 MHz, CDCl$_3$) δ7.84 (1H, dt, J=8.0, 1.6 Hz), 7.52 (1H, td, J=8.0, 1.6 Hz), 7.32 (1H, dd, J=6.0, 1.6 Hz), 7.26-7.19 (2H, m), 7.14-7.03 (4H, m), 6.46 (1H, br s), 4.49-4.43 (2H, m), 3.99-3.94 (1H, m), 3.83-3.82 (1H, m), 3.78-3.70 (1H, m), 3.05-2.90 (3H, m), 2.87 (3H, d, J=4.8 Hz), 2.27 (3H, s), 1.70-1.61 (1H, m), 1.46-1.37 (1H, m), 1.05 (3H, br t, J=7.2 Hz).

Example 12

Production of 3-(3-{[(R)-4-ethyl-1,1-dioxide-3,4-dihydro-2H-benzo[b][1,4,5]oxathiazepin-2-yl]methyl}-4-methylphenyl)-3-(5-[(isopropylamino)methyl]furan-2-yl)propanoic acid (Compound 32)

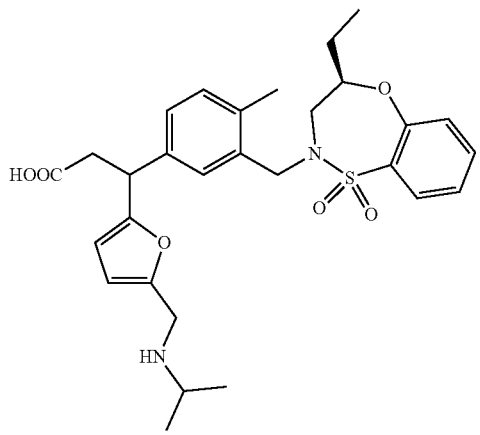 [SMILES: CC[C@@H]1CN(Cc2cc(C(CC(=O)O)c3ccc(CNC(C)C)o3)ccc2C)S(=O)(=O)c2ccccc2O1]

(R)-4-ethyl-2-[2-methyl-5-(4,4,5,5-tetramethyl-1,3,2-dioxaborolan-2-yl)benzyl]-3,4-dihydro-2H-benzo[b][1,4,5]oxathiazepine 1,1-dioxide (274.4 mg, 0.6 mmol), methyl (E)-3-(5-((isopropylamino)methyl) furan-2-yl)acrylate (89.4 mg, 0.4 mmol), [RhCl(cod)]$_2$ (19.8 mg, 0.04 mmol), 1,4-dioxane/water (1/1) (1.6 mL), and TEA (168 μL, 1.2 mmol) were used as raw materials, and the same operation was performed as in Reference Example 130, thereby obtaining a mixture (14.8 mg), containing the title compound, as an oily pale yellow substance. The mixture was dissolved in methanol/dichloromethane (2/1) (1.2 mL), and a 4N sodium hydroxide aqueous solution (110 μL, 0.44 mnol) was added. The reaction mixture was stirred at room temperature for 8 hours, and the solvent was distilled under reduced pressure. The residue was purified by preparative thin-layer chromatography (methanol/dichloromethane (v/v)=1/10), thereby obtaining the title compound (23.9 mg, 7%) as a pale yellow solid.

$^1$H NMR (400 MHz, CDCl$_3$) δ 7.86 (1H, dd, J=7.6, 1.6 Hz), 7.51 (1H, td, J=7.6, 1.6 Hz), 7.24 (1H, t, J=7.6 Hz), 7.20 (1H, d, J=7.6 Hz), 7.13-7.07 (3H, m), 6.23 (1H, d, J=3.2 Hz), 5.93 (1H, br s), 4.53-4.46 (2H, m), 4.03-3.94 (1H, m), 3.88 (2H, s), 3.84-3.67 (2H, m), 3.12-3.05 (1H, m), 2.99-2.89 (2H, m), 2.69 (1H, d, J=14.4, 5.6

Hz), 2.29 (3H, s), 1.72-1.63 (1H, m), 1.48-1.38 (1H, m), 1.24-1.21 (6H, m), 1.07-1.06 (3H, m).

Example 13

Production of 3-(3-{[(R)-4-ethyl-1,1-dioxide-3,4-dihydro-2H-benzo(b)[1,4,5]oxathiazepin-2-yl]methyl}-4-methylphenyl)-3-[3-methyl-5-(methylcarbamoyl)thiophen-2-yl]propanoic acid (Compound 47)

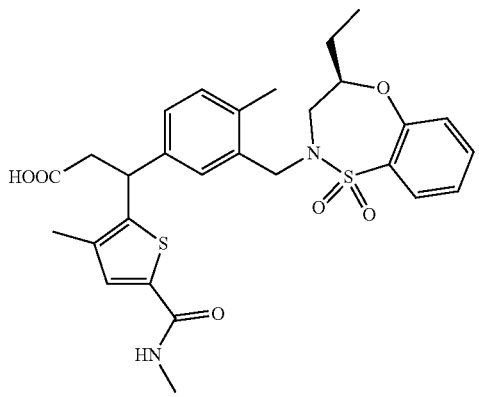 [SMILES: CC[C@@H]1CN(Cc2cc(C(CC(=O)O)c3sc(C(=O)NC)cc3C)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-[3-methyl-5-(methylcarbamoyl)thiophen-2-yl]propanoate (124 mg, 0.22 mmol), methanol/dichloromethane (2/1) (1.2 mL), and a 4N sodium hydroxide aqueous solution (540 μL, 2.2 mmol) were used as raw materials, and the same operation was performed as in Example 1, thereby obtaining the title compound (83.0 mg, 69%) as a white solid.

$^1$H NMR (400 MHz, CDCl$_3$) δ 7.84 (1H, br d, J=7.6 Hz), 7.51 (1H, br t, J=7.6 Hz), 7.25-7.16 (3H, m), 7.11-7.05 (3H, m), 6.57 (1H, br t, J=4.8 Hz), 4.67 (1H, t, J=6.8 Hz), 4.51-4.50 (1H, m), 3.97-3.93 (1H, m), 3.77-3.67 (2H, m), 2.93-2.90 (3H, m), 2.85 (3H, d, J=4.8 Hz), 2.28 (3H, br s), 2.03 (3H, s), 1.67-1.55 (1H, m), 1.42-1.31 (1H, m), 1.04-1.02 (3H, m).

Example 14

Production of 3-(3-{[(R)-4-ethyl-1,1-dioxide-3,4-dihydro-2H-benzo[b][1,4,5]oxathiazepin-2-yl]methyl}-4-methylphenyl)-3-(thiazol-5-yl)propanoic acid (Compound 39)

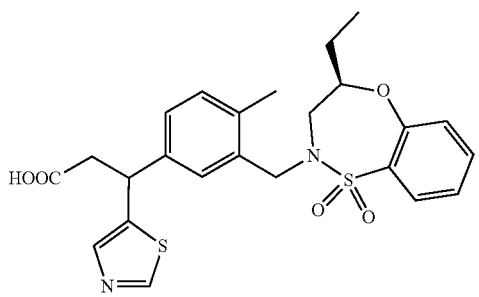 [SMILES: CC[C@@H]1CN(Cc2cc(C(CC(=O)O)c3cncs3)ccc2C)S(=O)(=O)c2ccccc2O1]

Ethyl 3-(3-{[(R)-4-ethyl-1,1-dioxide-3,4-dihydro-2H-benzo[b][1,4,5]oxathiazepin-2-yl]methyl}-4-methylphenyl)-3-(thiazol-5-yl)propanoate (97.3 mg, 0.19 mmol), methanol/dichloromethane (1/1) (1.6 mL), and a 4N sodium hydroxide aqueous solution (236 μL, 0.95 mmol) were used as raw materials, and the same operation was performed as in Example 1, thereby obtaining the title compound (52.7 mg, 57%) as a white solid.

$^1$H NMR (400 MHz, CDCl$_3$) δ 8.63 (1H, s), 7.85 (1H, dt, J=8.0, 1.6 Hz), 7.62 (1H, d, J=3.6 Hz), 7.50 (1H, td, J=8.0, 1.6 Hz), 7.23 (1H, br t, J=8.0 Hz), 7.18 (1H, d, J=8.0 Hz), 7.12-7.07 (3H, m), 4.73 (1H, t, J=7.6 Hz), 4.50 (1H, d, J=14.4 Hz), 4.00-3.92 (1H, m), 3.82-3.67 (2H, m), 3.04-2.91 (3H, m), 2.29 (3H, br s), 1.68-1.60 (1H, m), 1.43-1.27 (1H, m), 1.04-1.03 (3H, mi).

Example 15

Production of 3-(3-{[(R)-4-ethyl-1,1-dioxide-3,4-dihydro-2H-benzo[b][1,4,5]oxathiazepin-2-yl]methyl}-4-methylphenyl)-3-(1-methyl-4-oxo-4,5,6,7-tetrahydro-1H-indol-2-yl)propanoic acid (Compound 37)

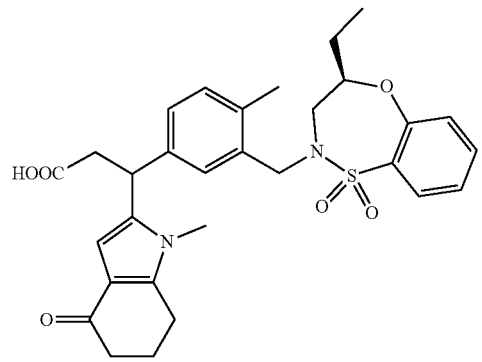 [SMILES: CC[C@@H]1CN(Cc2cc(C(CC(=O)O)c3cc4c(n3C)CCCC4=O)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-3-(1-methyl-4-oxo-4,5,6,7-tetrahydro-1H-indol-2-yl)propanoate (149.8 mg, 0.27 mmol), methanol/dichloromethane (1/1) (2.4 mL), and a 4N sodium hydroxide aqueous solution (338 μL, 1.35 mmol) were used as raw materials, and the same operation was performed as in Example 1, thereby obtaining the title compound (67.2 mg, 45%) as a white solid.

$^1$H NMR (400 MHz, CDCl$_3$) δ 7.84 (1H, br t, J=8.0 Hz), 7.54-7.49 (1H, m), 7.27-7.18 (2H, m), 7.11-7.09 (1H, m), 7.06-7.02 (1H, m), 6.98-6.96 (1H, m), 6.56 (1H, s), 4.52-4.50 (1H, m), 4.42 (1H, t, J=6.4 Hz), 3.99-3.94 (1H, m), 3.80-3.64 (2H, m), 3.22-3.20 (3H, m), 3.06-2.87 (2H, m), 2.77 (1H, dd, J=16.0, 6.4 Hz), 2.66-2.59 (2H, m), 2.45-2.41 (2H, m), 2.33-2.31 (3H, m), 2.10-2.09 (2H, m), 1.74-1.58 (1H, m), 1.50-1.33 (1H, m), 1.09-1.02 (3H, m).

Example 16

Production of 3-(5-acetyl-1-methyl-1H-pyrrol-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 33)

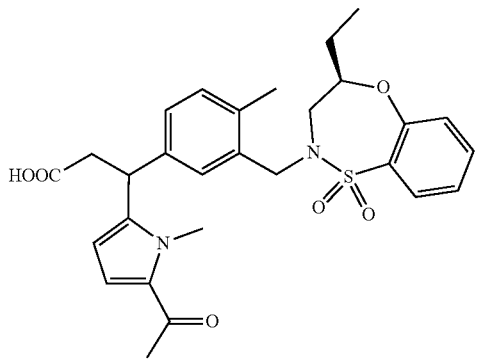 [SMILES: CC[C@@H]1CN(Cc2cc(C(CC(=O)O)c3ccc(C(C)=O)n3C)ccc2C)S(=O)(=O)c2ccccc2O1]

Methyl 3-(5-acetyl-1-methyl-1H-pyrrol-2-yl)3-(3-{[(R)-4-ethyl-1,1-dioxide-3,4-dihydro-2H-benzo[b][1,4,5]oxathiazepin-2-yl]methyl}-4-methylphenyl)propanoate (129.3 mg, 0.24 mmol), methanol/dichloromethane (1/1) (2.4 mL), and a 4N sodium hydroxide aqueous solution (300 µL, 1.2 mmol) were used as raw materials, and the same operation was performed as in Example 1, thereby obtaining the title compound (111.8 mg, 89%) as a white solid.

$^1$H NMR (400 MHz, CDCl$_3$) δ 7.86 (1H, d, J=8.0 Hz), 7.51 (1H, t, J=8.0 Hz), 7.26-7.18 (2H, m), 7.12-7.08 (1H, m), 7.02-6.93 (3H, m), 6.15 (1H, d, J=4.0 Hz), 4.55-4.44 (2H, m), 3.99-3.90 (1H, m), 3.81-3.65 (5H, m), 3.05 (1H, dd, J=16.0, 8.0 Hz), 2.93-2.82 (2H, m), 2.39 (3H, s), 2.32-2.29 (3H, m), 1.71-1.57 (1H, m), 1.45-1.28 (1H, m), 1.07-1.02 (3H, m).

Example 17

Production of 3-(5-acetyl-3-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 14)

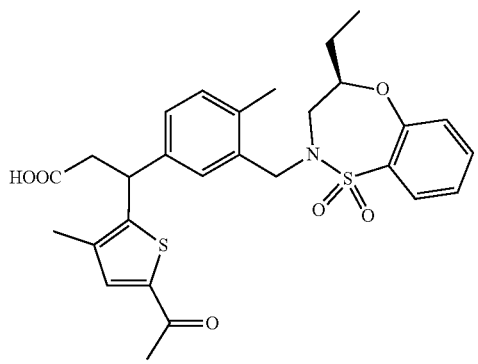 [SMILES: CC[C@@H]1CN(Cc2cc(C(CC(=O)O)c3sc(C(C)=O)cc3C)ccc2C)S(=O)(=O)c2ccccc2O1]

Methyl 3-(5-acetyl-3-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (120 mg, 0.22 mmol), methanol/dichloromethane (1/1) (2.0 mL), and a 4N sodium hydroxide aqueous solution (270 µL, 1.1 mmol) were used as raw materials, and the same operation was performed as in Example 1, thereby obtaining the title compound (99.8 mg, 85%) as a pale yellow solid.

$^1$H NMR (400 MHz, CDCl$_3$) δ7.85 (1H, dd, J=8.0, 1.6 Hz), 7.52 (1H, br t, J=8.0 Hz), 7.37 (1H, s), 7.27-7.18 (2H, m), 7.14-7.06 (3H, m), 4.70-4.69 (1H, m), 4.54-4.52 (1H, m), 4.00-3.93 (1H, m), 3.80-3.65 (2H, m), 3.05-2.86 (3H, m), 2.45 (3H, br s), 2.31 (3H, br s), 2.14 (3H, s), 1.71-1.56 (1H, m), 1.45-1.31 (1H, m), 1.05-1.04 (3H, m).

Example 18

Production of 3-(5-acetyl-4-fluorothiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 8)

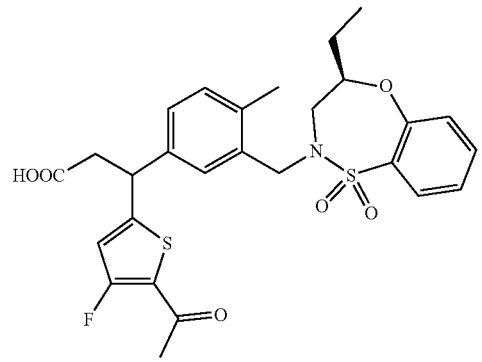 [SMILES: CC[C@@H]1CN(Cc2cc(C(CC(=O)O)c3cc(F)c(C(C)=O)s3)ccc2C)S(=O)(=O)c2ccccc2O1]

Methyl 3-(5-acetyl-4-fluorothiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (50 mg, 0.089 mmol), methanol/dichloromethane (1/1) (1.2 mL), and a 4N sodium hydroxide aqueous solution (110 µL, 0.45 nmol) were used as raw materials, and the same operation was performed as in Example 1, thereby obtaining the title compound (22.9 mg, 47%) as a pale yellow solid.

$^1$H NMR (400 MHz, CDCl$_3$) δ 7.85 (1H, dd, J=8.0, 4.0 Hz), 7.51 (1H, td, J=8.0, 1.6 Hz), 7.25-7.05 (5H, m), 6.62 (1H, br s), 4.56 (1H, t, J=7.6 Hz), 4.48 (1H, d, J=14.8 Hz), 4.02-3.94 (1H, m), 3.86-3.69 (2H, m), 3.03-2.88 (3H, m), 2.47 (3H, br s), 2.28 (3H, br s), 1.71-1.62 (1H, m), 1.48-1.40 (1H, m), 1.07-1.06 (3H, m).

Example 19

Production of 3-(5-carbamoylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 23)

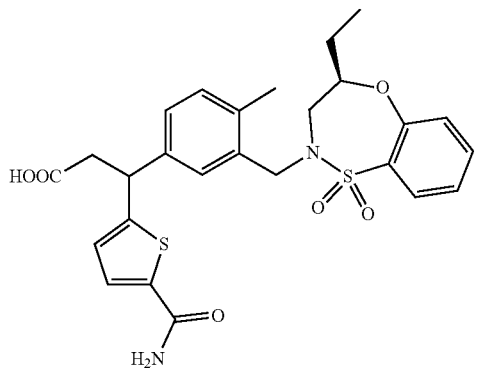 [SMILES: CC[C@@H]1CN(Cc2cc(C(CC(=O)O)c3ccc(C(N)=O)s3)ccc2C)S(=O)(=O)c2ccccc2O1]

Methyl 3-(5-carbamoylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (65.1 mg, 0.12 mmol), methanol/dichloromethane (1/1) (1.6 mL), and a 4N sodium hydroxide aqueous solution (150 μL, 0.6 mmol) were used as raw materials, and the same operation was performed as in Example 1, thereby obtaining the title compound (25.8 mg, 41%) as a pale yellow solid.

$^1$H NMR (400 MHz, CDCl$_3$) δ 7.73 (1H, dd, J=8.0, 1.6 Hz), 7.49 (1H, td, J=8.0, 1.6 Hz), 7.41-7.40 (1H, m), 7.20 (1H, td, J=8.0, 1.2 Hz), 7.16-7.06 (3H, m), 7.01 (1H, br d, J=16.8 Hz), 6.83-6.80 (1H, m), 4.59-4.54 (1H, m), 4.49-4.47 (1H, m), 3.92-3.86 (1H, m), 3.71-3.67 (1H, m), 3.60-3.54 (1H, m), 3.02-2.82 (2H, m), 2.78-2.73 (1H, m), 2.25 (3H, br s), 1.53-1.41 (1H, m), 1.34-1.22 (1H, m), 0.95 (3H, t, J=7.2 Hz).

Example 20

Production of 3-(5-acetyl-4-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 7)

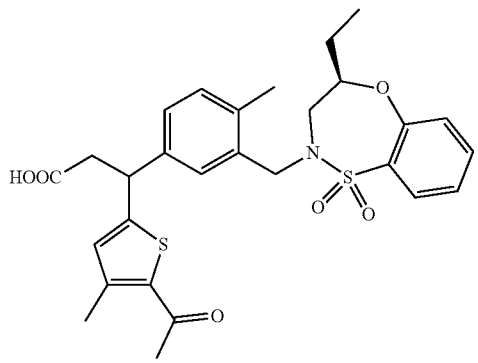

Methyl 3-(5-acetyl-4-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (77.0 mg, 0.14 mmol), methanol/dichloromethane (1/1) (1.6 mL), and a 4N sodium hydroxide aqueous solution (175 μL, 0.7 mmol) were used as raw materials, and the same operation was performed as in Example 1, thereby obtaining the title compound (47.6 mg, 63%) as a white solid.

$^1$H NMR (400 MHz, CDCl$_3$) δ 7.89-7.85 (1H, m), 7.54-7.49 (1H, m), 7.27-6.95 (5H, m), 6.69 (1H, br s), 4.62 (1H, t, J=7.6 Hz), 4.55 (1H, d, J=14.0 Hz), 4.03-3.98 (1H, m), 3.84-3.68 (2H, m), 3.11 (1H, dd, J=16.4, 7.2 Hz), 3.04-2.87 (2H, m), 2.45 (3H, s), 2.42 (3H, s), 2.33 (3H, s), 1.70-1.61 (1H, m), 1.45-1.35 (1H, m), 1.07-1.03 (3H, m).

Example 21

Production of 3-(4-acetyl-1,3,5-trimethyl-1H-pyrrol-2-yl)-3-(3-{[(R)-4-ethyl-1,1-dioxide-3,4-dihydro-2H-benzo[b][1,4,5]oxathiazepin-2-yl]methyl}-4-methylphenyl) propanoic acid (Compound 35)

Methyl 3-(4-acetyl-1,3,5-trimethyl-1H-pyrrol-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (20 mg, 0.035 mmol), methanol/dichloromethane (1/1) (1.0 mL), and a 4N sodium hydroxide aqueous solution (42.5 μL, 0.17 mmol) were used as raw materials, and the same operation was performed as in Example 1, thereby obtaining the title compound (11.5 mg, 60%) as a pale yellow solid.

$^1$H NMR (400 MHz, CDCl$_3$) δ 7.88-7.84 (1H, m), 7.52 (1H, br t, J=8.0 Hz), 7.25 (1H, br t, J=8.0 Hz), 7.20 (1H, dd, J=8.0, 3.2 Hz), 7.14-7.11 (1H, m), 7.02-6.99 (1H, m), 6.96-6.95 (1H, m), 4.81 (1H, t, J=7.6 Hz), 4.54-4.51 (1H, m), 3.99-3.94 (1H, m), 3.80-3.69 (2H, m), 3.28-3.22 (4H, m), 2.99-2.88 (2H, m), 2.42-2.41 (6H, m), 2.34-2.32 (3H, m), 2.21 (3H, s), 1.73-1.60 (1H, m), 1.46-1.32 (1H, m), 1.06-1.04 (3H, m).

Example 22

Production of 3-(5-acetyl-1-ethyl-1H-pyrrol-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 34)

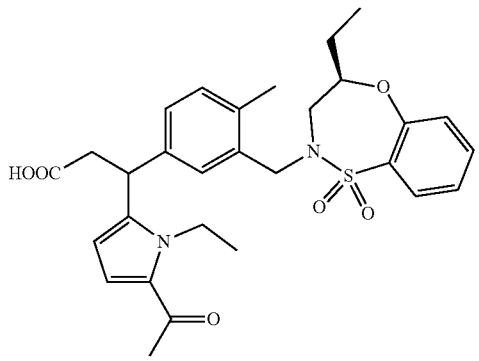 [SMILES: CC[C@@H]1CN(Cc2cc(C(CC(=O)O)c3ccc(C(C)=O)n3CC)ccc2C)S(=O)(=O)c2ccccc2O1]

Methyl 3-(5-acetyl-1-ethyl-1H-pyrrol-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (37 mg, 0.067 mmol), methanol/dichloromethane (1/1) (1.0 mL), and a 4N sodium hydroxide aqueous solution (84 μL, 0.34 mmol) were used as raw materials, and the same operation was performed as in Example 1, thereby obtaining the title compound (1.8.9 mg, 52%) as a pale yellow solid.

$^1$H NMR (400 MHz, CDCl$_3$) δ 7.88 (1H, dt, J=8.0, 1.6 Hz), 7.51 (1H, t, J=8.0 Hz), 7.25 (1H, t, J=8.0 Hz), 7.20 (1H, d, J=8.0 Hz), 7.14-7.09 (3H, m), 6.71-6.70 (1H, m), 6.63-6.62 (1H, m), 4.54-4.53 (1H, m), 4.35 (1H, t, J=7.6 Hz), 4.25 (2H, q, J=7.2 Hz), 4.03-3.97 (1H, m), 3.82-3.81 (1H, m), 3.75-3.68 (1H, m), 3.01-2.85 (3H, m), 2.35 (3H, s), 2.32 (3H, s), 1.70-1.61 (1H, m), 1.45-1.36 (1H, m), 1.29 (3H, t, J=7.2 Hz), 1.05-1.04 (3H, m).

Example 23

Production of 3-[5-(cyclopropanecarbonyl)thiophen-2-yl]-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 20)

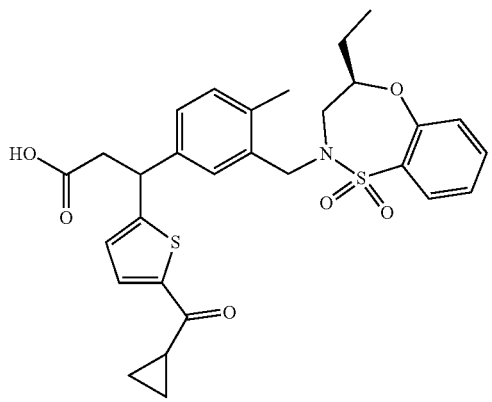 [SMILES: CC[C@@H]1CN(Cc2cc(C(CC(=O)O)c3ccc(C(=O)C4CC4)s3)ccc2C)S(=O)(=O)c2ccccc2O1]

Methyl 3-[5-(cyclopropanecarbonyl)thiophen-2-yl]-3-(3-{[(R)-4-ethyl-1,1-dioxide-3,4-dihydro-2H-benzo[b][1,4,5]oxathiazepin-2-yl]methyl}-4-methylphenyl)propanoate (45 mg, 0.08 mmol), methanol/dichloromethane (1/1) (1.0 mL), and a 4N sodium hydroxide aqueous solution (100 μL, 0.4 mmol) were used as raw materials, and the same operation was performed as in Example 1, thereby obtaining the title compound (14.8 mg, 34%) as a white solid.

$^1$H NMR (400 MHz, CDCl$_3$) δ 7.87 (1H, dt, J=8.0, 1.6 Hz), 7.62 (1H, d, J=3.6 Hz), 7.52 (1H, br t, J=8.0 Hz), 7.25 (1H, br t, J=8.0 Hz), 7.20 (1H, br d, J=8.0 Hz), 7.14 (2H, br s), 7.07 (1H, d, J=10.4 Hz), 6.90-6.88 (1H, m), 4.69 (1H, t, J=7.6 Hz), 4.57-4.52 (1H, m), 4.02-3.93 (1H, m), 3.83-3.74 (1H, m), 3.74-3.67 (1H, m), 3.13 (1H, dd, J=16.0, 7.6 Hz), 3.03 (1H, dd, J=16.0, 7.6 Hz), 2.93 (1H, dd, J=15.2, 10.0 Hz), 2.47-2.41 (1H, m), 2.33 (3H, br s), 1.69-1.59 (1H, m), 1.43-1.34 (1H, m), 1.20-1.16 (2H, m), 1.04 (3H, t, J=7.6 Hz), 1.00-0.95 (2H, m).

Example 24

Production of 3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (Compound 1)

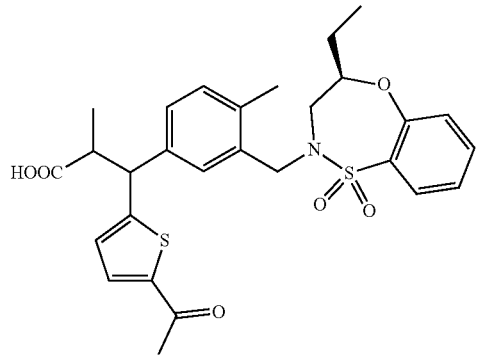 [SMILES: CC[C@@H]1CN(Cc2cc(C(c3ccc(C(C)=O)s3)C(C)C(=O)O)ccc2C)S(=O)(=O)c2ccccc2O1]

Concentrated hydrochloric acid (100 μL) was added to a THF (3.0 mL) solution of methyl 3-(3-{[(R)-4-ethyl-1,1-dioxide-3,4-dihydro-2H-benzo[b][1,4,5]oxathiazepin-2-yl]methyl}-4-methylphenyl)-3-[5-(2-methyl-1,3-dioxolan-2-yl)thiophen-2-yl]propanoate (46 mg, 0.077 mmol), and the mixture was stirred at room temperature for 7 hours. The reaction mixture was diluted with water and extracted with dichloromethane. The organic layer was washed with water and dried over sodium sulfate, and the solvent was concentrated under reduced pressure. The obtained residue was dissolved in methanol/dichloromethane (1/1) (1.0 mL), a 4N sodium hydroxide aqueous solution (100 μL, 0.4 mmol) was added, and the mixture was stirred at 60° C. for 6 hours. 1N hydrochloric acid was added to the mixture, followed by extraction with methanol/dichloromethane (1/10). The organic layer was washed with saturated saline and dried over sodium sulfate, and the solvent was concentrated under reduced pressure. The residue was purified by preparative thin-layer chromatography (hexane/ethyl acetate (v/v)=1/4), thereby obtaining the title compound (9.6 mg, 23%) as a white solid.

$^1$H NMR (400 MHz, CDCl$_3$) δ 7.89 (1H, dd, J=7.6, 1.6 Hz), 7.53 (1H, td, J=7.6, 1.6 Hz), 7.47 (1H, dd, J=4.0, 1.2 Hz), 7.28-7.21 (2H, m), 7.17-7.07 (3H, m), 6.95 (1H, d,

J=4.0 Hz), 4.60-4.52 (1H, m), 4.34 (1H, d, J=10.8 Hz), 4.06-3.95 (1H, m), 3.89-3.67 (2H, m), 3.23-3.17 (1H, m), 2.98-2.89 (1H, m), 2.46 (3H, s), 2.34-2.32 (3H, m), 1.73-1.61 (1H, m), 1.46-1.33 (1H, m), 1.11-1.05 (6H, m).

Example 25

Production of 3-(5-cyanothiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 19)

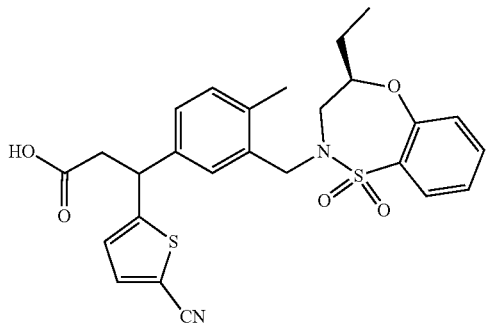 [SMILES: CC[C@@H]1CN(Cc2cc(C(CC(=O)O)c3ccc(C#N)s3)ccc2C)S(=O)(=O)c2ccccc2O1]

Methyl 3-(5-cyanothiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (22.2 mg, 0.042 mmol), methanol/dichloromethane (1/1) (1.0 mL), and a 4N sodium hydroxide aqueous solution (105 μL, 0.42 mmol) were used as raw materials, and the same operation was performed as in Example 1, thereby obtaining the title compound (8.0 mg, 38%) as a yellow solid.

$^1$H NMR (400 MHz, CDCl$_3$) δ 7.87 (1H, dd, J=7.6, 1.6 Hz), 7.53 (1H, td, J=7.6, 1.6 Hz), 7.43 (1H, dd, J=3.6, 0.8 Hz), 7.27-7.20 (2H, m), 7.17-7.10 (3H, m), 6.86 (1H, br d, J=4.0 Hz), 4.70 (1H, t, J=7.6 Hz), 4.54-4.49 (1H, m), 4.04-3.97 (1H, m), 3.86-3.82 (1H, m), 3.77-3.68 (1H, m), 3.15-3.01 (2H, m), 2.97 (1H, dd, J=14.0, 5.2 Hz), 2.31 (3H, s), 1.75-1.63 (1H, m), 1.47-1.37 (1H, m), 1.11-1.05 (3H, m).

Example 26

Production of 3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoic acid (Compound 6)

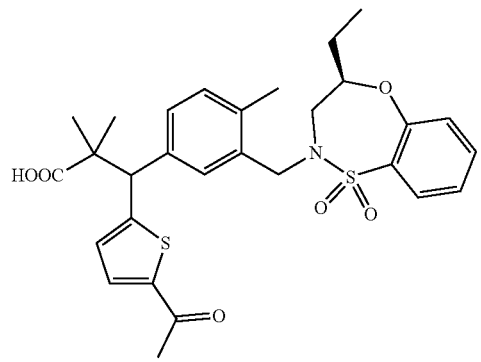 [SMILES: CC[C@@H]1CN(Cc2cc(C(c3ccc(C(C)=O)s3)C(C)(C)C(=O)O)ccc2C)S(=O)(=O)c2ccccc2O1]

A solution of methyl 3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoate (43.1 mg, 0.076 mmol) in methanol/1,4-dioxane (1/1) (2.0 mL) and a 1M potassium hydroxide aqueous solution (1.0 mL, 1.0 mmol) was heated under microwave irradiation at 100° C. for 3 hours. The reaction solution was cooled to room temperature, and the pH was adjusted to neutrality with 1M hydrochloric acid, followed by extraction with ethyl acetate. The obtained organic layer was dried over sodium sulfate, and the solvent was removed by distillation under reduced pressure. The obtained residue was purified by silica gel column chromatography (hexane/ethyl acetate (v/v)=45/55→23/77), thereby obtaining the title compound (15.3 mg, 36%) as a white solid.

$^1$H NMR (400 MHz, CDCl$_3$) δ 7.88 (1H, dt, J=7.6, 2.0 Hz), 7.55-7.51 (2H, m), 7.28-7.21 (4H, m), 7.13 (1H, d, J=7.6 Hz), 7.00 (1H, d, J=4.0 Hz), 4.72-4.70 (1H, m), 4.55 (1H, d, J=14.0 Hz), 4.05-3.96 (1H, m), 3.84-3.82 (1H, m), 3.74 (1H, dd, J=15.2, 10.8 Hz), 2.98-2.97 (1H, m), 2.50 (3H, s), 2.33 (3H, s), 1.75-1.58 (1H, m), 1.50-1.39 (1H, m), 1.32 (3H, s), 1.25 (3H, s), 1.10-1.05 (3H, m).

Example 27

Production of 3-(5-acetylthiophen-2-yl)-3-(3-{[(R)-4-ethyl-9-fluoro-1,1-dioxide-3,4-dihydro-2H-benzo[b][1,4,5]oxathiazepin-2-yl]methyl}-4-methylphenyl)-2,2-dimethylpropanoic acid (Compound 9)

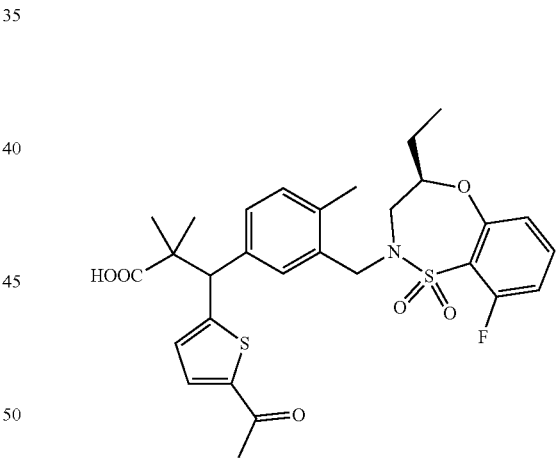

Methanol/1,4-dioxane (1/1) (2.0 mL) of methyl 3-(5-acetylthiophen-2-yl)-3-(3-{[(R)-4-ethyl-9-fluoro-1,1-dioxide-3,4-dihydro-2H-benzo[b][1,4,5]oxathiazepin-2-yl]methyl}-4-methylphenyl)-2,2-dimethylpropanoate (31.8 mg, 0.054 mmol), and a 1M potassium hydroxide aqueous solution (1.0 mL, 1.0 mmol) were added, and heated under microwave irradiation at 100° C. for 1.5 hours. The reaction solution was returned to room temperature, and the pH was adjusted to 6 with 1M hydrochloric acid, followed by extraction with ethyl acetate and drying over sodium sulfate. The solvent was removed by distillation under reduced pressure. The obtained residue was purified by silica gel column chromatography (hexane/ethyl acetate (v/v)=73/

27→48/62→2/8→0/1→CH₂Cl₂/MeOH=9/1), thereby obtaining the title compound (22.7 mg, 73%) as a white solid.

¹H NMR (400 MHz, CDCl₃) δ 7.52 (1H, br s), 7.44-7.37 (1H, m), 7.37-7.34 (1H, m), 7.27-7.23 (1H, m), 7.14-7.10 (1H, m), 7.04 (1H, br t, 4.0 Hz), 6.99-6.94 (1H, m), 6.77-6.75 (1H, m), 4.78-4.55 (1H, m), 4.75 (1H, s), 4.52-4.42 (1H, m), 4.23-4.18 (1H, m), 3.50-3.32 (1H, m), 3.15-2.84 (1H, m), 2.49 (3H, s), 2.34-2.32 (3H, m), 1.61-1.49 (2H, m), 1.33 (3H, s), 1.26 (3H, s), 1.04-0.96 (3H, m).

Example 28

Production of 3-(5-acetylthiophen-2-yl)-3-(4-{[(R)-4-ethyl-1,1-dioxide-3,4-dihydro-2H-benzo[b][1,4,5]oxathiazepin-2-yl]methyl}-1H-benzo[d]imidazol-6-yl)propanoic acid (Compound 45)

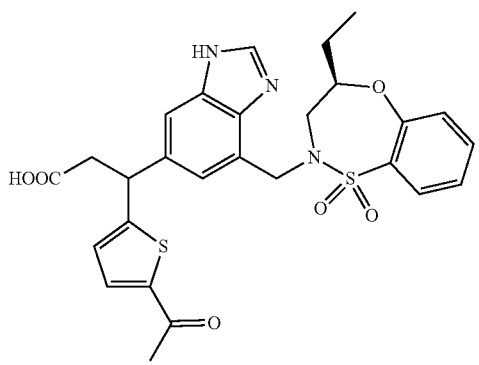 [SMILES: CC[C@@H]1CN(Cc2cc(C(CC(=O)O)c3ccc(C(C)=O)s3)cc3[nH]cnc23)S(=O)(=O)c2ccccc2O1]

A 1M potassium hydroxide aqueous solution (0.5 mL, 0.5 mmol) was added to a methanol/1,4-dioxane (1/1) (1.0 mL) solution of methyl 3-(5-acetylthiophen-2-yl)-3-(4-{[(R)-4-ethyl-1,1-dioxide-3,4-dihydro-2H-benzo[b][1,4,5]oxathiazepin-2-yl]methyl}-1H-benzo[d]imidazol-6-yl)propanoate (23.2 mg, 0.041 mmol), and the mixture was heated under microwave irradiation at 100° C. for 1 hour. The reaction solution was returned to room temperature, and neutralized with 1M hydrochloric acid, followed by extraction with a dichloromethane/methanol (9/1) mixed solvent and drying over sodium sulfate. The solvent was removed by distillation under reduced pressure. The obtained residue was washed with a dichloromethane/hexane mixed solvent, thereby obtaining the title compound (12.6 mg, 56%) as a white solid.

¹H NMR (400 MHz, CDCl₃) δ 8.11 (1H, s), 7.87 (1H, s), 7.86 (1H, d, J=7.6 Hz), 7.54 (1H, t, J=7.6 Hz), 7.51 (1H, br s), 7.28-7.24 (1H, m), 7.22 (1H, d, J=8.0 Hz), 6.95 (1H, s), 6.89 (1H, br s), 4.97-4.95 (1H, m), 4.69-4.66 (1H, m), 4.08-4.00 (1H, m), 3.97-3.92 (1H, m), 3.70-3.62 (1H, m), 3.24-3.22 (1H, m), 3.14-3.11 (1H, m), 3.04-3.01 (1H, m), 2.47 (3H, s), 1.76-1.67 (1H, m), 1.57-1.47 (1H, m), 1.10-1.08 (3H, m).

Example 29

Production of 3-(5-acetyl-4-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (Compound 2)

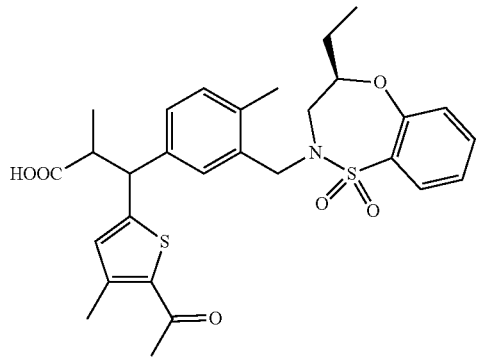 [SMILES: CC[C@@H]1CN(Cc2cc(C(c3cc(C)c(C(C)=O)s3)C(C)C(=O)O)ccc2C)S(=O)(=O)c2ccccc2O1]

A 1M potassium hydroxide aqueous solution (0.8 mL, 0.8 mmol) was added to a methanol/1,4-dioxane (1/1) (1.6 mL) solution of methyl 3-(5-acetyl-4-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoate (26.7 mg, 0.05 mnol), and the mixture was heated under microwave irradiation at 100° C. for 1.5 hours. The reaction solution was returned to room temperature, and the pH was adjusted to 3 with 1M hydrochloric acid, followed by extraction with ethyl acetate and drying over sodium sulfate. The solvent was removed by distillation under reduced pressure. The obtained residue was purified by preparative thin-layer chromatography (dichloromethane/methanol=95/5), thereby obtaining the title compound (10.9 mg, 42%) as a white solid.

¹H NMR (400 MHz, CDCl₃) δ 7.86 (1H, d, J=7.6 Hz), 7.53 (1H, d, J=7.6 Hz), 7.26 (1H, t, J=7.2 Hz), 7.21 (1H, d, J=8.0 Hz), 7.18-7.07 (3H, m), 6.78 (1H, s), 4.57-4.54 (1H, d, J=14.0 Hz), 4.29 (1H, d, J=10.8 Hz), 4.07-3.98 (1H, m), 3.83-3.82 (1H, m), 3.75-3.67 (1H, m), 3.23-3.17 (1H, m), 2.93-2.47 (1H, m), 2.44 (3H, s), 2.42 (3H, s), 2.34 (3H, br s), 1.75-1.60 (1H, m), 1.44-1.33 (1H, m), 1.11-1.04 (6H, m).

Example 30

Production of 3-(5-acetylthiazol-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 40)

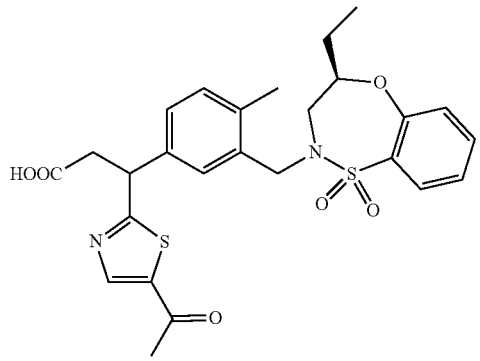 [SMILES: CC[C@@H]1CN(Cc2cc(C(CC(=O)O)c3ncc(C(C)=O)s3)ccc2C)S(=O)(=O)c2ccccc2O1]

A 1M potassium hydroxide aqueous solution (0.8 mL, 0.8 mmol) was added to a methanol/1,4-dioxane (1/1) (1.6 mL) solution of methyl 3-(5-acetylthiazol-2-yl)-3-(3-{[(R)-4-ethyl-1,1-dioxide-3,4-dihydro-2H-benzo[b][1,4,5]oxathiazepin-2-yl]methyl}-4-methylphenyl)-propanoate (19.0 mg, 0.036 mmol), and the mixture was heated under microwave irradiation at 100° C. for 1.5 hours. The reaction solution was returned to room temperature, and the pH was adjusted to 5 with 1M hydrochloric acid, followed by extraction with ethyl acetate. The organic layer was dried over sodium sulfate, and the solvent was removed by distillation under reduced pressure. The obtained residue was purified by silica gel column chromatography (dichloromethane/methanol=100/0→95/5, hexane/ethyl acetate=1/1→0/1→dichloromethane/methanol=98/2), thereby obtaining the title compound (3.8 mg, 20%) as a light brown solid.

$^1$H NMR (400 MHz, CDCl$_3$) δ 8.17 (1H, s), 7.87 (1H, d, J=7.6 Hz), 7.52 (1H, t, J=7.6 Hz), 7.25-7.16 (5H, m), 4.78 (1H, br s), 4.53 (1H, d, J=14.0 Hz), 4.06-3.96 (1H, m), 3.84 (1H, t, J=13.2 Hz), 3.76-3.61 (1H, m), 3.47-3.40 (1H, m), 3.04-2.93 (2H, m), 2.50 (3H, s), 2.33 (3H, s), 1.73-1.58 (1H, m), 1.50-1.40 (1H, m), 1.08-1.06 (3H, m).

Example 31

Production of 3-(5-acetyl-4-methylthiazol-2-yl)-3-(3-[{(R)-4-ethyl-1,1-dioxide-3,4-dihydro-2H-benzo[b][1,4,5]oxathiazepin-2-yl]methyl}-4-methylphenyl) propanoic acid (Compound 41)

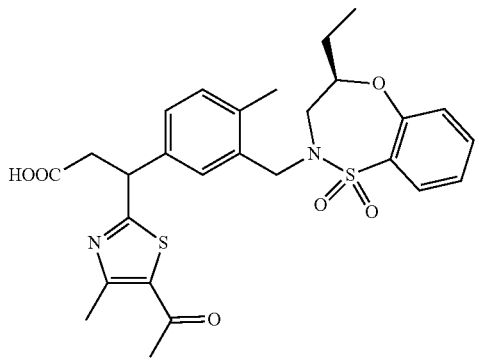 [SMILES: CC[C@@H]1CN(Cc2cc(C(CC(=O)O)c3nc(C)c(C(C)=O)s3)ccc2C)S(=O)(=O)c2ccccc2O1]

A 1M potassium hydroxide aqueous solution (0.6 mL, 0.6 mmol) was added to a methanol/1,4-dioxane (1/1) (1.2 mL) solution of methyl 3-(5-acetyl-4-methylthiazol-2-yl)-3-(3-{[(R)-4-ethyl-1,1-dioxide-3,4-dihydro-2H-benzo[b][1,4,5]oxathiazepin-2-yl]methyl}-4-methylphenyl)-propanoate (24.8 mg, 0.05 mmol), and the mixture was stirred at 100° C. for 14 hours. The reaction solution was returned to room temperature, and the pH was adjusted to 5 with 1M hydrochloric acid, followed by extraction with ethyl acetate. The obtained organic layer was dried over sodium sulfate, and the solvent was removed by distillation under reduced pressure. The obtained residue was dissolved in ethyl acetate, hexane was added, and the mixture was suspended. Then, the suspension was concentrated under reduced pressure, and hexane was added again, followed by filtration under reduced pressure, thereby obtaining the title compound (21.5 mg, 89%) as a white solid.

$^1$H NMR (400 MHz, CDCl$_3$) δ 7.87 (1H, d, J=7.6 Hz), 7.51 (1H, t, J=7.6 Hz), 7.25 (1H, t, J=7.6 Hz), 7.20-7.14 (4H, m), 4.69 (1H, t, J=7.2 Hz), 4.55 (1H, d, J=14.0 Hz), 4.05-3.96 (1H, m), 3.84-3.82 (1H, m), 3.75-3.70 (1H, m), 3.44 (1H, dd, J=16.4, 7.6 Hz), 3.04-2.93 (2H, m), 2.67 (3H, s), 2.43 (3H, s), 2.34 (3H, br s), 1.72-1.62 (1H, m), 1.51-1.36 (1H, m), 1.07-1.04 (3H, m).

Example 32

Production of 3-(3-{[(R)-4-ethyl-1,1-dioxide-3,4-dihydro-2H-benzo[b][1,4,5]oxathiazepin-2-yl]methyl}-4-methylphenyl)-3-(6-oxo-5,6-dihydro-4H-thieno[2,3-c]pyrrol-2-yl) propanoic acid (Compound 38)

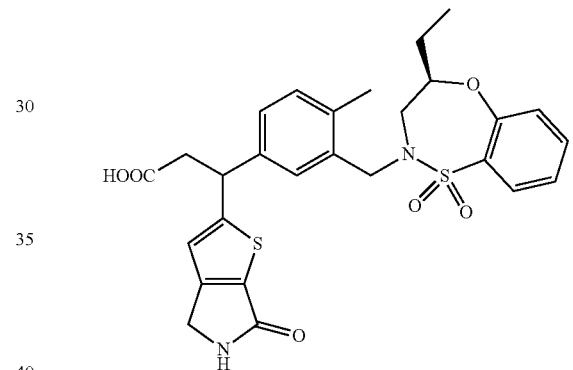

A 1M potassium hydroxide aqueous solution (0.4 mL, 0.4 mmol) was added to a methanol/1,4-dioxane (1/1) (1.6 mL) solution of methyl 3-(3-{[(R)-4-ethyl-1,1-dioxide-3,4-dihydro-2H-benzo[b][1,4,5]oxathiazepin-2-yl]methyl}-4-methylphenyl)-3-(6-oxo-5,6-dihydro-4H-thieno[2,3-c]pyrrol-2-yl)propanoate (20.1 mg, 0.03 mmol), and the mixture was refluxed for 1.5 hours. The reaction solution was cooled to room temperature, and the pH was adjusted to 3 with 1M hydrochloric acid, followed by extraction with ethyl acetate and drying over sodium sulfate. The solvent was removed by distillation under reduced pressure. The obtained residue was purified by preparative thin-layer chromatography (dichloromethane/methanol=9/1), thereby obtaining the title compound (12.2 mg, 63%) as a white solid.

$^1$H NMR (400 MHz, CDCl$_3$) δ 7.87 (1H, d, J=7.6 Hz), 7.52 (1H, t, J=7.6 Hz), 7.26-7.23 (1H, m), 7.2 (1H, d, J=8.0 Hz), 7.15-7.21 (4H, m), 6.86 (1H, s), 4.75 (1H, t, J=7.2 Hz), 4.54-4.53 (1H, m), 4.25 (2H, s), 4.03-3.96 (1H, m), 3.84-3.82 (1H, m), 3.73-3.65 (1H, m), 3.12 (1H, dd, J=16.0, 8.0 Hz), 3.03 (1H, d, J=16.0, 7.2 Hz), 2.96 (1H, d, J=14.4 Hz), 2.32 (3H, s), 1.71-1.60 (1H, m), 1.46-1.36 (1H, m), 1.05 (3H, t, J=7.2 Hz).

Example 33

Production of 3-(5-acetylfuran-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 25)

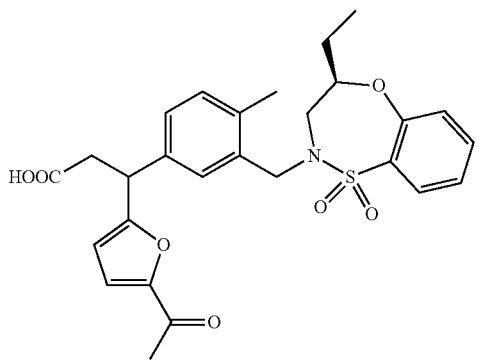 [SMILES: CC[C@@H]1CN(Cc2cc(C(CC(=O)O)c3ccc(C(C)=O)o3)ccc2C)S(=O)(=O)c2ccccc2O1]

Methyl 3-(5-acetylfuran-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (29.9 mg, 0.057 mmol), methanol/dichloromethane (1/1) (1.2 mL), and a 4N sodium hydroxide aqueous solution (200 µL, 0.8 mmol) were used as raw materials, and the same operation was performed as in Example 1, thereby obtaining the title compound (23.5 mg, 81%) as a pale yellow solid.

$^1$H NMR (400 MHz, CDCl$_3$) δ 7.87 (1H, dd, J=8.0, 1.6 Hz), 7.51 (1H, td, J=8.0, 1.6 Hz), 7.26-7.19 (2H, m), 7.15-7.10 (3H, m), 7.06 (1H, d, J=3.6 Hz), 6.15-6.13 (1H, m), 4.56-4.50 (2H, m), 4.04-3.96 (1H, m), 3.85-3.80 (1H, m), 3.76-3.68 (1H, m), 3.18-3.12 (1H, m), 3.00-2.89 (2H, m), 2.39 (3H, s), 2.31 (3H, s), 1.70-1.64 (1H, m), 1.49-1.38 (1H, m), 1.08-1.04 (3H, m).

Example 34

Production of 3-(5-acetylthiophen-3-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 15)

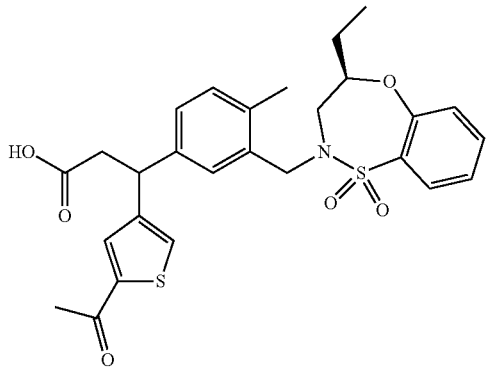 [SMILES: CC[C@@H]1CN(Cc2cc(C(CC(=O)O)c3csc(C(C)=O)c3)ccc2C)S(=O)(=O)c2ccccc2O1]

Methyl 3-(5-acetylthiophen-3-yl)-3-(3-{[(R)-4-ethyl-1,1-dioxide-3,4-dihydro-2H-benzo[b][1,4,5]oxathiazepin-2-yl]methyl}-4-methylphenyl)propanoate (52 mg, 0.096 mmol), methanol/dichloromethane (1/1) (2.0 mL), and a 4N sodium hydroxide aqueous solution (360 µL, 0.14 mmol) were used as raw materials, and the same operation was performed as in Example 1, thereby obtaining the title compound (39.2 mg, 77%) as a pale yellow solid.

$^1$H NMR (400 MHz, CDCl$_3$) δ 7.86 (1H, d, J=8.0 Hz), 7.51 (1H, br t, J=8.0 Hz), 7.45 (1H, dd, J=4.0, 1.2 Hz), 7.29 (1H, br s), 7.26-7.18 (2H, m), 7.13-7.05 (3H, m), 4.53-4.49 (2H, m), 4.01-3.94 (1H, m), 3.84-3.79 (1H, m), 3.74-3.67 (1H, m), 3.07-2.92 (3H, m), 2.47 (3H, s), 2.29 (3H, s), 1.69-1.60 (1H, m), 1.45-1.33 (1H, m), 1.04 (3H, t, J=7.2 Hz).

Example 35

Production of 3-(4-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 10)

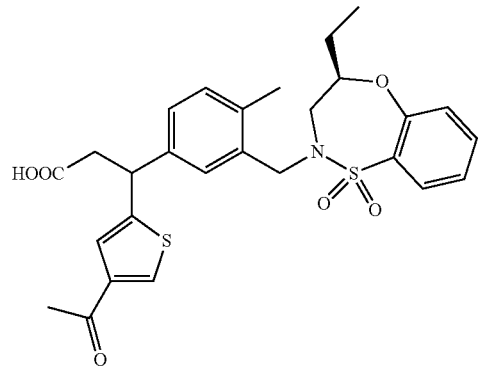 [SMILES: CC[C@@H]1CN(Cc2cc(C(CC(=O)O)c3cc(C(C)=O)cs3)ccc2C)S(=O)(=O)c2ccccc2O1]

Methyl 3-(4-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (25.5 mg, 0.047 mmol), methanol/dichloromethane (1/1) (1.0 mL), and a 4N sodium hydroxide aqueous solution (176.5 µL, 0.7 mmol) were used as raw materials, and the same operation was performed as in Example 1, thereby obtaining the title compound (10.2 mg, 40%) as an oily colorless substance.

$^1$H NMR (400 MHz, CDCl$_3$) δ 7.88 (1H, br d, J=8.0 Hz), 7.84 (1H, br s), 7.52 (1H, br t, J=8.0 Hz), 7.27-7.23 (2H, m), 7.21-7.18 (1H, m), 7.16-7.11 (2H, m), 7.08-7.05 (1H, m), 4.65-4.61 (1H, m), 4.55 (1H, d, J=14.0 Hz), 4.02-3.94 (1H, m), 3.83-3.68 (2H, m), 3.15-3.12 (1H, m), 3.04-2.90 (2H, m), 2.47 (3H, s), 2.29 (3H, br s), 1.69-1.60 (1H, m), 1.45-1.33 (1H, m), 1.06-1.02 (3H, m).

Example 36

Production of 3-(5-cyano-1-methyl-1H-pyrrol-3-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 36)

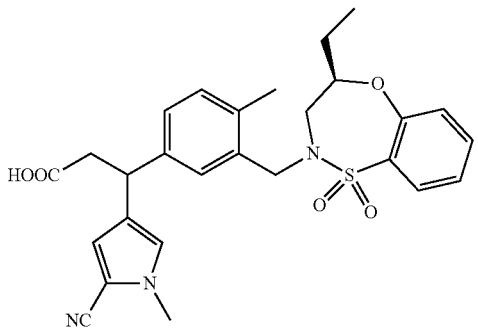 [SMILES: CC[C@@H]1CN(Cc2cc(C(CC(=O)O)c3cc(C#N)n(C)c3)ccc2C)S(=O)(=O)c2ccccc2O1]

Methyl 3-(5-cyano-1-methyl-1H-pyrrol-3-yl)-3-(3-{[(R)-4-ethyl-1,1-dioxide-3,4-dihydro-2H-benzo[b][1,4,5]oxathiazepin-2-yl]methyl}-4-methylphenyl)propanoate (52.4 mg, 0.1 mmol), methanol/dichloromethane (1/1) (1.6 mL), and a 4N sodium hydroxide aqueous solution (375 μL, 1.5 mmol) were used as raw materials, and the same operation was performed as in Example 1, thereby obtaining the title compound (33.0 mg, 65%) as a white solid.

$^1$H NMR (400 MHz, CDCl$_3$) δ 7.88 (1H, dd, J=8.0, 1.6 Hz), 7.52 (1H, td, J=8.0, 1.6 Hz), 7.25 (1H, td, J=8.0, 1.2 Hz), 7.21 (1H, d, J=8.0 Hz), 7.13-7.11 (1H, m), 7.08-7.06 (2H, m), 6.57-6.54 (2H, m), 4.53 (1H, d, J=14.4 Hz), 4.33-4.29 (1H, m), 4.04-3.97 (1H, m), 3.85-3.81 (1H, m), 3.75-3.70 (1H, m), 3.68 (3H, s), 2.99-2.82 (3H, m), 2.31 (3H, s), 1.73-1.64 (1H, m), 1.47-1.38 (1H, m), 1.09-1.06 (3H, m).

Example 37

Production of 3-(3-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoic acid (Compound 44)

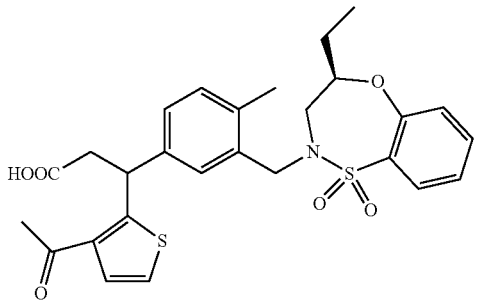 [SMILES: CC[C@@H]1CN(Cc2cc(C(CC(=O)O)c3sccc3C(C)=O)ccc2C)S(=O)(=O)c2ccccc2O1]

Methyl 3-(3-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)propanoate (24.6 mg, 0.045 mmol), methanol/dichloromethane (2/1) (1.05 mL), and a 4N sodium hydroxide aqueous solution (169 μL, 0.68 mmol) were used as raw materials, and the same operation was performed as in Example 1, thereby obtaining the title compound (17.3 mg, 72%) as a pale yellow solid.

$^1$H NMR (400 MHz, CDCl$_3$) δ 7.88 (1H, br d, J=8.0 Hz), 7.51 (1H, br t, J=8.0 Hz), 7.33 (1H, d, J=5.6 Hz), 7.27-7.19 (3H, m), 7.14-7.10 (3H, m), 5.62-5.57 (1H, m), 4.61-4.56 (1H, m), 4.02-3.96 (1H, m), 3.78-3.66 (2H, m), 3.14-3.07 (1H, m), 3.02-2.89 (2H, m), 2.48 (3H, br s), 2.35 (3H, br s), 1.69-1.56 (1H, m), 1.45-1.35 (1H, m), 1.10-1.02 (3H, m).

Example 38

Production of 3-(5-acetylthiophen-2-yl)-2,2-dimethyl-3-(4-methyl-3-{[(R)-4-methyl-1,1-dioxide-3,4-dihydro-2H-benzo[b][1,4,5]oxathiazepin-2-yl]methyl}phenyl)propanoic acid (Compound 12)

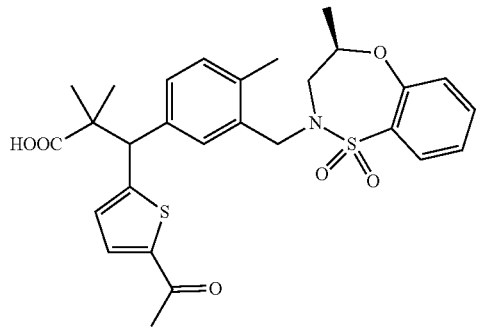 [SMILES: CC(=O)c1ccc(C(c2ccc(C)c(CN3C[C@@H](C)Oc4ccccc4S3(=O)=O)c2)C(C)(C)C(=O)O)s1]

A 2M DEAD toluene solution (76 μL, 0.17 mmol) was added at 0° C. to a THF (0.3 mL) solution of methyl 3-(5-acetylthiophen-2-yl)-3-[3-(hydroxymethyl)-4-methylphenyl]-2,2-dimethylpropanoate (50 mg, 0.14 mmol), (R)-4-methyl-3,4-dihydro-2H-benzo[b][1,4,5]oxathiazepine 1,1-dioxide (29.6 mg, 0.14 mmol), and triphenylphosphine (36.5 mg, 0.14 mmol). The reaction mixture was stirred at room temperature for 29 hours, and water was added, followed by extraction with ethyl acetate. The organic layer was dried over sodium sulfate, and the solvent was distilled under reduced pressure. The residue was purified by silica gel column chromatography (hexane/ethyl acetate (v/v)=70/30→50/50), and the obtained oily colorless substance (35.9 mg) was dissolved in 1,4-dioxane/methanol (1/1) (1.2 μL). A 4N sodium hydroxide aqueous solution (100 μL, 0.4 mmol) was added to the solution, and the mixture was heated under microwave irradiation at 100° C. for 1.5 hours. 1N hydrochloric acid was added, followed by extraction with methanol/dichloromethane (1/9). The organic layer was dried over sodium sulfate, and the solvent was distilled under reduced pressure. The residue was purified by preparative thin-layer chromatography (hexane/ethyl acetate (v/v)=35/65), thereby obtaining the title compound (8.7 mg, 12%) as an oily colorless substance.

$^1$H NMR (400 MHz, CDCl$_3$) δ 7.88 (1H, br d, J=8.0 Hz), 7.55-7.50 (2H, m), 7.28-7.20 (4H, m), 7.15-7.12 (1H, m), 7.01-7.00 (1H, m), 4.71 (1H, d, J=4.8 Hz), 4.58-4.57 (1H, m), 4.35-4.26 (1H, m), 3.84-3.70 (2H, m), 2.95-2.91 (1H, m), 2.50 (3H, s), 2.34 (3H, br s), 1.34-1.31 (3H, m), 1.28-1.24 (6H, m).

Example 39

Production of 3-(5-acetylfuran-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (Compound 24)

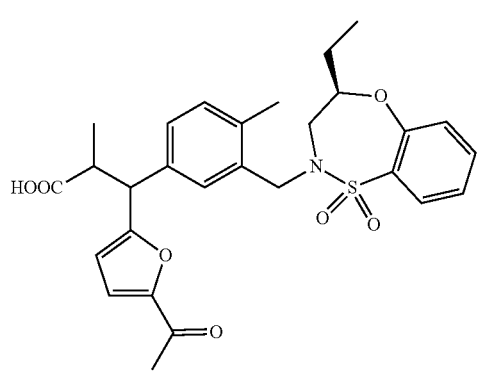 [SMILES: CC[C@@H]1CN(Cc2cc(C(c3ccc(C(C)=O)o3)C(C)C(=O)O)ccc2C)S(=O)(=O)c2ccccc2O1]

Methyl 3-(3-{[(R)-4-ethyl-1,1-dioxide-3,4-dihydro-2H-benzo[b][1,4,5]oxathiazepin-2-yl]methyl}-4-methylphenyl)-2-methyl-3-[5-(2-methyl-1,3-dioxolon-2-yl)furan-2-yl]propanoate (33.9 mg, 0.058 mmol) was dissolved in a 1,4-dioxane (300 μL, 1.2 mmol) solution of 4N hydrochloric acid, and the mixture was stirred for 4 hours. The reaction mixture was diluted with water and extracted with dichloromethane. The organic layer was washed with a saturated sodium hydrogen carbonate aqueous solution and dried over sodium sulfate, and the solvent was concentrated under reduced pressure. The obtained residue was dissolved in methanol/THF (1/1) (0.8 mL), and a 4N sodium hydroxide aqueous solution (220 μL, 0.88 mmol) was added and stirred at room temperature for 16 hours. 1N hydrochloric acid was added to the mixture, followed by extraction with methanol/dichloromethane (1/10). The organic layer was washed with saturated saline and dried over sodium sulfate, and the solvent was concentrated under reduced pressure. The residue was purified by preparative thin-layer chromatography (hexane/ethyl acetate (v/v)=4/1), thereby obtaining the title compound (5.0 mg, 16%) as an oily pale yellow substance.

$^1$H NMR (400 MHz, CDCl$_3$) δ 7.89 (1H, dd, J=8.0, 1.6 Hz), 7.53 (1H, td, J=8.0, 1.6 Hz), 7.28-7.24 (1H, m), 7.23-7.20 (1H, m), 7.18-7.11 (3H, m), 7.06 (1H, br d, J=3.6 Hz), 6.25 (1H, d, J=3.6 Hz), 4.58-4.52 (1H, m), 4.24 (1H, d, J=10.8 Hz), 4.07-3.97 (1H, m), 3.89-3.81 (1H, m), 3.76-3.68 (1H, m), 3.22-3.16 (1H, m), 3.00-2.93 (1H, m), 2.39 (3H, s), 2.33 (3H, s), 1.74-1.63 (1H, m), 1.49-1.35 (1H, m), 1.10-1.04 (6H, m).

Example 40

Production of 3-(5-acetylthiophen-2-yl)-3-(3-{[(R)-4-ethyl-1,1-dioxide-3,4-dihydro-2H-pyrido[2,3-b][1,4,5]oxathiazepin-2-yl]methyl}-4-methylphenyl)-2,2-dimethylpropanoic acid (Compound 46)

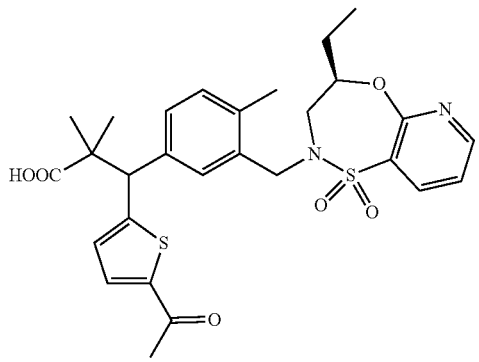 [SMILES: CC[C@@H]1CN(Cc2cc(C(c3ccc(C(C)=O)s3)C(C)(C)C(=O)O)ccc2C)S(=O)(=O)c2cccnc2O1]

Methyl 3-(5-acetylfuran-2-yl)-3-(3-{[(R)-4-ethyl-1,1-dioxide-3,4-dihydro-2H-pyrido[2,3-b][1,4,5]oxathiazepin-2-yl]methyl}-4-methylphenyl)-2,2-dimethylpropanoate (39.4 mg, 0.069 mnol), methanol/dichloromethane (1/1) (0.8 mL), and a 4N sodium hydroxide aqueous solution (259 μL, 1.04 mmol) were used as raw materials, and the same operation was performed as in Example 1, thereby obtaining the title compound (16.7 mg, 43%) as an oily pale yellow substance.

$^1$H NMR (400 MHz, CDCl$_3$) δ 8.22 (1H, br t, J=8.0 Hz), 7.69-7.64 (1H, m), 7.51 (1H, t, J=3.6 Hz), 7.32-7.19 (2H, m), 7.07-7.03 (2H, m), 6.43-6.38 (1H, m), 4.66-4.38 (3H, m), 3.51-3.25 (3H, m), 2.48-2.46 (3H, m), 2.28 (3H, s), 1.33-1.24 (8H, m), 0.81-0.76 (3H, m).

Example 41

Production of 3-(5-acetylthiophen-2-yl)-3-[3-({4-[2-(benzyloxy)ethyl]-1,1-dioxide-3,4-dihydro-2H-benzo[b][1,4,5]oxathiazepin-2-yl}methyl)-4-methylphenyl]-2-methylpropanoic acid (Compound 13)

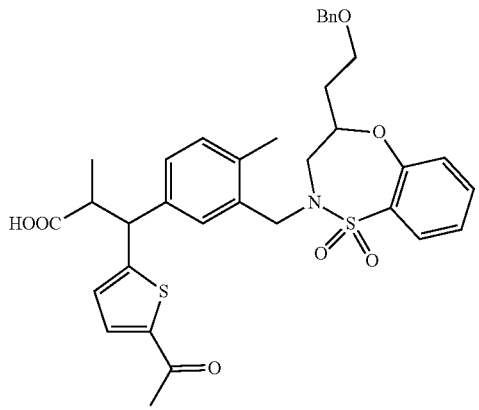 [SMILES: CC(=O)c1ccc(C(c2ccc(C)c(CN3CC(CCOCc4ccccc4)Oc4ccccc4S3(=O)=O)c2)C(C)C(=O)O)s1]

Methyl 3-(5-acetylfuran-2-yl)-3-[3-({4-[2-(benzyloxy)ethyl]-1,1-dioxide-3,4-dihydro-2H-benzo[b][1,4,5]oxathiazepin-2-yl}methyl)-4-methylphenyl)-2-methylpropanoate (29.6 mg, 0.045 mmol), methanol/dichloromethane (1/1) (0.66 mL), and a 4N sodium hydroxide aqueous solution (168 μL, 0.67 mmol) were used as raw materials, and the same operation was performed as in Example 1, thereby obtaining the title compound (6.7 mg, 23%) as a pale yellow solid.

$^1$H NMR (400 MHz, CDCl$_3$) δ 7.88 (1H, dd, J=7.6, 1.2 Hz), 7.50-7.42 (2H, m), 7.39-7.24 (6H, m), 7.18-7.00 (3H, m), 6.96-6.77 (2H, m), 4.76-4.36 (4H, m), 4.34-4.19 (1H, m), 3.93-3.80 (2H, m), 3.77-3.74 (1H, m), 3.63-3.58 (1H, m), 3.31-3.19 (1H, m), 2.88-2.76 (1H, m), 2.47-2.44 (3H, m), 2.39-2.31 (3H, m), 2.00-1.64 (2H, m), 1.12 (3H, t, J=6.8 Hz).

Example 42

Production of 3-(5-acetylthiophen-2-yl)-3-(3-{[4-(2-hydroxyethyl)-1,1-dioxide-3,4-dihydro-2H-benzo[b][1,4,5]oxathiazepin-2-yl]methyl}-4-methylphenyl)-2-methylpropanoic acid (Compounds 43a and 43b)

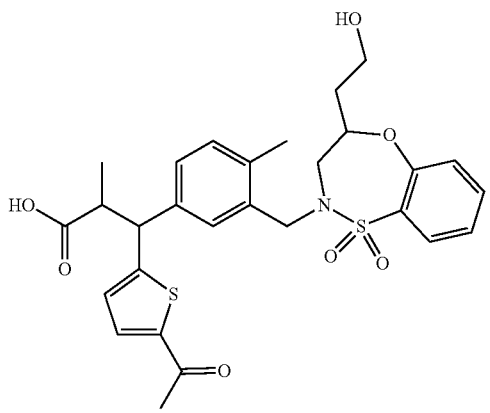 [SMILES: CC(=O)c1ccc(C(c2ccc(C)c(CN3CC(CCO)Oc4ccccc4S3(=O)=O)c2)C(C)C(=O)O)s1]

Methyl 3-(5-acetylthiophen-2-yl)-3-(3-{[4-(2-hydroxyethyl)-1,1-dioxide-3,4-dihydro-2H-benzo[b][1,4,5]oxathiazepin-2-yl]methyl}-4-methylphenyl)-2-methylpropanoate (19 mg, 0.033 mmol), methanol/dichloromethane (1/1) (1.0 mL), and a 4N sodium hydroxide aqueous solution (125 μL, 0.5 mmol) were used as raw materials, and the same operation was performed as in Example 1, thereby obtaining the title compound. The title compound could be separated into two isomer mixtures by preparative thin-layer chromatography; isomer mixture 43a with a shorter retention time (2.7 mg, 15%) was obtained as a pale yellow solid, and isomer mixture 43b with a longer retention time (2.5 mg, 14%) was obtained as a pale yellow solid.

43a: $^1$H NMR (400 MHz, CDCl$_3$) δ 7.90-7.85 (1H, m), 7.55-7.40 (2H, m), 7.31-7.27 (1H, m), 7.24-7.13 (2H, m), 7.10-7.03 (2H, m), 6.92-6.82 (1H, m), 4.74-4.62 (1H, m), 4.41-4.39 (1H, m), 4.31-4.18 (1H, m), 4.04-3.77 (3H, m), 3.72-3.60 (1H, m), 3.12-3.05 (1H, m), 2.87-2.77 (1H, m), 2.49-2.29 (1H, m), 1.89-1.56 (2H, m), 1.12-0.92 (3H, m).

43b: $^1$H NMR (400 MHz, CDCl$_3$) δ 7.90-7.85 (1H, m), 7.55-7.47 (1H, m), 7.42-7.32 (1H, m), 7.29-7.24 (1H, m), 7.22-7.13 (2H, m), 7.11-7.03 (2H, m), 6.93-6.84 (1H, m), 4.75-4.61 (1H, m), 4.44-4.18 (2H, m), 4.05-3.79 (3H, m), 3.73-3.60 (1H, m), 3.15-3.09 (1H, m), 2.88-2.77 (1H, m), 2.49-2.30 (6H, m), 1.91-1.77 (1H, m), 1.63-1.53 (1H, m), 1.14-0.96 (3H, m).

Example 43

Production of 3-(5-acetyl-4-methoxythiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoic acid (Compound 4)

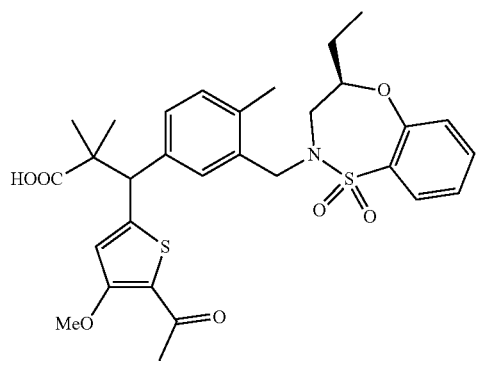 [SMILES: CC[C@@H]1CN(Cc2cc(C(c3cc(OC)c(C(C)=O)s3)C(C)(C)C(=O)O)ccc2C)S(=O)(=O)c2ccccc2O1]

Methyl 3-(5-acetyl-4-fluorothiophen-2-yl)3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoate (48 mg, 0.082 mmol), methanol/1,4-dioxane (1/1) (0.6 mL), and a 4N sodium hydroxide aqueous solution (306 μL, 1.23 mmol) were used as raw materials, and the same operation was performed as in Example 1, thereby obtaining the title compound (4.5 mg, 9%) as a pale yellow solid.

$^1$H NMR (400 MHz, CDCl$_3$) δ 7.88 (1H, br d, J=7.6 Hz), 7.53 (1H, br t, J=7.6 Hz), 7.28-7.20 (5H, m), 7.12 (1H, dd, J=7.6, 2.4 Hz), 6.82-6.80 (1H, m), 4.60 (1H, d, J=3.6 Hz), 4.54 (1H, d, J=14.4 Hz), 4.03-3.99 (1H, m), 3.93 (3H, s), 3.87-3.81 (1H, m), 3.78-3.71 (1H, m), 2.97 (1H, dd, J=7.6, 1.2 Hz), 2.47 (3H, br s), 2.32 (3H, s), 1.74-1.62 (1H, m), 1.49-1.37 (1H, m), 1.33 (3H, br s), 1.25 (3H, br s), 1.11-1.06 (3H, m).

Example 44

Production of 3-(4-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid (Compound 3)

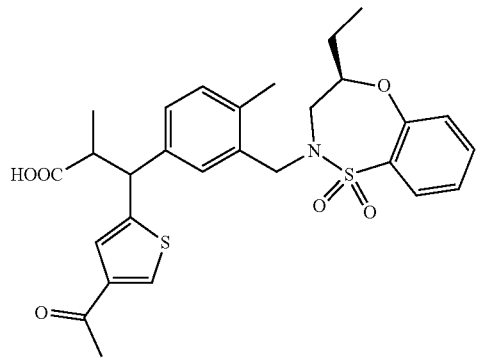 [SMILES: CC[C@@H]1CN(Cc2cc(C(c3cc(C(C)=O)cs3)C(C)C(=O)O)ccc2C)S(=O)(=O)c2ccccc2O1]

2N hydrochloric acid (150 μL) was added to a THF (0.3 mL) solution of methyl 3-(3-{[(R)-4-ethyl-1,1-dioxide-3,4-dihydro-2H-benzo[b][1,4,5]oxathiazepin-2-yl]methyl}-4-methylphenyl)-2-methyl-3-[4-(2-methyl-1,3-dioxolan-2-yl)thiophen-2-yl]propanoate (30 mg, 0.05 mmol), and the mixture was stirred at room temperature for 1.5 hours. The reaction mixture was neutralized with a 1N sodium hydroxide aqueous solution, and extracted with dichloromethane. The organic layer was washed with water and dried over sodium sulfate, and the solvent was concentrated under reduced pressure. The obtained residue (26.5 mg) was dissolved in methanol/dichloromethane (1/1) (1.76 mL), and a 4N sodium hydroxide aqueous solution (188 μL, 0.75 mmol) was added and stirred at 60° C. for 6 hours. 1N hydrochloric acid was added to the mixture, followed by extraction with methanol/dichloromethane (1/10). The organic layer was washed with saturated saline and dried over sodium sulfate, and the solvent was concentrated under reduced pressure. The residue was purified by preparative thin-layer chromatography (hexane/ethyl acetate (v/v)=7/3), thereby obtaining the title compound (11.2 mg, 41%) as a white solid.

$^1$H NMR (400 MHz, CDCl$_3$) δ 7.88 (1H, br d, J=7.6 Hz), 7.83 (1H, dd, J=10.4, 1.2 Hz), 7.55-7.50 (1H, m), 7.36-7.35 (1H, m), 7.28-7.25 (1H, m), 7.24-7.19 (1H, m), 7.17-7.04 (3H, m), 4.66-4.53 (1H, m), 4.30 (1H, d, J=10.8 Hz), 4.03-3.64 (3H, m), 3.31-3.02 (1H, m), 2.96-2.88 (1H, m), 2.46-2.44 (3H, m), 2.35-2.33 (3H, m), 1.70-1.60 (1H, m), 1.44-1.32 (1H, m), 1.09-1.03 (6H, s).

Example 45

Production of 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoic acid (Compound 16)

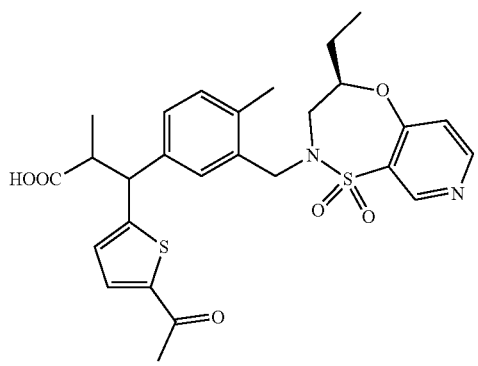 [SMILES: CC[C@@H]1CN(Cc2cc(C(c3ccc(C(C)=O)s3)C(C)C(=O)O)ccc2C)S(=O)(=O)c2cnccc2O1]

Methyl 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoate (24.8 mg, 0.045 mmol), methanol/THF (1/1) (0.6 mL), and a 4N sodium hydroxide aqueous solution (170 μL, 0.67 mmol) were used as raw materials, and the same operation was performed as in Reference Example 3, thereby obtaining the title compound (5.7 mg, 24%) as a pale yellow solid.

$^1$H NMR (400 MHz, CDCl$_3$) δ 9.02 (1H, s), 8.66 (1H, dd, J=5.6, 1.6 Hz), 7.49-7.47 (1H, m), 7.17 (2H, s), 7.12-7.10 (2H, m), 6.98-6.97 (1H, m), 4.47-4.36 (3H, m), 4.22-4.10 (1H, m), 3.50-3.40 (1H, m), 3.26-3.12 (2H, m), 2.47 (3H, s), 2.33 (3H, s), 1.74-1.63 (1H, m), 1.56-1.48 (1H, m), 1.12 (3H, d, J=6.8 Hz), 1.04 (3H, br t, J=7.2 Hz).

Example 46

Production of 3-(5-acetylthiophen-2-yl)-3-(3-{[4-(2-methoxyethyl)-1,1-dioxide-3,4-dihydro-2H-benzo[b][1,4,5]oxathiazepin-2-yl]methyl}-4-methylphenyl)-2-methylpropanoic acid (Compound 42)

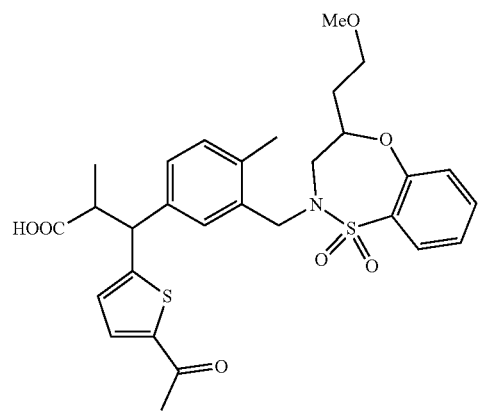 [SMILES: COCCC1CN(Cc2cc(C(c3ccc(C(C)=O)s3)C(C)C(=O)O)ccc2C)S(=O)(=O)c2ccccc2O1]

Methyl 3-(5-acetylthiophen-2-yl)-3-(3-{[4-(2-methoxyethyl)-1,1-dioxide-3,4-dihydro-2H-benzo[b][1,4,5]oxathiazepin-2-yl]methyl}-4-methylphenyl)-2-methylpropanoate (5.5 mg, 0.0094 mmol), methanol/THF (1/1) (0.6 mL), and a 4N sodium hydroxide aqueous solution (105 μL, 0.42 mmol) were used as raw materials, and the same operation was performed as in Example 1, thereby obtaining the title compound (2.3 mg, 43%) as a pale yellow solid.

$^1$H NMR (400 MHz, CDCl$_3$) δ 7.96-7.89 (1H, m), 7.59-7.54 (1H, m), 7.52-7.46 (1H, m), 7.37-7.27 (2H, m), 7.20-7.10 (3H, m), 6.97-6.88 (1H, m), 4.81-4.73 (1H, m), 4.64-4.43 (1H, m), 4.36-4.21 (1H, m), 3.91-3.72 (3H, m), 3.67-0.54 (1H, m), 3.49-3.41 (3H, m), 3.35-3.16 (1H, m), 2.88-2.69 (1H, m), 2.50-2.35 (6H, m), 1.89-1.74 (1H, m), 1.69-1.66 (1H, m), 1.21-1.12 (3H, m).

Example 47

Production of 3-(5-acetyl-4-fluorothiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoic acid (Compound 11)

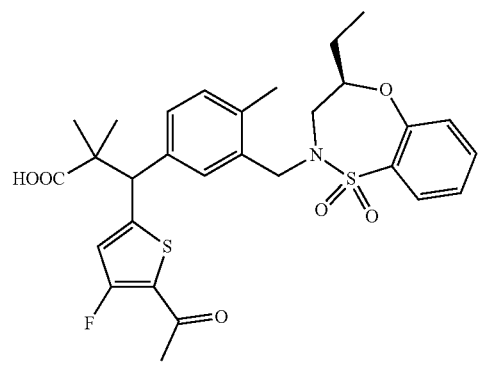 [SMILES: CC[C@@H]1CN(Cc2cc(C(c3cc(F)c(C(C)=O)s3)C(C)(C)C(=O)O)ccc2C)S(=O)(=O)c2ccccc2O1]

Manganese dioxide (647 mg, 7.4 mmol) was added to dichloromethane (2.0 mL) of 3-(3-{[(R)-4-ethyl-1,1-dioxide-3,4-dihydro-2H-benzo[b][1,4,5]oxathiazepin-2-yl]methyl}-4-methylphenyl)-3-[4-fluoro-5-(1-hydroxyethyl)thiophen-2-yl]-2,2-dimethylpropanoic acid (90.7 mg, 0.12 mmol), and the mixture was stirred under heating and refluxing for 2 hours. The mixture was filtered through Celite, and the filtrate was concentrated under reduced pressure. The residue was purified by preparative thin-layer chromatography (hexane/ethyl acetate (v/v)=3/2), thereby obtaining the title compound (13.1 mg, 18%) as a white solid.

$^1$H NMR (400 MHz, CDCl$_3$) δ 7.88 (1H, dt, J=8.0, 1.6 Hz), 7.53 (1H, br t, J=8.0 Hz), 7.28-7.20 (4H, m), 7.16-7.14 (1H, m), 6.79 (1H, d, J=5.2 Hz), 4.57-4.54 (2H, m), 4.06-4.01 (1H, m), 3.86-3.84 (1H, m), 3.74 (1H, dd, J=15.2, 10.4 Hz), 2.97 (1H, dd, J=15.2, 5.6 Hz), 2.51 (3H, br s), 2.34 (3H, s), 1.74-1.61 (1H, m), 1.49-1.41 (1H, m), 1.33 (3H, s), 1.26 (3H, br s), 1.08 (3H, br t, J=7.2 Hz).

Example 48

Production of 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid (Compound 48)

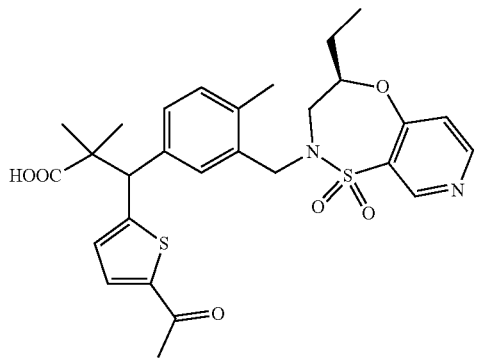 [SMILES: CC[C@@H]1CN(Cc2cc(C(c3ccc(C(C)=O)s3)C(C)(C)C(=O)O)ccc2C)S(=O)(=O)c2cnccc2O1]

Lithium iodide (56.2 mg, 0.42 mmol) was added to a pyridine (306 μL) solution of methyl 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoate (40.0 mg, 0.070 mmol), and the mixture was heated to reflux at 120° C. for 48 hours. The reaction solution was cooled to room temperature, and the solvent was distilled under reduced pressure. The pH was adjusted to 4 with 1N hydrochloric acid, followed by extraction with dichloromethane. The obtained organic layer was dried over sodium sulfate, and the solvent was distilled under reduced pressure. The obtained residue was purified by preparative thin-layer chromatography (methanol/ethyl acetate (v/v)=2/98), thereby obtaining the title compound (6.0 mg, 15%) as a pale yellow solid.

$^1$H NMR (400 MHz, CDCl$_3$) δ 9.00 (1H, br s), 8.66-8.63 (1H, m), 7.54 (1H, d, J=3.6 Hz), 7.30-7.26 (2H, m), 7.16-7.10 (2H, m), 7.05-7.03 (1H, m), 4.74 (1H, br s), 4.46-4.37 (2H, m), 4.17-4.11 (1H, m), 3.46-3.43 (1H, m), 3.20-3.14 (1H, m), 2.50 (3H, s), 2.32 (3H, s), 1.73-1.63 (1H, m), 1.57-1.47 (1H, m), 1.32 (3H, s), 1.27 (3H, br s), 1.06-1.02 (3H, m).

Example 49

Production of 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)propanoic acid (Compound 53)

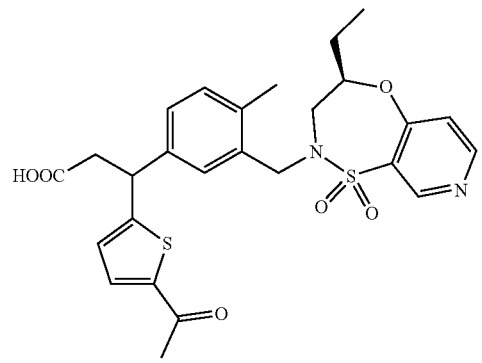 [SMILES: CC[C@@H]1CN(Cc2cc(C(CC(=O)O)c3ccc(C(C)=O)s3)ccc2C)S(=O)(=O)c2cnccc2O1]

Methyl 3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)propanoate (48.2 mg, 0.089 mmol), methanol/tetrahydrofuran (1/1) (0.8 mL), and a 4N sodium hydroxide aqueous solution (190 μL, 0.76 mmol) were used as raw materials, and the same operation was performed as in Example 1, thereby obtaining the title compound (8.6 mg, 18%) as a pale yellow solid.

$^1$H NMR (400 MHz, CDCl$_3$) δ 9.00 (1H, s), 8.62 (1H, d, J=5.6 Hz), 7.49 (1H, br s), 7.16-7.08 (4H, m), 6.88 (1H, br s), 4.71 (1H, t, J=7.6 Hz) 4.43-4.37 (2H, m), 4.16-4.12 (1H, m), 3.51-3.42 (1H, m), 3.19-3.02 (3H, m), 2.47 (3H, s), 2.32 (3H, s), 1.70-1.61 (1H, m), 1.56-1.48 (1H, m), 1.02 (3H, t, J=7.6 Hz).

Example 50

Production of 3-(5-acetyl-4-fluorothiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid (Compound 49)

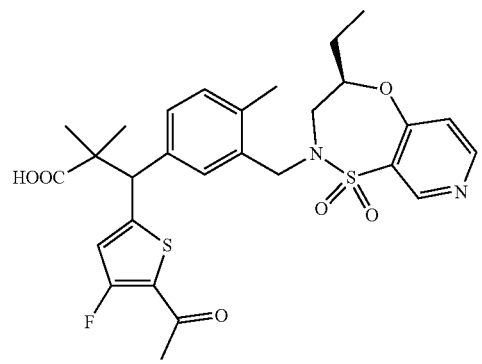 [SMILES: CC[C@@H]1CN(Cc2cc(C(c3cc(F)c(C(C)=O)s3)C(C)(C)C(=O)O)ccc2C)S(=O)(=O)c2cnccc2O1]

Lithium iodide (49.7 mg, 0.37 mmol) was added to a pyridine (300 μL) solution of methyl 3-(5-acetyl-4-fluorothiophen-2-yl)-3-(3-{[(R)-4-ethyl-1,1-dioxide-3,4-dihydro- 2H-pyrido[4,3-b][1,4,5]oxathiazepin-2-yl]methyl}-4-methylphenyl)-2,2-dimethylpropanoate (35.9 mg, 0.061 mmol), and the mixture was heated to reflux at 125° C. for 18 hours. The reaction solution was cooled to room temperature, and the solvent was distilled under reduced pressure. The pH was adjusted to 5 with 1N hydrochloric acid, followed by extraction with dichloromethane. The obtained organic layer was dried over sodium sulfate, and the solvent was distilled under reduced pressure. The obtained residue was purified by preparative thin-layer chromatography (dichloromethane/methanol (v/v)=95/5), thereby obtaining the title compound (10.6 mg, 30%) as a white solid.

$^1$H NMR (400 MHz, CDCl$_3$) δ 9.00, 8.99 (each 0.5H, s), 8.65, 8.64 (each 0.5H, d, J=5.6 Hz), 7.26-7.23 (3H, m), 7.16 (1H, d, J=7.6 Hz), 7.11, 7.10 (each 0.5H, d, J=5.4 Hz), 6.84, 6.83 (each 0.5H, s), 4.59, 4.58 (each 0.5H, s), 4.51-4.43 (1H, m), 4.39, 4.38 (each 0.5H, d, J=14.4 Hz), 4.17 (1H, d, J=14.4 Hz), 3.50-3.42 (1H, m), 3.21, 3.18 (each 0.5H, dd, J=14.4, 4.8 Hz), 2.52, 2.51 (each 1.5H, s), 2.33, 2.32 (each 1.5H, s), 1.74-1.63 (1H, m), 1.61-1.50 (1H, m), 1.34, 1.33 (each 1.5H, s), 1.25 (3H, s), 1.04 (3H, t, J=7.2 Hz).

Example 51

Production of 3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid (Compound 50)

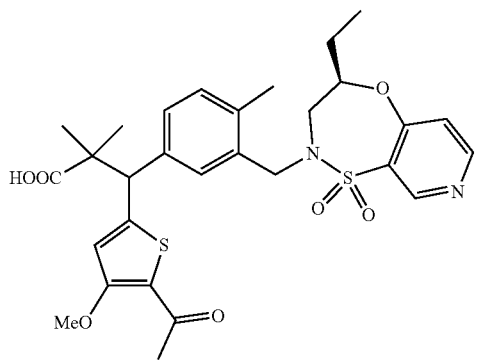 [SMILES: CC[C@@H]1CN(Cc2cc(C(c3cc(OC)c(C(C)=O)s3)C(C)(C)C(=O)O)ccc2C)S(=O)(=O)c2cnccc2O1]

A 1M tetrabutylammonium fluoride THF solution (420 μL, 0.42 mmol) was added to a DMF (1.5 mL) solution of 2-(trimethylsilyl)ethyl 3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoate (the entire amount of the compound synthesized in Reference Example 195), and the mixture was stirred at room temperature for 2 hours. Water was added to the mixture, and the pH was adjusted to 5 with 1M hydrochloric acid, followed by extraction with dichloromethane. The organic layer was dried over sodium sulfate, and the solvent was removed under reduced pressure. Then, the obtained crude product was purified by silica gel column chromatography (dichloromethane/methanol (v/v)=1/0/37→96/4), thereby obtaining the title compound (104.5 mg, 83%) as a white solid.

$^1$H NMR (400 MHz, CDCl$_3$) δ 9.01, 9.00 (each 0.5H, s), 8.65, 8.64 (each 0.5H, d, J=5.6 Hz), 7.29-7.26 (2H, m), 7.14 (1H, d, J=7.6 Hz), 7.11, 7.10 (each 0.5H, d, J=5.6 Hz), 6.83, 6.82 (each 0.5H, s), 4.64, 4.61 (each 0.5H, s), 4.48-4.42 (1H, m), 4.37 (1H, d, J=14.4 Hz), 4.17 (1H, d, J=14.4 Hz), 3.94 (3H, s), 3.50-3.43 (1H, m), 3.22-3.15 (1H, m), 2.47 (3H, s), 2.312, 2.311 (each 1.5H, s), 1.74-1.64 (1H, m), 1.58-1.50 (1H, m), 1.344, 1.341 (each 1.5H, s), 1.28, 1.27 (each 1.5H, s), 1.05, 1.04 (each 1.5H, t, J=7.2 Hz).

Example 52

Production of 3-(5-acetyl-4-fluorothiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoic acid (Compound 52)

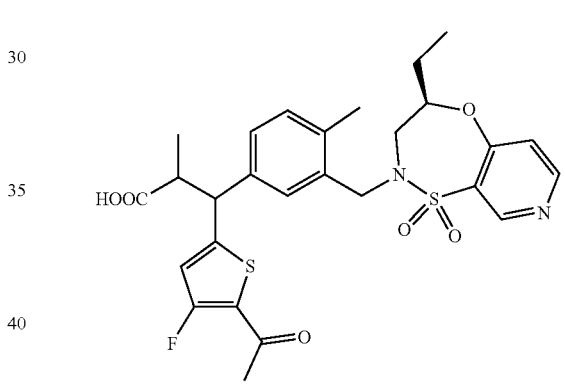

Lithium iodide (66.8 mg, 0.5 mmol) was added to a pyridine (200 μL) solution of methyl 3-(5-acetyl-4-fluorothiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoate (28.7 mg, 0.05 mmol), and the mixture was heated under microwave irradiation at 140° C. for 2.5 hours. The reaction solution was cooled to room temperature, and the solvent was distilled under reduced pressure. The pH was adjusted to 4 with 1N hydrochloric acid, followed by extraction with dichloromethane. The obtained organic layer was dried over sodium sulfate, and the solvent was distilled under reduced pressure. The obtained residue was purified by preparative thin-layer chromatography (methanol/dichloromethane (v/v)=5/95), thereby obtaining the title compound (2.0 mg, 7%) as a light yellow solid.

$^1$H NMR (400 MHz, CDCl$_3$) δ 9.02-9.00 (1H, m), 8.67-8.64 (1H, m), 7.20-7.09 (4H, m), 6.76-6.74 (1H, m), 4.46-4.35 (2H, r), 4.30-4.10 (2H, m), 3.51-3.40 (1H, m), 3.22-3.15 (2H, m), 2.51-2.48 (3H, m), 2.33-2.31 (3H, m), 1.75-1.66 (1H, m), 1.58-1.52 (1H, m), 1.11 (3H, br d, J=7.2 Hz), 1.05 (3H, br t, J=7.6 Hz).

Example 53

Production of 3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoic acid (Compound 51)

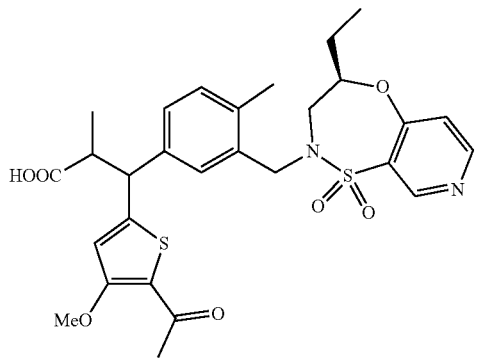 [SMILES: CC[C@@H]1CN(Cc2cc(C(c3cc(OC)c(C(C)=O)s3)C(C)C(=O)O)ccc2C)S(=O)(=O)c2cnccc2O1]

A 1M tetrabutylammonium fluoride THF solution (315 µL, 0.32 mmol) was added to a THF (0.7 mL) solution of 2-(trimethylsilyl)ethyl 3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoate (42.4 mg, 0.063 mmol), and the mixture was stirred at room temperature for 2 hours. 1N hydrochloric acid was added to the mixture, followed by extraction with dichloromethane/methanol (95/5). The organic layer was washed with saturated saline and dried over sodium sulfate, and the solvent was distilled under reduced pressure. The obtained crude product was purified by silica gel column chromatography (dichloromethane/methanol (v/v)=100/0→99/1), thereby obtaining the title compound (22.5 mg, 62%) as a white solid.

$^1$H NMR (400 MHz, CDCl$_3$) δ 9.02 (1H, s), 8.64 (1H, br d, J=5.6 Hz), 7.14-708 (4H, m), 6.73 (1H, s), 4.46-4.35 (2H, m), 4.27 (1H, br d, J=10.8 Hz), 4.22-4.07 (1H, m), 3.87 (3H, br s), 3.55-3.44 (1H, m), 3.22-3.08 (2H, m), 2.38 (3H, br s), 2.31 (3H, s), 1.73-1.65 (1H, m), 1.54-1.49 (1H, m), 1.05-1.01 (6H, m).

Test Example 1

Test Example 1-1. Measurement 1 of Nrf2 Activating Action (Binding Assay)

Compounds 1 to 53 produced in the Examples were used as test substances.

The inhibitory activity of each compound on the binding between NRF2 and KEAP1 was measured by bioluminescence resonance energy transfer (BRET) assay. A plasmid having human NRF2 (Original Clone ID: ha01449s1) sequence fused with NanoLuc (19 kDa, Promega) at the N-terminal was transduced into HCE-T cells using FuGENE HD (Promega). 48 hours after transduction, the cell lysate was collected and used as an NRF2-expressing cell lysate. A plasmid having human KEAP1 (Original Clone ID: cs00328) sequence fused with HaloTag (33 kDa, Promega) at the C-terminal was transduced into HCE-T cells using FuGENE HD (Promega). After 24 hours, HaloTag Nano BRET 618 Ligand (Promega) was added to the medium. The cell lysate cultured for 24 hours after the addition was used as a KEAP1-expressing cell lysate.

The NRF2-expressing cell lysate and the KEAP1-expressing cell lysate were adjusted so that the luminescence and fluorescence intensities per well were constant. Tables 1 and 2 show the formulation of each reaction solution.

TABLE 1

| KEAP1 solution | Final concentration |
|---|---|
| DTT | 5 mM |
| NaCl | 15 mM |
| BSA | 0.01% |
| Tris-HCl | 50 mM |
| KEAP1-expressing cell lysate | Fluorescence intensity: about 3 (Excitation filter: 520 nm, Emission filter: 580-640 nm) |

TABLE 2

| NRF2 solution | Final concentration |
|---|---|
| NaCl | 15 mM |
| BSA | 0.01% |
| Tris-HCl | 50 mM |
| NRF2-expressing cell lysate | Fluorescence intensity: about 10000000 (Emission filter: 495 short pass) |

Each test substance at a concentration 100 times higher than the test concentration was dissolved in dimethylsulfoxide for adjustment. 49 µL of KEAP1 solution was added to a 96-well polystyrene microplate (FALCON) to which 1 µL of each test substance solution was added, followed by incubation for 15 minutes. Then, 50 µL of NRF2 solution was added to the above solution, followed by incubation for 1 hour. To measure the binding between NRF2 and KEAP1, NanoBRET Nano-Glo Substrate (Promega) diluted with Opti-Mem (Thermo Fisher Scientific) was added, followed by shaking for 30 seconds. Then, luminescence and fluorescence were measured using the GloMax Discover System (Promega). A 495-nm short pass filter and a 600-nm long pass filter were respectively used to measure donor and acceptor emission values. A value obtained by dividing the acceptor emission value by the donor emission value was regarded as BRET value. A BRET value when the compound was not added, and a BRET value when the KEAP1 solution was not added were respectively used as binding rates of 100% and 0%, and the binding rate when the compound was added was calculated. Further, using this binding rate, the 50% binding inhibitory activity concentration (IC50) was calculated from the following formula:

$$IC50(M)=10^{\wedge}(LOG(A/B)\times(50-C)/(D-C)+LOG(B))$$

A: higher concentration out of 2 close concentrations across the inhibition rate of 50%
B: lower concentration out of 2 close concentrations across the inhibition rate of 50%
C: inhibition rate at B
D: inhibition rate at A

Test Example 1-2. Measurement 2 of Nrf2 Activating Action (Reporter Assay)

The NRF2 activating action of the compounds on cells was measured by a reporter gene assay. pGL4.37[luc2P/ARE/Hygro](Promega) was introduced into HCE-T cells using FuGENE HD. Cells that acquired drug resistance as a result of transduction were screened by culture in the presence of 50 μg/mL hygromycin, and a clone strain, HCE-T/ARE-Luc, was established.

HCE-T/ARE-Luc was cultured using DMEM/F12, 10 ng/mL hEGF, 5 μg/mL insulin, and 5% FBS. Phenol red-free DMEM/F12 was used as the assay medium.

HCE-T/ARE-Luc was seeded in a 96-well polystyrene microplate (FALCON) with 10000 cells per well. The cells were incubated in a CO: incubator at 37° C. for 16 hours to allow for cell adhesion. The test substance was dissolved in dimethylsulfoxide to prepare a solution at a concentration 1000 times higher than the test concentration. The test substance diluted 1000-fold in the assay medium was added, followed by culture for 24 hours. When measuring the activity of the reporter, the medium containing the test substance was removed, and then a new medium and a substrate of ONE-GloEX Luciferase Assay System (Promega) were added. The plate was shaken for 1 minute and then allowed to stand at ordinary temperature for 10 minutes, and luminescence was detected using the GloMax Discover System.

The 50% activation concentration of each test substance was calculated by creating a calibration curve between two concentrations across the luminescence intensity of 50%.

Test Example 1-3. Measurement of Metabolic Stability 1 mmol/L DMSO solutions of the compounds produced in the Examples were prepared. Each of the 1 mmol/L DMSO solutions was diluted with acetonitrile to 10 μmol/L, and then diluted with a 6.5 mmol/L Q-NADPH solution to 200 nmol/L. 50 μL of each solution was added to the reaction group and the non-reaction group. 50 μL of a 0.2 mg protein/mL human liver microsome (Mixed Gender, Pool of 50 livers; XenoTech, LLC) solution was added to the reaction group, followed by incubation at 37° C. for 30 minutes with shaking. After 400 μL of methanol was added to the non-reaction group, 50 μL of a 0.2 mg protein/mL human liver microsome solution was added to adjust the formulation. After incubation in the reaction group, 400 μL of methanol was added to stop the reaction. The samples of the reaction group and non-reaction group were allowed to stand at −20° C. for about 30 minutes, followed by centrifugation at 4° C. at 3000 rpm for about 10 minutes. The supernatant was analyzed using LC/MS/MS, and the residual ratio of the test compound was calculated from the peak area value of the test compound using the following formula. The measurement was carried out using the following devices: HPLC system: LC-20A-Series High Performance Liquid Chromatograph (Shimadzu Corporation) and mass spectrometer: API 4000 (AB Sciex Pte. Ltd.), or using equivalent devices.

Residual ratio (%)=(peak area value of test compound in reaction group/peak area value of test compound in non-reaction group)×100

Results

Tables 3 to 11 show the results. Tables 3 to 8 and 10 show the results of $IC_{50}$ (nM, binding assay) and metabolic stability, and Tables 9 and 11 show the results of $EC_{50}$ (nM, reporter assay).

TABLE 3

| Cpd. No. | $R^{1a}, R^{1b}$ | $R^2$ | $R^3$ | Y | $R^4, R^5\ R^6$ | A, Z | $IC_{50}$ (nM, binding assay) | Metabolic stability* |
|---|---|---|---|---|---|---|---|---|
| 1 | Me, H | thiophene-2,5-diyl with $R^3$ | Acetyl | H | H, Me  Et | phenyl | 0.24 | 37% |
| 2 | Me, H | thiophene with Y, $R^3$ | Acetyl | Me | H, Me  Et | phenyl | 0.25 | 21% |
| 3 | Me, H | thiophene with $R^3$ | Acetyl | H | H, Me  Et | phenyl | 0.17 | 51% |
| 4 | Me, Me | thiophene with Y, $R^3$ | Acetyl | OMe | H, Me  Et | phenyl | 0.41 | 48% |

TABLE 3-continued

| Cpd. No. | R¹ᵃ, R¹ᵇ | R² | R³ | Y | R⁴, R⁵ | R⁶ | A, Z | IC$_{50}$ (nM, binding assay) | Metabolic stability* |
|---|---|---|---|---|---|---|---|---|---|
| 5 | H, H | 2-thienyl (5-R³) | Acetyl | H | H, Me | Et | 1,2-phenylene | 0.23 | 53% |
| 6 | Me, Me | 2-thienyl (5-R³) | Acetyl | H | H, Me | Et | 1,2-phenylene | 0.27 | 32% |
| 7 | H, H | 2-thienyl (3-Y, 5-R³) | Acetyl | Me | H, Me | Et | 1,2-phenylene | 0.36 | 30% |
| 8 | H, H | 2-thienyl (3-Y, 5-R³) | Acetyl | F | H, Me | Et | 1,2-phenylene | 0.36 | 36% |

TABLE 4

| Cpd. No. | R¹ᵃ, R¹ᵇ | R² | R³ | Y | R⁴, R⁵ | R⁶ | A, Z | IC$_{50}$ (nM, binding assay) | Metabolic stability* |
|---|---|---|---|---|---|---|---|---|---|
| 9 | Me, Me | 2-thienyl (5-R³) | Acetyl | H | H, Me | Et | 3-fluoro-1,2-phenylene | 0.30 | 38% |
| 10 | H, H | 2-thienyl (4-R³) | Acetyl | H | H, Me | Et | 1,2-phenylene | 0.30 | 39% |
| 11 | Me, Me | 2-thienyl (3-Y, 5-R³) | Acetyl | F | H, Me | Et | 1,2-phenylene | 0.23 | 27% |

TABLE 4-continued

| Cpd. No. | R¹ᵃ, R¹ᵇ | R² | R³ | Y | R⁴, R⁵ | R⁶ | A, Z | IC₅₀ (nM, binding assay) | Metabolic stability* |
|---|---|---|---|---|---|---|---|---|---|
| 12 | Me, Me | thiophene-R³ | Acetyl | H | H, Me | Me | benzene | 0.28 | 56% |
| 13 | Me, H | thiophene-R³ | Acetyl | H | H, Me | CH2CH2OBn | benzene | 0.50 | 2% |

TABLE 5

| Cpd. No. | R¹ᵃ, R¹ᵇ | R² | R³ | Y | R⁴, R⁵ | R⁶ | A, Z | IC₅₀ (nM, binding assay) | Metabolic stability* |
|---|---|---|---|---|---|---|---|---|---|
| 14 | H, H | Y-thiophene-R³ | Acetyl | | Me H, Me | Et | benzene | 1.3 | 25% |
| 15 | H, H | thiophene-R³ | Acetyl | | H H, Me | Et | benzene | 1.4 | 47% |
| 16 | Me, H | thiophene-R³ | Acetyl | | H H, Me | Et | pyridine | 0.2 | 51% |
| 17 | H, H | thiophene-R³ | H | | H H, Me | Et | benzene | 28 | 36% |
| 18 | H, H | thiophene-R³ | Aminosulfonyl | | H H, Me | Et | benzene | 35 | 40% |

TABLE 6

| Cpd. No. | R1a, R1b | R2 | R3 | Y | R4, R5 | R6 | A, Z | IC50 (nM, binding assay) | Metabolic stability* |
|---|---|---|---|---|---|---|---|---|---|
| 19 | H, H | 2-thienyl (R3 at 5) | Cyano | H | H, Me | Et | benzo | 3.1 | 23% |
| 20 | H, H | 2-thienyl (R3 at 5) | Cyclopropyl-carbonyl | H | H, Me | Et | benzo | 24 | 7% |
| 21 | H, H | 2-thienyl (R3 at 5) | methylamino-carbonyl | H | H, Me | Et | benzo | 4.6 | 74% |
| 22 | H, H | 3-thienyl (R3 at 5) | methylamino-carbonyl | H | H, Me | Et | benzo | 6.1 | 77% |
| 23 | H, H | 2-thienyl (R3 at 5) | carbamoyl | H | H, Me | Et | benzo | 0.39 | 75% |
| 24 | Me, H | 2-furyl (R3 at 5) | Acetyl | H | H, Me | Et | benzo | 0.83 | 72% |
| 25 | H, H | 2-furyl (R3 at 5) | Acetyl | H | H, Me | Et | benzo | 3.8 | 72% |

TABLE 7

| Cpd. No. | R¹ᵃ, R¹ᵇ | R² | R³ | Y | R⁴, R⁵ | R⁶ | A, Z | IC$_{50}$ (nM, binding assay) | Metabolic stability* |
|---|---|---|---|---|---|---|---|---|---|
| 26 | H, H | furan-2,5-diyl (R³ at 5) | Methylaminocarbonyl | H | H, Me | Et | phenylene | 17 | 93% |
| 27 | H, H | furan-2,5-diyl (R³ at 5) | dimethylaminocarbonyl | H | H, Me | Et | phenylene | 20 | 85% |
| 28 | H, H | furan-2,5-diyl (R³ at 5) | N-pyrrolidinylcarbonyl | H | H, Me | Et | phenylene | 19 | 67% |
| 29 | H, H | furan-2,5-diyl (R³ at 5) | isopropylaminocarbonyl | H | H, Me | Et | phenylene | 17 | 83% |
| 30 | H, H | furan-2,5-diyl (R³ at 5) | 2-Methoxyethyl-amminocarbonyl | H | H, Me | Et | phenylene | 14 | 81% |
| 31 | H, H | furan (Y at 3, R³ at 2) | Methylaminocarbonyl | Me | H, Me | Et | phenylene | 99 | 77% |
| 32 | H, H | furan-2,5-diyl (R³ at 5) | isopropylaminomethyl | H | H, Me | Et | phenylene | 205 | 90% |
| 33 | H, H | pyrrole (N-Y, R³ at 5) | Acetyl | Me | H, Me | Et | phenylene | 0.30 | 62% |

TABLE 8

| Cpd. No. | $R^{1a}$, $R^{1b}$ | $R^2$ | $R^3$ | Y | $R^4$, $R^5$ | $R^6$ | A, Z | IC$_{50}$ (nM, binding assay) | Metabolic stability* |
|---|---|---|---|---|---|---|---|---|---|
| 34 | H, H | pyrrole (N-Y, R³) | Acetyl | Et | H, Me | Et | benzene | 47 | 54% |
| 35 | H, H | pyrrole (Me, N-Me, R³, Y) | Acetyl | Me | H, Me | Et | benzene | 3.9 | 39% |
| 36 | H, H | pyrrole (R³, N-Me) | Cyano | H | H, Me | Et | benzene | 2.5 | 29% |
| 37 | H, H | 4-oxo-tetrahydroindole (N-Me) | — | — | H, Me | Et | benzene | 0.16 | 89% |
| 38 | H, H | thieno-pyrrolone | — | — | H, Me | Et | benzene | 0.22 | 61% |
| 39 | H, H | thiazole | — | H | H, Me | Et | benzene | 3.8 | 89% |
| 40 | H, H | thiazole (R³) | Acetyl | H | H, Me | Et | benzene | 2.6 | 69% |
| 41 | H, H | thiazole (Y, R³) | Acetyl | Me | H, Me | Et | benzene | 3.3 | 65% |

TABLE 9

| Cpd. No. | R¹ᵃ, R¹ᵇ | R² | R³ | Y | R⁴, R⁵ | R⁶ | A, Z | EC$_{50}$ (nM, reporter assay) |
|---|---|---|---|---|---|---|---|---|
| 1 | Me, H | thiophene (2,5-) with R³ | Acetyl | H | H, Me | Et | benzene | 9.19 |
| 2 | Me, H | thiophene (2,5-) with Y, R³ | Acetyl | Me | H, Me | Et | benzene | 9.00 |
| 3 | Me, H | thiophene (2,4-) with R³ | Acetyl | H | H, Me | Et | benzene | 6.81 |
| 4 | Me, Me | thiophene (2,5-) with Y, R³ | Acetyl | OMe | H, Me | Et | benzene | 7.17 |
| 13 | Me, H | thiophene (2,5-) with R³ | Acetyl | H | H, Me | CH2CH2OBn | benzene | 6.71 |
| 16 | Me, H | thiophene (2,5-) with R³ | Acetyl | H | H, Me | Et | pyridine | 3.57 |

TABLE 10

| Cpd. No. | R¹ᵃ, R¹ᵇ | R² | R³ | Y | R⁴, R⁵ | R⁶ | A, Z | IC$_{50}$ (nM, binding assay) | Metabolic stability* |
|---|---|---|---|---|---|---|---|---|---|
| 48 | Me, Me | thiophene (2,5-) with R³ | Acetyl | H | H, Me | Et | pyridine | 0.39 | 56% |

TABLE 10-continued
| Cpd. No. | $R^{1a}$, $R^{1b}$ | $R^2$ | $R^3$ | Y | $R^4$, $R^5$ | $R^6$ | A, Z | IC$_{50}$ (nM, binding assay) | Metabolic stability* |
|---|---|---|---|---|---|---|---|---|---|
| 49 | Me, Me | 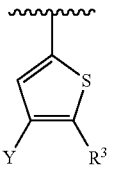 | Acetyl | F | H, Me | Et | 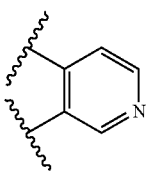 [SMILES: *c1ccncc1*] | 0.31 | 44% |
| 50 | Me, Me | 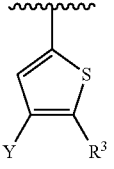 | Acetyl | OMe | H, Me | Et | 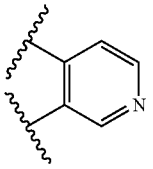 [SMILES: *c1ccncc1*] | 0.19 | 48% |
| 51 | Me, H | 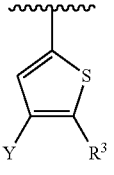 | Acetyl | OMe | H, Me | Et | 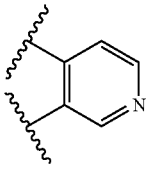 [SMILES: *c1ccncc1*] | 0.41 | 50% |
| 52 | Me, H | 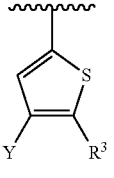 | Acetyl | F | H, Me | Et | 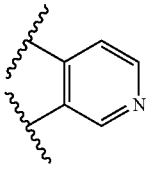 [SMILES: *c1ccncc1*] | 0.27 | 53% |
| 53 | H, H | 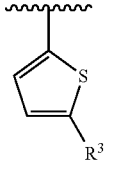 | Acetyl | H | H, Me | Et | 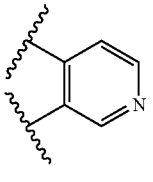 [SMILES: *c1ccncc1*] | 2.3 | — |
TABLE 11
| Cpd. No. | $R^{1a}$, $R^{1b}$ | $R^2$ | $R^3$ | Y | $R^4$, $R^5$ | $R^6$ | A, Z | EC$_{50}$ (nM, reporter assay) |
|---|---|---|---|---|---|---|---|---|
| 48 | Me, Me | 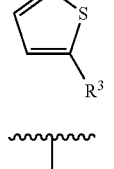 | Acetyl | H | H, Me | Et | 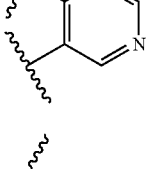 | 3.67 |
| 49 | Me, Me | 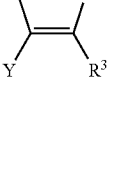 | Acetyl | F | H, Me | Et | 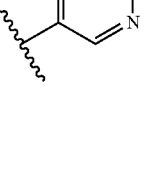 | 7.76 |

TABLE 11-continued

| Cpd. No. | $R^{1a}, R^{1b}$ | $R^2$ | $R^3$ | Y | $R^4, R^5$ | $R^6$ | A, Z | $EC_{50}$ (nM, reporter assay) |
|---|---|---|---|---|---|---|---|---|
| 50 | Me, Me | (thiophene with Y, $R^3$) | Acetyl | OMe | H, Me | Et | (pyridine) | 2.98 |
| 51 | Me, H | (thiophene with Y, $R^3$) | Acetyl | OMe | H, Me | Et | (pyridine) | 7.47 |

The invention claimed is:

1. A compound represented by formula (I), a salt of the compound, solvate of the compound, or a salt of the solvate:

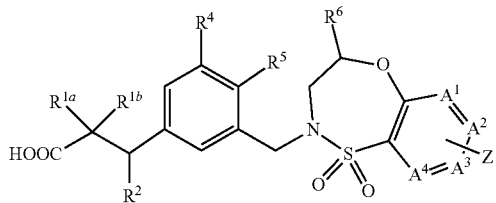
(I)

wherein $R^{1a}$ and $R^{1b}$ are identical or different and represent a hydrogen atom, an alkyl group, or a halogen atom; $R^2$ represents an optionally substituted heterocycle selected from the group consisting of thiophene, furan, pyrrole, and thiazole, or a fused ring thereof; $R_4$ and $R_5$ are identical or different and represent a hydrogen atom or an optionally substituted alkyl group, or $R_4$ and $R_5$ bind with each other to form —NH—CH=N—; $R^6$ represents an optionally substituted alkyl group; $A^1$, $A^2$, $A^3$, and $A^4$ are identical or different and represent CH or N wherein the number of N is 1 or less; and Z represents a hydrogen atom or a halogen atom.

2. The compound according to claim 1, salt of the compound, solvate of the compound or salt of the solvate, wherein $R^2$ represents a thienyl group optionally having a substituent.

3. The compound according to claim 2, salt of the compound, solvate of the compound or salt of the solvate, wherein the optional substituent of the thienyl is an electron-withdrawing group.

4. The compound according to claim 2, salt of the compound, solvate of the compound or salt of the solvate, wherein the optional substituent of the thienyl is an acetyl group, an aminosulfonyl group, a cyano group, or a cycloalkyl carbonyl group.

5. The compound according to claim 1, salt of the compound, solvate of the compound or salt of the solvate, wherein $R^2$ is a group represented by formula (R2A):

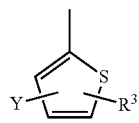
(R2A)

wherein $R^3$ represents an acetyl group, an aminosulfonyl group, a cyano group, or a cycloalkyl carbonyl group; and Y represents a hydrogen atom, an alkyl group, a halogen atom, or an alkoxy group.

6. The compound according to claim 1, salt of the compound, solvate of the compound or salt of the solvate, wherein $R^2$ is a group represented by formula (R2Aa) or (R2Ab):

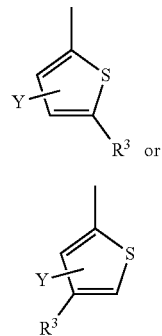

wherein $R^3$ represents an acetyl group, an aminosulfonyl group, a cyano group, or a cycloalkyl carbonyl group; and Y represents a hydrogen atom, an alkyl group, a halogen atom, or an alkoxy group.

7. The compound according to claim 5, salt of the compound, solvate of the compound or salt of the solvate, wherein $R^3$ represents an acetyl group.

8. The compound according to claim 5, salt of the compound, solvate of the compound or salt of the solvate, wherein $R^4$ and $R^5$ are identical or different and represent a hydrogen atom or an alkyl group.

9. The compound according to claim 5, salt of the compound, solvate of the compound or salt of the solvate, wherein $R^{1a}$ and $R^{1b}$ are identical or different and represent a hydrogen atom or an alkyl group.

10. The compound according to claim 5, salt of the compound, solvate of the compound or salt of the solvate, wherein $R^{1a}$ and $R^{1b}$ are identical or different and represent a hydrogen atom or an alkyl group; $R^3$ represents an acetyl group; $R^4$ and $R^5$ are identical or different and represent a hydrogen atom or an alkyl group; $R^6$ represents an optionally substituted ethyl group; $A^1$, $A^2$, and $A^4$ are all CH, and $A^3$ represents CH or N; Y represents a hydrogen atom, an alkyl group, a halogen atom, or an alkoxy group; and Z represents a hydrogen atom.

11. The compound according claim 5, salt of the compound, solvate of the compound or salt of the solvate, wherein one of $R^{1a}$ and $R^{1b}$ is an alkyl group, and the other is a hydrogen atom, or $R^{1a}$ and $R^{1b}$ are both an alkyl group, $R^2$ is represented by formula (R2Aa):

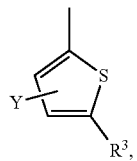

(R2Aa)

wherein $R^3$ represents an acetyl group, Y represents a hydrogen atom, an alkyl group, a halogen atom, or an alkoxy group;
$R^4$ represents a hydrogen atom;
$R^5$ represents an alkyl group,
$R^6$ represents an optionally substituted ethyl group,
$A^1$, $A^2$, and $A^4$ are all CH, and $A^3$ represents CH or N; and Z represents a hydrogen atom.

12. A compound selected from the group consisting of:
3-(5-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid,
3-(5-acetyl-4-methylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid,
3-(4-acetylthiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2-methylpropanoic acid,
3-(5-acetyl-4-methoxythiophen-2-yl)-3-(3-{[(R)-4-ethyl-1,1-dioxide-3,4-dihydro-2H-benzo[b][1,4,5]oxathiazepin-2-yl]methyl}-4-methylphenyl)-2,2-dimethylpropanoic acid,
3-(5-acetylthiophen-2-yl)-3-[3-({4-[2-(benzyloxy)ethyl]-1,1-dioxide-3,4-dihydro-2H-benzo[b][1,4,5]oxathiazepin-2-yl}methyl)-4-methylphenyl]-2-methylpropanoic acid,
3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoic acid,
3-(5-acetylthiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid,
3-(5-acetyl-4-fluorothiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid,
3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2,2-dimethylpropanoic acid, and
3-(5-acetyl-4-methoxythiophen-2-yl)-3-(3-{[(R)-4-ethyl-1,1-dioxide-3,4-dihydro-2H-pyrido[4,3-b][1,4,5]oxathiazepin-2-yl]methyl}-4-methylphenyl)-2-methylpropanoic acid,
or a salt of the compound, a solvate of the compound, or a salt of the solvate.

13. A pharmaceutical composition comprising a compound of claim 1, a salt of the compound, a solvate of the compound or a salt of the solvate, and a pharmaceutically acceptable additive.

14. The pharmaceutical composition according to claim 13, which is an Nrf2 (NF-E2-related factor 2) activator.

15. The pharmaceutical composition according to claim 13, which is a topically administered formulation.

16. The pharmaceutical composition according to claim 13, which is an ophthalmic formulation.

17. The pharmaceutical composition according to claim 13, which is a parenterally administered formulation.

18. The pharmaceutical composition according to claim 13, which is an intravenously administered formulation.

19. The compound according to claim 1, salt of the compound, solvate of the compound or salt of the solvate, wherein $R^2$ represents an oxohydroindole or an oxohydrothienopyrrole.

20. A method of treating a brain disease, a lung disease, a skin disease, an otologic disease, a kidney disease, or an ophthalmic disease, the method comprising administering a therapeutically effective amount of a compound according to claim 1 or salt of the compound, solvate of the compound, or salt of the solvate to a subject in need thereof.

21. A method of treating a brain disease, a lung disease, a skin disease, an otologic disease, a kidney disease, or an ophthalmic disease, the method comprising administering a therapeutically effective amount of the pharmaceutical composition according to claim 13 to a subject in need thereof.

* * * * *